(12) United States Patent
Ghassabian

(10) Patent No.: US 10,976,922 B2
(45) Date of Patent: Apr. 13, 2021

(54) DATA ENTRY SYSTEMS

(71) Applicant: Benjamin Firooz Ghassabian, Jerusalem (IL)

(72) Inventor: Benjamin Firooz Ghassabian, Jerusalem (IL)

( * ) Notice: Subject to any disclaimer, the term of this patent is extended or adjusted under 35 U.S.C. 154(b) by 610 days.

(21) Appl. No.: 15/412,026

(22) Filed: Jan. 22, 2017

(65) Prior Publication Data
US 2018/0210643 A1 Jul. 26, 2018

Related U.S. Application Data

(62) Division of application No. 14/767,606, filed as application No. PCT/US2014/016777 on Feb. 18, 2014, now abandoned.

(60) Provisional application No. 61/765,751, filed on Feb. 17, 2013, provisional application No. 61/766,747, filed on Feb. 20, 2013, provisional application No. 61/769,285, filed on Feb. 26, 2013, provisional application No. 61/772,066, filed on Mar. 4, 2013, provisional application No. 61/774,605, filed on Mar. 8, 2013, provisional application No. 61/777,102, filed on Mar. 12, 2013, provisional application No. 61/778,888, filed on Mar. 13, 2013, provisional application No. 61/802,690, filed on Mar. 17, 2013, provisional application No. 61/803,456, filed on Mar. 20, 2013, provisional application No. 61/804,681, filed on Mar. 24, 2013, provisional application No. 61/810,805, filed on Apr. 11, 2013, provisional application No. 61/811,756, filed on Apr. 14, 2013, provisional application No. 61/813,271, filed on Apr. 18, 2013, provisional application No. 61/814,290, filed on Apr. 21, 2013, provisional application No. 61/819,598, filed on May 5, 2013, provisional application No. 61/821,331, filed on May 9, 2013, provisional application No. 61/822,934, filed on May 14, 2013, provisional application No. 61/823,971, filed on May 16, 2013, provisional application No. 61/825,049, filed on May 19, 2013, provisional
(Continued)

(51) Int. Cl.
*G06F 3/0488* (2013.01)
*G06F 3/0481* (2013.01)
*G06F 3/023* (2006.01)

(52) U.S. Cl.
CPC ........ *G06F 3/04886* (2013.01); *G06F 3/0233* (2013.01); *G06F 3/0237* (2013.01); *G06F 3/0481* (2013.01); *G06F 3/04883* (2013.01); *G06F 2203/04803* (2013.01); *G06F 2203/04804* (2013.01); *H04M 2250/22* (2013.01)

(58) Field of Classification Search
CPC .......................... G06F 3/04886; G06F 3/0233
See application file for complete search history.

(56) References Cited

U.S. PATENT DOCUMENTS

| | | | |
|---|---|---|---|
| 5,936,614 A * | 8/1999 | An ...................... | G06F 3/04886 345/173 |
| 6,903,723 B1 * | 6/2005 | Forest ...................... | A61F 4/00 345/157 |

(Continued)

*Primary Examiner* — Dino Kujundzic

(57) ABSTRACT

A system is described with a plurality of keys, five of the keys representing all of the letters of an alphabet. The five keys are arranged to form two to three rows of keys. A first row includes two of the five keys and a second row includes at least two other keys of the five keys. The keys are hard keys and/or virtual keys.

21 Claims, 67 Drawing Sheets

Related U.S. Application Data application No. 61/827,020, filed on May 24, 2013, provisional application No. 61/830,114, filed on Jun. 2, 2013, provisional application No. 61/833,512, filed on Jun. 11, 2013, provisional application No. 61/833,991, filed on Jun. 12, 2013, provisional application No. 61/834,889, filed on Jun. 14, 2013, provisional application No. 61/835,704, filed on Jun. 17, 2013, provisional application No. 61/837,662, filed on Jun. 21, 2013, provisional application No. 61/838,288, filed on Jun. 23, 2013, provisional application No. 61/838,403, filed on Jun. 24, 2013, provisional application No. 61/841,360, filed on Jun. 30, 2013, provisional application No. 61/843,391, filed on Jul. 7, 2013, provisional application No. 61/846,030, filed on Jul. 14, 2013, provisional application No. 61/858,210, filed on Jul. 25, 2013, provisional application No. 61/860,396, filed on Jul. 31, 2013, provisional application No. 61/865,254, filed on Aug. 13, 2013, provisional application No. 61/866,119, filed on Aug. 15, 2013, provisional application No. 61/868,172, filed on Aug. 21, 2013, provisional application No. 61/869,722, filed on Aug. 25, 2013, provisional application No. 61/875,192, filed on Sep. 9, 2013, provisional application No. 61/878,695, filed on Sep. 17, 2013, provisional application No. 61/879,152, filed on Sep. 18, 2013, provisional application No. 61/882,160, filed on Sep. 25, 2013, provisional application No. 61/893,291, filed on Oct. 21, 2013, provisional application No. 61/899,240, filed on Nov. 3, 2013, provisional application No. 61/902,242, filed on Nov. 10, 2013, provisional application No. 61/908,122, filed on Nov. 24, 2013, provisional application No. 61/908,248, filed on Nov. 25, 2013, provisional application No. 61/913,472, filed on Dec. 9, 2013, provisional application No. 61/920,572, filed on Dec. 24, 2013, provisional application No. 61/926,474, filed on Jan. 13, 2014, provisional application No. 61/927,039, filed on Jan. 14, 2014, provisional application No. 61/929,187, filed on Jan. 20, 2014, provisional application No. 61/931,633, filed on Jan. 26, 2014, provisional application No. 61/937,545, filed on Feb. 9, 2014.

(56) References Cited

U.S. PATENT DOCUMENTS

| | | | | |
|---|---|---|---|---|
| 7,081,887 B2* | 7/2006 | Harrison | ............ | G06F 3/04886 345/168 |
| 7,705,829 B1* | 4/2010 | Plotnikov | ............ | G06F 3/0236 341/22 |
| 8,584,031 B2* | 11/2013 | Moore | ................ | G06F 3/0482 715/773 |
| 2010/0066698 A1* | 3/2010 | Seo | ..................... | G06F 3/04883 345/173 |
| 2012/0084678 A1* | 4/2012 | Sirpal | .................. | G06F 1/1616 715/761 |
| 2012/0127082 A1* | 5/2012 | Kushler | ............. | G06F 3/04886 345/169 |
| 2012/0235921 A1* | 9/2012 | Laubach | ............... | G06F 3/0238 345/172 |
| 2012/0306767 A1* | 12/2012 | Campbell | ........... | G06F 3/04883 345/173 |
| 2013/0076595 A1* | 3/2013 | Sirpal | .................. | G06F 3/1438 345/1.3 |
| 2013/0093680 A1* | 4/2013 | Ogita | .................... | H01Q 1/243 345/168 |
| 2014/0028562 A1* | 1/2014 | St Clair | ............. | G06F 3/04883 345/168 |
| 2014/0089833 A1* | 3/2014 | Hwang | ............... | G06F 3/04817 715/769 |
| 2015/0007088 A1* | 1/2015 | Itoh | ...................... | G06F 1/1643 715/773 |
| 2015/0049026 A1* | 2/2015 | Chen | ................... | G06F 3/04886 345/173 |
| 2016/0041965 A1* | 2/2016 | Ghassabian | ............. | G06F 3/005 715/261 |
| 2016/0259533 A1* | 9/2016 | Sudabattula | ............. | G09G 5/14 |
| 2016/0330150 A1* | 11/2016 | Joe | ........................ | H04L 51/046 |
| 2017/0308273 A1* | 10/2017 | Choi | ................... | G06F 3/04842 |
| 2017/0310616 A1* | 10/2017 | Cao | ....................... | H04L 51/046 |
| 2017/0357521 A1* | 12/2017 | Paek | .................... | G06F 3/04817 |

\* cited by examiner

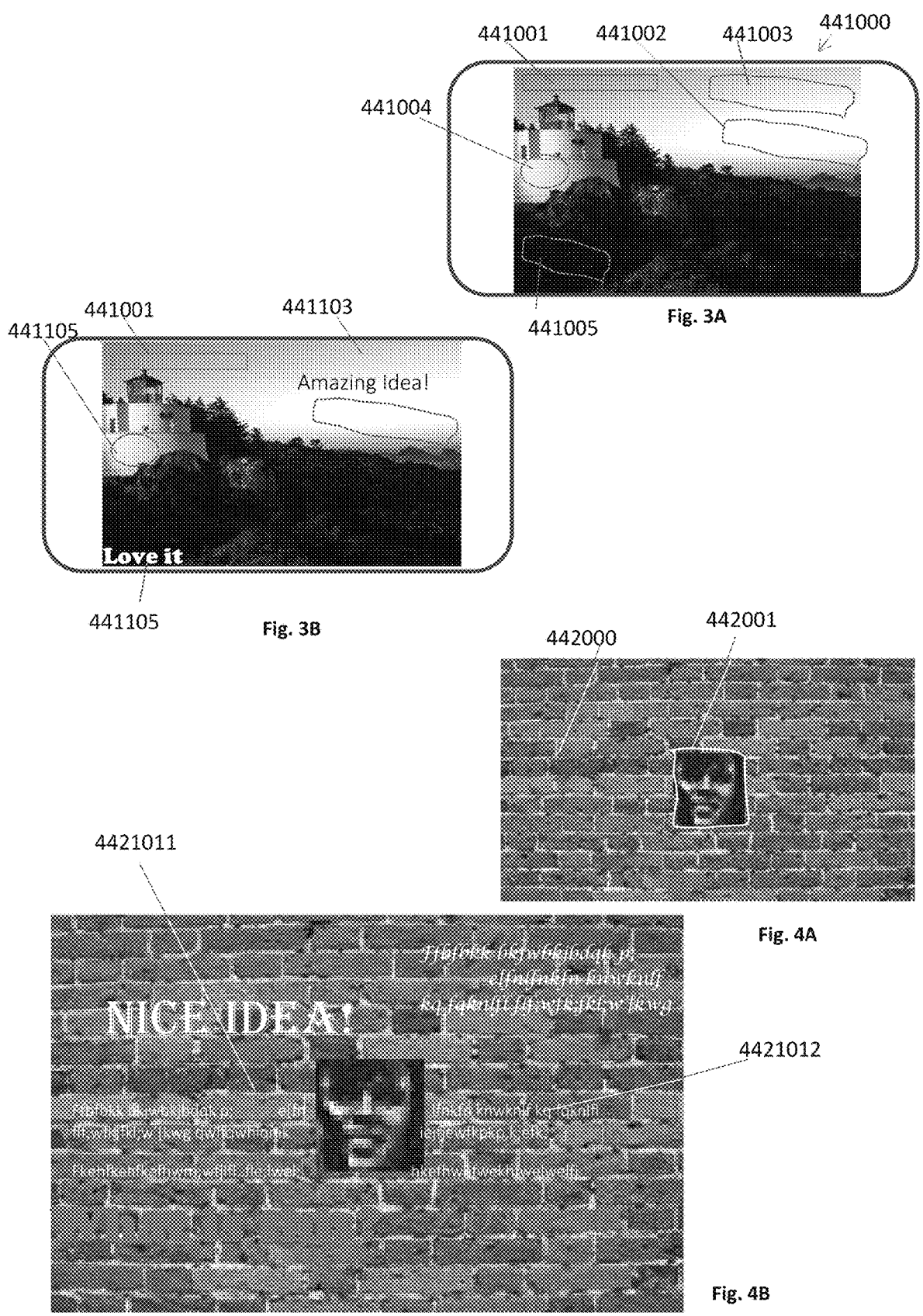

453000

QWERTYUIOP
ASDFGHJKL
ZXCVB&NM

TYISLEWNADRO

Fig. 10A 452001

ADELINORSTWY

ADEL

INORSTWY

ADELIN      ORSTWY

Fig. 10D

457302
ab cd efg hij kl mn op qr s tuv wx yz
a bcd e fghi jkl mn o pqr s t uvw xyz
ab cd efg hij kl mn op qr s tu vw wyz
457301 ——— abc d efgh ijk lm n opq r s tuv wx yz

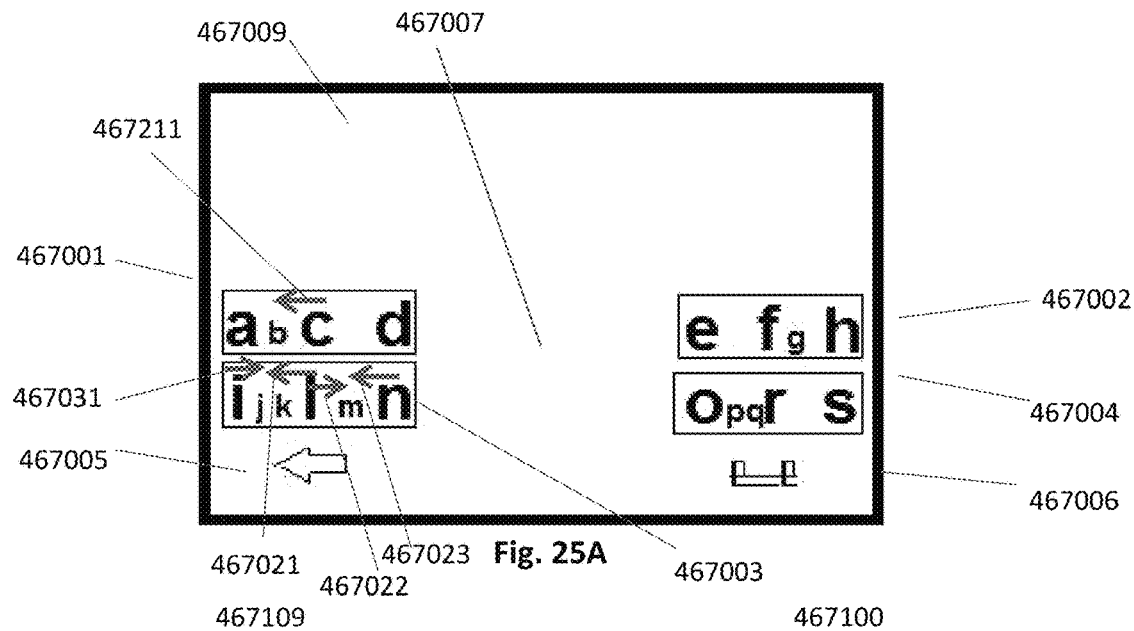
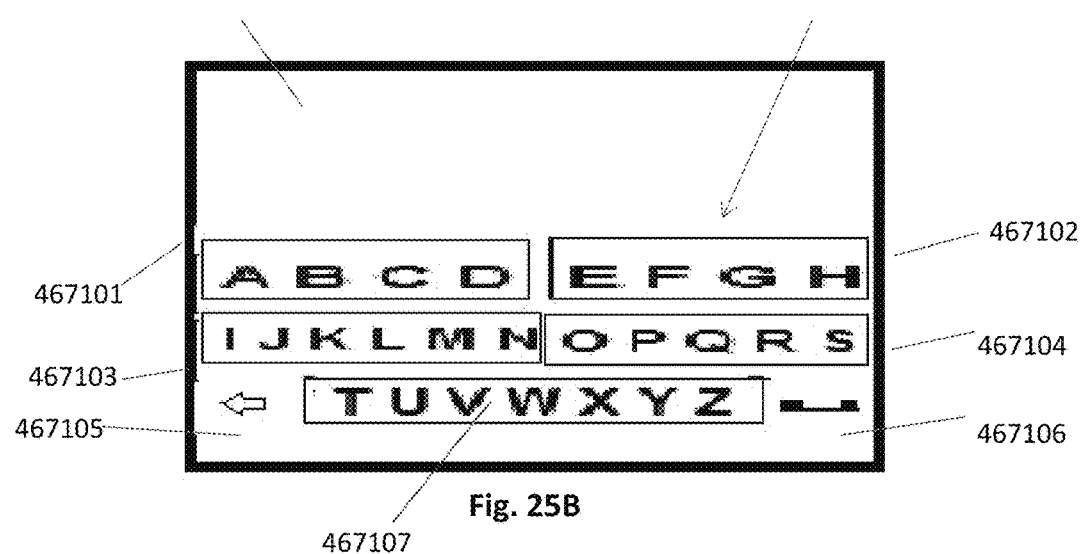
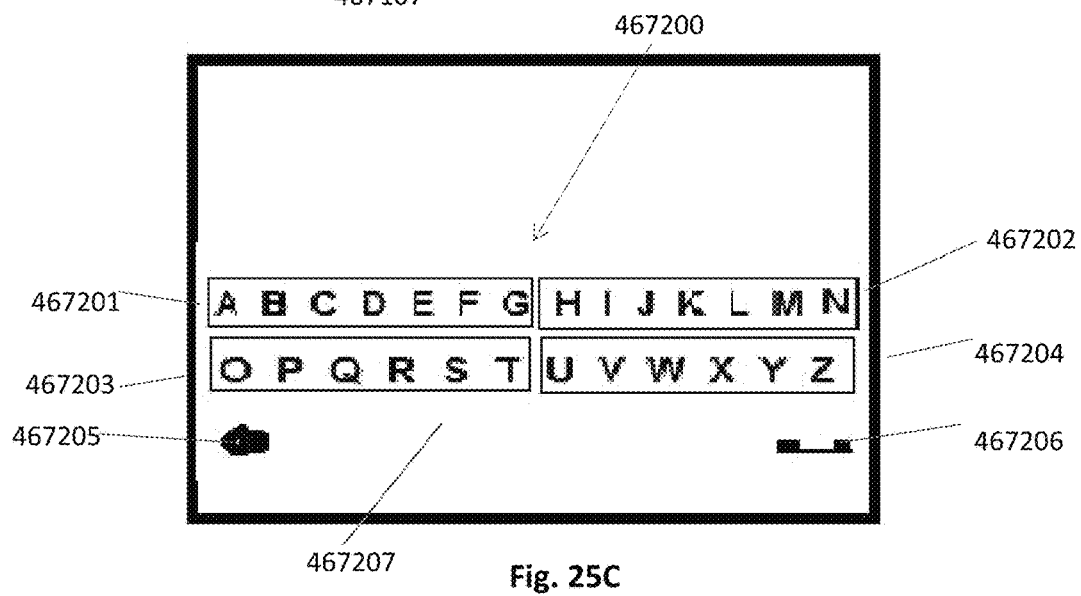

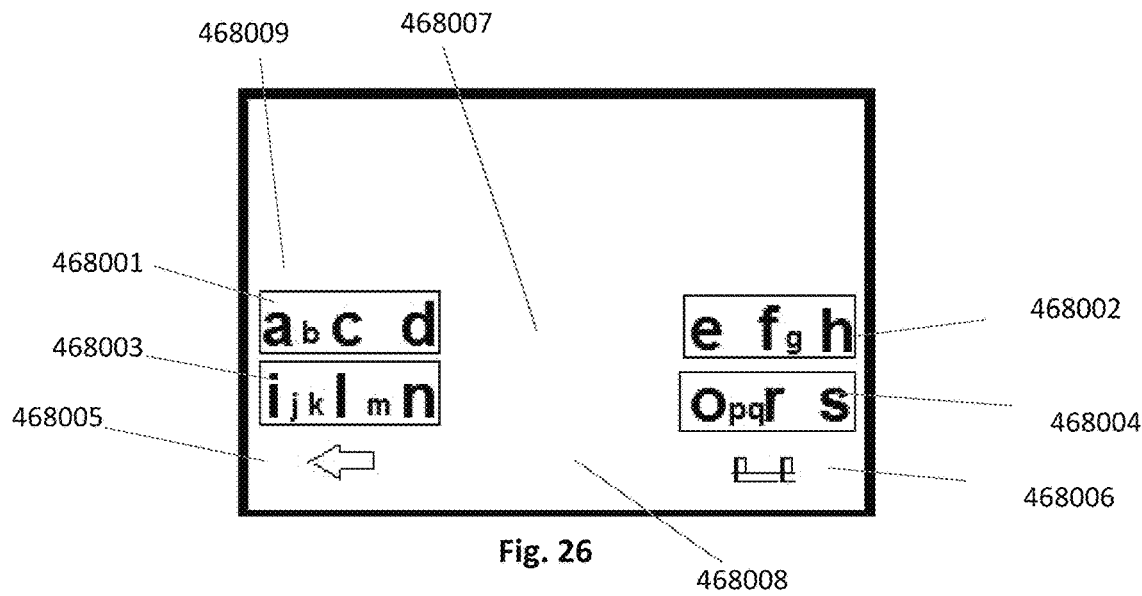
Fig. 26
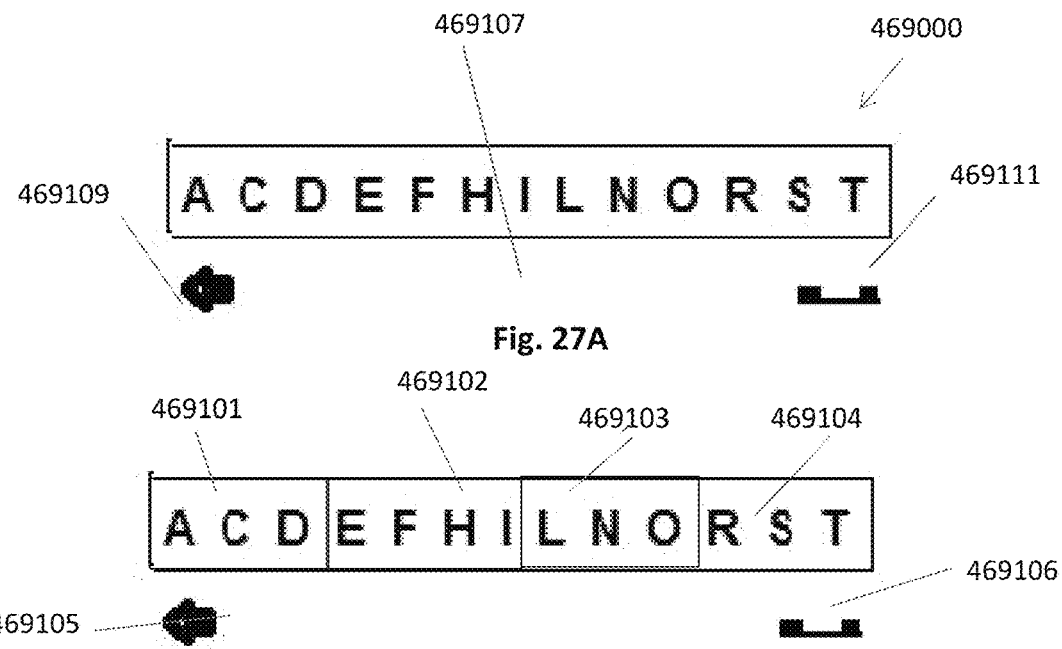
Fig. 27A
Fig. 27B
Fig. 28

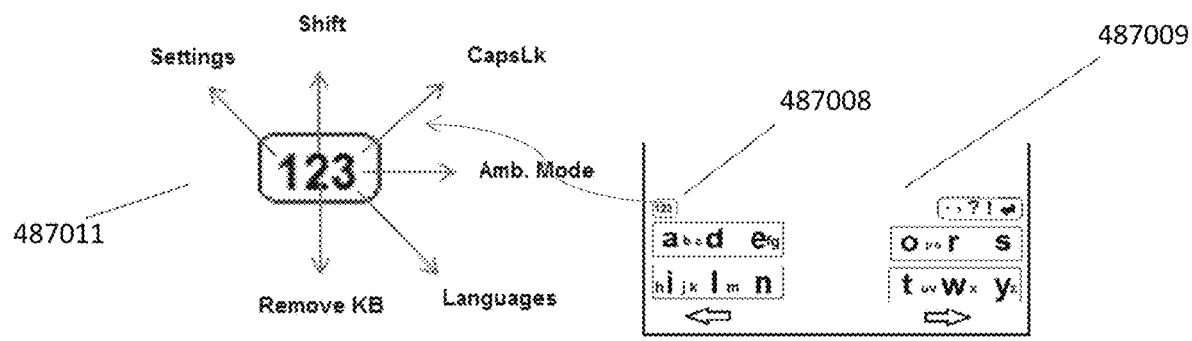
Fig. 41
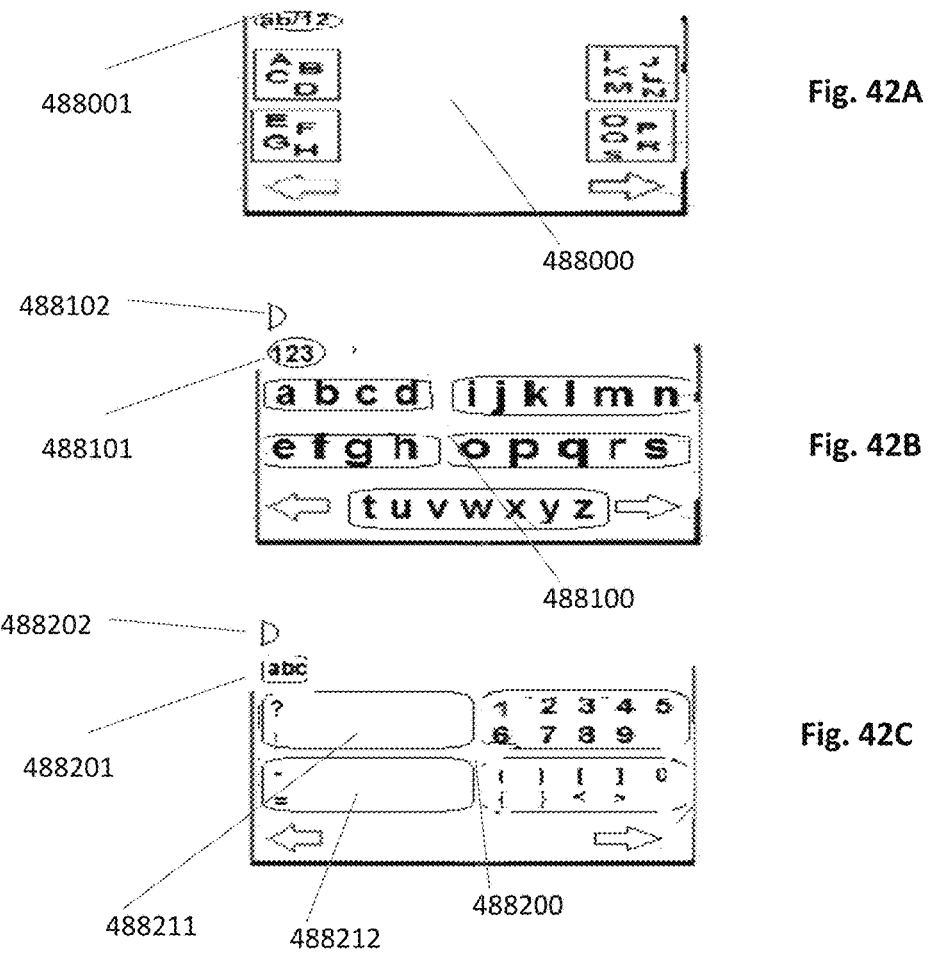
Fig. 42A
Fig. 42B
Fig. 42C

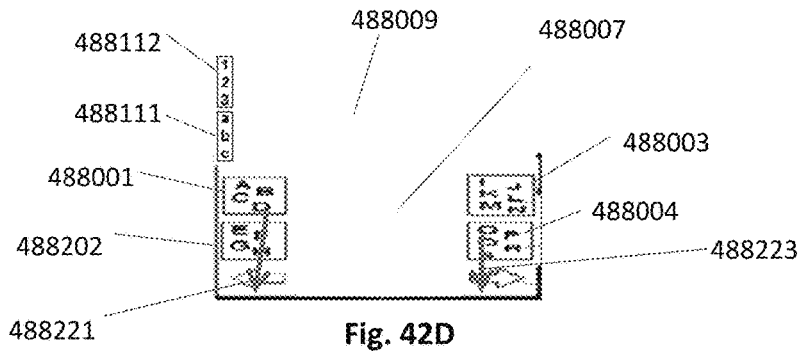
Fig. 42D
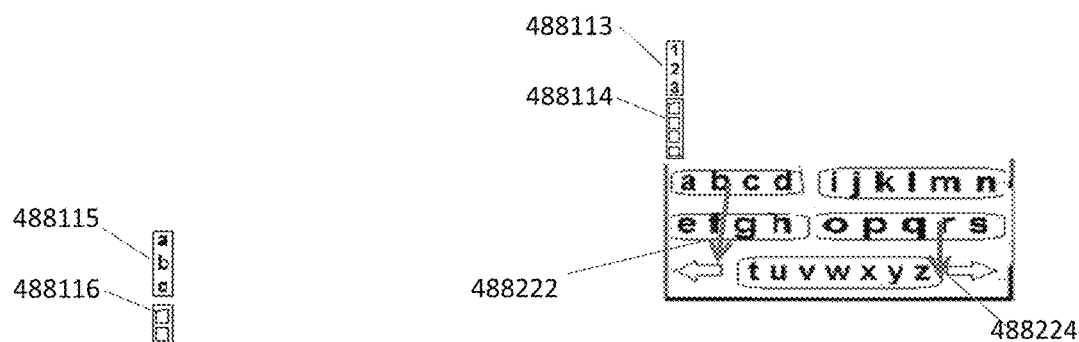
Fig. 42E
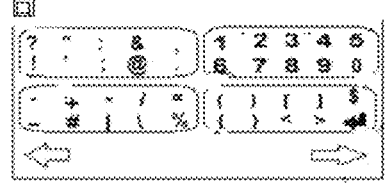
Fig. 42F
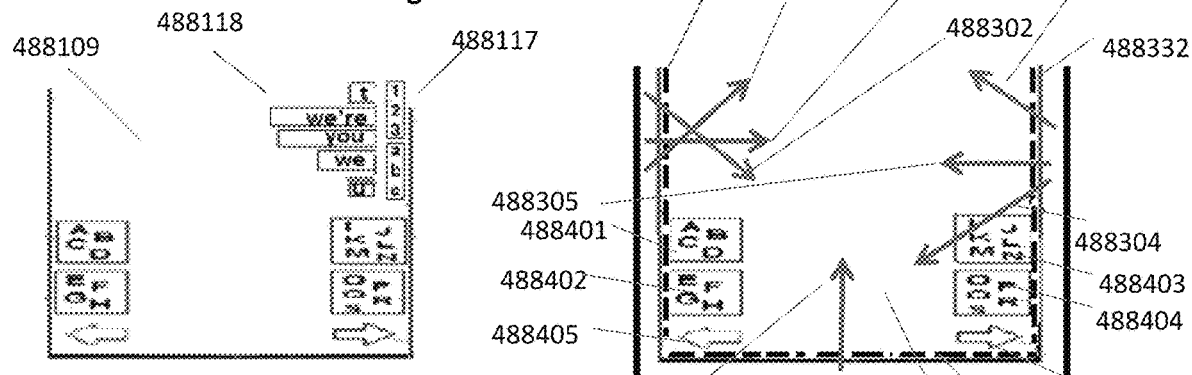
Fig. 42H
Fig. 42G

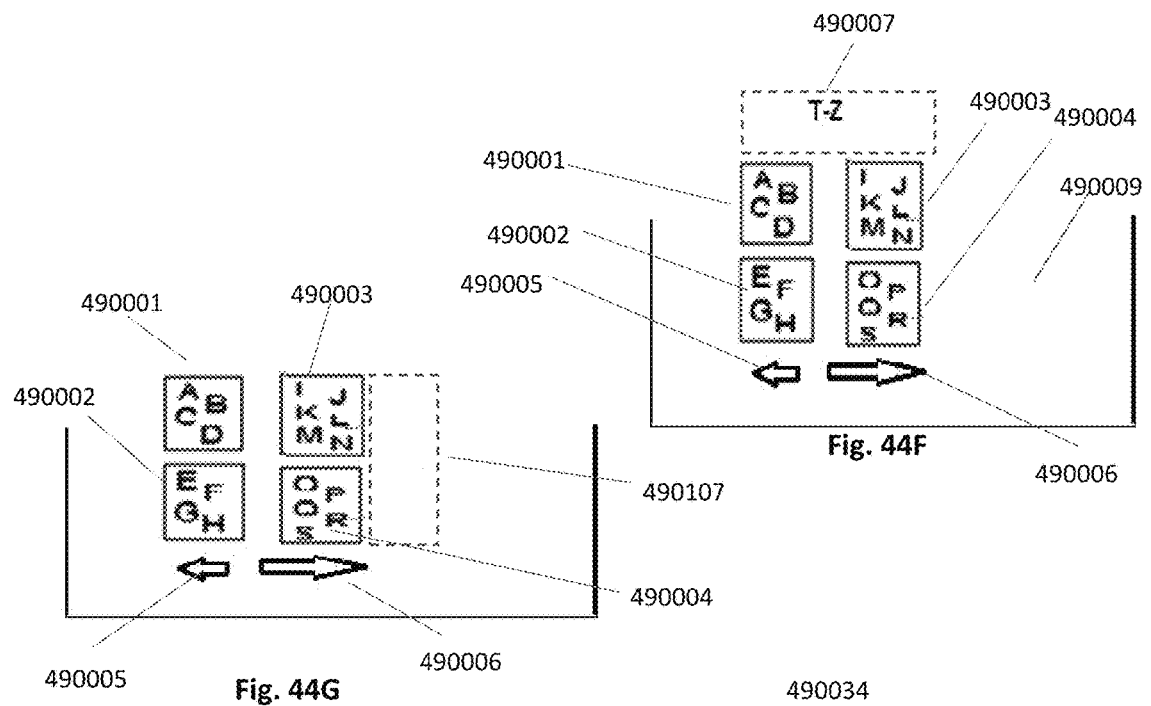
Fig. 44F
Fig. 44G
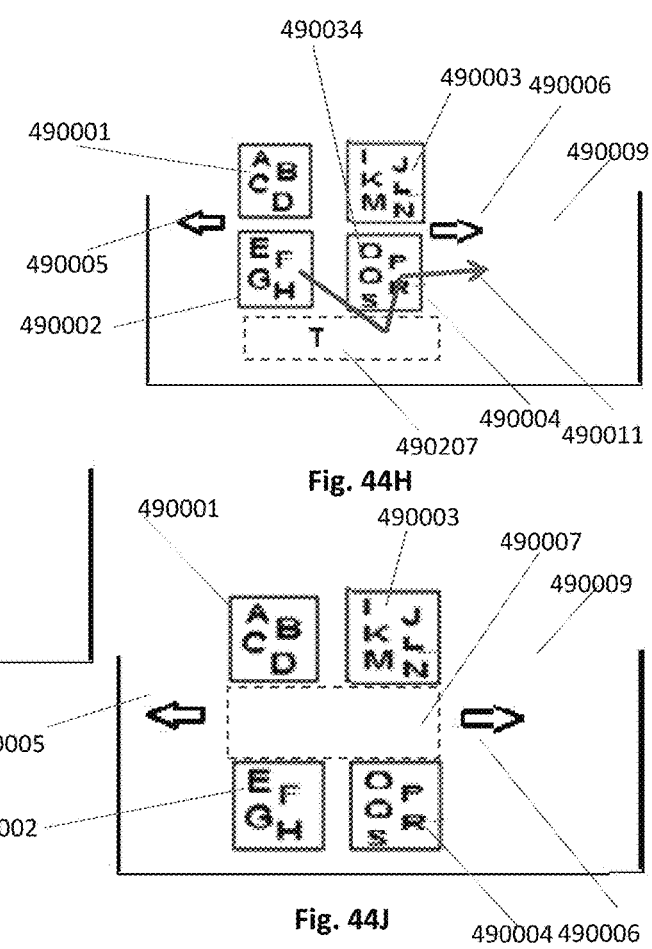
Fig. 44H
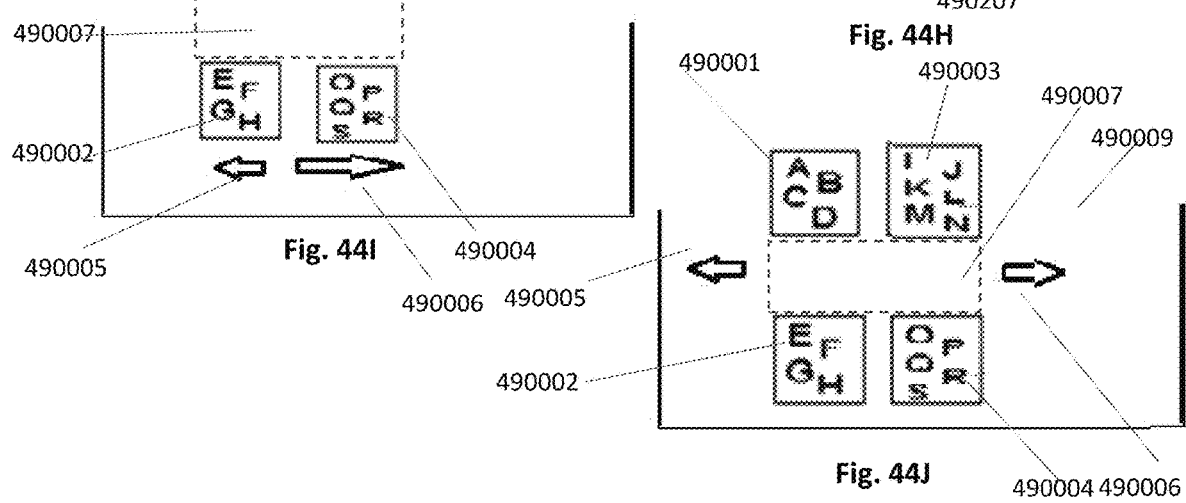
Fig. 44I
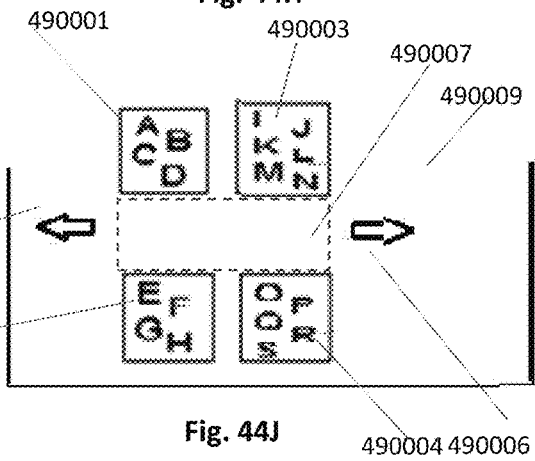
Fig. 44J

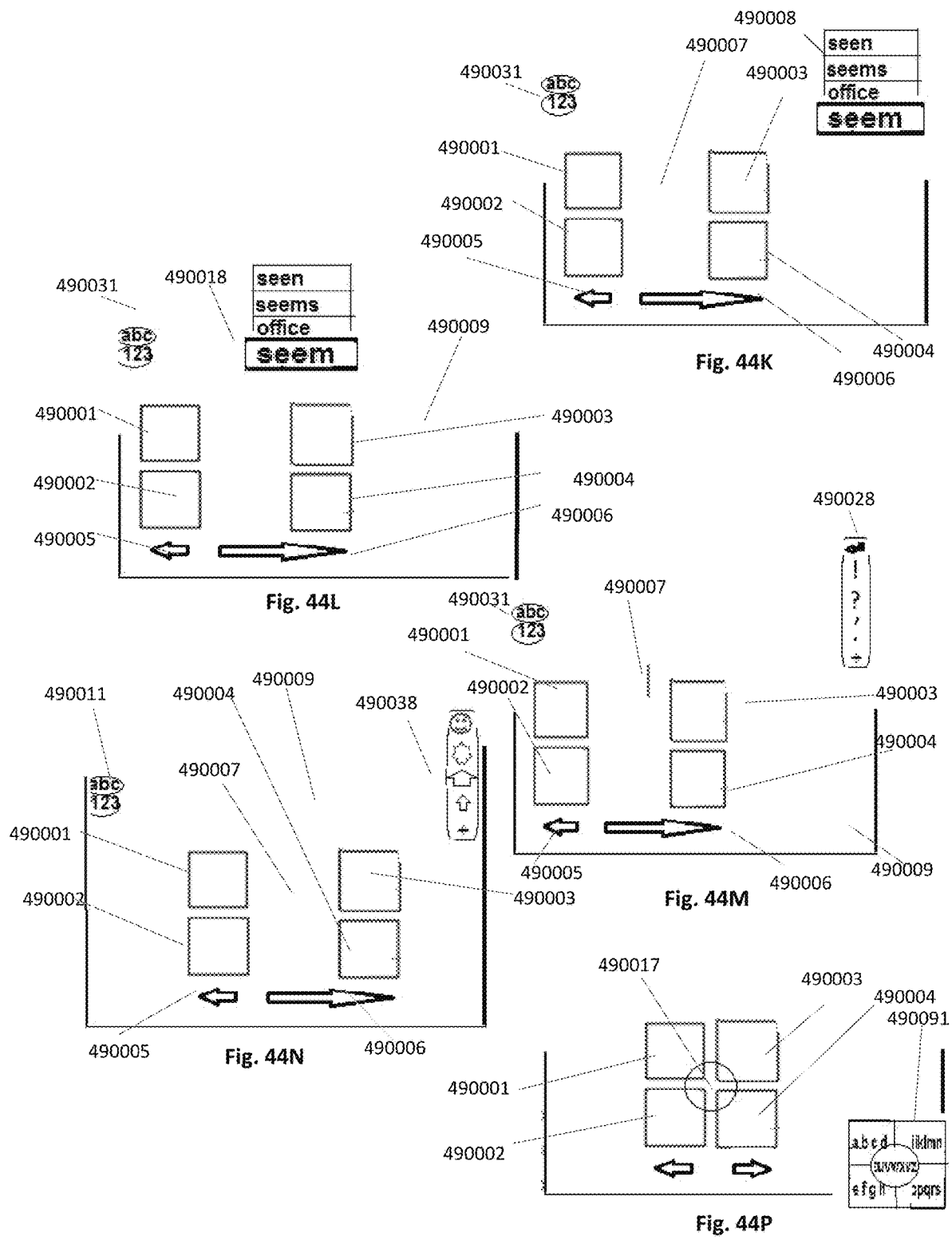

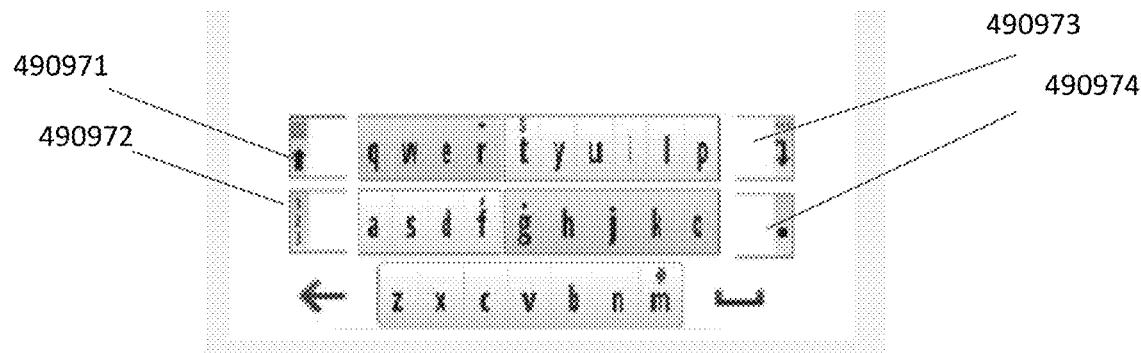
Fig. 44Z1
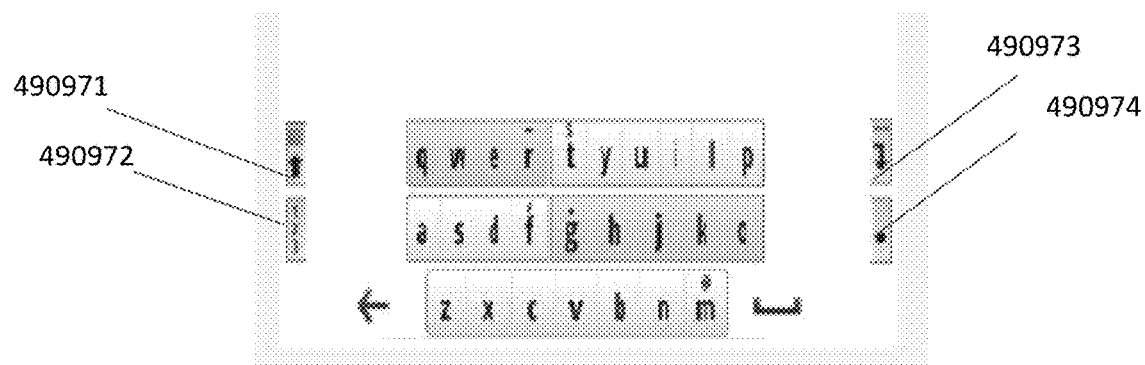
Fig. 44Z2
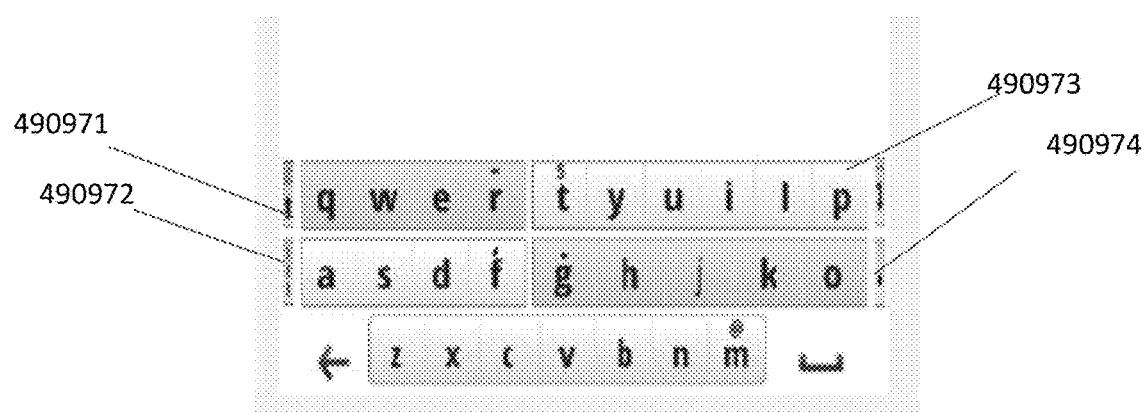
Fig. 44Z3

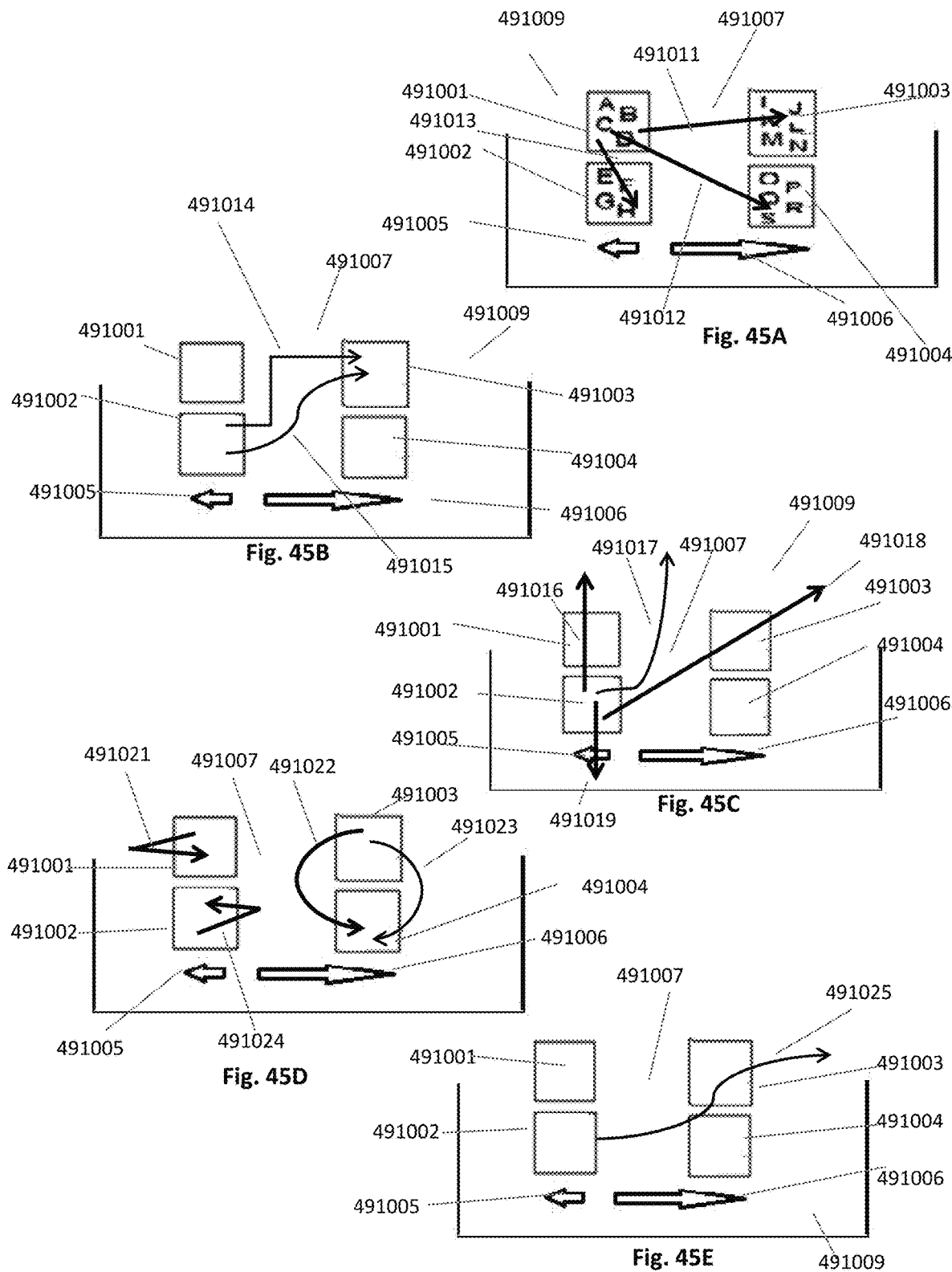

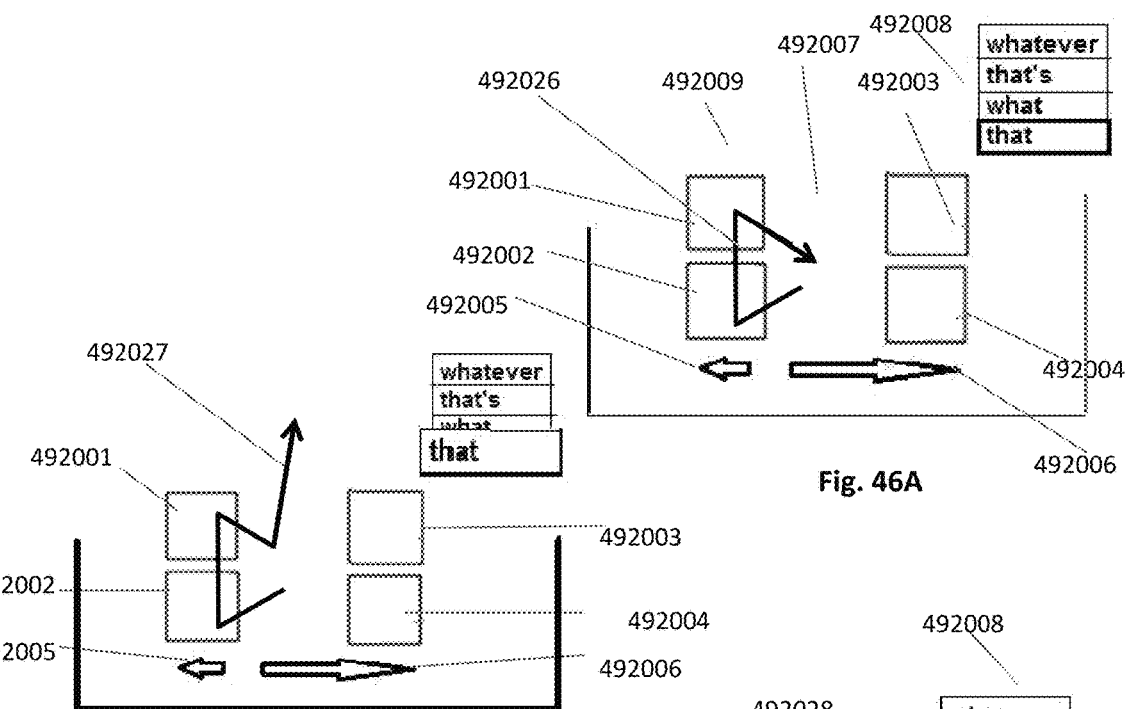
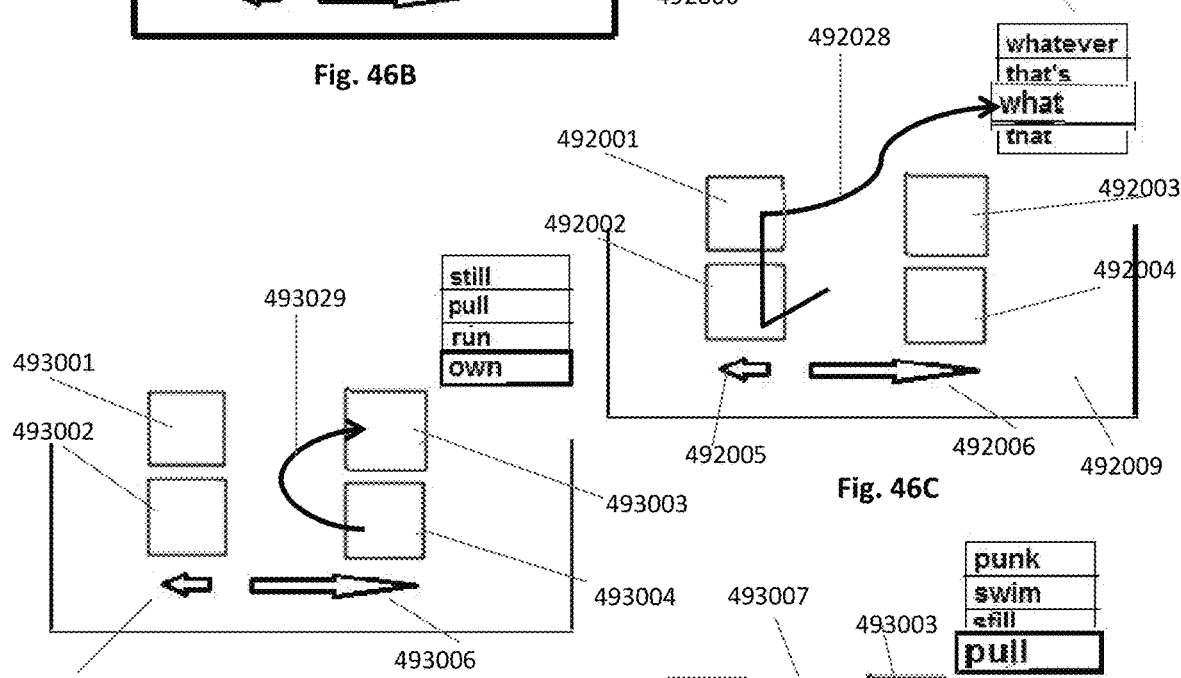
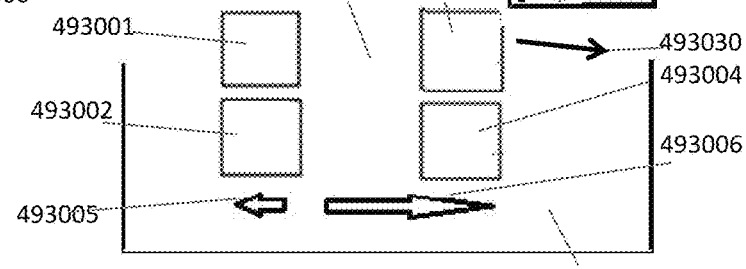
Fig. 46A
Fig. 46B
Fig. 46C
Fig. 47A
Fig. 47B

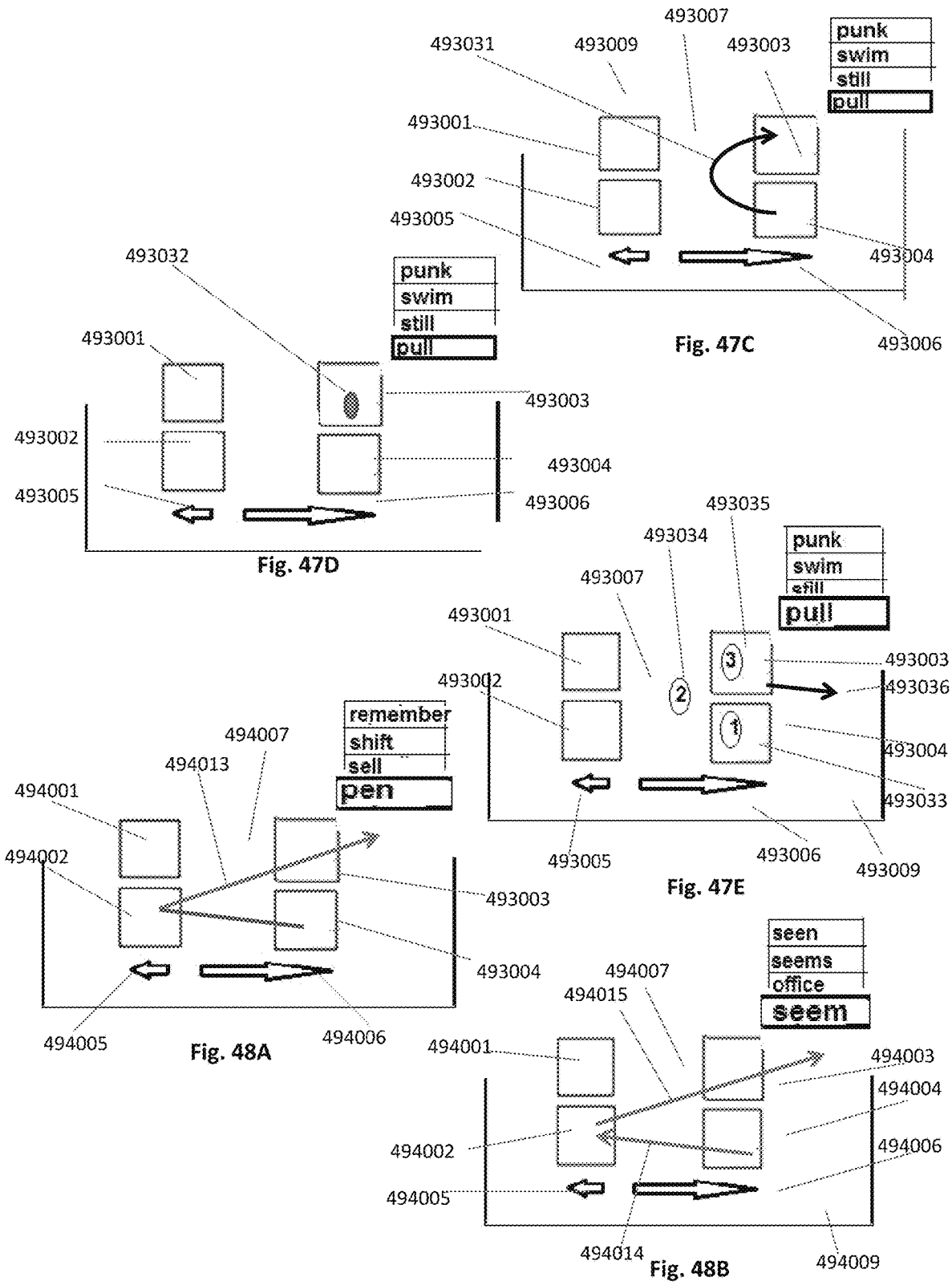

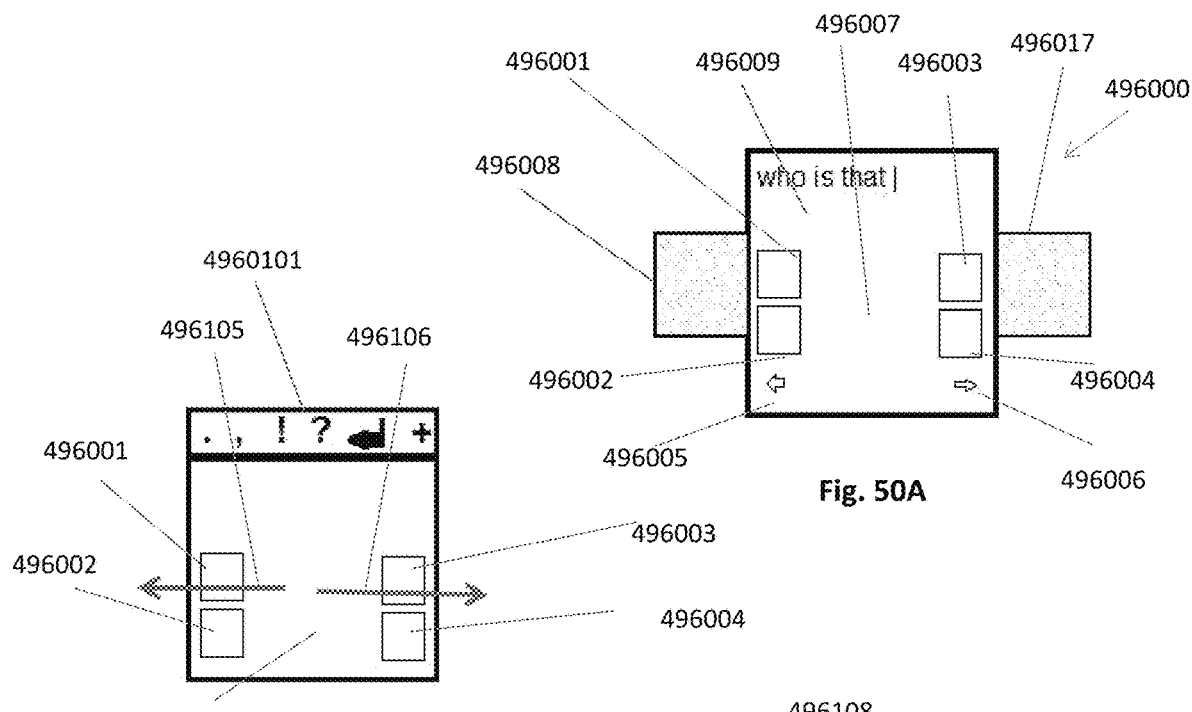
Fig. 50A
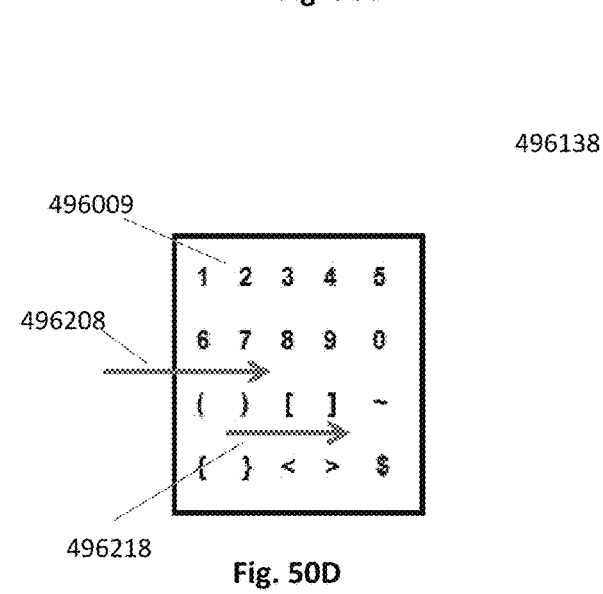
Fig. 50B
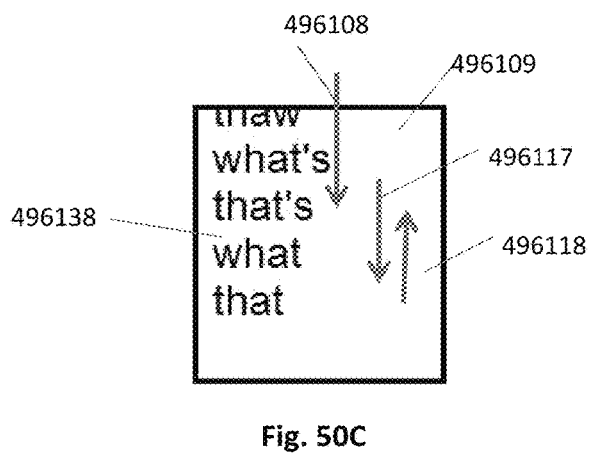
Fig. 50C
Fig. 50D
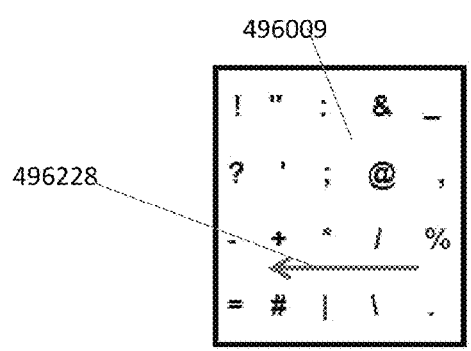
Fig. 50E

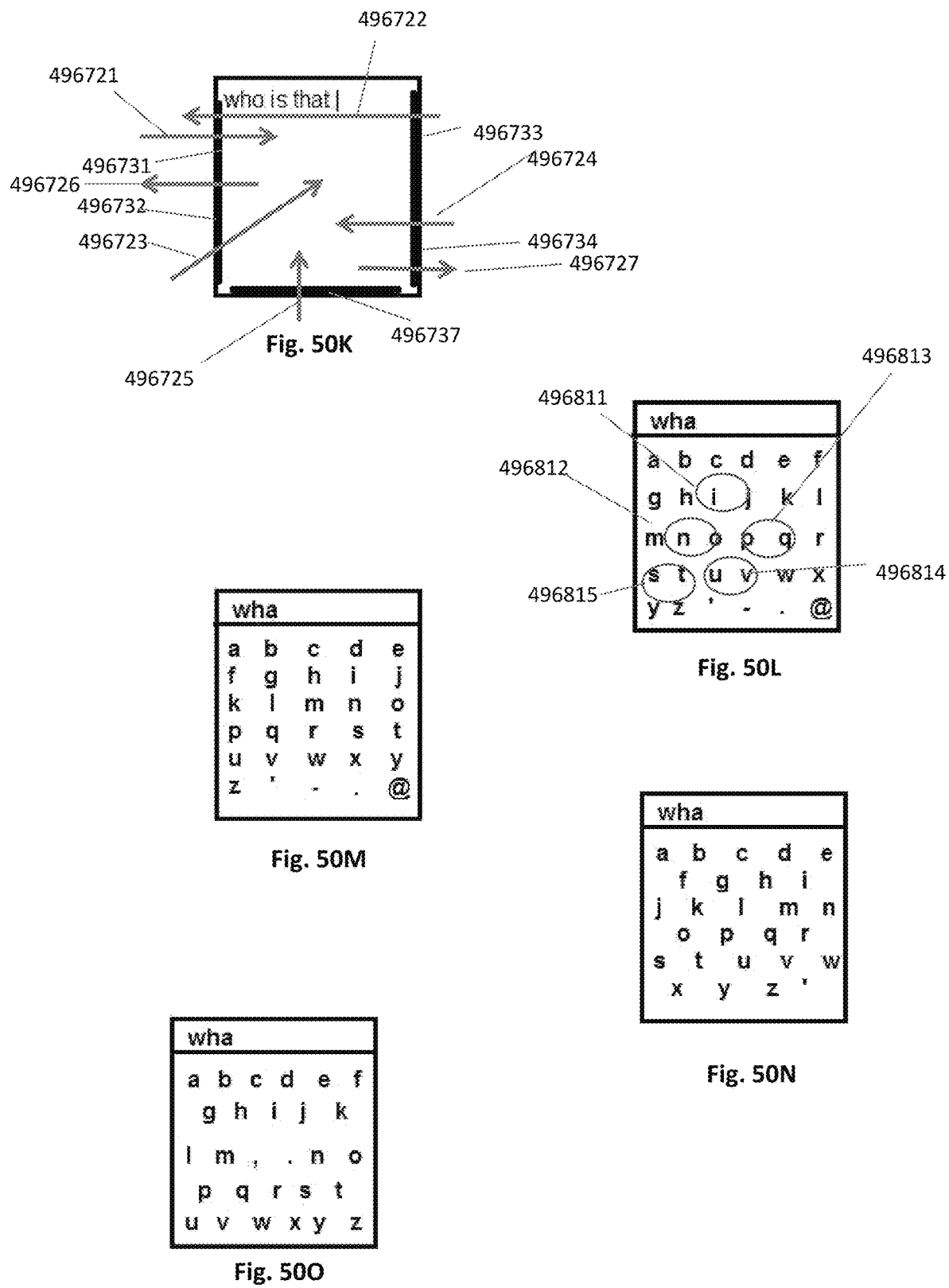

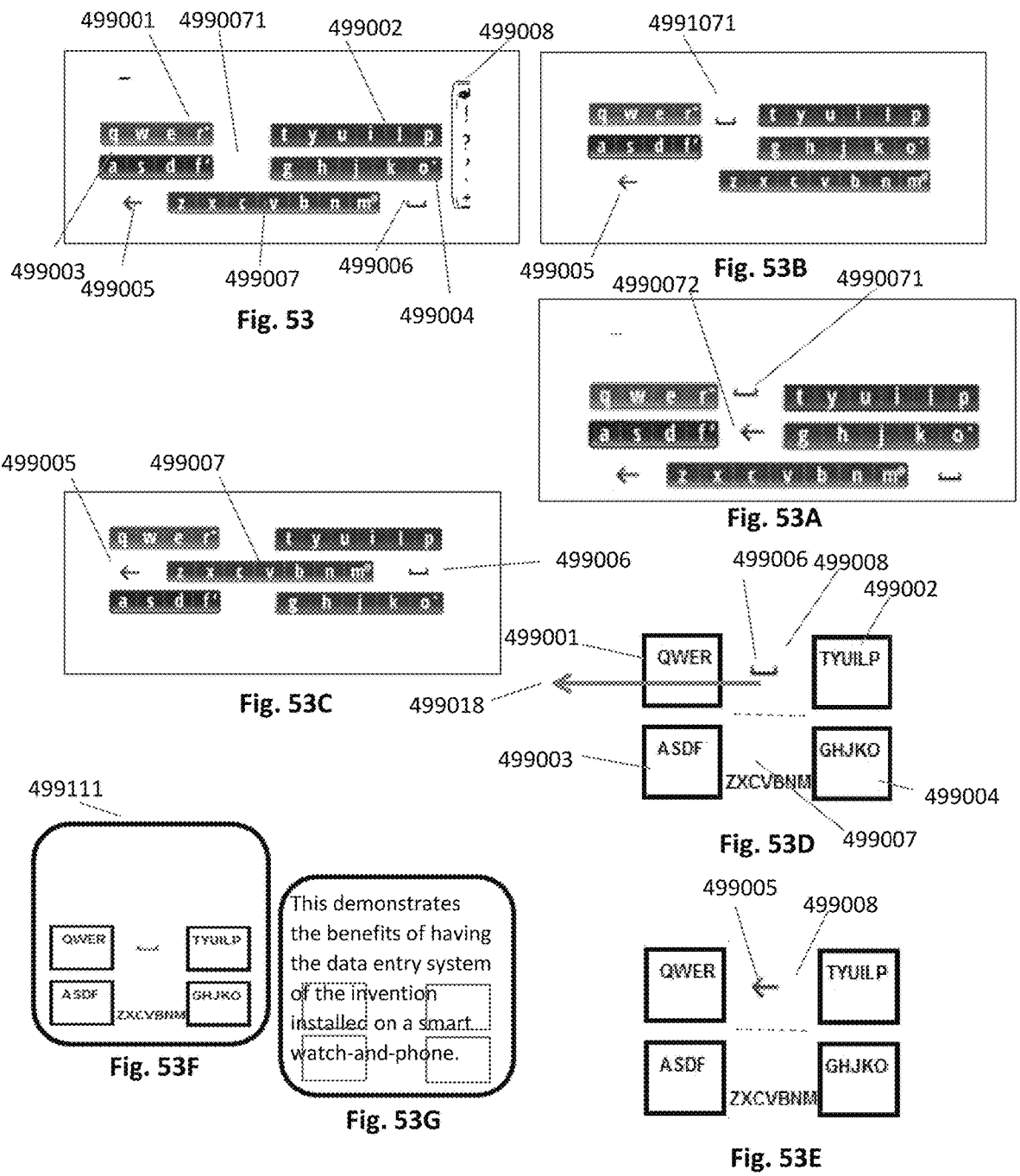

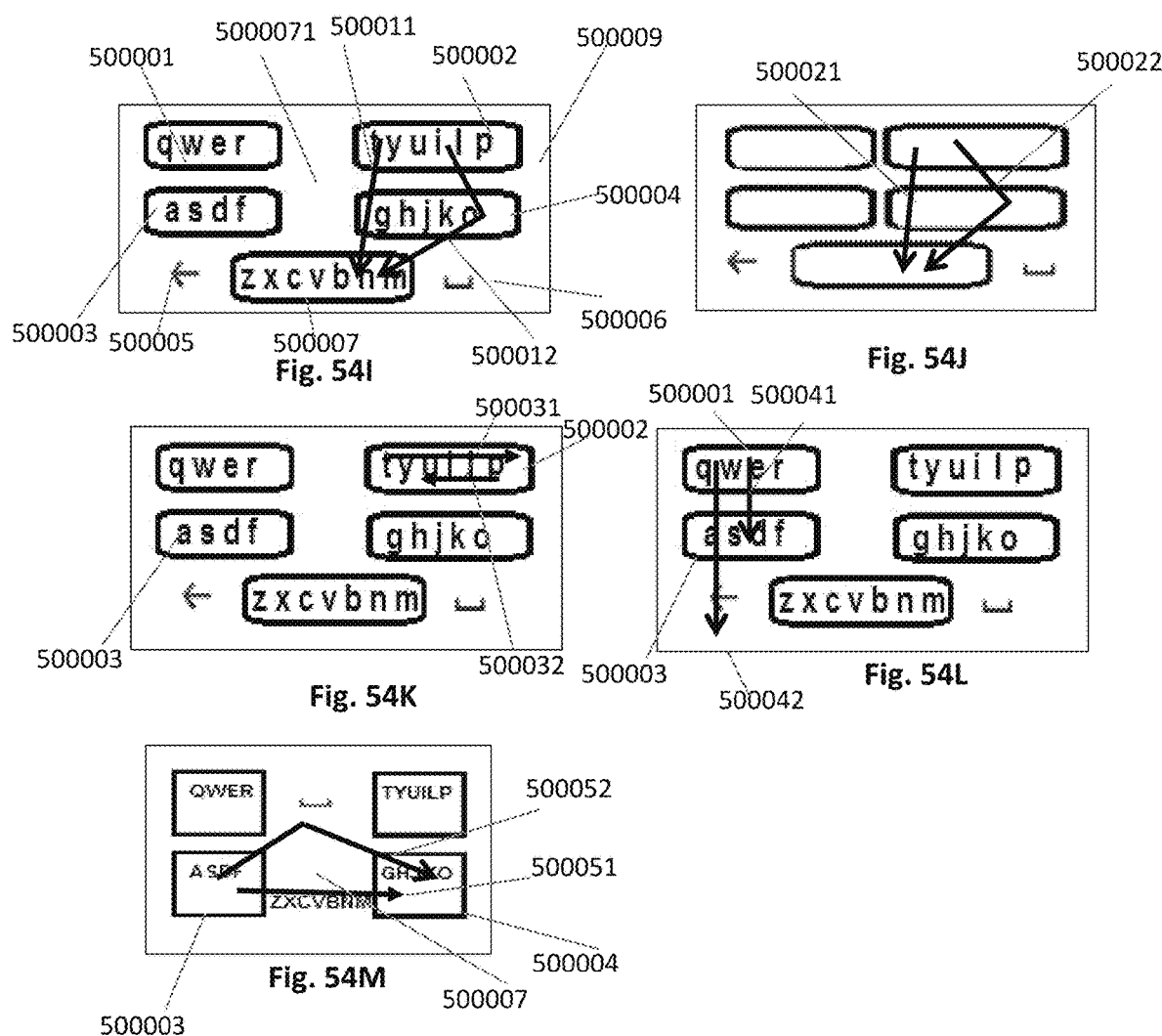

DATA ENTRY SYSTEMS

FIELD OF THE INVENTION

The present invention relates to data input systems and particularly systems and methods for entering letters, words, other symbols and/or other information. The present invention also relates to a method of social interaction by texting on virtual content(s) such as a picture or a video.

BACKGROUND OF THE INVENTION

Mobile devices including cellular phones, personal digital aids and miniature computers are widely used as they are easily carried around and can perform many tasks. One problem of mobile device(s) is text entry, which is problematic due to their small size of a device. One solution for text entry in mobile devices is using a limited key set in which at least some of the keys are ambiguously associated with a plurality of letters. Upon receiving a sequence of key strokes, a word predictive system proposes a word of a dictionary/database. If the system does not propose the desired word, the system proposes other words. The problem of such system is that when a word is not in the database the user must use another method of text entry.

Another problem of mobile devices is entering symbols other than letters.

With the emergence of devices having touch screens, on screen full (e.g. QWERTY) keyboard systems are used on most devices. Due to the size of mobile devices, and the number of keys of a full keyboard, such keys are reduced in size rendering the keyboard cumbersome and the data entry slow. The screen of a device is intended to display the output. Having a full keyboard with many keys on the screen covers a significant portion of the screen, hindering the use of many current applications and limiting creation of many other applications.

A real mobile data entry system must be mobile, enabling to enter data in any environment such as while standing, walking, in the dark, etc. In addition, such system must preferably free the screen from an interface that occupies a large portion of the screen.

SUMMARY OF THE INVENTION

The data entry system, described in this application, provides a system that is adapted to mobile environments. It is also intuitive, accurate, fast, and easy to understand and use.

An aspect of some embodiments of the invention relates to an input interface adapted to identify user interactions and to associate at least some of the user interactions with different types of input signals. Optionally, some of said input signals are together associated with all the letters of a language such as the Latin/Roman alphabet or a phonetic alphabet.

An aspect of the inventions relates to an input interface (e.g. herein may be referred to as a keyboard) having a few input means (e.g. herein may be referred to as keys/zones) adapted to relate an input signal received by interaction with an input means to an unambiguous character (e.g. herein such an input signal may be referred to as unambiguous/identified input signal, and such a character may be referred to as identified/precise character) and/or to ambiguously relate said interaction to any of a group of characters assigned to said input means (e.g. herein such an input signal may be referred to as ambiguous input signal, and such a character may be referred to as ambiguous character).

An aspect of some embodiments of the invention relates to an input interface (e.g. hereafter may be referred to as keypad/keyboard) wherein (e.g. at least) a few number (e.g. 4 to 12) of its input means (e.g. hereafter, may be referred to as keys or zones on a touch sensitive surface such as a touchscreen) ambiguously and/or precisely represent more than one characters/letters. According to first method said a few number of keys together represent all of the letters of an alphabet. According to a second method, said a few number of keys together represent some of the letters of an alphabet (e.g. hereafter may be referred to as Preferred characters). The rest of the letters (e.g. hereafter may be referred to as Non-preferred characters) of said alphabet are represented by a key/zone outside said a few number of keys. For ease of description, herein, such a key of the/a keypad and interaction with it may be referred to as "narrowly ambiguous key/interaction" providing "narrowly ambiguous input signal", and said key/zone outside the keypad and interaction with it may be referred to as "broadly ambiguous key/interaction" providing "broadly ambiguous input signal". In some paragraphs herein, said zone may also/is referred to as "navigation zone".

An aspect of some embodiments of the invention relate to a procedure of assisting the user to correctly entering a word which may be mistyped by the user by assigning all of the characters (e.g. letters) of a language to the broadly ambiguous keys/interactions. This aspect herein may be referred to as Spelling Help feature.

Preferably, said a few number of keys are split to form two groups of keys. Preferably, said key/zone outside said a few number of keys is located between or below said split group of keys. Preferably, said keypad is a virtual keypad located on a touch sensitive surface. Optionally, said touch sensitive surface is a touch screen.

Preferably, said input interface is used with a word prediction system/software wherein upon/during providing a sequence of one or more interactions with the input interface, the system predicts one or more words from the corresponding entries of a database of words used by the system. A word predictive system/software predicting words as such is known by people skilled in the art and some of such software (e.g. T9, iTap, or auto correction software used with an on-screen QWERTY keyboard wherein an interaction with a key may ambiguously be related to said key and some of the surrounding keys because the keys are too small and the user may mispress a key) are implemented in a variety of mobile phones.

Optionally, a single letter may be assigned to more than one zone/key.

Preferably, the input interface further includes additional input means relating to symbols and/or functions such as the space key sand the back space keys.

Optionally, to at least one of the input means more than one letter of a language is assigned such that a predefined interaction with the input means ambiguously and/or precisely corresponds one of the letters. In such case, herein, the system may be referred to as being in the Ambiguous Letter Mode.

An aspect of the inventions is related to a traditional keyboard wherein the letter are divided into few groups (e.g. 5 or 6) each assigned/represented by a different zone/key. Optionally, the keyboard has an alphabetical layout. Optionally, the keyboard has a traditional letter layout (e.g. QWERTY, QWERTZ). Preferably, (e.g. minor) modification to the layout is provided. Preferably, a different portion of the surface of a key/zone is assigned to an identified character. Preferably, interacting with a portion of a key/zone is related by the system to said identified letter and/or ambiguously to any of the letters assigned to said key/zone. Preferably, the background (e.g. color, shade, etc.) of a zone/key is different than the background of its adjacent key/zone.

Optionally, the keyboard can be switched from a large size to a small size or vice versa. Optionally, the system may be switched to a Precise Symbol Mode, wherein a predefined interaction with a key/zone may provide an individual precise/identified special character or function. The interface of the system in such mode may preferably be different than the interface in other modes. Preferably, special characters are divided into a plurality of groups (e.g. four to five groups) based on a common characteristic.

An aspect of some embodiments of the invention relates to an input system wherein a first predefined type of interaction with an input means ambiguously correspond to a first group of characters assigned to said input means, and wherein a second predefined type of interaction with the input means ambiguously correspond to a second group of characters assigned to said input means.

An aspect of some embodiments of the invention relates to an input system wherein a first predefined type of interaction with an input means ambiguously correspond to any character of a group of characters assigned to said input means, and wherein a second predefined type of interaction with an input means (precisely) correspond to an identified character assigned to said input means.

An aspect of the invention relates to an enhanced word predictive data entry system receiving input information in form of precise and/or ambiguous input signals to predict a (e.g. one or more) word. A precise input signal corresponds to an identified character in a character position in said word and an ambiguous signal corresponds to an ambiguous character in a different character position in said word.

An aspect of some embodiments of the invention relates to a data entry system using one or more N-gram (e.g. N>0) database of words to predict a word.

An aspect of some embodiments of the invention relates to a first type of interactions (e.g. gliding actions) provided anywhere and/or on a virtual keypad on a touch sensitive surface to emulate a second type of interactions (e.g. tapping actions) with the keys of a virtual keypad (e.g. or keypad model).

An aspect of some embodiments of the invention relates to editing/entering text instantaneously in any direction on a virtual content such as a picture/video, and methods to share the (e.g. combined) content with others.

An aspect of some embodiments of the invention relates to commenting (e.g. writing text) in text box relating to a picture/video (e.g. shared or to be shared). For an edited video such comments may be time-stamped at any particular point in the video.

An aspect of the invention relates to creating and/or operating a virtual forum.

An aspect of some embodiments of the invention relates to the selecting/grabbing at least a portion of text (e.g. a word) to modify the said portion.

BRIEF DESCRIPTION OF FIGURES

Exemplary non-limiting embodiments of the invention will be described with reference to the following description of embodiments in conjunction with the FIGURES. Identical structures, elements or parts which appear in more than one FIGURE are preferably labeled with a same or similar number in all the FIGURES in which they appear, in which:

FIG. 3A shows an image where portion(s) of it are selected by the user for editing purposes.

FIG. 3B shows an image where selected portion(s) of it have been edited, while other portion(s) of it remain unedited.

FIG. 4A-4B show a selected portion of an image where said portion is disabled for editing.

FIG. 10 shows a (e.g. compressed qwerty) keyboard.

FIG. 10A shows a (e.g. linear) one line keyboard of the invention.

FIG. 10B shows an arrangement of preferred letters assigned to a zone.

FIG. 10C shows two zones, including preferred letters, and a broadly ambiguous zone.

FIG. 10D shows an assignment/arrangement of letters to a (e.g. a larger) zone(s).

FIG. 25A shows a method of (e.g. alphabetic) arrangement of letters of a keypad having four keys.

FIG. 25B-25C show keypads of the invention in a precise mode.

FIG. 26 shows an assignment of letters of a language on a keypad.

FIG. 27A shows a linear keypad having alphabetic order.

FIG. 27B shows a keypad wherein the preferred characters are grouped in four different zones.

FIG. 28 shows a one line (e.g. linear) alphabetically ordered keypad.

FIG. 41 shows a button having several functions.

FIG. 42A-42C show examples of navigating the various modes of the keypad/keyboard.

FIG. 42D shows an example a screen of a device having two different buttons/zones.

FIG. 42E-42F shows an example of the system switched into the precise letter mode.

FIG. 42G shows an example of the keypad where buttons are lines located at the edge of the screen.

FIG. 42H shows an example where the mode buttons and the wordlist are located close to each other on the right side of the screen.

FIGS. 44F-44H show examples of keypads/keyboards where broadly ambiguous zones are respectively located on different locations relating to the other letter keys.

FIG. 44I-44J shows examples of keypads where letter keys are split vertically.

FIGS. 44K-44N and 44P-S show examples of splitting and unsplitting a keypad.

FIG. 44Z1 shows an example of a keypad with function buttons highlighted by an outline.

FIG. 44Z2 shows an example of a keypad with function buttons displayed as a bar.

FIG. 44Z3 shows an example of a keypad with function buttons displayed as lines.

FIG. 45A-48B show examples of various gliding actions interacting with a keypad.

FIG. 50A shows an example of a small electronic device having a touch sensitive surface.

FIG. 50B shows an example of a small electronic device with a data entry system having a keypad with few keys and a broadly ambiguous zone.

FIG. 50C shows an example of the screen of a small electronic device after a user provides a gesture from the edge of the device/screen towards inside of the screen for during data entry.

FIG. 50D shows an example of the screen of a small electronic device after a user provides a gesture from the left edge of the device/screen towards inside of the screen.

FIG. 50E shows an example of the screen of a small electronic device with more symbols after a user provides a rightwards gesture on the screen.

FIG. 50I-50O show examples of the screen of a small electronic device after various gestures.

FIG. 50Q shows an example of a wrist device while the user's hand is in a vertical position.

FIG. 53 shows an example of a keypad with multi-mode keys/zones.

FIG. 53A shows an example of a keypad where two neutral zones are used to provide any of the functionality of the space and backspace keys/zones.

FIG. 53B shows an example of an enlarged keyboard with multi-mode keys/zones.

FIG. 53C shows an example of a multi-mode keys/zones, space, and backspace key of a keyboard.

FIG. 53D shows an example of a keypad having four keys/zones and a broadly ambiguous zone.

FIG. 53E shows an example of a keypad having backspace functionality in the neutral zone.

FIG. 53F shows an example of a keypad that is integrated in a small device.

FIG. 53G shows an example of a keypad with keys shown in its invisible mode.

FIG. 54A-54H shows examples of a keypad where various gestures may move through a neutral zone.

FIG. 54I-54M show various examples of keypads where various gestures are substantially straight.

FIG. 55A-55C show examples of keypads.

FIG. 56A shows an example of a 4-key mini keypad.

FIG. 56B shows an example of a 4-key super mini keypad.

FIG. 56C shows an example of a small and split 5-zone keypad.

FIG. 57A-57C show examples of 3 types of keyboards.

FIG. 58A shows an example of a keypad where a key includes the apostrophe in the first layer.

FIG. 58B shows an example of a keypad a space key and a backspace key.

FIG. 59A-59E show examples of keyboards divided into several zones.

FIG. 60A shows an example of a keyboard having an additional space key/zone located above it.

FIG. 60B shows an example of a keyboard having an additional space key/zone and backspace key/zone are located above the keyboard.

Figure 61A:

FIG. 61A shows an example of a keyboard where the user uses one hand/finger to type.

Figure 61B:
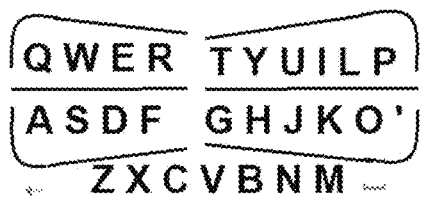

FIG. 61B shows an example of a keyboard where the user uses two hands/fingers to type.

Figure 62A:
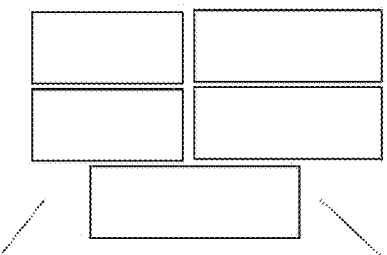
Figure 62C:
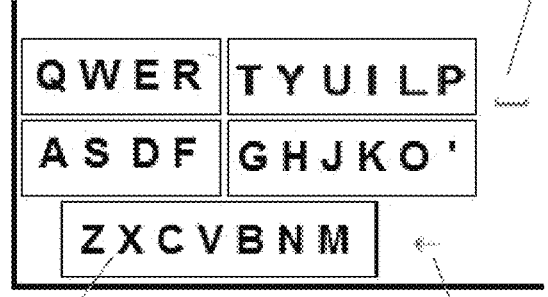
Figure 62B:
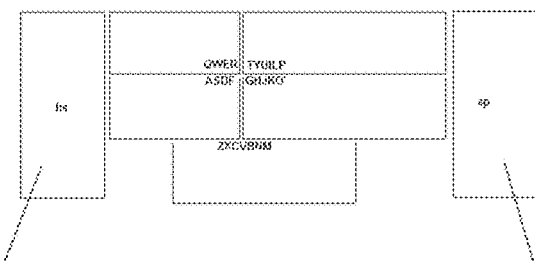

FIG. 62A-62C show examples of keyboards.

DETAILED DESCRIPTION OF EMBODIMENTS

The data entry system of the invention generally refers to using a predefined number of keys to enter text/data. The letters/characters of a language are distributed on at least some of said number of keys such that to at least one of the keys (e.g. hereafter may be referred to as an "ambiguous letter key" or "ambiguous key") more than one letter/character is assigned.

According to one embodiment of the invention the keypad may preferably have a few number (e.g. 4 to 8) of keys ambiguously representing more than one character/letter. According to one method, said a few number of keys together substantially represent all of the letters of a language.

Figure 1:
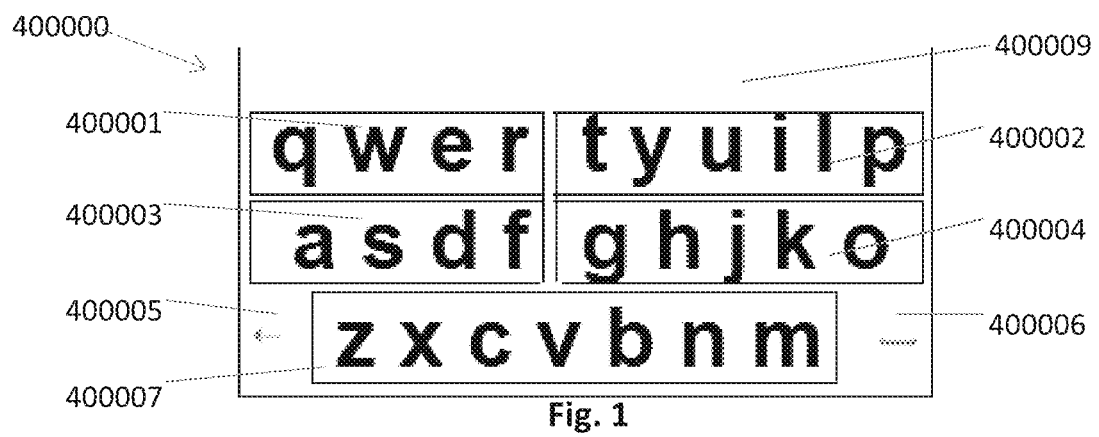

Preferably, said keys and the layer layout may represent a traditional keyboard (e.g. QWERTY) form factor. FIG. 1 shows, as an example, a device 400000 having an on-screen keyboard wherein the letter(s) are represented by five zones/keys 400001-400004 and 400007 located on a touch sensitive surface 400009, wherein each of said keys represents three characters/letters. In this example, the keyboard includes two more keys, namely the Space key 400006 and Backspace key 400005. Preferably the keys are/zones are separated such that to be easily distinguished from each other. In case of a virtual (e.g. on screen, on a touchpad) keyboard the border between the keys are marked by separating delimiters (e.g. lines).

According to one embodiment, the surface relating to the letters of a virtual keyboard may be divided in into few (e.g. 4 to 6) zones each having a plurality of letters. Each of said zones may be considered as an ambiguous key/zone. A word prediction system as described may be used to predict words upon interactions with said zones. The surface may be divided in any manner, preferably, such that to augment the accuracy of the prediction. Preferably, the divided zone may be marked such that to be distinguished from each other.

Figure 1A:
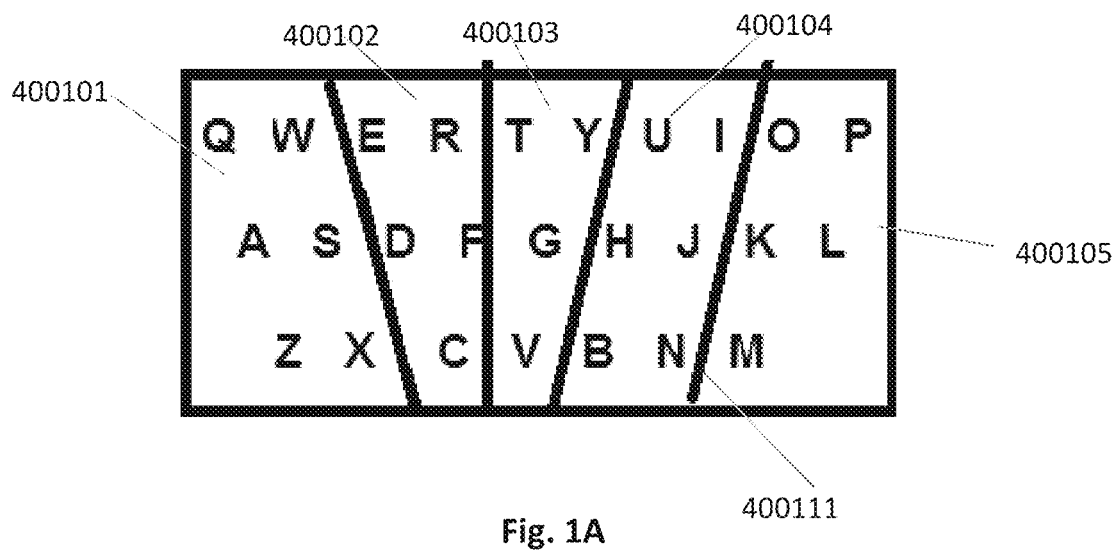
FIG. 1A-1B show a keypad divided into several zones.

FIG. 1A, shows as an example, an on screen QWERTY keyboard divided into five zones 400101-400105 to each a plurality of letters are assigned. The zones are divided by distinguishing lines (e.g. 400111). All principles (e.g. of data entry) described herein may apply to this type of keyboard. For example, when a zone is interacted, the system may relate the interaction to (e.g. both) an ambiguous input signal (e.g. corresponding to any character of the letters assigned to the interacted zone) and/or to a unambiguous input signal (e.g. corresponding to the letter on which the said interaction is provided).

A zone of a keyboard may include one or more special characters following the same rules of a letter (e.g. considered ambiguous and/or unambiguous). For example, an apostrophe may be assigned to one of the zones.

Figure 1B:
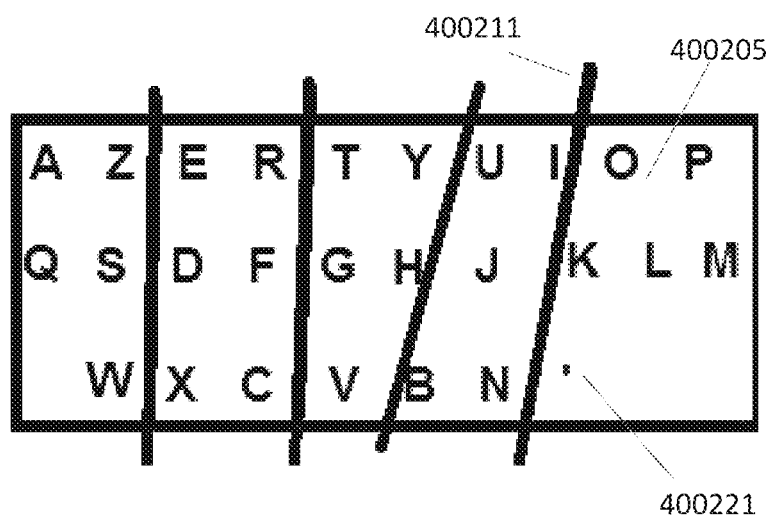

FIG. 1B shows an AZERTY keyboard divided into five zones. In this example an apostrophe 400221 is assigned to the zone 400205. Note that in this example, the separating/distinguishing bars/lines (e.g. 400211) are also traversing outside the letter zone of the keyboard so that to better distinguish the zones from each other.

The rest of the keyboard such as function keys and/or special character keys are not shown here. One or more of said keys may be integrated within a zone but preferably being as an independent key.

It must be noted that the division of a virtual keyboards as shown here are exemplary divisions. Other manner of division of a virtual keyboard based on these principles may be considered (e.g. the keyboard/zones may be divided/defined differently). The dividing such a keyboard may be a predefined division (e.g. by the creator/manufacturer of the keyboard) or a dynamic division (e.g. by the creator/manufacturer of the keyboard or by a/the user). Note that the division of (e.g. preferably the letter keys of) a keyboard may be determined by the user, for example, by providing gestures to define delimiters of (e.g. arbitrary) zones of said keyboard. Preferably said delimiters may be display. Note that the zones of a keyboard may be delimited by (e.g. slightly) distancing said zones from each other.

According to a preferred embodiment, the keyboard is divided into several zones such that the zones are delimited such that to augment the accuracy of the predictive system without deforming the keyboard. As an example, main vowels may be separated from each other by delimiters. Preferably, the delimiters are provided arbitrarily such that each of the zones may have a different shape. Preferably, the delimiters are provided such that each zone is easy to interact with. The number of zones may be defined such that to be as few as possible while keeping prediction accuracy at a high level. Preferably the delimiters are provided from top to bottom or bottom to top. Alternatively, the delimiters can have any shape.

The principles of dividing and presenting a virtual keypad as described has a many advantages. While keeping the form factor of a traditional keyboard, they permit to have few large keys that can be divided differently based on the language used by the keyboard, also permitting to have very high accuracy of word prediction in any language. Such principles, may be very beneficial for languages having many letters (e.g. Russian, Indian, Korean, etc.). The number of zones may vary for example based on the number of letters of a language.

Additionally, a virtual keyboard designed as such may be reduced in height and/or width. Throughout this patent resized keyboard are shown and described in detail.

Note that the principles of division of a virtual keyboard described herein may also be applied to the keyboards having hard/mechanical keys. In this case, interacting with a key within a zone, may precisely correspond to interacted key and/or ambiguously correspond to any of the keys of the zone in which the interacted keys is located. The hard keys of a zone may have a different characteristics (e.g. different color) so that to be easily distinguishable from the keys of another zone, According to one method, the pair of keys 400001 and 400003, and the pair of keys 400002 and 400004, are (e.g. reduced in size and) positioned on opposite sides of the touch sensitive surface and the zone 400007 (e.g. herein may be referred to as broadly ambiguous zone) is located outside (e.g. between) said pairs of keys.

Preferably, the pairs of keys are arranged such that to form two columns of letter keys. Preferably, the Space key is positioned on the side of a first column of letter keys and the Backspace key is positioned on the side of a second column of letter keys. Optionally, each of said space or the backspace keys may form a column of keys together a first and a second column of letter keys, respectively.

According to one embodiment, a word predictive system using predicting a word from a database of words based on key interaction provided by a user may be used by the data entry system of the invention. The principles of such word prediction system is commonly known (e.g. T9, etc.) Upon interaction(s) (e.g. tapping action(s)) with the one or more said keys/zones, the system may predict a word from the database and preferably propose it to a user.

In the example, FIG. 1, in order to enter the word "why" the user may provide input information corresponding (e.g. precise and/ambiguous input signals corresponding to entering a word by the (e.g. word predictive) system may herein be referred to as input information) to entering said word by for example interactions (e.g. pressing/tapping actions) on ambiguous key 400001, the zone 400004, and the key 400002. The system may propose/predict the word "why" which corresponds to said key/zone interactions and has the highest priority among the words of the database corresponding to said interactions. If the predicted word is the desired word, the user may confirm it by providing an end-of-the-word signal such as tapping on the space key. As such, according to one method, in addition to entering the predicted word, the system may provide a space character after the entered word. Such a system to predict a word may herein be referred to as fully ambiguous/predictive system).

Preferably, the system may simultaneous propose more than one word corresponding to the input information provided by the user. The proposed words may form a wordlist. If a desired word is not in the word list, upon providing a predefined interaction (e.g. a gliding action on/from the wordlist, tapping on an icon, etc.) the system may propose additional corresponding words.

Optionally, the user may be enabled to enter at least one of the characters of the desired word precisely so as to assist the system to enhance the quality of prediction by the system. By receiving and combining said at least one precise/identified character and one or more key presses ambiguously corresponding to at least one of the remaining characters of the desired word, the system may more accurately predict a desired word.

Figure 2A:
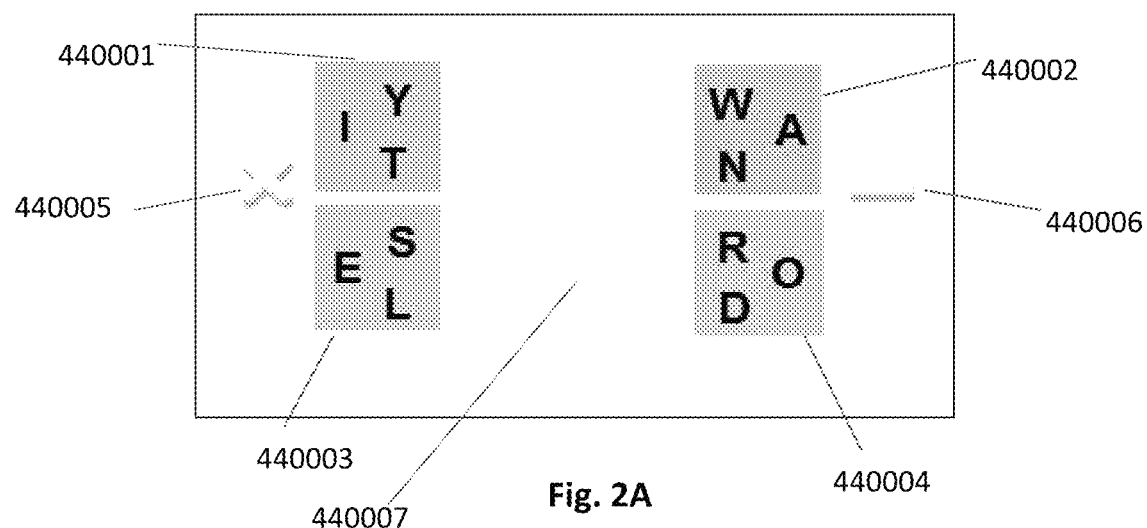
FIG. 2A-2B show a simplified keyboard.

According to one embodiment of the invention, the letters of an alphabet may be divided to two groups of characters, a first group preferably includes (e.g. may include some exception), the letters that are more frequently used (e.g. herein may be referred to as preferred characters/letters) and a second group includes the rest of the letters (e.g. herein may be referred to as non-preferred characters/letters). As an example, in FIG. 2A, the preferred letters are assigned to the keys 440001 to 440004, and the none-preferred letters are assigned to the zone 440007 between said keys. In this example, the keyboard includes a space key 440006 and a backspace key 440005. These matters have been described in detail in previous patents filed by this inventor.

As mentioned before, when a user taps on a key, the system may relate said interaction to ambiguous and/or unambiguous input signals. In the current example, when a user provides a sequence tapping actions on the keys/zones of the keyboard, according to one method, the system may relate interactions with the keys 440001 to 440004 to identified characters on which the tapping actions are provided, and may relate the interactions with the zone 440007 to ambiguous characters assigned to said zone. The system, to predict a word as such, may herein be referred to as semi-ambiguous/predictive system. Accordingly, the words proposed to the user may include identified and/or none ambiguous characters. If none of the proposed words are the desired word, the user may switch the keyboard to a precise keyboard mode wherein the non-preferred characters/letters may be entered precisely. By interacting said keyboard the user can replace the ambiguous character of a proposed word by precise characters. Said keyboard may be a keyboard displaying only the none preferred characters or a full keyboard displaying all characters (e.g. a qwerty keyboard).

Figure 2B:
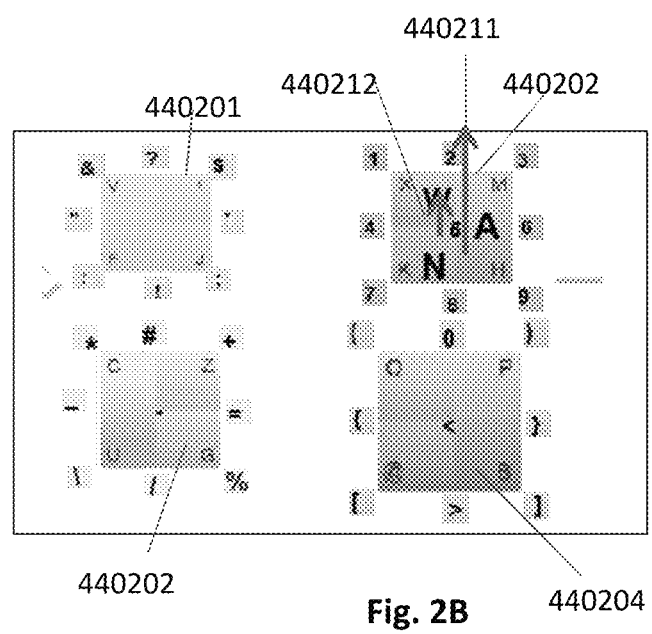

FIG. 2B shows the keys of said keypad during providing a gliding action (e.g. short/long) and/or long pressing action, provided on any one of the keys of the keypad. A key of this keypad, in such a case, herein may be referred to as 'expanded key.' According to one method, only the keys on which said gliding and/or gliding action is provided is expanded. According to another method, all of the keys may be expanded during providing of a gliding action and/or long pressing action on any key. In this application a keyboard in retracted mode a keyboard in retracted mode may respectively In this application a keypad Optionally, the second keypad may have the same appearance as the first keypad, which in this application is referred to as the 'second keypad". According to one method, providing another gliding action on/from a key may reduce the size of the keyboard (and vice versa). The principles of expanding/reducing the size of a keyboard may be applied to any type of keyboard.

Note that, any of the principles, features, concept, aspects, etc., of the invention may be applied to/used with any type input method (e.g. keyboard, voice recognition, handwriting recognition, lip reading, etc.) for example a QWERTY keyboard.

When a word is being entered by providing the input information, the system may propose one or more candidate words in a word list to the user. The word matching the best the input information (e.g. has the highest frequency, has not the highest priority but is matches the best because of preceding words in the text, etc.) may herein be referred to as the (current) predicted word or main candidate.

After typing a beginning of a word, a candidate word proposed by the system may correspond to the desired word. The user may provide an interaction with (e.g. long press on) said candidate, and the system may propose additional words beginning with/based on the interacted candidate. After such interaction, preferably said candidate word become the main candidate and/or its characters preferably will be considered as identified characters (e.g. such a word may herein be referred to as fixed word). Note that a user may fix a word during the entry of a word and continue typing the rest of the word. By considering the fixed portion and the input information corresponding to the rest of the word the system may more accurately predict a word.

When a proposed word (e.g. among the list) is fixed, said word may preferably replace the current predicted word and additional words/candidates may be predicted based on the selected word and be presented preferably next to the current predicted word (e.g. below the current predicted word). According to one aspect, repeating an interaction such as a long pressing action on a same predicted/candidate provides additional candidates based on said word/stem.

According to one embodiment, a predefined interaction such as a gliding action (e.g. leftward, down wards, etc.) on/from a predefined zone such as the zone between the split keys and/or on/from the (e.g. zone corresponding to the) word list may preferably correspond to deleting the word being entered and preferably the word list. In this example, a gliding action including a holding action may result in deleting more words until the user lift his/her finger (e.g. from the touch screen). Accordingly, said interactions in an opposite direction may preferably correspond to an undo function to reviving of one or more deleted words.

A method of spelling help may be used with the system so that to help a user to type a word such as a long word or a word for which the spelling is not known, etc. According to one embodiment of the invention, the user may provide one or more beginning characters of a word (e.g. herein may be referred to as a beginning portion of a word) and/or one or more of the end characters of a word (e.g. herein may be referred to as an end portion of a word). By considering the input information corresponding to a word as such, the system may predict one or more corresponding words from a database of words. Different scenarios may be considered, for example:

Preferably, before providing the input information corresponding to an end portion of a word, the user may provide a predefined interaction (e.g. a long-pressing action, a gliding action, downwards from the Backspace key of a keypad, etc. Such interaction herein may be referred to as the/a last letters alert). Note that, in this scenario, according to one method, the user may not provide input information corresponding to the beginning portion of a word;

A predefined number of characters corresponding to a beginning portion of a word and/or a predefined number of characters corresponding to an end portion of a word may be provided by a user, without the user providing a predefined interaction;

The user provides input information corresponding to a beginning and ending portions of a word without providing an interaction between said portions. In this case, the system dynamically differentiates one of more combinations of beginning and end portions of corresponding words from the input information provided by the user.

Preferably, the length of a word(s) proposed by the system, based on the input of information, may include at least one character in addition to the number of characters corresponding to the input information.

According to one embodiment, (e.g. for better prediction accuracy) input information provided as described above may be provided for several portions of a word based on the principles as described above (e.g. providing input information for a middle portion of a word and for an end portion of a word).

With continuous description of the current embodiment, during the entry of a portion (e.g. an end portion) of a word, upon the user providing a number of backspacing actions such that said number of backspace actions is one more than the number of characters of said end portion being entered, the system cancels (e.g. ignores) said predefined interaction relating to entering a corresponding portion (e.g. end portion).

According to one embodiment of the invention, a recorded phrase such as mentioned earlier, may be entered by a data entry system using the Spell Help function described herein. According to a preferred method, a user may enter the input information corresponding to one or more beginning characters of a phrase and/or ending characters of said phrase. Preferably, before providing the input information corresponding to the ending character(s) of said phrase, the user may provide a predefined interaction such a gliding action (e.g. on a left side of the keyboard currently being used), to inform the system that the input information provided of said interaction preferably corresponds to the ending characters to the word being entered. Note that according to one method the system may predict/present single word(s) and/or phrase(s) corresponding to said input information to the user. As an example, in order to enter the exemplary recorded phrase "Best regards, John" If a corresponding word/phrase includes a function (e.g. see the example of recording/saving the current exemplary phrase), then if said word is entered/selected by the user, it preferably will be printed by considering the phrase characteristics.

It must be noted that the term 'word' used through this application may be considered as a word, a gram of an entry of a database of words, an entire entry of a database of words, compound word, composite word, phrase, a character, etc., creating and/or entering such a word may be herein referred to as creating and/or entering a text portion.

According to one embodiment of the invention, a text portion may be recorded by any means such as, for example, during the entry of a text. As an example, at any moment during the entry of a text, a user may provide a predefined interaction to inform the system to start recording entry of said text from that moment. Preferably, another or the same predefined interaction may inform the system to end said recording. Said text portion may be stored and preferably later be recalled for some purpose such as re-entering said text portion. aid text portion may be reused (e.g. reentered) as described earlier, for example, by typing the keys corresponding to a few beginning characters of said text portion, and then providing a gliding action downwards from the left keys, and then typing a few last letters of said phrase.

According to one embodiment, in order to enhance the accuracy of the system, relating to entering text portions, a first predefined interaction may inform the system of the entry of a first type of text portion such as a text portion having a first number of words (e.g. one word). And a second predefined interaction may inform the system of the entry of a second type of text portion, such as a text portion having more than one word.

Note that, according to on method, instead of relating the interaction, (e.g. gliding action) provided to inform the system about the entry of the last few letters of a text portion, the user may be required to provide such an interaction for any of the words of a text portion, and then provide the last few letters of said word of said text portion.

The spell help system/feature described in this and in the related/previous applications filed by this inventor may be used with any type of auto-correction system. For example, the input information corresponding any portion (e.g. at least one of the beginning and/or the ending portion, or other portion) of a word may include an ambiguous input signal corresponding to an erroneous interaction such as an interaction with an erroneous input means (e.g. mistyping on an ambiguous keys/zone, tapping on a wrong key/zone that does not correspond to a user's desired character of a word). Further, said input information may include information that does not contain a desired interaction or missing information that was erroneously omitted by the user (e.g. the user did not type on an input means that the user meant to input). Said interaction(s) may be of any kind, including tapping, sliding (e.g. gliding or swiping) gestures, speaking, moving (e.g. detection of motion in the air), etc. Such erroneous input signals may herein be referred to as erroneous input signal.

Further to the above spell help system/feature, said input information may (e.g. only) be provided through unambiguous input signals, for example, corresponding to some identified/individual characters. Said input information may also be provided through an unambiguous and ambiguous input signals. Said ambiguous and/or unambiguous input information may be provided by any of keypad/keyboards (e.g. such as those contemplated in this patent application, a qwerty (e.g. touchscreen) keyboard (e.g. providing precise characters and/or providing ambiguous input signals upon interaction with dynamic zones related to the location of the user's interaction with the keyboard, etc.), a keyboard having ambiguous and/or precise keys). Several auto-correction embodiment/s and/or methods may be considered to be used with the spell help system/feature, including those embodiments and methods described in this and previous patent applications filed by this inventor.

According to one method, when an input information corresponding to a word is provided by a user, the system may consider any one or more of the input signals included in said input information as being erroneous input signal(s). According to a preferred method, the system may consecutively consider any one of the input signals (e.g. one signal at a time), preferably starting with an arbitrary or predefined being character position (e.g. from the first letter in a word to a last letter in a word, or vice versa). Preferably, from a word of a predefined minimum length (e.g. depending on language), the system may consider two or more input signals as being erroneous (e.g. more than one error contained in the input information corresponding to the exemplary word "entertainment").

Note that, the system preferably by default may consider the input information as being completely correct (e.g. without erroneous input information) and preferably at first proposes the corresponding predicted words, and preferably after such consideration the system may propose words relating spell help and/or auto-correction methods/features as described herein. Such proposed words based on erroneous input signals may automatically be presented, or presented upon a user's predefined interaction.

According to one embodiment of the invention, (e.g. one or more (e.g. all) word(s)) of an N-gram (e.g. N>0 or N>1) entry of a database may be entered by using the spell help system of the invention.

Methods of Spelling Help by typing one or more beginning characters of a word and/or typing one or more ending characters of a word have been described before by this inventor. According to one method, the beginning characters of a word may be entered by using a first type of interaction and the ending characters may be entered by using a second type of interaction.

According to another method, during the entry of a word, (e.g. in addition to relating said interactions to a sequence of characters) the system (e.g. automatically) may relate a first number of key/zone interactions to beginning characters of a word, and may relate the rest of the key/zone interactions to the ending characters of said word.

According to another method, (e.g. after entering the input information (e.g. key presses) corresponding to one or more beginning characters of a word) and, preferably, interacting with a means such as a key/button corresponding to spelling help, the user may enter the input information corresponding to the one or more ending characters of the word. According to one method, said key/button may be provided/presented in the presented wordlist corresponding to the input information provided by the user. As an example, after entering the input information corresponding to a word, in addition to the corresponding word/s being presented to the user, the system may also display said key/button corresponding to the spell help. At any moment during the entry of the (beginning) portion of the word, the user may interact with said key/button and then enter input information corresponding to one or more ending characters of the word.

According to one embodiment, in order to predict a (e.g. one or more) word using the spell help (e.g. of the invention), the system may either consider all of the input information corresponding to the word (e.g. provided by the user) and/or a portion of it. As an example, the system may consider the input information corresponding to a (e.g. predefined) number of the beginning characters of the word and the input information corresponding to a (e.g. predefined) number (e.g. some or preferably all) of the ending characters of the word provided by the user. As an example, the system may consider the input information corresponding to four beginning characters of the word (e.g. even if the user provided an input information corresponding to more beginning characters) and the input information corresponding to the ending characters of the word.

Principles and methods regarding recording/considering a portion (e.g. a word, a phrase, a sentence) of a text (e.g. during the entry of a text) and entering them later by using a data entry system such as for example the data entry system of the invention have been described before. According to one embodiment, (e.g. instead of a gesture/gliding action) a means to inform the system of the beginning and/or the ending of the recording procedure may be in the form of an interaction with a key/button, for example, similar to the key/button used for the spell help system. According to one method, said key/button may be presented to the user during the entry of a word. A first interaction with said key/button may preferably correspond to the beginning of the recording procedure (e.g. which preferably includes the input information corresponding to the word being entered). A second interaction with said key/button, preferably during the entry of another word, may preferably end the recording procedure (e.g. which preferably includes said another word being entered). Note that said key/button may be presented separate from a wordlist. In this case, preferably, after the first interaction of said key/button, the system begins to record the input information corresponding to the text/word being entered, until a second interaction of said key/button.

The different methods of spell-help have been described before. According to one embodiment, (e.g. after interacting with the spell help means/button/icon) the user is preferably required to enter a few last characters of the word precisely. In this case, the system may preferably consider the beginning portion of the input information as being ambiguous. According to one method, the system may also consider that at least one of the input information corresponding to the beginning and/or the last characters of the word to have one or more mistyping/misspelling errors, and may predict one or more words accordingly.

According to one aspect, after a word is selected, the automatic spelling help feature described herein in detail, may preferably be activated.

Providing a short and a long gliding action in a same direction may correspond to two different symbols/functions. In FIG. 2B, as an example, providing a long gliding action 440211 may preferably correspond to entering the special character '2', and providing a short gliding action may correspond to precise character W. According to one method, a gliding action in a same direction regardless of its trajectory length may ambiguously correspond to any of several characters (e.g. W and 2) corresponding to said direction.

The principles of using stems/words mixed with keyboard interactions and word/stem interactions described herein may be applied to any type of (e.g. alphabetic) language such as Roman based languages (e.g. English, Italian), Korean, Hindi, Arabic, Hebrew, etc.

The principles of swapping and/or selecting wordsword (s)/stem(s) and preferably proposing/predicting longer word (s)/stem(s) including (e.g. beginning with) a selected word/stem as just described throughout this application may be used for the entry of the phonetic transcription of a word/stem (e.g. hereafter may be referred to as or a phonetic word/stem) for languages such as Chinese or Japanese (e.g. hereafter, may be referred to as a phonetic alphabet). As an example, Chinese language uses Pinyin input method wherein the Chinese characters are represented by the Roman phonetic transcription. A word of a Chinese language may be constituted of one or more characters, each may be represented by a pinyin phonetic transcription (e.g. herein may be referred to as a pinyin representation of a word, or pinyin). According to one embodiment of the invention, a database of pinyin representation of words may be used by the data entry system of the invention. As such, a pinyin representation of a word having more than one syllable may be entered by providing the input information corresponding to said syllable. A word list that may include the corresponding pinyin representations of words may be presented to the user. If the presented word list does not include the desired pinyin, the user may provide a predefined interaction such as a gliding action as described for Roman-based languages, (e.g. reject action or next options action), and the system may propose/present a new word list. If needed the user may repeat this procedure until the system proposes the desired word. The user may select a desired pinyin representation of a word within the/a corresponding word list as described earlier (e.g. by tapping on it). The system may preferably fix the characters of the selected pinyin representation of a word, and preferably, may propose longer pinyin representations of words beginning with the fixed characters, and preferably also show the corresponding hieroglyphic words preferably based on their frequency of use. And so on. According to one method, during proceeding to providing the input information corresponding to the next pinyin representation of a word of the desired word, by considering the selected pinyin representation and said input information, the system may propose one or more corresponding pinyin representations of words wherein their first pinyin representation of a word is the selected one. Now, the user may either select one of the new proposed pinyin representations of words (e.g. as the desired pinyin representation of a word or as a stem of a longer pinyin representations of a words word) or he may continue typing the next one. And so on.

In the current embodiment, according to one method, at any moment (e.g. for each selected pinyin representation of a word) during the entry of a pinyin representation(s) of a word, (e.g. after providing information corresponding to the beginning symbols of a word), the user may select its/their corresponding symbol(s) or the user may select all of the symbols of the user's desired word after all of the pinyin(s) of the desired pinyin-based word (e.g. phonetic word) is/are entered.

For the sake of clarity, in the embodiments relating to a hieroglyphic language such as the Chinese language or Japanese languages as described herein, a phonetic representation of a word such as a pinyin representation of a word in case of (e.g. as one example for the Chinese language is preferably) of a word may be considered as equivalent to a stem of a word and/or a single word in a language with an alphabetic system (e.g. English). As such all principles of the data entry system of the invention may preferably be applied to the entry of input information of a phonetic language for entering phonetic chains of characters (e.g. phonetic words/stems) which may be represented by symbols in the corresponding hieroglyphic language.

According to one embodiment of the invention, the system may include an auto-correction method such that when the user touches a key/zone on a location near the border between (e.g. zones corresponding to two or three) letters/characters, the system may consider all of said letters/characters, and preferably provide/predict different words accordingly.

It must be noted that the keypad of the invention may have any number of (e.g. letter) keys, each key may have any number of characters/letters, and any other configuration of letters on the keys.

According to a first aspect of the invention, each of a plurality of (e.g. dynamically assigned) zones/keys on (e.g. a virtual keyboard) on the screen of a device may ambiguously represent a number of characters such as letters. When a user interacts with (e.g. taps on) a location between two (e.g. neighboring) zones/keys, at least some of the characters surrounding the location, preferably regardless of key(s)/zone(s) to which characters are/may be assigned, may be considered as an ambiguous input preferably corresponding to a plurality of said characters by the word predictive data entry system of the invention.

According to a second aspect of the invention, when a plurality of zones/keys on the screen each represent a (e.g. single) character such as a letter, when a user interacts (e.g. taps) on/near a zone/key, in addition to the character of the corresponding zone/key, the system may ambiguously consider at least some of the characters (preferably those characters close to the location of the interaction) corresponding to the neighboring keys/zones as input to the data entry system of the invention. Also, preferably, when the user interacts (e.g. taps on) on/near a zone/key which may also be related to an individual identified character such as a letter, the system may also consider said identified character as input to the data entry system of the invention. In both cases, the system may predict/propose words corresponding to a sequence of input signals provided as such, wherein at least one of the input signals ambiguously corresponds to a plurality of characters.

The arrangement/assignment of (e.g. dynamic) zones and/or assignment of one or more characters to a zone may be of any kind. For example, the zones may constitute a single row of zone(s), a double row of zone(s) (e.g. parallel to each other, and/or located on opposite sides of a touch sensitive surface such as a touch screen), etc. The (e.g. dynamic) assignment of one or more characters to a zone may be based on alphabetical order, QWERTY-based order, or based on any of the principles of data entry system of the invention (e.g. preferred character(s) may be assigned to one or more row(s) of zone(s) and non-preferred character(s) may be assigned to one or more zone(s) outside said zone(s), etc.). As an example, the keypad of the invention may be a narrow full QWERTY keyboard (e.g. a QWERTY keyboard layout compressed in either the vertical or horizontal orientation, in a manner to preferably at least substantially maintain its QWERTY appearance but preferably such that said keypad may be useable (where said keypad may be used by the data entry of the invention (e.g. by considering a plurality of characters near an interaction on a zone of said keypad as input to the (e.g. predictive) data entry of the invention) in a manner to maintain the highest possible prediction accuracy). According to one method a (e.g. multiple-) split QWERTY keyboard wherein each of the split portions is narrow, as described, and preferably is located on an opposite side on the screen may be considered and used. In the current embodiment, the keyboard used with the word prediction system may also include one or, preferably, more special characters that may, at least, be included in words of a database, such as "'", "_", "/", "-", ".", "&", etc. FIG. 10 shows such a (e.g. compressed qwerty) keyboard 452200. In this example, characters "&" 452051, and "-", "_" and "'" 452052.

FIG. 10A shows an exemplary (e.g. linear) one line keyboard of the invention in which some (e.g. preferably) preferred characters are arranged on a single row zone 452001. When a user interacts (e.g. taps, slides/glides, double taps, etc.) on a zone on said keypad, the system may consider at least some of the characters (e.g. displayed/located) near the impact of the user's interaction (e.g. tapping action, sliding action, double tapping action, etc.) on the zone. A (e.g. one or more) predefined zone(s) (e.g. 452002) outside the (e.g. single row) zone may correspond to a broadly ambiguous zone(s) as described before. By providing at least a sequence of interactions (e.g. tapping actions) on the said single row zone and/or the broadly ambiguous zone(s), the word predictive system may predict/propose a word. FIG. 10B, shows, for example, another type of arrangement of preferred letters assigned to said first zone is shown. Other letter(s), configuration of letters on a zone, number of corresponding zone(s), arrangement of said zone (s) on a touch sensitive surface, etc., may be considered by people skilled in the art. As an example, FIG. 10C shows the two zones 452201, and 452202, including the preferred letters, and a broadly ambiguous zone 452203.

In the event that each zone/key represents a single identified character, providing a predefined interaction such as a long pressing action or a gliding action (e.g. preferably) on a larger zone corresponding a group of such zones/keys may correspond to entering one of another group of characters such one of a group of special characters or one of a group of non-preferred characters assigned to said larger zone (e.g. 452002 of FIG. 10A).

According to one embodiment of the invention, providing short gliding action(s) or providing long gliding action(s) from/on a zone/key in a predefined direction may correspond to two different symbols such as two special characters and/or functions, and providing a predefined interaction such as a gliding action with any length in a (e.g. another) predefined direction may preferably correspond to a single character such as, preferably, a non-preferred character/letter.

According to one method, upon providing a predefined interaction such as a gliding action and/or a long pressing action with such a larger zone or with a zone/key of the keypad having at least one plurality of preferred characters, the corresponding other characters may be shown near the user's finger such that, preferably, substantially all of them may be visible to the user.

According to one embodiment, when the user switches to the precise letter mode, the system may show the non-preferred characters in one or more rows, based on any order, preferably, based on an alphabetic order.

According to one embodiment of the invention, preferably in the semi-predictive mode, if a word being entered (e.g. or already entered and then grabbed by a predefined interaction, for example by (e.g. single or double) tapping on it) is not in the dictionary, the user may switch the system into the precise letter mode. In this case, the user may tap on the (e.g. zone(s) corresponding to non-preferred) characters to replace at least some of (e.g. preferably all of) the (e.g. non-preferred) characters of the word. According to one embodiment of the invention, upon providing a predefined interaction such as a gliding action (in a predefined direction or trajectory) or, for example, a long pressing action from/on a (e.g. dynamic) zone anywhere on a (e.g. one line) keyboard and/or on a predefined location such as on/from a character such as a letter, may correspond to (e.g. precisely) enter a predefined character (e.g. a non-preferred or preferred character), (e.g. either alone or from a group of characters presented to the user).

Note that in the embodiments/principles described herein, zone(s) relating to one or more character(s) may preferably be considered by the system as part of a larger zone (e.g. the keypad/letters keys of the invention).

Note that, through this application, although the word 'zone' and/or 'key' is used to describe the relationship (e.g. relative distance) between two or more characters (e.g. preferred characters) to assign one or more characters to a corresponding input signal related to a user interaction with the keypad (e.g. the larger zone) of the invention, it is understood that different other parameter(s)/object(s) of description such as the distance between points/areas/characters/locations may be used to assign one or more characters to an interaction with the larger zone (e.g. including characters) providing an input signal to the system.

FIG. 10D show another type of assignment/arrangement of letters to a (e.g. a larger) zone(s). In this example, the letters are arranged in two groups such that to have a (e.g. significant) space/gap 452302 anywhere between the groups. In this example, the space/gap 452302 relates to a broadly ambiguous zone as described herein.

According to one embodiment of the invention, by providing a predefined interaction, the system may enter into the precise character (e.g. letter) mode wherein the non-preferred characters and/or special characters/functions may be shown (e.g. on different zones) to the user, preferably in a straight line. The (e.g. non-preferred) characters may preferably be arranged in alphabetical order. An interaction with a zone corresponding to a character may enter said character precisely.

Figure 11A:
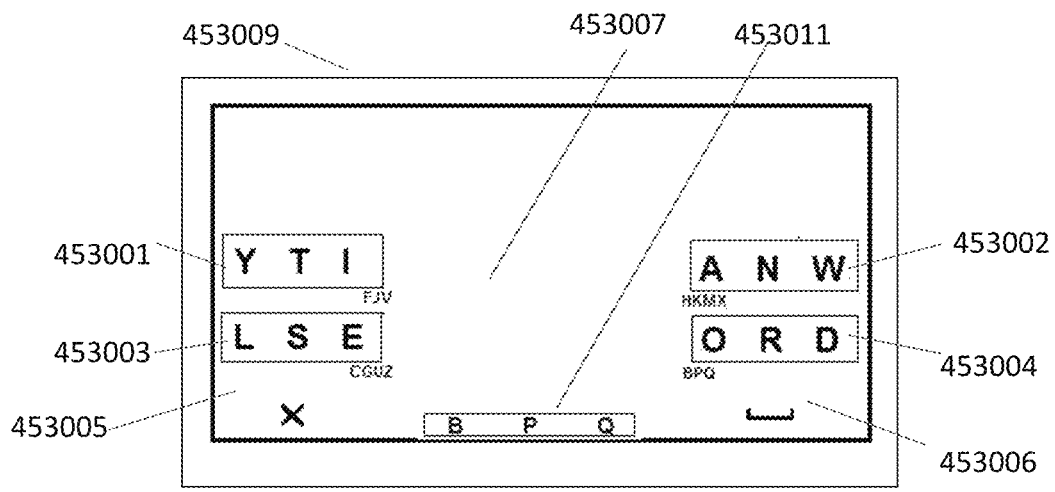
FIG. 11A-11C show various methods of arrangement of keys of a keypad.

FIG. 11A shows another method of arrangement of keys of the keypad of the invention, in this example, the keypad having narrow letter keys 453001 to 453004 (e.g. being split in to two groups and located on opposite edges of the display 453009 (e.g. touch sensitive screen of a device)). In this example, the space and backspace keys are grouped with the letters keys of each side (e.g. such as to form a row/column of keys). Note that, in this example, the boarder of the space and backspace keys are not shown. The space and backspace keys may be located above the letter keys, between the letter keys, under the letter keys, or beside the letter keys. In this example, the broadly ambiguous zone is located between the split keys. According to one method, the letter keys may be large but only a narrow portion of them being visible to the user.

Different methods of entering precise characters through the data entry system of the invention have been described before. According to one embodiment of the invention, when user interacts with a zone assigned to a or related to a preferred character, in addition to entering said/a preferred character, the system may show in a location of the screen the non-preferred character(s) related to said key. As an example, as shown in FIG. 11A, if the user interacts with any zone related to a letter of a key (interacting with a zone relating to a letter of a key may herein be referred to as interacting with a letter on a key) such as the key 453004, the system may show the corresponding non-preferred characters BPQ (e.g. at a location 453011) on the screen 453009 of the device 453000. To each of said non-preferred characters a predefined zone (e.g. on the screen) is defined such that an interaction such as a tapping action on the zone relating to a non-preferred character may preferably enter said character precisely preferably by replacing the entered precise character. Note that, according to one method, the non-preferred characters relating to each key may preferably be printed next to the key, or close/on the key. The current embodiment of entering precise characters may be used/integrated with any of the methods of entering words such as Semi-predicted Mode and/or the Fully-predictive Mode of the invention.

Figure 11B:
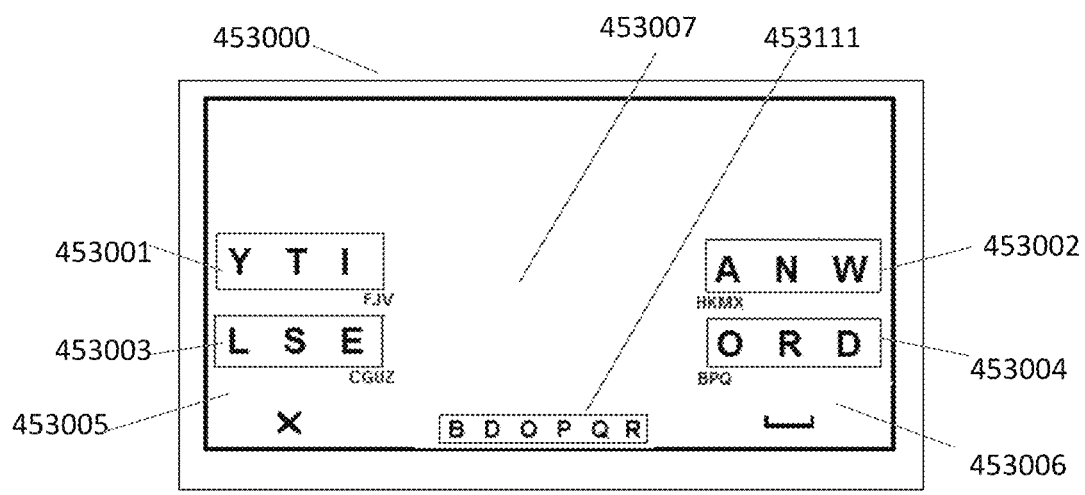

According to one embodiment of the invention, when the user touches anywhere on the key all of the (e.g. preferred and/or non-preferred) characters related to said key may be shown on a location on the screen as described immediately above and interacted with as described immediately above. FIG. 11B shows an example of this embodiment wherein by providing a tapping action anywhere on the key 453004 the system has printed/displayed all the characters related to said key on the location 453111.

Figure 11C:
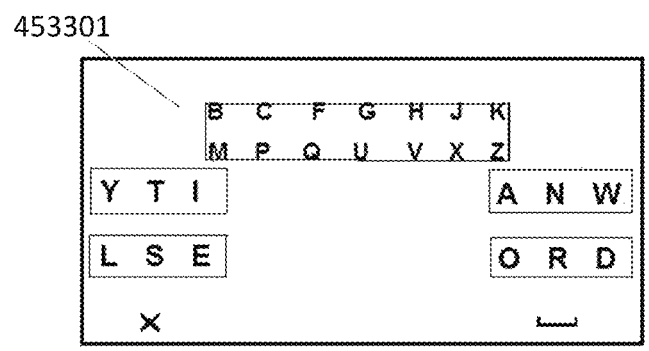

According to another embodiment, the system may include a means, for example, such as providing a predefined gliding action on/from a key so that to present/display all of the non-preferred characters (e.g. in a location) on the screen. In this case, interacting with a zone corresponding to a preferred and/or a non-preferred character may enter said character precisely. FIG. 11C shows an example of such an embodiment wherein the non-preferred characters 453301 are display (e.g. on a screen) for a given predefined interaction. Now the user can tap on any of the characters (e.g. letters) on the screen to enter said character(s) precisely.

Note that in the embodiments above, any of the preferred and/or non-preferred characters relating to a keys/zone of the keypad of the invention may include one or more of the commonly used special characters (e.g. such as "'" is included in a word such as "it's").

As mentioned before, the (e.g. preferred and/or non-preferred) characters (e.g. letters) of the invention may be grouped in various groups and assigned to various zone(s)/key(s) on a touch sensitive surface to for a keypad of the invention or said (e.g. preferred and/or non-preferred) characters may form a continuous sequence of characters on the surface (e.g. preferably a linear sequence) and wherein an interaction with any location of said sequence of characters may dynamically define a key/zone of the keypad of the invention, including the characters close to the touch impact on said sequence of characters. Said group of characters may be considered as an ambiguous key(s)/zone(s) of the invention. By receiving a sequence of one or more such ambiguous dynamic zone or key interactions the data entry system of the invention may predict one or more words accordingly. Accordingly, each of the considered ambiguous characters of such interaction may be printed/displayed on a screen in a separate zone such that an interaction with a zone corresponding to a character enters said character precisely (e.g. as described above).

Figure 12:
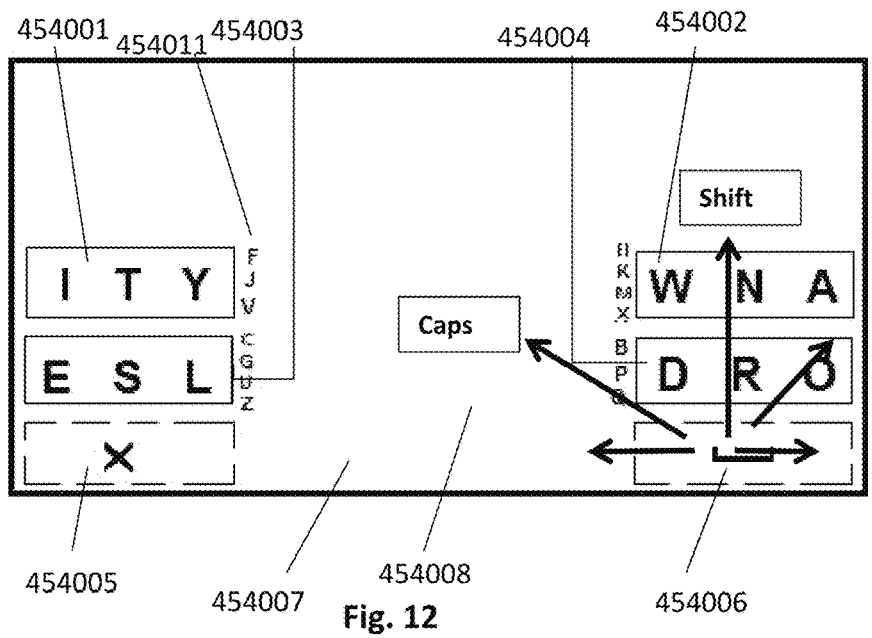
FIG. 12 shows a keypad where the limits of the borders of the Space and Backspace keys are demarcated.

FIG. 12 shows an example of the keypad of the invention, in this example, the limits of the borders of the Space and Backspace keys are demarked in the FIGURE, but are not shown on the screen and/or keypad of the invention. As described throughout this application, gliding actions in predefined directions on/from the Space and/or Backspace key may be related to symbols such as functions and/or special characters, letters such as, for example, accented letters, etc. In this example, said gliding actions are preferably provided on/from said key(s) towards preferably a plurality of preferred gestures (e.g. such as gliding actions) departing preferably anywhere on/from said key(s) in a direction such as left, upper-left, up, upper-right, and right.

Another method of entering precise characters may be considered. According to one embodiment of the invention, in order to entry a non-preferred character precisely, by considering the exemplary keypad of FIG. 12, (e.g. during the entry of a word) when a user interacts with a (e.g. preferred) character (e.g. letter) on a key, said character may be printed/displayed in a corresponding word(s) in the word list proposed by the system. The user may then interact (e.g. tap) with said word and the system may propose/predict a new list of word(s) wherein all of their characters (e.g. zero of more characters) except the last character of the word resemble the corresponding characters of the interacted word and wherein the last character of said word(s) each include one of the non-preferred characters relating to the interacted key. Note that, said word list may also include word(s) other than those described immediately above.

Figure 13:
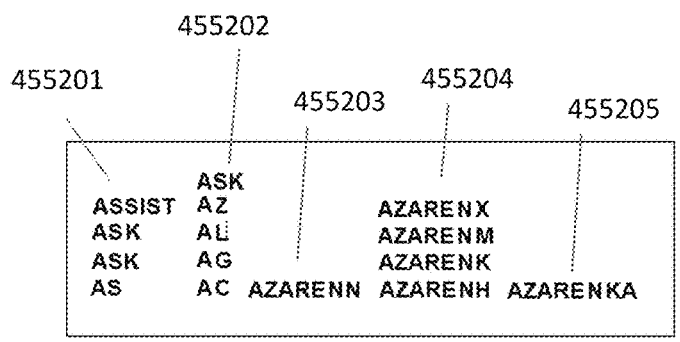
FIG. 13 shows a list of words relating to the semi-predictive mode.

FIG. 13 shows and example of the principles just described above, with a semi-predictive mode of the invention. In this example, in order to enter the word "AZARENKA" letter-by-letter precisely, a user may tap on the letter "A" then tap, for example, on the letter "S" of the key 455005. The system may propose a word list 455201 of a number of words including the word/precise-chain-of-characters "AS" (e.g. hereafter may be referred to as non-definite precise stem) and preferably some other words beginning with the letters "AS". In order to replace the letter "S" by the desired letter "Z", the user may tap on the word/chain-of-characters "AS" in the word list. Consequently, preferably, the system may propose a new word list 455202 including a number of words/chain of characters (e.g. "AC", "AG", "AU", and "AZ") (e.g. that herein may be referred to as "suggested chains of precise characters") each beginning with the letter "A" (e.g. the first letter of the non-desired word "AS") and each ending with a different one of the non-preferred characters corresponding to the key 455003 and wherein said words (e.g. preferably) have the same length as the non-desired word (e.g. such) (e.g. Note that the system may also propose additional words (e.g. "ASK") beginning with the chain of characters "AS" in said word list). The user now may interact (e.g. tap) on the desired chain of characters (e.g. word) "AZ" to select it, and continue to tap on the characters "A", "R", "E", and "N" so that the system presents at least the chain of characters "AZAREN" in a word list 455203. Now, in order to enter the letter "K", the user taps on a letter such as the letter "N" on the key 455002. The system may propose the word/chain-of-characters "AZARENN"—this is not the desired chain of characters. The user may tap on said word and the system may propose a new word list 455204 including a number of words having the same number of characters as the word "AZARENN" and where in each of said words start with the chain-of-characters "AZAREN" and where in each of said words end with one of the non-preferred characters (e.g. "C", "G", "U", and "Z") corresponding to the key 455003. Now the user selects the word "AZARENK" in the word list 455304 and type on the letter "A" on the key 455002 to complete the desired word (e.g. letter-by-letter precisely).

Figure 14:
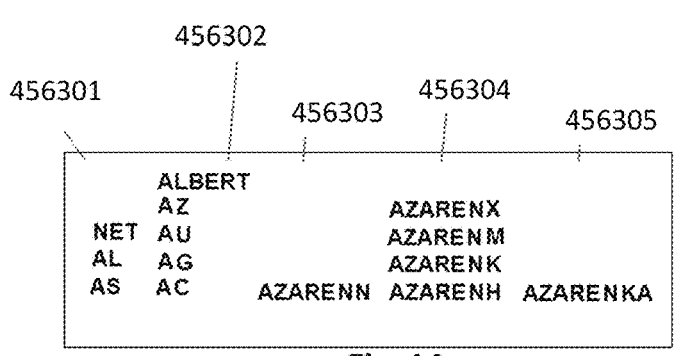
FIG. 14 shows a list of words relating to the fully-predictive mode.

FIG. 14 shows the principles of this embodiment used with the fully predictive mode of the data entry system of the invention. In this example, in order to enter the word "AZARENKA" the user first interacts (e.g. taps) with the letter "A" and then interacts with the letter "L" of the key 454002. The system proposes the ambiguous word "AS" and the precise chain of characters "AL" in a word list 456301 that also includes at least one more word (e.g. "NET") preferably (e.g. ambiguous) related to the interactions with the keys 454002 and 454003. The precise characters "AL" is are not desired by the user. The user interacts with said precise chain of characters "AL". Consequently, preferably, the system may propose a new word list 456302 including a number of words each beginning with the letter "A" (e.g. the first letter of the non-desired word "AL") and each ending with a different one of the non-preferred characters corresponding to the key 455003 and wherein said words (e.g. preferably) have the same length as the non-desired word (e.g. Note that according to a first method, the system may also propose additional words (e.g. "ALBERT") beginning with the selected chain-of-characters "AL", and that according to a second method, the system may propose additional words by considering the key interactions as ambiguously corresponding to any of the characters of the corresponding keys). The user now selects the chain-of-characters "AZ" and continues to enter the rest of the characters as described in the example of semi-predictive mode.

Note that, according to a preferred method, preferred and non-preferred characters related to the keys of the keypad of the invention having four letter keys are grouped such that letters the key 454001 stand on one point, and letters on the key 454002 stand on two points, and letter on the key 454003 stand on a wide base, and letters on the key 454004 containing substantially a closed circle, as described before and in previous applications filed by this inventor.

Note that, according to one method, the keypad of the invention may preferably have a broadly ambiguous zone as described throughout this application. According to another method, all of the preferred and non-preferred characters related to the keys (e.g. four keys) of the keypad of the invention, as described, may be considered as preferred characters. Such keypad may preferably, not include a broadly ambiguous zone and may be used with the word predictive data entry system and use the methods of entering precise characters as described throughout this and previous applications filed by this inventor. As an example, in the examples of FIG. 11B, each of the keys 453001-452004 may be assign to all of the preferred and non-preferred characters related to any of said keys as display on and near each key. All of said ambiguous keys may be used by the word predictive system of the invention. Additionally, for example, according to a preferred method, when the user interacts with the key 453002 all of the characters assigned to said key may be shown in a location on a screen where interacting with any of said characters may enter said character precisely as described before.

Figures 15A, 15B:
FIG. 15A shows four different types of relationships between preferred and non-preferred letters/characters.
FIG. 15B shows a key configuration for an example of a relationship between preferred and non-preferred letters/characters.
Figure 16A:
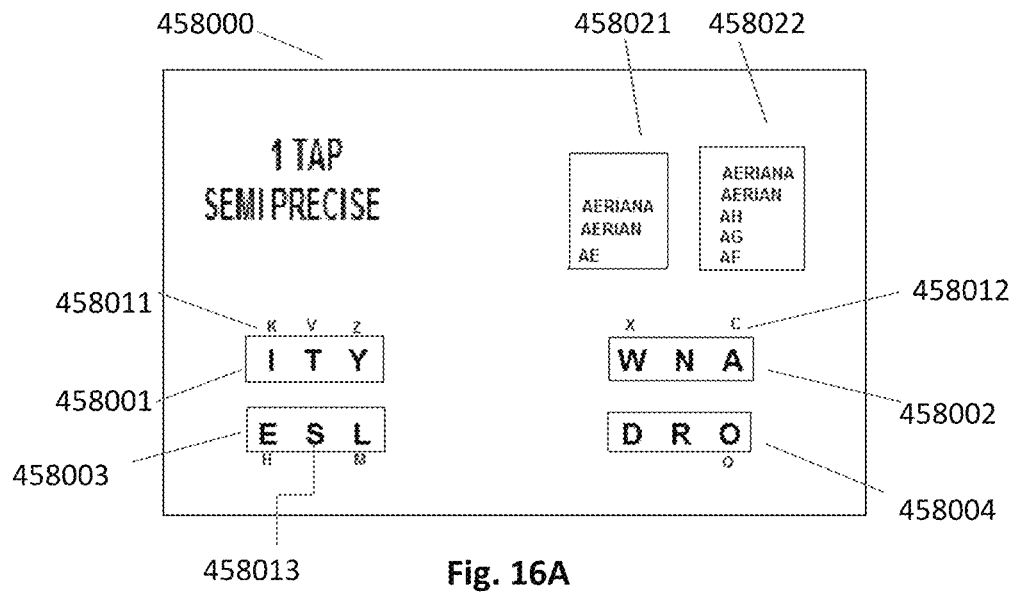
FIGS. 16A-17B show various examples of entering characters precisely during the entry of words and the corresponding words proposed by the system.
Figure 16B:
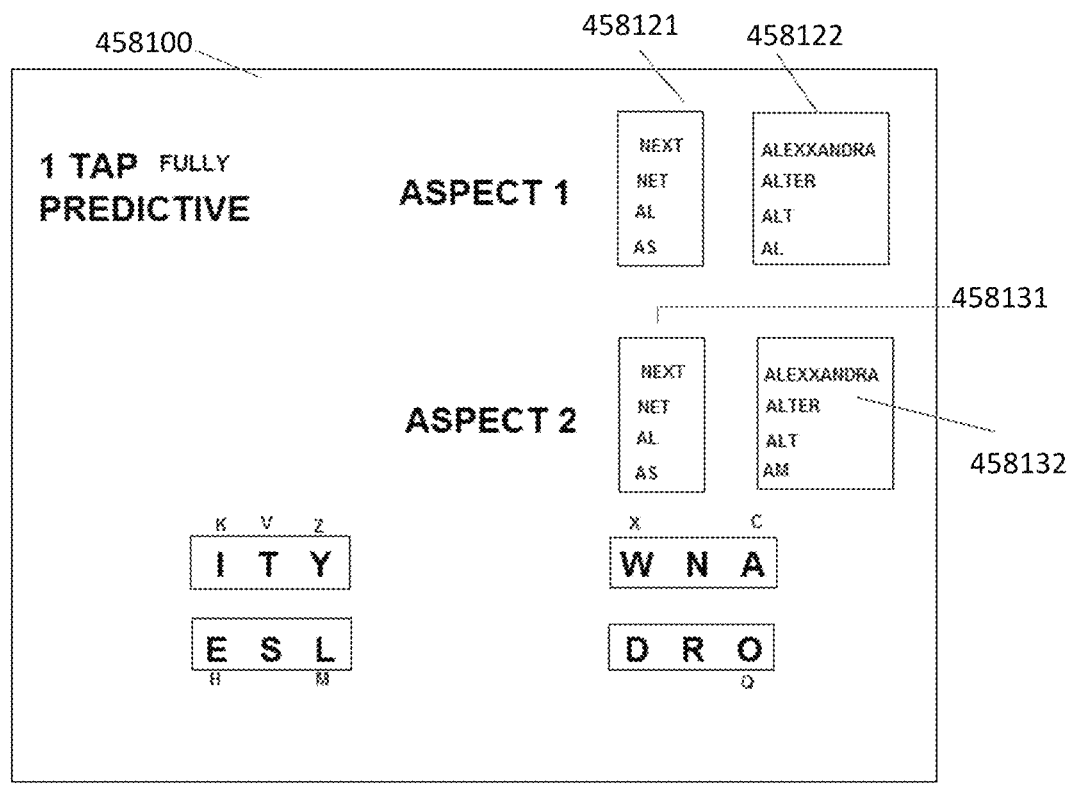
Figure 17A:
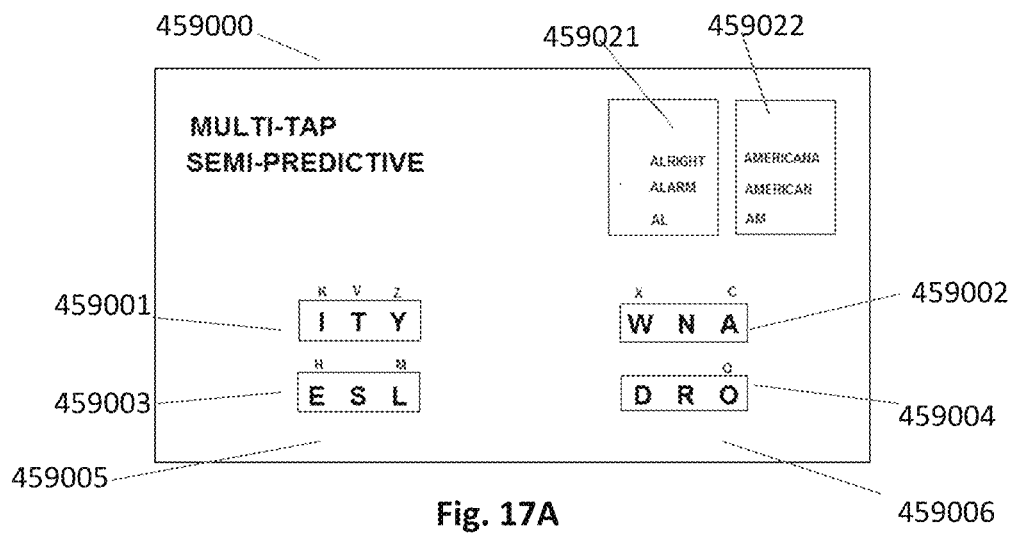
Figure 17B:
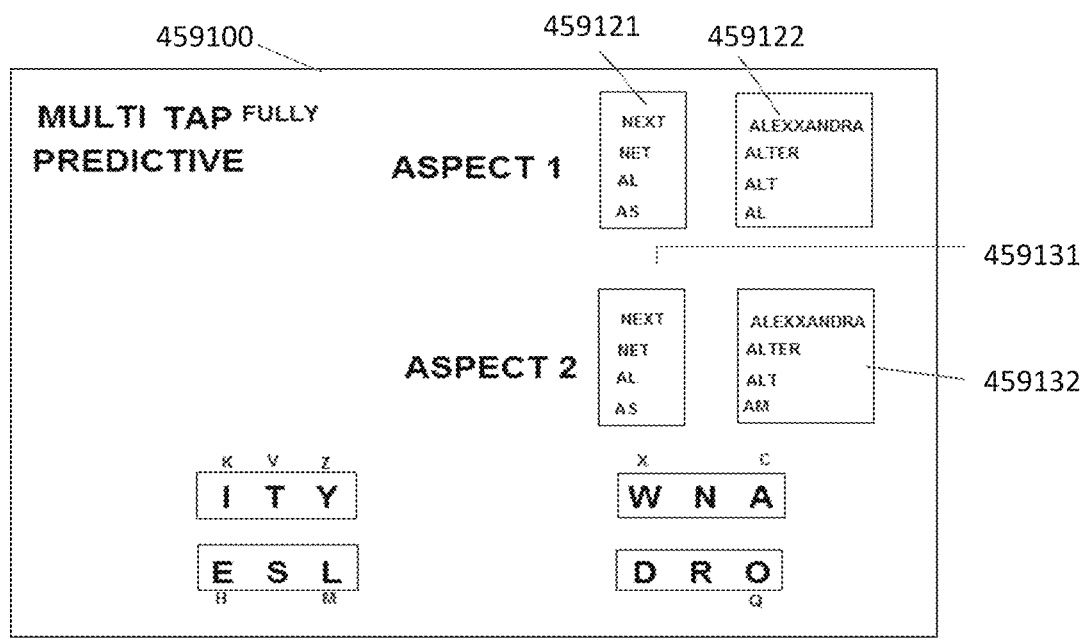

According to one embodiment of the invention, each of the preferred letters/characters may correspond to some non-preferred letters/characters. FIG. 15A shows four different types of relationships between the preferred and non-preferred letters/characters (e.g. such as the relationship shown in the line 457301 and its corresponding key configuration as shown in FIG. 15B. In this example, the non-preferred characters "BC" are related to the preferred character "A", the preferred character "D" has no relationship with any non-preferred character, and so on). Such relationship is shown in the example of FIG. 15B in such a way that, for example, for the group of characters "E, F, G, H" the preferred character "E" is displayed on the key and the last non-preferred character of the group is shown preferably outside the key, near said preferred character "E". In this example, the preferred character "S", "R", "N", "D", have no group relationship. The above principles may be used for entering precise characters.

In the examples of FIG. 12A to FIG. 14, when a user interacts with any preferred character, the corresponding non-preferred characters are a similar group of characters, while in the immediate example above, interacting with each of the preferred characters corresponds to a different group (e.g. of one or more) of non-preferred characters, if any. The principle of entry of precise characters related as such may be similar to those described from FIG. 13 through to FIG. 14 with the difference that here the related non-preferred characters used for entering characters precisely are those characters assigned/related to said preferred characters.

The assignment of non-preferred characters to preferred characters, in the current embodiment, may be of any kind such as alphabetical order, QWERTY order (e.g. "Q" assigned/related to "W" and e.g. "M", "V", "B" assigned/related to "N"), shape order (e.g. "K", "H", "X" assigned/related to the preferred character "A"), etc. Note that in the current embodiment any other type (e.g. arbitrary) assignment/relationship between a preferred and corresponding non-preferred character(s), if any, may be considered by those skilled in the art.

In the embodiments above, for entering characters precisely by using the non-preferred characters assigned to a preferred character, according to one method, when the user interacts with a chain-of-characters corresponding to the non-definite precise stem, the system may replace the last character of the non-definite precise stem by the first related/assign non-preferred character and so on, until the system replaces set character with the desired non-preferred character corresponding to the preferred character. After entering precisely the preferred character "A", if the user interacts with the character "E", the system may show the stem "AE". If the user taps one time on that stem in the word list, the system may propose the stem "EF". If the user interacts (e.g. taps) with the stem "EF" the system may propose the stem "EG". Interacting with the stem "EG" will cause the system to provide "EH" wherein "H" is the last non-preferred character relating to the preferred character "E". As such, any non-preferred character corresponding to a preferred character may be entered using this method of multi-tapping on a proposed stem and may be used for entering characters precisely, letter-by-letter and mentioned before in various embodiments.

FIGS. 16A to 17B show various examples of entering characters precisely during the entry of words and the corresponding words proposed by the system.

According to one embodiment, the non-preferred may be hidden or shown (displayed) next to the keys based on the uses manual interaction, or automatically according some system criterion/criteria.

Note that the keypad of the invention may be of any kind configuration of keys/zones and various assignments of characters to said keys/zones. As an example, the keypad of the invention may have 10 keys each having one preferred character related/assigned to one non-preferred character, and 2 more keys each having one preferred character related/assigned to two non-preferred characters, wherein preferably one of the non-preferred characters of said two non-preferred characters is the one that is used less often (e.g. has lowest frequency of use among the letters of a language, e.g. 'Z' and 'X' in a Roman based language).

According to one correction embodiment, after the user provides interaction with a key, the system may preferably show at least the corresponding non-preferred characters (e.g. the system may show all/any of the non-preferred characters too) on a location of the screen for entering any of the characters precisely, as described before. According to one embodiment of the invention, when the user continues to interact with the key(s), the non-preferred characters shown as such corresponding to the first key interaction may remain on the screen. As an example, after providing the input information corresponding to a desired word, if the user's word is not in the dictionary, the user may proceed to correct the entered chain-of-characters. For that, if the first character of the desired word is a non-preferred character, the user may tap on a desired letter of the group of non-preferred characters corresponding to the key of the first key interaction which is shown on the screen, if not, the user may, for example, tap on the desired preferred character. Now the system may show the non-preferred characters corresponding to the following key interaction of the user, and so on.

Figure 18A:
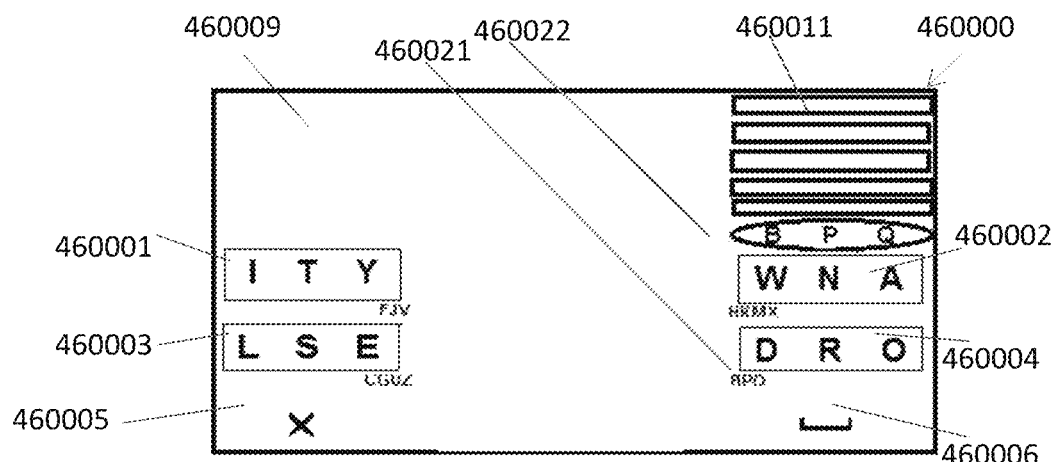
FIG. 18A shows a keypad with the non-preferred characters displayed in an enlarged zone.

According to one embodiment of the invention, (e.g. each of) a group of non-preferred characters may have its own corresponding zone on a/the touch sensitive surface, and wherein interacting with said zone may enlarge said zone or may result to show the (e.g. enlarged) corresponding characters on a location on the screen as described before (e.g. the zone corresponding to the enlarged non-preferred characters may herein be referred to as the non-preferred characters' enlarged zone). As an example, FIG. 18A, a tapping on (e.g. the zone corresponding to) the non-preferred characters 460021 may result to proposing the enlarged corresponding non-preferred characters in a zone 460022 near the word list 460011 on the screen 460009 of a device 460000.

Figure 18B:
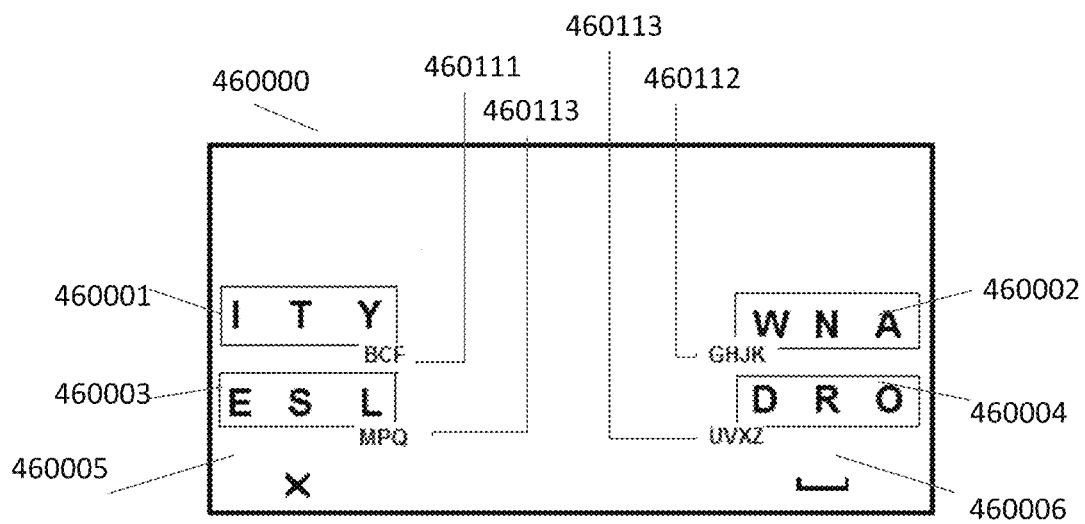
FIG. 18B shows a keypad with the non-preferred characters arranged in four groups.

Note that the non-preferred characters may be grouped according to any type of arrangement such as for example alphabetical arrangement. In the exemplary FIG. 18B, the non-preferred characters are arranged in four (e.g. separate) groups in 460111-460114 in an alphabetical order.

Figure 18C:
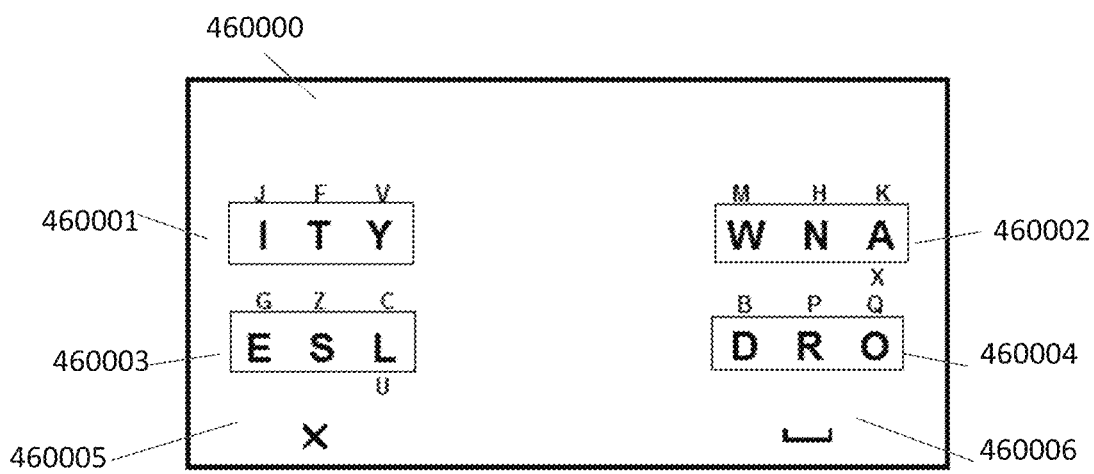
FIG. 18C shows a keypad where letter(s)/character(s) have related letter(s)/character(s).

According to one embodiment, each (e.g. of the preferred) letters/characters may have at least one related character/letter such as a non-preferred character. By providing a predefined interaction such as a gliding/long-pressing action with a (e.g. zone corresponding to a preferred) character/letter, the system may enter the corresponding (e.g. non-preferred) character (e.g. preferably, precisely). As an example, in FIG. 18C, a long pressing action or a gliding action from/on the (e.g. zone corresponding to the) letter "S" may correspond to entering the letter "Z". Accordingly, a gliding action upward from/on the (e.g. zone corresponding to the) letter "L" may correspond to entering the letter "C", and a gliding action downward from/on the (e.g. zone corresponding to the) letter "L" may correspond to entering the letter "U".

Note that other types of arrangement of non-preferred characters and other methods of entering a non-preferred character may be considered. As an example, according to another method, each of the non-preferred characters may have its own zone, wherein upon interacting with one of said zones the system may preferably enter the corresponding character precisely.

According to one embodiment of the invention, according to a first method, after the user selects a non-preferred character in the non-preferred characters' enlarged zone, said non-preferred character replaces the corresponding preferred character and said zone disappears.

According to a second method, after said selection of said non-preferred character, said zone remains displayed on the screen and subsequently selecting another character from said zone, replaces the previously selected non-preferred character.

According to a second method, after said selection of said non-preferred character, said zone remains displayed on the screen and subsequently selecting another character from said zone, appends the corresponding selected character to the previously selected non-preferred character.

According to one embodiment, a (e.g. non-preferred) character may be related to one or more (e.g. pre-defined) corresponding (e.g. non-preferred) characters. According to one method, after said selection of a (e.g. non-preferred) character from the non-preferred characters' enlarged zone, said one or more (e.g. pre-defined) corresponding (e.g. non-preferred) characters are displayed in the non-preferred characters' enlarged zone and available for selection to be preferably be appended to the previously selected non-preferred character. As an example, after selecting the letter 'C' from the non-preferred characters' enlarged zone, the system may show the corresponding related characters (e.g. 'H', etc.) and the user may select a related character to, for example, enter (e.g. two) consecutive (e.g. non-preferred) characters (e.g. 'CK').

According to one embodiment of the invention, a press-and-holding action on a key/zone may bring up (e.g. display) the corresponding symbols (e.g. such as special characters of at least said key). According to one method, the user may interact (e.g. tap) any of the symbols to enter said symbol. According to another embodiment, a predefined gliding action provided on any key may enter a corresponding symbol (e.g. such as a special character or function) of said key.

Note that in the embodiments described throughout this application, a zone/key described may be dynamically defined based on the location of interaction with the keypad (e.g. including preferred characters) of the invention as described before. In this case, according to one method, the relationship/assignment of the non-preferred characters corresponding to one or more preferred characters that are considered by the system based on such an interaction(s) may also be dynamically defined.

According to one embodiment of the invention, during the entry of the input information corresponding to a word, a user may provide a predefined interaction, such as a gliding action in the broadly ambiguous zone, to inform the system that the input information corresponding to a next portion of a word will not be provided by the user, hereafter referred to as the 'skipped portion'. After said interaction, if the user provides input information, the system relates said input information to a/any next portion of the desired word. The length and/or the corresponding characters of the skipped portion may be dynamically defined by the system, by considering the a predefined criterion and/or by considering the contents of a dictionary/word database, by, for example, finding words that match, preferably, all the/said input information relating to the entry of a word.

As an example, the user may enter a beginning and a last portion of a word, and the system may accordingly propose corresponding words that begin and end with said portions of a word.

According to one embodiment of the invention, after a predefined time interval, starting from the end or beginning of the user's last interaction (e.g. pressing on a key), the system may preferably begin to process the input information, by, for example, searching a dictionary/word database and may select words for proposal to the user.

According to one embodiment of the invention, after a predefined time interval, starting from the end or beginning of the user's last interaction (e.g. pressing on a key), the system may preferably display/propose word(s) (e.g. in the form of a word list) to the user.

Figure 19A:
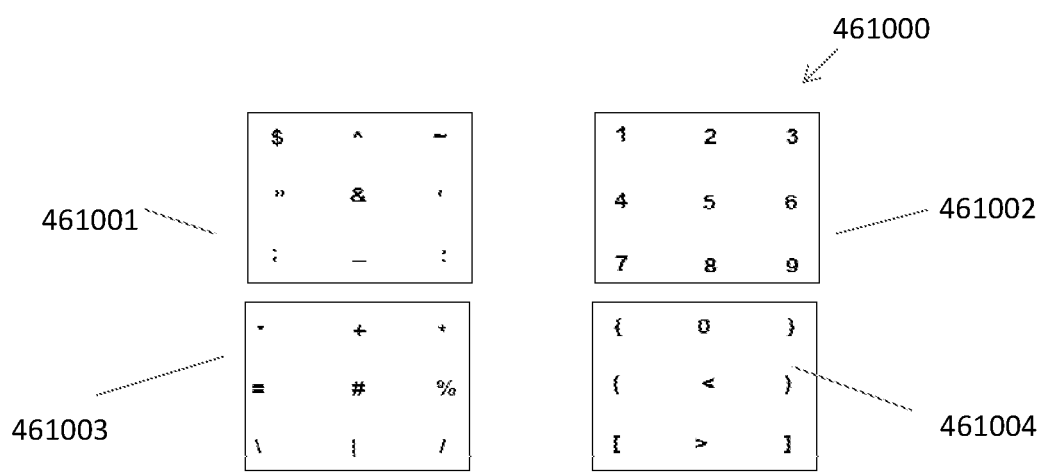
FIG. 19A-19B show arrangement of special characters and/or functions on keys.
Figure 19B:
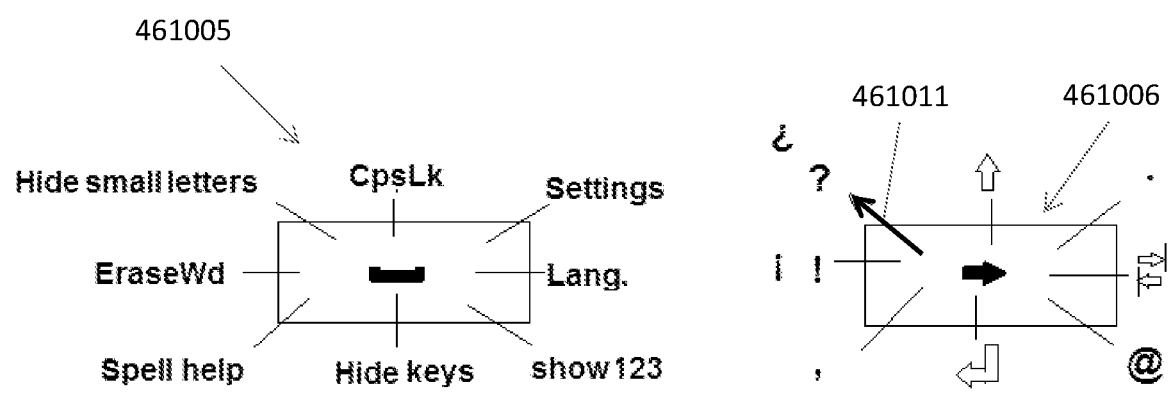

FIG. 19A shows another type of assignment of special characters to the keys of the keypad of the invention. FIG. 19B shows another type of assignment of special character and functions to the keys such as the Space and the Backspace keys of the keypad. In this example, up to eight gliding actions in various directions may each correspond to a predefined character or function. Optionally, two gliding actions, each having a different length, provided in a same direction, may each correspond to a different character. For example, a short and long gliding action in the direction 461011 may correspond respectively correspond to a first and second character (e.g. '?' and").

Figure 20A:
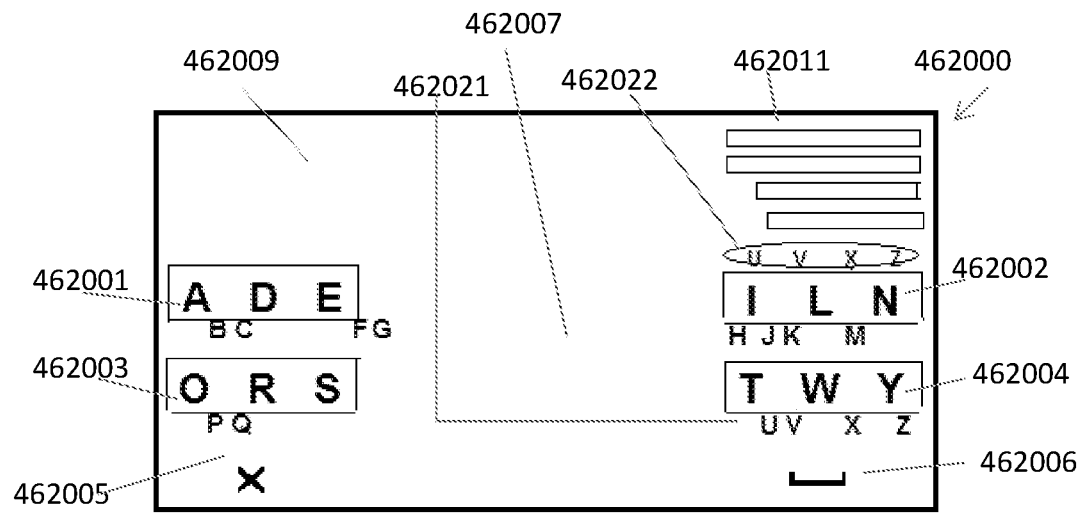
FIG. 20A-20B show an example of a keypad having a plurality keys on and/or next to which the preferred and non-preferred characters are arranged/presented.

As mentioned before the, the letters (e.g. all of the letters, preferred and/or non-preferred letters, etc.) of the keypad may be arranged in alphabetical order. FIG. 20A shows, as an example, the keypad of the invention having a plurality (e.g. four) of letter keys (e.g. 462001 to 642004) on and/or next to which the preferred and non-preferred characters are arranged/presented in alphabetical order. In this example, the preferred characters are shown on the keys (e.g. TWY on the key 462004), and the non-preferred characters are shown outside the keys (e.g. letters UVXZ 462021 on the key 462004). Such a keypad may be used with a data entry system such as the word predictive (e.g. fully-predictive and/or semi-predictive) data entry system of the invention. As an example, for a preferred letter, the user may preferably tap on a key, and for a non-preferred character the user may preferably tap on the broadly ambiguous zone 462007 between the keys. The use of preferred and non-preferred characters by a data entry system such as a word predictive system to predict words has already been described in detail.

In this example, the keypad may also include additional key(s) such as a Space key (462005) and/or a Backspace key (462006), which may also include additional function(s).

Figure 20B:
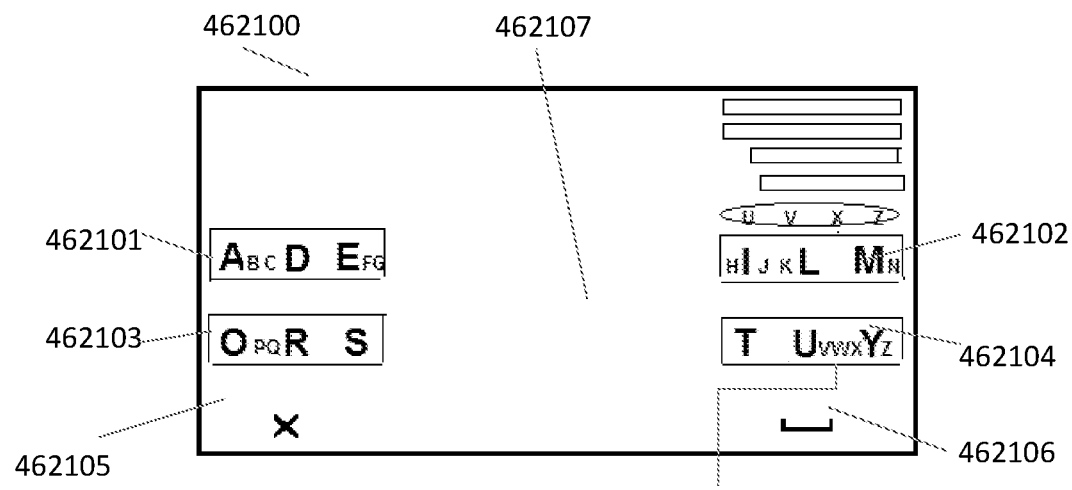

Note that, in the current embodiment, the preferred characters and/or the non-preferred characters, may be defined/modified based on the parameters such as the accuracy of prediction in different languages while keeping the alphabetical order. FIG. 20B shows, as an example, an arrangement of letters on a keypad. In this example, the presentation of the non-preferred characters and preferred characters of FIG. 20A are slightly modified, and are shown on the keys (462101 to 462104) of the keypad in small font, and the preferred characters are printed in a large font. In this example, the keypad may preferably include at least a broadly ambiguous zone (462107). Note that, the number of preferred characters assigned to a key are shown as an example and may vary.

Note that all of the letters of an alphabet may be assigned to the keys of a keypad as preferred characters. In this case the keypad may not include a broadly ambiguous zone. For example, in the examples above, all of the letters may be assigned to the (e.g. four) keys in alphabetical order.

With continuous description of the current embodiments, according to a first method, for a key interaction, the system may present the non-preferred characters (e.g. 462021) in an enlarged format (e.g. 462022) (e.g. so that the user can precisely enter a non-preferred character by tapping on it) as described before. According to a second method, for a key interaction, the system may present all of the character of said key in an enlarged format preferably so that the user can precisely enter a character. According to a third method, for a key interaction, the system may present any number of predefined characters (e.g. in an enlarged format) preferably so that the user can precisely enter a character.

Figure 23:
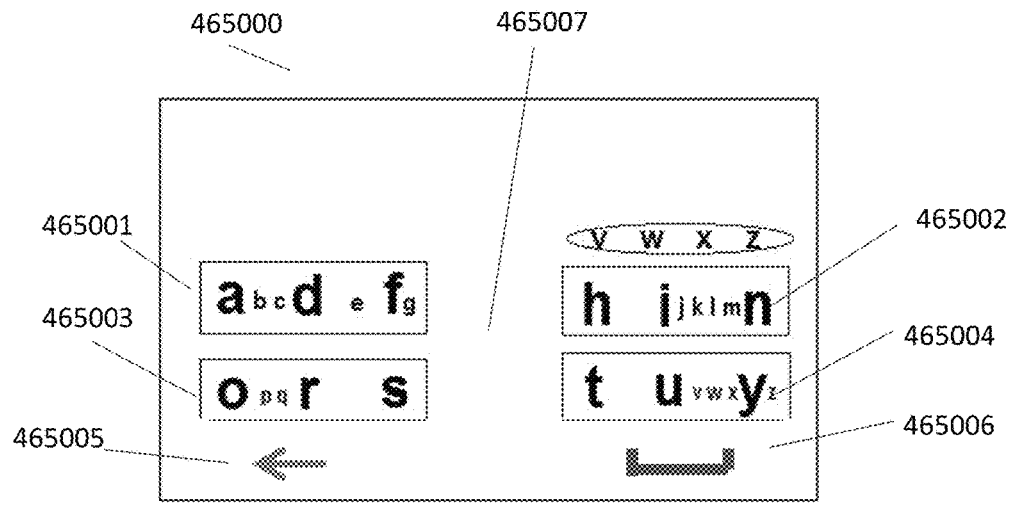
FIG. 23 shows an arrangement of preferred characters (e.g. shown in large font) on the keys/zones of a keypad.

FIG. 23 shows a preferred arrangement of preferred characters (e.g. shown in large font) on the keys/zones of the keypad of the invention. In this example, the non-preferred characters (e.g. shown in small font) are also shown on the keys, but preferably, as mentioned before, according to a preferred method the non-preferred characters may be assigned to the broadly ambiguous zone 465007. Note that, as mentioned before, the broadly ambiguous zone is preferably part of the keypad of the invention.

Figure 23A:
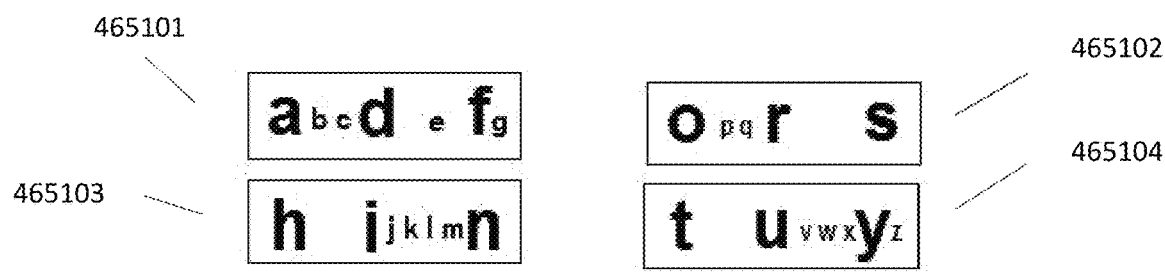
FIG. 23A shows a preferred arrangement/assignment of the preferred and non-preferred characters of a keypad.

FIG. 23A shows another preferred arrangement/assignment of the preferred and non-preferred characters of the keypad of the invention.

Figure 23B:
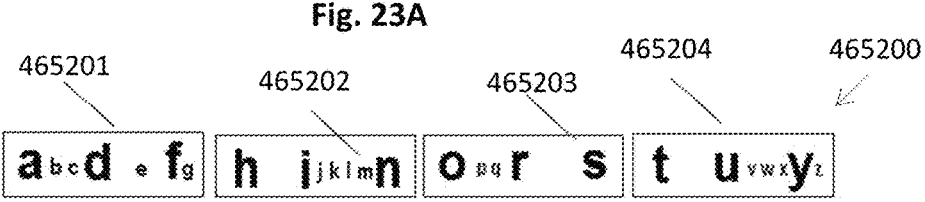
FIG. 23B-23D shows an example of a linear arrangement/assignment of the preferred and non-preferred characters of a keypad.

FIG. 23B shows an example of a linear arrangement of the keys and the arrangement/assignment of preferred and non-preferred characters of the keypad of the invention. In this example, a zone (e.g. not shown) outside said keys may be considered by the system as a broadly ambiguous zone of the keypad of the invention.

Figure 23C:

FIG. 23C shows an example of a linear arrangement/assignment of the preferred and non-preferred characters of the keypad of the invention. As mentioned before, when a user interacts with a zone on such a keypad, the systems considers/relates (e.g. ambiguously and/or precisely) a number of characters near the impact point of the user's interaction. In this example, the preferred characters that are shown in large font, are printed on the keypad (e.g. zone) such that the user may enter (e.g. precisely) the preferred characters by interacting with them. According to one method the system may (e.g. also and preferably simultaneously) consider said preferred character and the nearby characters as ambiguous characters. According to one method, if the user interacts with (e.g. a zone corresponding to) non-preferred character(s), the system may consider the nearby non-preferred characters as ambiguous characters. According to one method, after such interaction, the system may also enlarge said characters and optionally the nearby preferred characters, so that the user can enter any of said considered characters precisely. Note that a sequence of such ambiguously entered characters and optionally the precisely entered characters, may be considered by the word predictive system to predict word(s).

Figure 23D:
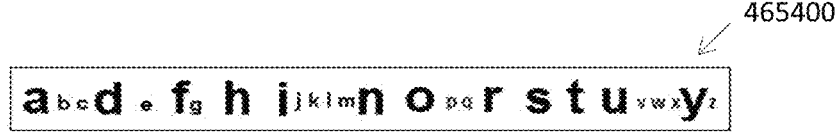
Figure 24A:
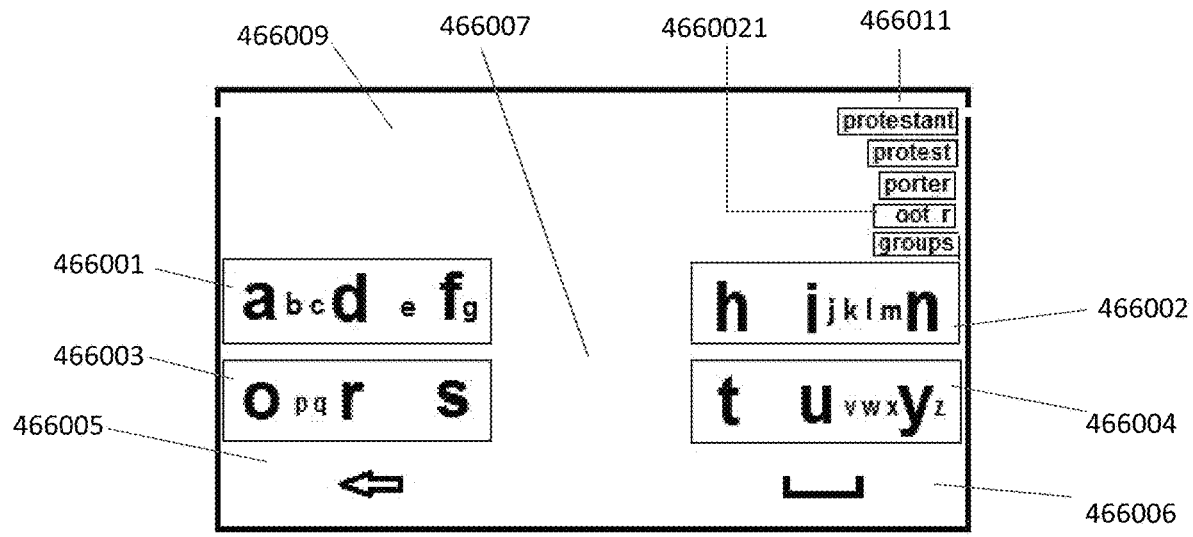
FIG. 24A-24C show the keypad of the invention in different instances (e.g. respectively, fully-predictive mode, semi-predictive mode, non-preferred mode).
Figure 24B:
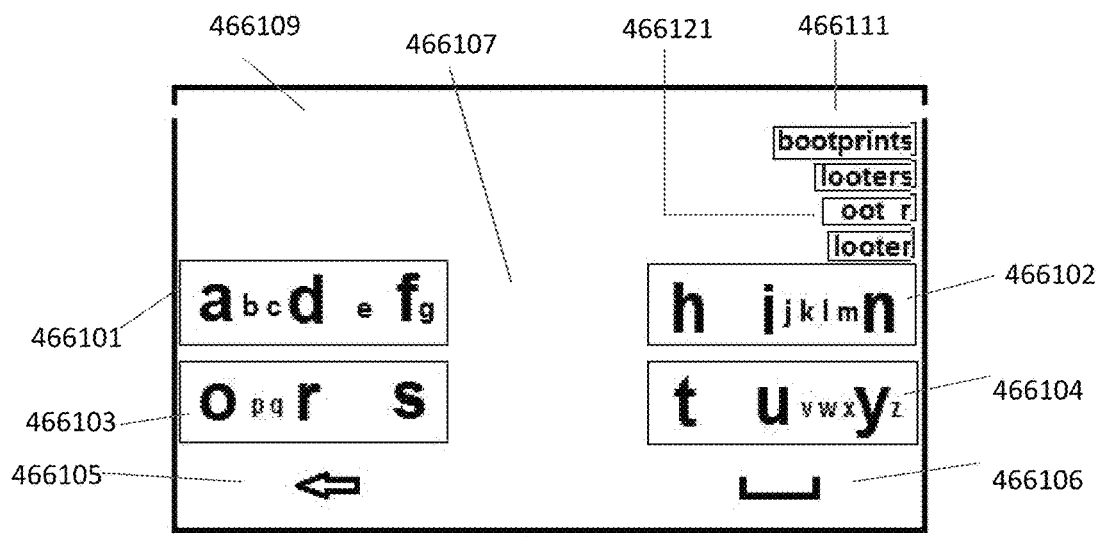
Figure 24C:
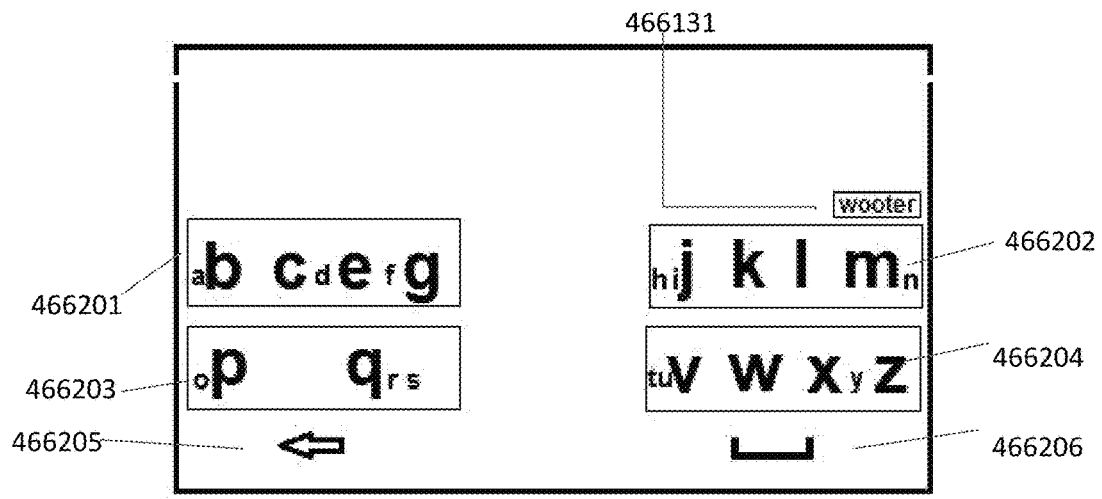

FIG. 23D shows another type of keyboard similar to keyboard 465300 of FIG. 23C where in this example, all the characters (e.g. preferred and non-preferred characters) are arranged close to each other to reduce the size of the keypad.

Figure 21A:
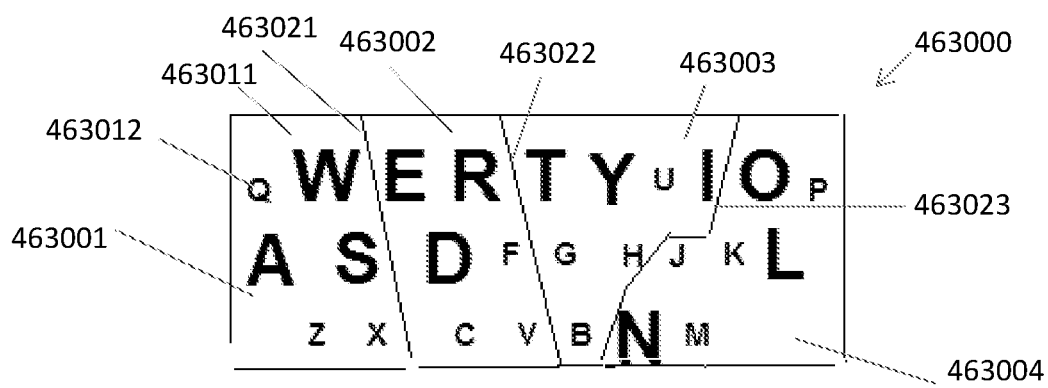
FIG. 21A-21D show an example of keypads having a plurality keys with preferred and/or non-preferred characters on various key layouts.
Figure 21B:
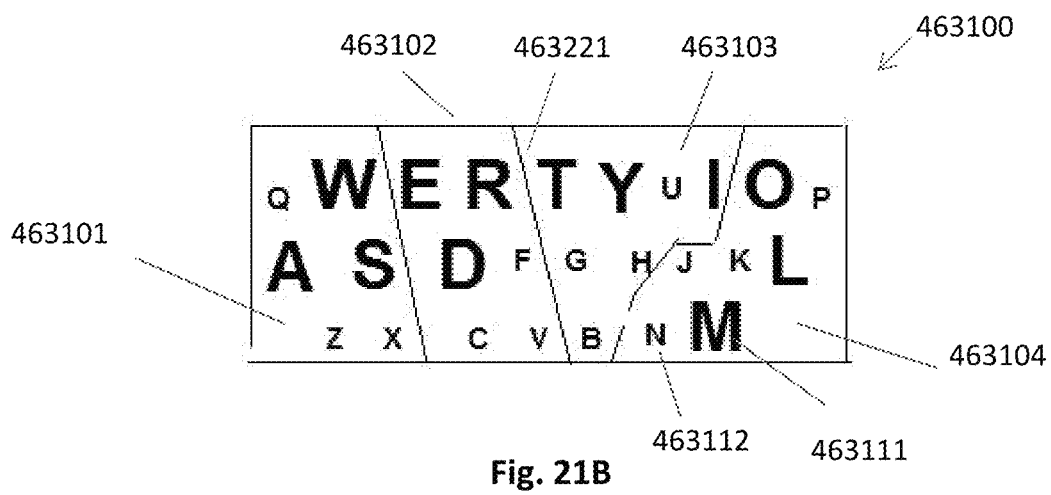

As mentioned before the, the letters (e.g. all of the letters, preferred and/or non-preferred letters, etc.) of the keypad may be arranged in the order of a standard (e.g. QWERTY) keyboard. FIG. 21A shows, as an example, a keypad of the invention including a plurality (e.g. four) of letter keys (463001 to 463004). The preferred characters (e.g. 463011) are shown in large font and non-preferred characters (e.g. 463012) are shown in small font on the keys of the keypad. According to one method, for preferred characters, the user may tap on the keys and for non-preferred characters the user may tap on a broadly ambiguous zone (not shown) outside said keys. Preferably the keys of the keypad may have different forms so that together, they constitute a QWERTY-like keyboard. In this example, the boarders between keys are shown by lines (463021 to 463023). Such keyboard may also be used with a data entry system as mentioned before. Note that, the preferred characters assigned to a key are shown as an example and may vary. For example, in FIG. 21A, the character 'N' was presented as a preferred character (e.g. shown in large font) and the character 'M' was presented as a non-preferred character, and in FIG. 21B, the character 'M' 463111 is presented as a preferred character, and 'N' 463112 is presented as a non-preferred character. Also note that the number of preferred characters may vary, accordingly as required.

It must be noted, that a keypad of the system having a QWERTY arrangement, may have any number of keys.

Figure 21C:
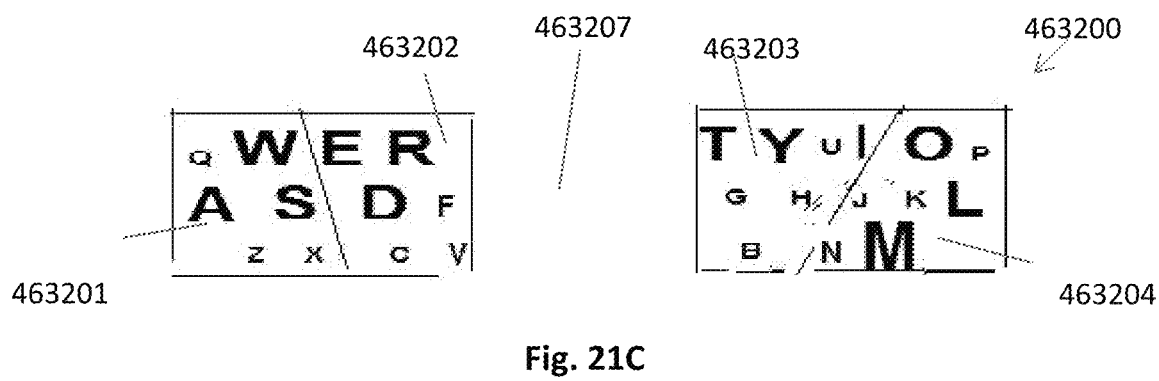

FIG. 21C shows the keypad 21B in a split configuration having two portions each have two keys. In this example, the keys 463201 and 463202 form a first portion of the keypad and the keys 463203 and 463204 form a second portion of the keypad. Said portions are separated by a broodingly ambiguous zone 463207.

Figure 21D:
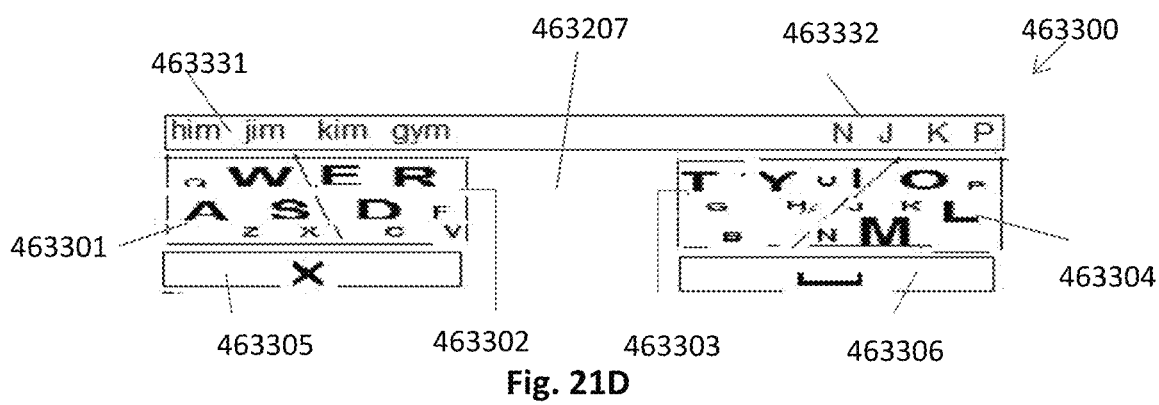

The keypad of the invention, as described above, may be resized, for example, to be in large format and/or in compact format. FIG. 21D shows a preferred embodiment of the invention, in this example, the keypad 21C is shown in a (e.g. vertically) compact format. In this example, the keypad includes additionally keys 463305 and 463306 relating to, for example, Space and Backspace as described throughout this application by the inventor. When a user touched a key, the non-preferred characters related to said key (e.g. 463304), may be shown in an enlarged format (e.g. 463332) so that the user may be able to enter at least one of them precisely. In this example, a word list 463331 presenting words corresponding to the input information provided by the user is also shown.

Note that all of the letters of a QWERTY-like keypad may be assigned to the keys of a keypad as preferred characters. In this case the keypad may not include a broadly ambiguous zone. For example, in the examples above, all of the letters may be assigned to the (e.g. four) keys in QWERTY-like keypads.

Note that letter arrangements other than Alphabetical and/or QWERTY-like keyboard arrangements may be consider by people skilled in the art based on the principles described above.

Such a keypad may be used with a data entry system such as the word predictive (e.g. fully-predictive and/or semi-predictive) data entry system of the invention. The use of preferred and non-preferred characters by a data entry system such as a word predictive system to predict words has already been described in detail.

It must be noted that in examples above, that although these embodiments, methods, principles, and examples refer to the use of keys, such keys are preferably zones on a touch sensitive surface such as a touchscreen.

It is understood that instead of a QWERTY-like keyboard, any other keyboard having any number of keys any character assignment, etc. may be used.

Figure 22:
FIG. 22 shows an example of a keypad.

As mentioned before, the data entry system of the invention may use a keyboard such as an on-screen (e.g. alphabetically ordered, QWERTY-like, etc.) keyboard on a touch sensitive screen relating to an electronic device. As mentioned before, when user interacts with the keys, he may tap in an area of the keyboard being close to the character that the user intended to enter. The system may consider at least some of the neighboring character relating (e.g. near, around, or corresponding predefined characters) to the pressed area (e.g. zone). This may provide a set of ambiguous characters for each interaction with the keyboard. By providing a sequence of such interactions, the user may dynamically provide an ambiguous input information to the data entry system (i.e. each of the number of such interactions with the keyboard may be related to at least one character such as a letter, such as to duplicate a virtual key interaction corresponding ambiguously corresponding to one or more characters). Note that, even if there are non-preferred characters presented on the keyboard, according to a preferred method, the system may consider only the preferred characters relating (e.g. near, around, or corresponding predefined characters) to the interaction with the keyboard. As an example, by considering FIG. 22, when a user interacts with the keyboard at the touching/interaction point 464011, the system considers at least the letters 'E', 'R', and 'D' as ambiguously corresponding to said interaction. These matters have already been described in detail.

According to one embodiment, during the entry of a word, the letters of one of the words presented in the word list may be those letters that the user has tapped on them on the corresponding keys, and the remaining one or more characters of said word corresponding to user's interaction with the broadly ambiguous zone may be presented by a predefined character such as a blank character (e.g. such word may hereafter be referred to as an incomplete word). According to one method, if the user selects said incomplete word, it may become the current predicted word and the system or the user may enter the system into a correction procedure by switching the keypad into another layer wherein the non-preferred characters (e.g. on enlarged keys) are presented. Typing on the presented characters may replace said predefined/blank characters.

Note that, each time the user replaces a predefined character (e.g. by a non-preferred character), the system may propose one or more words from the database used by the system corresponding to the input information provided until then.

FIG. 25A shows another method of (e.g. alphabetic) arrangement of letters of a keypad of the invention having four keys 467001-467004 and a broadly ambiguous zone 467007. Different scenarios may be considered, such as:

(1) According to one embodiment (e.g. hereafter may be referred to as the preferred scenario)(e.g. preferably, in the fully ambiguous mode), each of the keys represents the letters displayed on it. The remaining letters are (e.g. t, u, v, w, x, y, z, not shown) represented by the broadly ambiguous zone 467007. According to one method, in this example, in order to enter a word, and interaction such as a tapping action on a key/zone may ambiguously correspond to any of the letters on said key/zone. As such, a sequence of interactions with key(s)/zone(s) may correspond to one or more words of a database used by the system. Note that according to one embodiment, the characters/letters assigned to the broadly ambiguous zone may be displayed on said zone or anywhere on the screen. Note that, according to one embodiment, the boarders of the broadly ambiguous zone may be displayed on the screen. In the example FIG. 25A, the broadly ambiguous zone 467007 is the zone preferably between the letter keys and the space and backspace keys. In this example, the borders of the broadly ambiguous zone are not displayed.

(2) According to one embodiment, (e.g. preferably, in the semi-predictive mode), interacting with a key, may correspond to any of the preferred characters assigned to said key (e.g. in this example, the preferred letters displayed on a key are shown in large font, while the non-preferred letters are shown in small font). Interacting with the broadly ambiguous zone 467007 may preferably correspond to any of the non-preferred letters (e.g. small) shown on the keys (e.g. b, g, j, k, m, p, q) and the rest of the letters of the language that are not shown (e.g. t, u, v, w, x, y, z).

(e.g. In the embodiments above) optionally, according to one method, a predefined interaction such as tapping on any of the letters of a key may identify said letter and entering it (e.g. here in may be referred to as precisely entering a character/letter). According to a second method, a predefined interaction such as a tapping action on any preferred letter may precisely enter said letter. Accordingly, another type of interaction such as a (e.g. short) gliding action from a preferred character towards a non-preferred character may precisely enter said non-preferred character.

The system may include a precise mode wherein a predefined interaction such as a gliding action on/from the Space 467006 or Backspace key 467005 in a predefined direction may enter the system into said precise more where the user can precisely enter (e.g. any) characters. FIGS. 25B and 25C show, as an example, such keypads.

Another method of assignment of letters of a language to a keypad of the invention is described using FIG. 26. In this example, in addition to the keys 468001 to 468004 two broadly ambiguous zones 468007 and 468008 are considered each relating to portion of the mainly the remaining characters (e.g. none-preferred characters and TUVWXYZ, respectively.

As mentioned before, during interaction with a key/zone, such as tapping on a key, in addition to relating said interaction to an ambiguous input signal, the system may also relate said interaction to a precise character, preferably the character with which the user interacts (e.g. taps on).

As such, when the user provides the input information corresponding to a word, the system may consider/propose two types of corresponding words. A first type may include one or more words corresponding to ambiguous input signals and the second type may include one or more words that include one, more, or all of the precisely identified characters considered by system. Note that in some cases, the precisely identified characters may comprise all of the characters of a word. As an example, the table immediately below shows the words corresponding to interacting with the keys 467002, 467001, and the zone 467007. If the user types anywhere on said keys and the broadly ambiguous zone, the system may propose one or more words of the first type such as the words "eat", "fat", "hat" (herein may be referred to as ambiguous words), and "gay". Additionally, if the user precisely taps on the letter F, then taps on the letter A, and finally taps on the zone 467007, the system may also propose the word "fat". Similarly, for interacting with the letter H instead of the letter F, the same may apply to the word "hat". By using this method the user may enter a desired word from a number of ambiguous words.

According to on method, the system proposes a (e.g. one or more) word of a second type only if said word, only if said word contains a (e.g. one or more) criterion such as having at least a predefined minimum frequency of use/occurrence. Said frequency of use/occurrence may be predefined number or a dynamically defined number, such as the relationship of frequency of said word and the frequency of an ambiguous word(s) wherein both types of words correspond to a same sequence of input signal(s). Note that in some cases, said second type of word may even become the current predicted word so that a predefined interaction such as tapping on the Space key may enter said word. According to one method, if the user select second type of word, the system may propose other words (e.g. having the same number of characters) corresponding to the input information provided by the user and corresponding to said second type of word.

According to one method, all of the characters/letters displayed on a key may be entered precisely by providing an interaction such as the tapping action on them. According to another method, when the user provides an interaction with a character displayed on a key to enter it precisely, the system may also consider a related (e.g. non-preferred) character/letter or one or more characters near said character, and based on these characters and additional input information provided during the entry of a word, the system may propose one or more corresponding words.

FIG. 28 shows a one line/row (e.g. linear) alphabetically ordered keypad. Several methods of entering text using this keyboard may be considered.

According to a first method, interacting with a zone corresponding to a character (e.g. where the zone does not necessarily have to be over said character) may ambiguously correspond to said character and a number of characters near said character.

According to a second method, interacting with a zone corresponding to a preferred character (e.g. shown in large font) (e.g. where the zone does not necessarily have to be over said character) may ambiguously correspond to said character and a number of preferred characters near said character.

According to a third method, interacting with a zone corresponding to a (e.g. preferably preferred) character (e.g. shown in large font) (e.g. where the zone does not necessarily have to be over said character) may ambiguously correspond to said character.

In the methods just described above, a tapping action on a broadly ambiguous zone 470207 preferably may either correspond to any of the characters (e.g. letters/symbols) of the corresponding alphabet or to the non-preferred characters.

In the example of FIG. 28, a predefined action such as a tapping action on a preferred character may enter said character precisely and a gliding action, as described in FIG. 25A, may correspond to entering a non-preferred character precisely. For example, the gliding action 470212 provided from the letter E to the letter F, may correspond to precisely entering the letter F. Similarly, providing the gliding action 470211 may correspond to entering the character G. Also, as an example, providing any of the gliding actions 470213 or 470214 may correspond to precisely entering the character X. According to another method, a gliding action provided from a (e.g. preferred) character, may correspond to precisely entering another (e.g. preferred) character. Note that, in FIG. 28, the broadly ambiguous zone 470207 is, as an example, preferably located between the Backspace key 470205 and the Space key 470206.

Note that each of a group of characters of such a keypad may have a common zone from which providing an interaction, such as a long gliding action, may correspond to precisely entering a symbol such as a function or special character. FIG. 27B shows, as an example, the letters of the keypad 470000 of FIG. 28, may be divided into four zones wherein each zone may also correspond to a different group of special characters as shown and described before and throughout this application.

FIG. 27A shows another type of linear keypad having alphabetic order. In this example only the preferred characters are displayed and the rest of the characters are assigned to the broadly ambiguous zone 469107. As described before, interacting with a zone relating to a character, may correspond to either said character or to said characters and the characters near said character, depending on the method used as described above. FIG. 27B shows said keypad wherein the preferred characters are grouped in four different zones 469101 to 469104, wherein each zone also corresponds to a different group of symbols such as special characters.

Note that in the embodiments described throughout this application, according to one method, the broadly ambiguous zone may correspond to all of the letters of the corresponding alphabet. As an example, in embodiment corresponding to FIG. 27A or FIG. 25A, a user may provide the interaction corresponding to a partial number of (e.g. preferably preferred) characters corresponding to a desired word and, for the rest of the characters (e.g. preferred and/or non-preferred) of the desired word, the user may interact with (e.g. tap on) the broadly ambiguous zone. This matter has already been described in detail by this inventor.

In the embodiments described throughout this application, instead of using tapping actions corresponding to a sequence of (e.g. ambiguous and/or precise) characters, a gliding action interaction representing said sequence of characters my be used. To enter a word, according to one method a mixture of (e.g. one or more) such a gliding action and (e.g. one or more) other interactions such as tapping interactions may be used. These matters have already been described in detail before by this inventor.

Note that in any of the embodiment throughout this application, any other letter arrangement may be considered by people skilled in the art to be used with the principles of data entry as described. For example, said letter arrangement may (e.g. partially or fully) resemble a qwerty arrangement.

According to one method, the current predicted word may be a word having the highest priority corresponding to the input information provided by the user, even if said input information corresponds to the portion of said word such as its beginning portion.

Figure 29A:
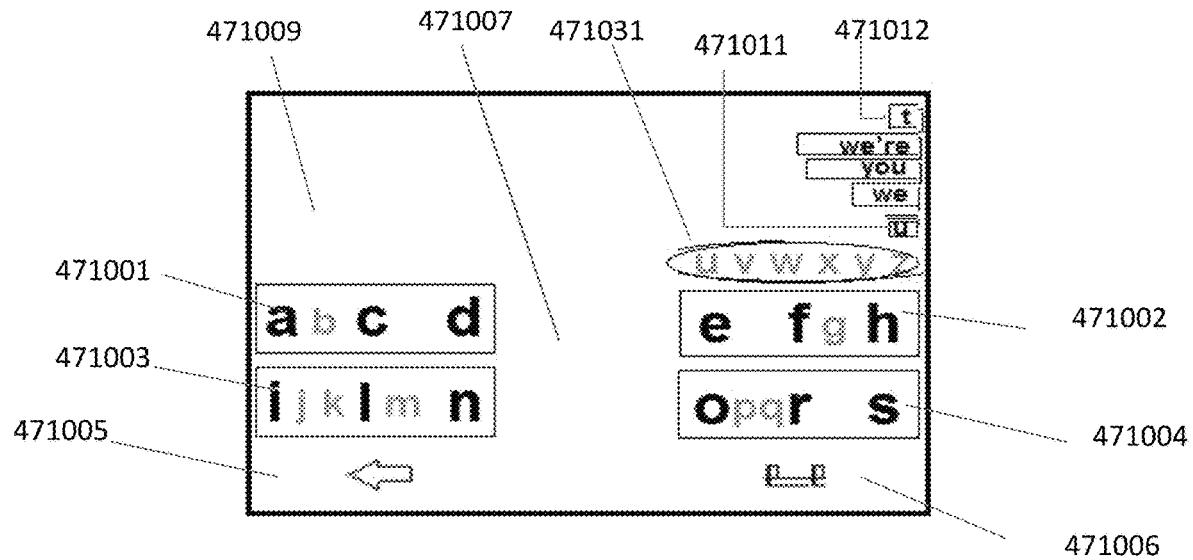
FIG. 29A-29B shows an example of a keypad having a broadly ambiguous zone.

With continuous description of the preferred scenario, as presented in FIG. 25A, according to one method, as shown in FIG. 29A when a user interacts with (e.g. taps on) the broadly ambiguous zone 471007, in addition to ambiguously relating said interaction to any character of a group of characters assigned to said zone (e.g. T, U, V, W, X, Y, Z, and preferably some special characters), the system may also relate said interaction to a predefined identified character (e.g. the character 'T') precisely, such as preferably based on the frequency of said groups of character.

With continuous description of the current embodiment, the letters assigned to a key may be presented to a user in two manners; a first group may be displayed in a first manner (e.g. a color, font, size, weight, etc.) and the rest of the characters of said key may be presented in a second manners (e.g. another color, font, style, size, weight, etc.). As such, according to one method, when a user interacts (e.g. taps on) with the a key, in addition to ambiguously relating said interaction to any character of a group of characters assigned to said key, the system may also relate said interaction to an identified character displayed in said first manner on/near which the user provides said interaction on said key. Said character may be presented in a word list. According to one method, preferably upon an/said interaction with a key, the system may present the characters displayed in the second manner on a location (e.g. preferably under/near the word list (e.g. on the screen)). If the user interacts with one of said characters, the system may replace said identified character. Note that selecting an identified character as such preferably resembles a similar procedure (as described before, in detail) to replace an identified (e.g. preferred) character by another identified (e.g. non-preferred) character. According to one method, same procedure may be applied to entering any character of the groups of (e.g. non-preferred) characters assigned to the broadly ambiguous zone of FIG. 25A. For example, as shown in FIG. 29A, when a user interacts with the zone 471007 the system may ambiguously relate said interaction to a character of the group of (e.g. non-preferred) characters (e.g. T, U, V, W, X, Y, Z) assigned to the broadly ambiguous zone and display it in a word list (e.g. the letter 'u' 471011). Additionally, the system may relate said interaction to a predefined identified character (e.g. 'T' 471012) of said group of characters. In addition to said characters, the system may also propose additional corresponding (e.g. longer) words from the word database used by the system. As such, by providing a sequence of such interactions, in addition to predicting words corresponding to said sequence of interactions, the system may also present a word wherein all of its characters are identified characters. According to a preferred method, all of said words are presented in a same word list. Note that in this embodiment, all of the characters assigned to a key are preferably considered by the system as preferred characters (e.g. irrespective of the manner of display). As an example, the characters I, K, L, M, N assigned to the key 4671003 are all considered as preferred characters wherein some of the characters I, L, N are displayed in a first manner (e.g. large black font), while the other characters J, K, M are displayed in a second manner (e.g. small grey font). As an example, the user can enter any of the characters I, L, N (e.g. L) precisely by tapping on it. When such tapping action is provided, the system may also provide the characters displayed in the second manner J, K, M in a location on the screen. If the user taps on any (e.g. M) one of said characters displayed in said location, the system may preferably replace the entered character (e.g. L) by said character (e.g. M).

Figure 29B:
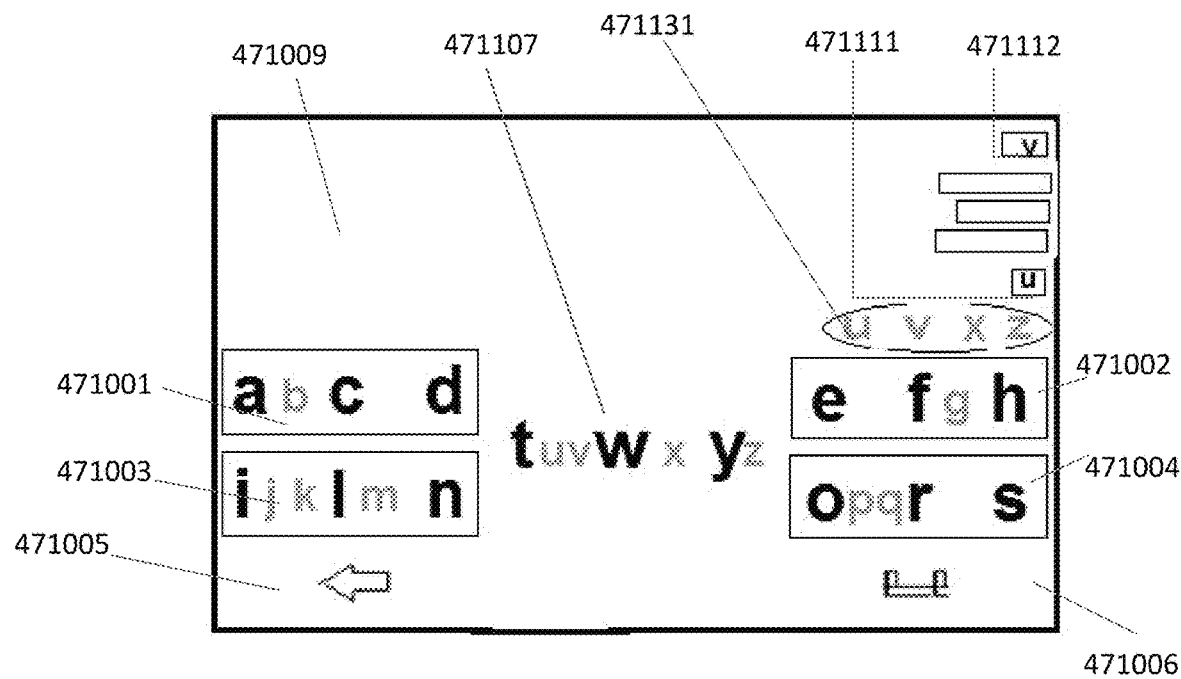

Note that according to one embodiment the characters assigned to the broadly ambiguous zone may also be display in said zone. FIG. 29B shows, as an example, the keypad of the invention having four keys and a broadly ambiguous zone wherein the characters are respectively arranged in alphabetic manner on the four keys and in the broadly ambiguous zone. According to one embodiment, the principles of entering precise/identified characters of a key may also apply to the characters assigned to the broadly ambiguous zone. As an example, as shown in FIG. 29B, the characters T, U, V, X, Y, Z assigned to the zone 471107 are displayed in two different manners as described before. As such, as an example, in addition to ambiguously relating an interaction such as a tapping action on the broadly ambiguous zone 471107, the system may also relate said interaction to an identified character (e.g. one of the characters T, W, and Y) as described above. Upon said interaction, the system may also display, for example in a zone 471131 (e.g. near the word list), the characters (e.g. U, V, X, Z) displayed in the second manner on the broadly ambiguous zone 471107 so that the user can enter any of said characters precisely as described above for the keys.

Note that a group of characters assigned to a key of the keypad may include letters and/or special characters.

According to another embodiment, preferably, in the fully ambiguous mode, all of the characters (e.g. letters) assigned to a key and/or to the broadly ambiguous zone(s), may preferably be displayed on said key(s)/zone(s) in a same manner (e.g. color, font, style, etc.). As such when a user interacts with (e.g. taps on) a key and/or a broadly ambiguous zone, in addition to ambiguously relating said interaction to any character of a group of characters (e.g. letters and/or special characters) assigned to said key/zone (e.g. herein may be referred to as an ambiguous input signal and/or ambiguous interaction), the system may also relate said interaction to a predefined identified character on/near which the user provides said interaction on said key (e.g. herein may be referred to as a precise input signal and/or precise interaction). Said character may be presented in a word list. When a user enters input information, by providing a sequence of such interactions the system may present two types of words to the user. A first type of one or more words by relating said key/zone interactions to ambiguous input signals, and a second type of one or more words (e.g. the length of one of the words corresponds to the number of key and/or zone interactions, and the additional words may be longer words, for example wherein their beginning characters correspond to said key/zone interactions) by relating said key interactions to precise input signals. Note that, according to one method, the input information provided by the user may be a mixture of ambiguous and precise input signals as described throughout this and other patent applications filed by this inventor. As an example, if the user uses another method (e.g. such as a gliding action) for entering a precise character, the system may predict one or more words by considering said precise character and relating the rest of the key and/or zone interactions provided by the user to ambiguous signal(s).

Figure 30A:
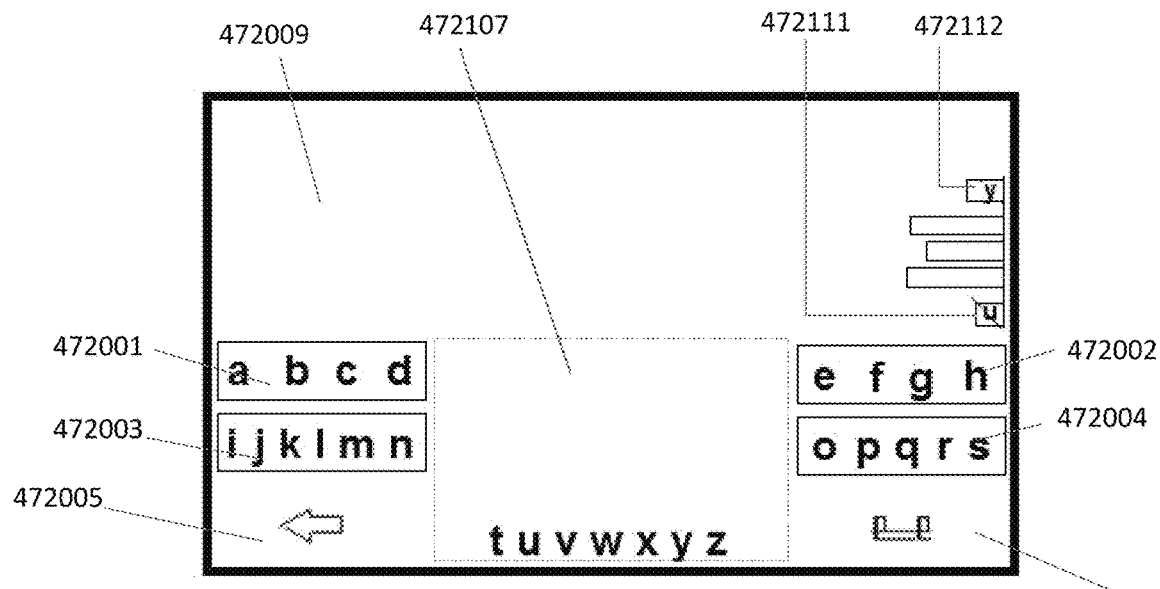
FIG. 30A shows an example of an enlarged keypad of the invention.

FIG. 30A shows an exemplary keypad of the vowels 'A', 'E', 'I', 'O', and 'U' to a separate key/zone while keeping an alphabetic order on the keypad, and preferably also separating the letters S and T (e.g. by assigning the letter T to the broadly ambiguous zone) a familiar and highly accurate word prediction system is provided. Note that by locating two pairs of letter keys on opposite sides (e.g. of the screen) of a device and locating two letters keys only under a user's thumb, the user's thumb has only two positions (e.g. up-down, or left-right, depending on the keys being respectively positioned in vertically or horizontally) during entering a word and the rest of the letters being preferably between said zone, any user is enabled to type blindly and quickly form the beginning.

Figure 30B:
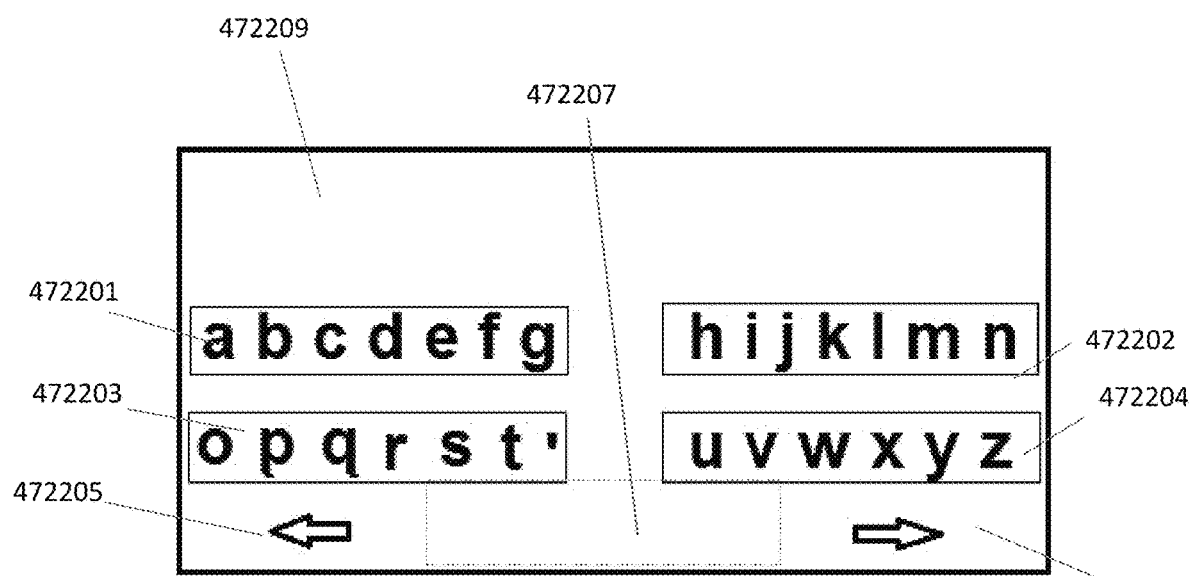
FIG. 30B shows examples of alphabetical keypads having four keys.

As an example, FIG. 30B shows a keypad of the invention having four letter keys 472201-472204. In this example, according to one method, the principles of text entry similar to those described above and shown through FIG. 30A may be considered.

In the embodiments above, in addition to the letters, a group of (e.g. ambiguously) characters assigned to a key may also include one or more symbols such as special characters. As show in FIG. 30B, as an example, the key 472203 includes an apostrophe that may be included in some of the words of the database used by the system.

In some of the embodiments (e.g. in the embodiments above) or all of the embodiments of the invention, a broadly ambiguous zone (e.g. the zone, 472207 of FIG. 30B) may represent some or all of the characters assigned to the keys or all of the characters/letters of a language (e.g. even if the keys (e.g. the four letter keys) of the keypad together represent all of the characters/letters of a language). According to one method, at any moment during the entry of a word, the user may interact with (e.g. tap on) the broadly ambiguous zone for a character/letter of his desired word. As such, when the user provides a sequence of interactions including interactions with the letter keys and/or the broadly ambiguous zone, the system predicts one or more word corresponding to said interactions. This matter has already been described in detail before in this and in the previous patent applications filed by this inventor.

Note that according to one embodiment, the characters/letters assigned to the broadly ambiguous zone may be displayed on said zone or anywhere on the screen. Note that, according to one embodiment, the boarders of the broadly ambiguous zone may be or not be displayed on the screen. In the example FIG. 25A, the broadly ambiguous zone 467007 is the zone preferably between the letter keys and the space and backspace keys. In this example, the borders of the broadly ambiguous zone are not displayed.

Note that selecting an identified character as such preferably resembles a similar procedure (as described before, in detail) to replace an identified (e.g. preferred) character by another identified (e.g. non-preferred) character. According to one method, same procedure may be applied to entering any character of the groups of (e.g. non-preferred) characters assigned to the broadly ambiguous zone of FIG. 25A. For example, as shown in FIG. 29A, when a user interacts with the zone 471007 the system may ambiguously relate said interaction to a character of the group of (e.g. non-preferred) characters (e.g. T, U, V, W, X, Y, Z) assigned to the broadly ambiguous zone and display it in a word list (e.g. the letter 'u' 471011). Additionally, the system may relate said interaction to a predefined identified character (e.g. 'T' 471012) of said group of characters. In addition to said characters, the system may also propose additional corresponding (e.g. longer) words from the word database used by the system. As such, by providing a sequence of such interactions, in addition to predicting words corresponding to said sequence of interactions, the system may also present a word wherein all of its characters are identified characters. According to a preferred method, all of said words are presented in a same word list. Note that in this embodiment, all of the characters assigned to a key are preferably considered by the system as preferred characters (e.g. irrespective of the manner of display). As an example, the characters I, K, L, M, N assigned to the key 4671003 are all considered as preferred characters wherein some of the characters I, L, N are displayed in a first manner (e.g. large black font), while the other characters J, K, M are displayed in a second manner (e.g. small grey font). As an example, the user can enter any of the characters I, L, N (e.g. L) precisely by tapping on it. When such tapping action is provided, the system may also provide the characters displayed in the second manner J, K, M in a location on the screen. If the user taps on any (e.g. M) one of said characters displayed in said location, the system may preferably replace the entered character (e.g. L) by said character (e.g. M).

Note that according to one embodiment the characters assigned to the broadly ambiguous zone may also be display in said zone. FIG. 29B shows, as an example, the keypad of the invention having four keys and a broadly ambiguous zone wherein the characters are respectively arranged in alphabetic manner on the four keys and in the broadly ambiguous zone. According to one embodiment, the principles of entering precise/identified characters of a key may also apply to the characters assigned to the broadly ambiguous zone. As an example, as shown in FIG. 29B, the characters T, U, V, X, Y, Z assigned to the zone 471107 are displayed in two different manners as described before. As such, as an example, in addition to ambiguously relating an interaction such as a tapping action on the broadly ambiguous zone 471107, the system may also relate said interaction to an identified character (e.g. one of the characters T, W, and Y) as described above. Upon said interaction, the system may also display, for example in a zone 471131 (e.g. near the word list), the characters (e.g. U, V, X, Z) displayed in the second manner on the broadly ambiguous zone 471107 so that the user can enter any of said characters precisely as described above for the keys.

Note that a group of characters assigned to a key of the keypad may include letters and/or special characters.

Note that according to one method, each group of several characters may be assigned to a separate zone which is preferably also assigned to a different groups of special characters, as described throughout this application. For example, in FIG. 25B, providing gliding action on/from, respectively, the zones, 467101-467104, may correspond to entering special characters from four different groups of characters as described throughout this application, and providing gliding action on/from the zone 467105 may correspond to entering mouse functions as described before.

Also for example, in FIG. 25C, providing gliding action on/from, respectively, the zones, 467201-467204, may correspond to entering special characters from four different groups of characters as described throughout this application.

According to one method, (e.g. in alphabetical order) the characters assigned to the zones/keys and the broadly ambiguous zone may begin with a vowel.

Note that switching between the reduced (e.g. ambiguous) keypad and the (e.g. precise) enlarged keypad or vice versa may be achieved by providing a gliding action on a/any zone/key of the keypad.

Note that, according to a preferred type of arrangement, the main character related to a secondary character may not necessarily have a high frequency of use.

Figure 32:
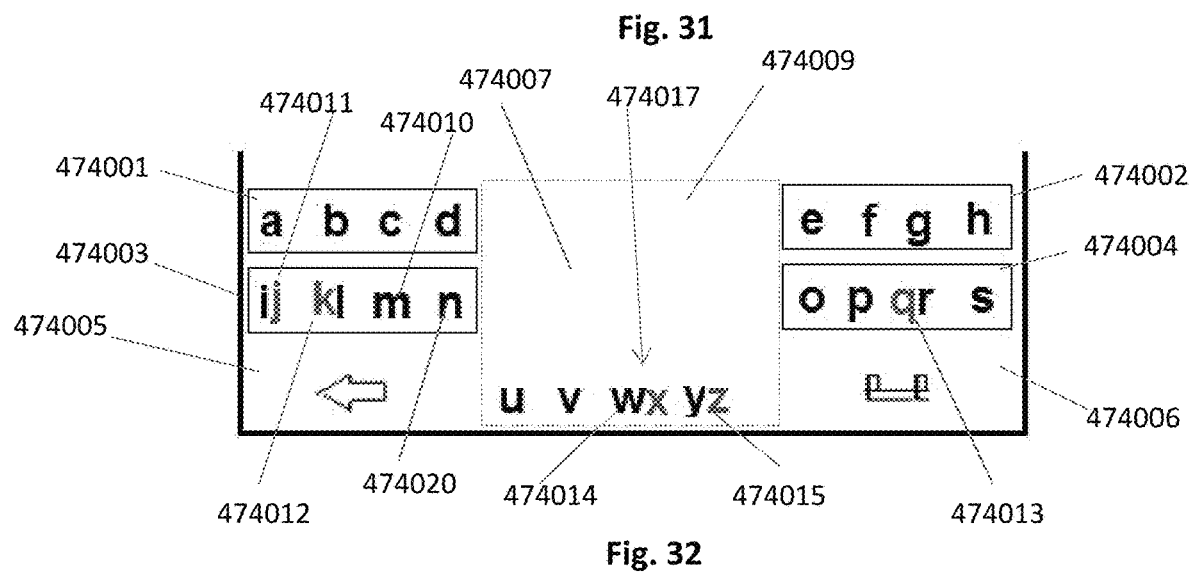
FIG. 32 shows an example of a keypad.

Regarding the broadly ambiguous zone, different scenarios of presentation and/or interaction for input may be considered such as:

Scenario 1: the broadly ambiguous zone may be a single (e.g. additional) key/zone (e.g. having several subzones) resembling to any of the letter keys such keys 474001 to 474004 of FIG. 32.

Scenario 2: the broadly ambiguous zone may be a separate/additional zone relating to any of the keys of the keypad (e.g. including the (e.g. additional) key/zone of scenario 1).

Scenario 3 (preferred): the broadly ambiguous zone (e.g. 474007) may be a large zone that also includes the subzones (e.g. 474017) of scenario 1. In this case, according to a preferred method, tapping anywhere on the broadly ambiguous zone (e.g. including tapping on the subzones 474017) may preferably correspond to, both, an ambiguous and a corresponding precise input signal (e.g. corresponding to an identified letter/character). According to a first method, one of the letters/characters (e.g. T) assigned to the broadly ambiguous zone may be entered precisely by default when the user interacts with (e.g. taps on) a location outside the subzones (e.g. 474017) in the broadly ambiguous zone (e.g. 474007). In this case, said letter (e.g. T) may preferably not be printed anywhere in the broadly ambiguous zone (e.g. including in its included subzones) as shown in FIG. 32.

According to another method, such default letter/characters is not considered when the user interacts outside the subzones in the broadly ambiguous zone. In this case, such letter (e.g. T) may preferably be assigned/printed to/on one of the corresponding subzones.

It must be noted that, at any moment the user may be allowed to hide the letters/subzones assigned to the broadly ambiguous zone. As such, preferably, the icons and/or borders relating to the space and backspace keys may also be hidden, so that to reduce the visible portion of the keypad. Also, the user may be allowed to reduce the size of the letter keys. In this case, according to one method, interacting with a key/zone may correspond to an ambiguous input signal assigned to said key, and to enter precise character, the user may use other methods (e.g. providing gliding actions in different direction on/from said key, each corresponding to a different letter/character assigned to said key) as described throughout this and the previous patent application filed by this inventor. Note that according to one method, the user may be enabled to make the letter keys invisible or just shoe the borders of them.

Figure 33:
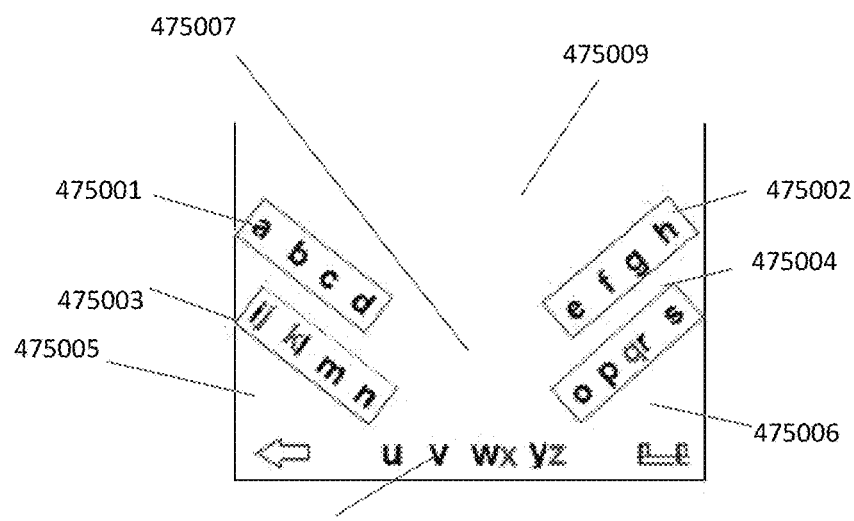
FIG. 33 shows as an example of a keypad where letter keys are disposed diagonally.
Figure 34:
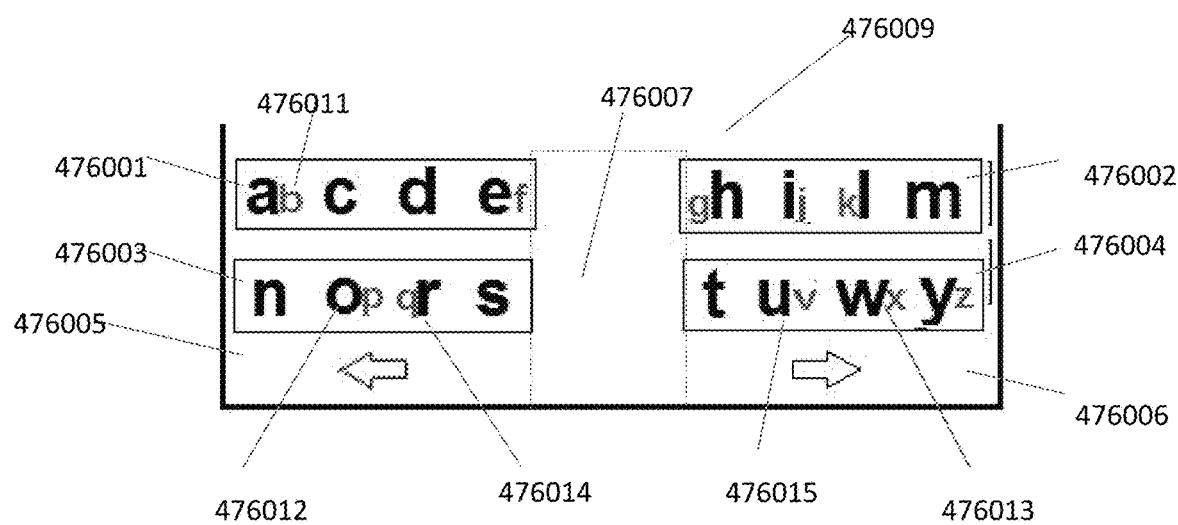
FIG. 34 shows an example of a keypad where the preferred and non-preferred characters are displayed in different colors.

Note that, when the system identifies an entered character as a precise character, the system preferably proposes/predicts words that include said identified character in the corresponding character position within the words Note that the keys of the keypad may have any arrangement. FIG. 33, shows as an example, a keypad of the invention wherein its letter keys 475001 to 475004 are disposed diagonally so that the precise letter can be entered easier. The FIG. also shows the broadly ambiguous zone 475007 which in this case is located between keys that includes a large zone wherein a portion of the zone is occupied by the sub-zones as described above, Different keypads corresponding to the semi-predictive mode of the invention have been described and shown before. According to one embodiment, each of the keys of such keypad may have a number of zones such as four subzones. FIG. 34 shows an exemplary such keypad. In this example, the preferred characters on each key are shown in black font and the none-preferred characters are printed in red. Note that as described before in detail, in the semi-precise mode, for the preferred characters the user may interact such as tap on said characters or on a zone relating to said characters, and for the none-preferred characters the user may preferably interacts with the broadly ambiguous zone (e.g. 476007). By receiving a sequence of one or more such interactions the system may predict one or more words. This and the relating matters have already been described in detail before.

Figure 35A:
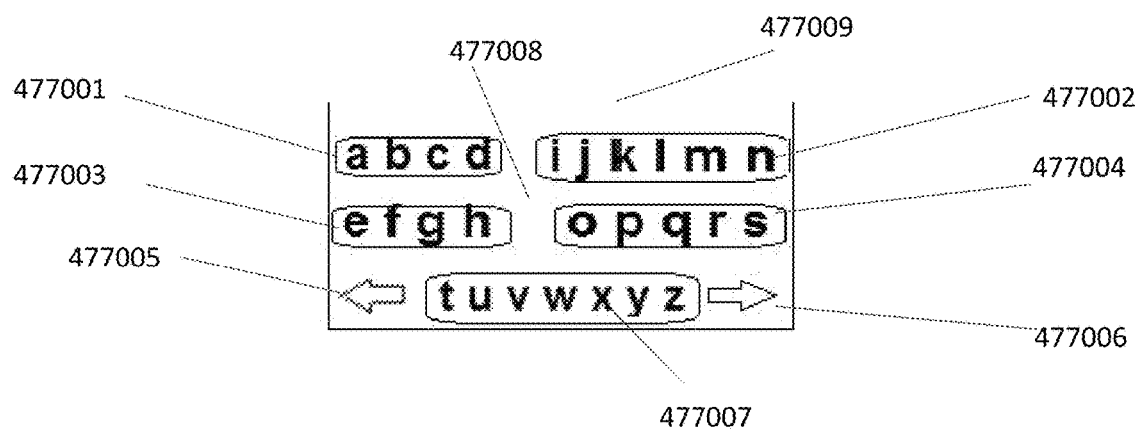
FIGS. 35A-35G show examples of a keypad for various embodiments of the invention.

A keypad of the invention used by the semi-predictive mode of the invention may have any type of key and/or letter arrangements. Note that a key can be a zone on a touch sensitive surface such as a touch screen FIG. 35A shown another example of the keypad of the invention on the screen 474009 of an electronic device. In this example, the letters are arranged in alphabetical order on four keys 477001-477004, and the broadly ambiguous zone 474007 (e.g. in this example, may be considered as a key).

The fully ambiguous mode of the invention has already been described in detail. The above keypad may preferably be used with the fully ambiguous version of the invention. In this example, The letters A to D are assigned to the key 477001, the letters E to H are assigned to the key 474003, the letters I to N are assigned to the key 477003, the letters O to S are assigned to the key 477004, and the letters T to Z are assigned to the zone/key 477007. As described before, when a user interacts with a key/zone, the system may preferably (e.g. simultaneously) relate said interaction to two types of interaction: ambiguous interaction and precise interaction. To enter precisely a character/letter, the user may use precise interaction as described earlier. As described and shown before, a key/zone of the keypad may include several sub-zones (e.g. herein may be referred to as subzone) such that interacting with a subzone may enter precisely the character/letter assigned to said sub-zone. According to a preferred method, as shown in this example, any of the keys/zone(s) of the keypad may preferably include a sub-zone corresponding to a different single letter (e.g. and or any special character (e.g. ambiguously assigned to said key). As such different keys of the keypad may have different numbers of subzones and therefore their size may vary. For example, the key 477001 has four subzones each relating to a different single letter of the group of letters assigned to said key. As such, the key 477002 has six subzones, the key 477003 has four subzones, the key 477004 has five subzones, and the broadly ambiguous zone/key 477007 has preferably seven subzones. In this embodiment, interacting with a subzone may preferably provide an ambiguous input signal corresponding to any of the letters assigned to said key, and a precise input signal corresponding to an identified character assigned to said sub-zone. As such at any moment, the user may be able to enter both predictive and/or precise input information (e.g. the user may enter a word ambiguously by tapping anywhere on the keys and/or zone, or enter a chain of characters letter by letter precisely. Note that in this example, the characters/letters A-H are assigned to the left keys, and the characters/letters I to N are assigned to the right keys. This is beneficial especially in devices such as tablets because the user can faster remember and/or scan the alphabetically ordered letters.

Figure 35B:
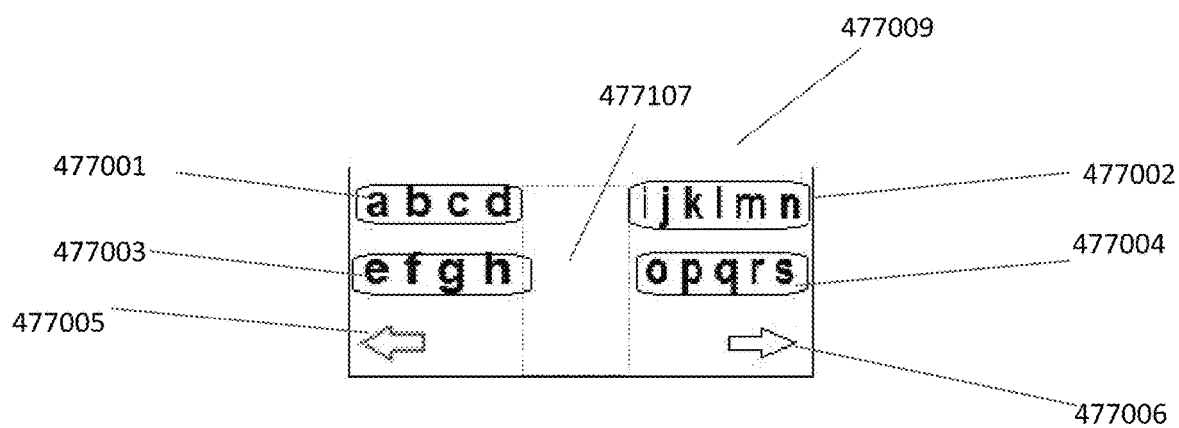

According to one embodiment, the system may have a switching method so that to reduce the size of the/a keypad for example such as the keypad of FIG. 35A. As such, as shown in FIG. 35B, after switching the keypad to such a mode. In this example, the size of the keys 477001 to 477004 are reduced, and the key/zone 477007 is replaced by the broadly ambiguous zone 477107. Now, interacting anywhere on the zone 477107 is preferably ambiguously related to any of the letters T to Z. according to one method, in this example, the number of subzones may be reduced such that to correspond to the main letters/characters, and the secondary characters may be entered as described before or in any other manner known by people skilled in the art.

According to one method, the size of the keypad/keyboard may be reduced into several predefined reduced sizes, for example, depending on the user's desire/needs. As such, after switching the keypad to one of the predefined sizes, the number of the subzones on a key may be reduced accordingly. In this case, each of the subzones may correspond to an identified predefined main character on the corresponding key in a corresponding reduced size keypad. The secondary characters may preferably be shown in a different manner relating to the main character on the keys/zone(s) or they may not be shown.

Figure 35C:
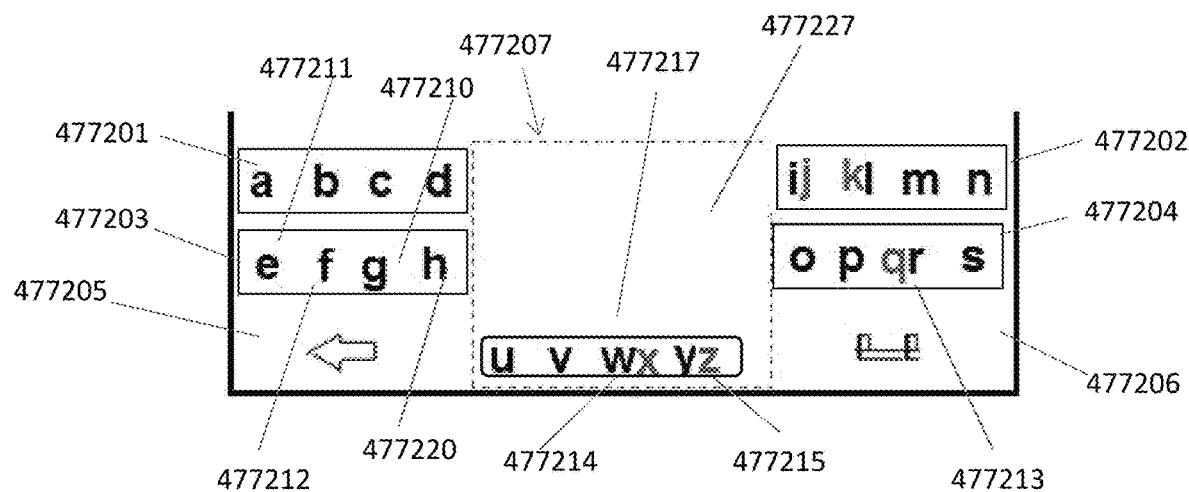

As an example, FIG. 35C shows the (e.g. large size/mode) keypad of FIG. 35A in a first reduced size (e.g. middle size/mode). In this example, each of the keys/zones of the keypad includes four subzones. Each of the subzones preferably represents a single identified character which in this example is printed in black. The secondary characters are printed in another color (e.g. red, gray).

Figure 35D:
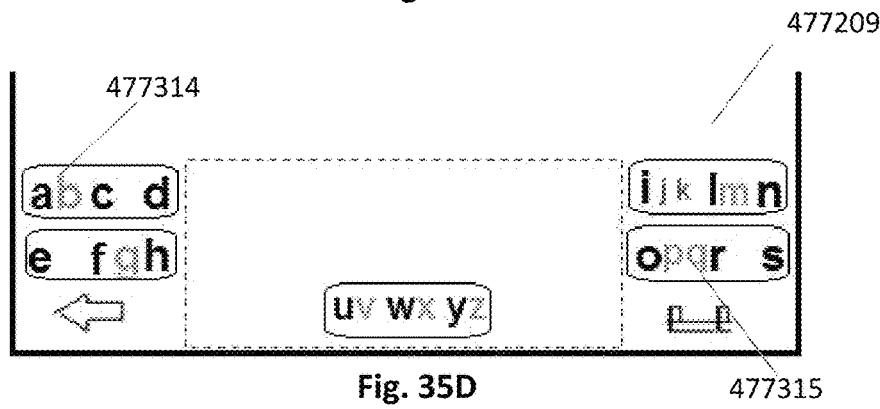

Also as an example, FIG. 35D shows the (e.g. large size) keypad of FIG. 35A in a second reduced size (e.g. middle) size/mode. In this example, each of the keys/zoned of the keypad include three subzones. Each of the subzones represents a single identified character which in this example is printed in black. The secondary characters are printed in color (e.g. red/gray).

According to one method, the subzones of a key/zone may not be equal in size or form. As an example, in FIG. 35C the broadly ambiguous zone 477207 includes four subzones 477217 related to the main characters UVWY which in this example are printed in black, and a large subzone 477227 (e.g. outside the subzones 477217 within the zone 477207) corresponding to an identified character which in this example is the letter T which preferably is not printed in said subzone. Note that as mentioned before, interacting with any of said subzones may correspond to, both, the corresponding identified character and to a corresponding ambiguous input signal. Note that, the borders of the subzones may or may not be shown/printed.

According to one embodiment of the invention, preferably in the fully ambiguous mode, when the user taps on a letter key and or the/a broadly ambiguous zone, in addition to relating said tapping action to an ambiguous character, the system may relate said tapping action to a predefined identified character (e.g. a vowel/consonant, a blank character, a visible character representing a blank character, etc.). According to one method, each key may have a different default character, while according to another method, all of the keys/zone may have a same default character. As such, when a user provides a sequence of one or more tapping action on the keys and/or the boadly ambiguous zone, one of the proposed words may preferably be constituted from the corresponding default characters (e.g. said word may herein be referred to as the default word). According to one method, if the user interacts with said/the default word, the system may preferably switch into the precise letter mode, wherein for each interaction with a key of the keyboard, the system may preferably replace the corresponding default character in the default word by the precise letter corresponding to the key of the precise keypad being interacted. By using this method, uncommon words and/or the words that are not included in the database of words used by the system may be entered character by character precisely. According to a preferred method, when the user interacts with a default word, the system may also propose more words (e.g. if any) corresponding to the input information provided by the user until then. Each additional interaction with the default word may result in proposing more corresponding words. Preferably, at least at first, the system proposes the corresponding words with the length of the default word, and preferably then, the system proposes the words that a (e.g. the beginning) portion of them corresponds to the input information provided by the user.

Figure 35E:
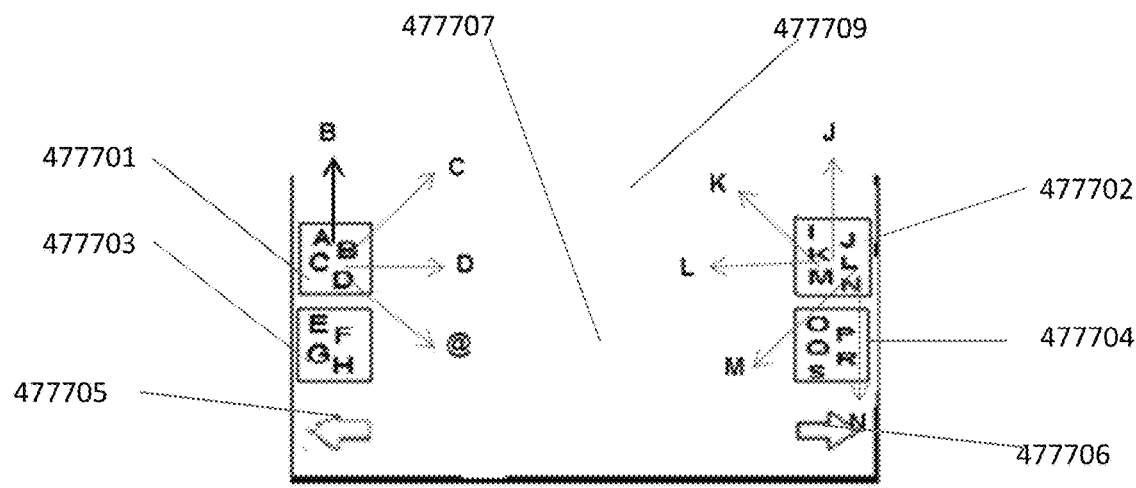
Figure 35F:
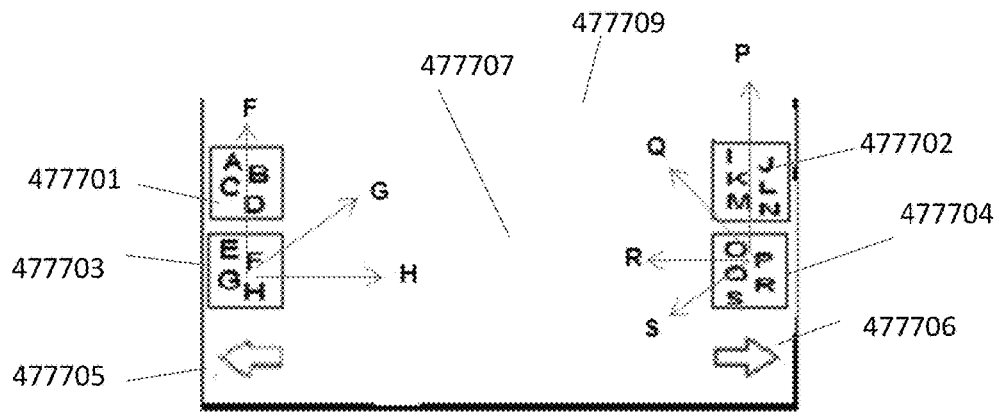
Figure 35G:
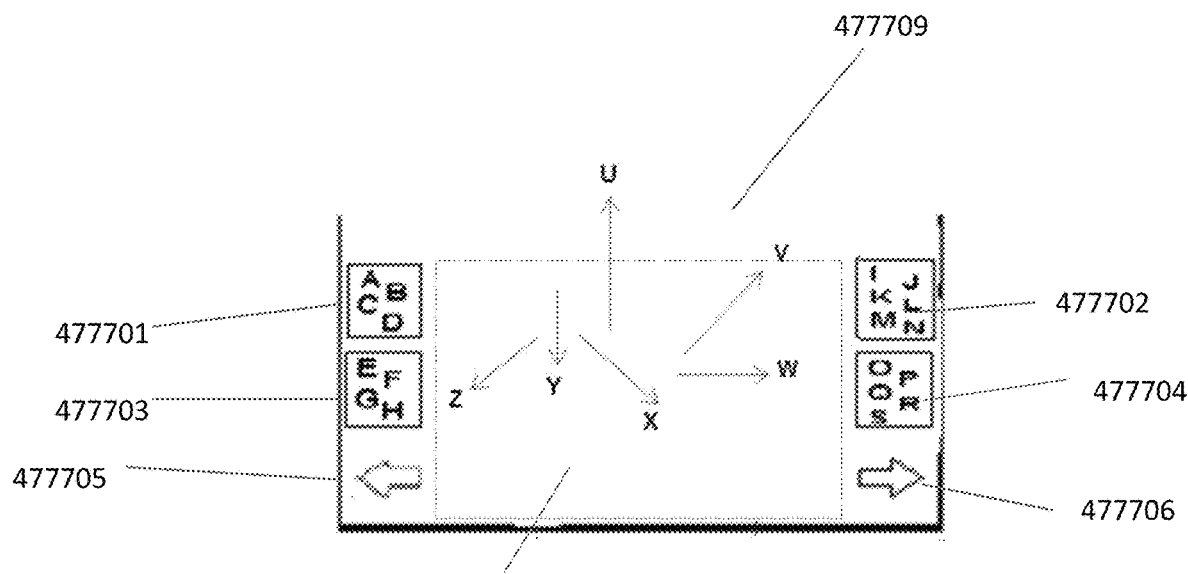

According to one embodiment of the invention, providing gestures from anywhere on a key in several predefined directions may provide corresponding several identified character (e.g. letters) ambiguously assigned to said key. Preferably the order of the gestures directions may correspond to alphabetical order of the corresponding identified characters/letters. As an example, FIGS. 35E to 35G show a keypad of the invention (e.g. similar to that of the FIG. 35B wherein the letters on the keys are printed such that to permit to have small keys) using an exemplary method of entering precise characters/letters (e.g. note that this method of entering precise characters/letters may be used in addition or in replacement to the methods of entering precise characters as described before such as through the FIGS. 35A to 35D. In this example, the default character of each key/zone may preferably be the first character of the corresponding ambiguous characters in alphabetical order (e.g. respectively, A, E, I, O, and T). The other characters of each key/zone may preferably be entered precisely according to their alphabetical order on the corresponding key, preferably according to gestures in corresponding predefined directions (e.g. clockwise order or opposite clockwise order).

For example, as shown in FIG. 35E, providing gliding actions on/from the key 477701 towards up, upper-right, and right, may respectively correspond to entering precisely the letters, B, C, and D, and providing gliding actions on/from the key 477702 towards up, upper-left, left, lower-left, and down, may respectively correspond to entering precisely the letters, J, K, L, M, and N.

Also, for example, as shown in FIG. 35F, providing gliding actions on/from the key 477703 towards up, upper-right, and right, may respectively correspond to entering precisely the letters, F, G, and H, and providing gliding actions on/from the key 477704 towards up, upper-left, left, and lower-left, may respectively correspond to entering precisely the letters, P, Q, R, and S.

Also, for example, as shown in FIG. 35G, providing gliding actions on/from the broadly ambiguous zone/key 477707 towards up, upper-right, right, lower-right, down, and lower-left, may respectively correspond to entering precisely the letters, U, V, W, X, Y, and Z.

Note that in this example, providing a tapping action on the keys/zones 477701, 477703, 477702, 477704, and 477707, are preferably correspond to respectively, the default letters A, E, I, O, and T.

Note that this is only as example to demonstrate the principles of entering intuitively/blindly precise character/letters. Other methods may be considered for the same purpose. For example, interacting such as a tapping action on a key may not correspond/provide a letter, but (e.g. a symbol representing) a blank character. In this case, according to one method, any (e.g. of some or all) of the characters (e.g. ambiguously) assigned to a key may be precisely entered by providing a gliding action towards a predefined direction. As an example, providing gliding actions on/from the key 477701 towards up, upper-right, right, and lower-right, may respectively correspond to entering precisely the letters, A, B, C, and D. Same rule may be applied to other keys/zones.

Note that in the embodiment above, the order (e.g. of gestures in different direction (e.g. such as up to eight different directions from a key) described for entering precise character is alphabetic. Other orders such as for example QWERTY order may be used. Note that according to principles described above, a user may enter a text blindly, both, in precise mode and in ambiguous mode.

According to one embodiment of the invention, as described throughout different patent applications filed by this inventor, gliding actions including a press-and-holding-action in different directions such as in up to eight directions as described above may be used for entering special characters assigned to a key. As described before in detail, each key may represent a group of characters having a common characteristic. For example, press-and-holding- and gliding actions in different predefined directions such as eight different directions on a key, may provide up to eight different special characters assigned to said key. A long pressing action on said key and removing the finger (e.g. without providing a gesture) may be related to entering another special character assigned to said key.

Note that, the keypads/keyboards shown in the patent applications such as this patent application filed by this inventor are shown as example to demonstrate the principles of the data entry system of the invention. Major or minor modifications may be considered. For example, in the examples of FIGS. 35A to 35D, rather than assigning the letter T to the/a broadly ambiguous zone (e.g. 477007 of FIG. 35A and/or 477107 of FIG. 35B), the letter T may be combined with/included in the group of character O to S, and be assigned to a corresponding key/zone (e.g. the key 477004 of FIG. 35A and/or the key 477004 of FIG. 35B).

According to one embodiment, the arrangement of letters on different keys may vary based on parameters such as the type of language used with the/a keyboard. For example, in English language, the letters O to T may be assigned to the key 477004 (e.g. although this may also cause a decrease of prediction accuracy because the letters S and T have both high frequency of use), and the letters U to Z may be assigned to the broadly ambiguous zone 477007 and/or 477107, while in French language the letters O to S may be assigned to the key 477004, and the letters T to Z may be assigned to the broadly ambiguous zone 477007 and/or 477107. This is because for example in English language the letters T and W are used often and according to one method it may be preferable to assign them to different/separate keys/zones, while in French language the letter W is not often used and therefore the letters W and T may be included in the/a same group and be assigned to a same key/zone.

According to a preferred method, in (e.g. substantially) all of the Roman based languages (e.g. English, French, Spanish, Italian), the arrangement/assignment of letters an/to the keyboard/keypad of the invention may be similar (e.g. the letters O to S are preferably assigned to the key 477004, and the letters T to Z are preferably assigned to the broadly ambiguous zone 477007 and/or 477017). This may provide an intuitive and easy method of text entry in several languages (e.g. simultaneously) because the user does not have to learn (e.g. two) different letters layouts.

According to one embodiment, the system may include an automatic method of resizing the keypad based on user's way of interaction, for example, either when he/she begins to type a text/data or in real time while entering text/data. For example, during typing a portion of a text such as a word, if the user taps several (e.g. consecutive) times on a same location on a key, then the system may assume that the user is entering a word ambiguously. In this case, the system may automatically reduce the size of the keypad. On the other hand, as an example, during typing a portion of a text such as a word, if the user taps several (e.g. consecutive) times on different locations on a key, then the system my assume that the user is entering a word precisely. In this case, the system may automatically expand the size of the keypad.

Figure 36A:
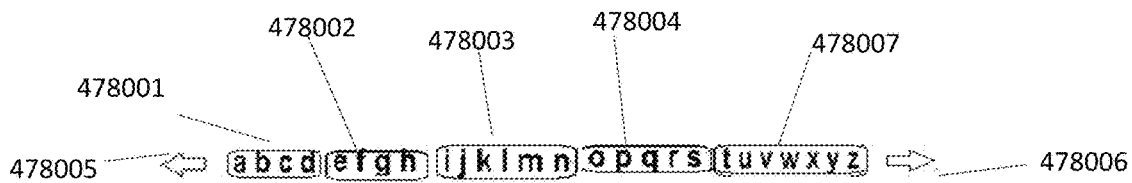
FIG. 36A-36D show examples of keyboards have one or two lines of keys.
Figure 36B:
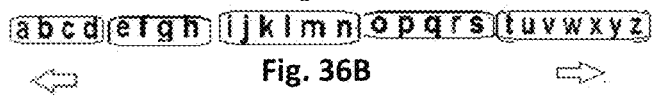
Figure 36C:
Figure 36D:
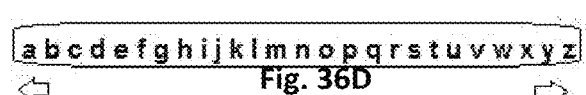

As mentioned before, based on the principles of data entry described by this inventor, many other configuration of letters on/and/or many other key/zone arrangements may be considered by people skilled in the art. As an example, keyboards constitute of or including one line or two line keys such as or substantially similar to those shown in FIG. 36A to 36C may be considered. In FIG. 36A, the space key 478006 and the backspace key 478005 of the invention are located in a same line than the letter keys 478001 to 478005. In FIG. 36B, the space and backspace key are located in a separate line relating to the line of letter keys, and in FIG. 36C, the key/zone 478007 and the space and backspace keys form a line separately from the line of keys 478001 to 478004. Keypad of FIG. 36D is similar to that of the 36B with the different that this keypad has a single character/letter zone 478101. Note that in these example(s), any of the lines of keys/zones may be horizontal and/or vertical, and/or diagonal, etc.

Figure 37A:
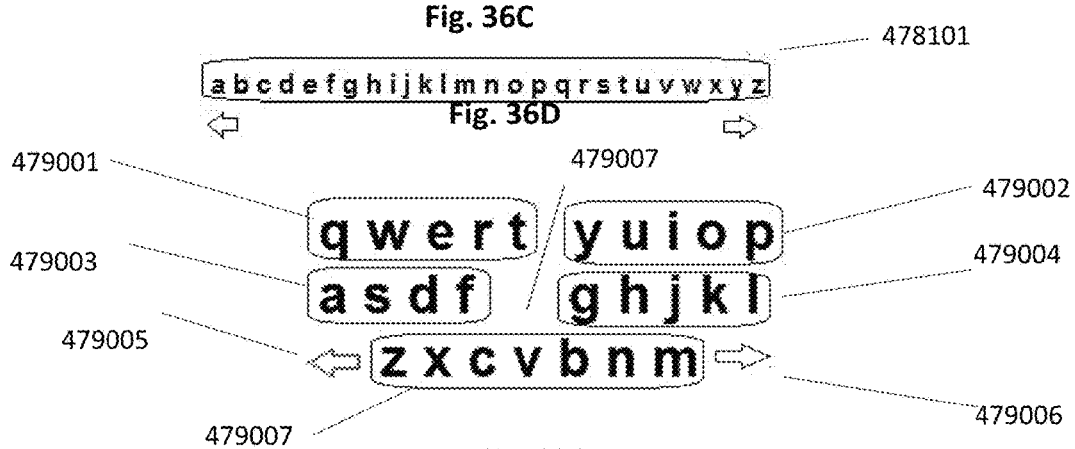
FIG. 37A-37D show examples of a keyboard having a QWERTY or QWERTY-like letter arrangement.
Figure 37B:
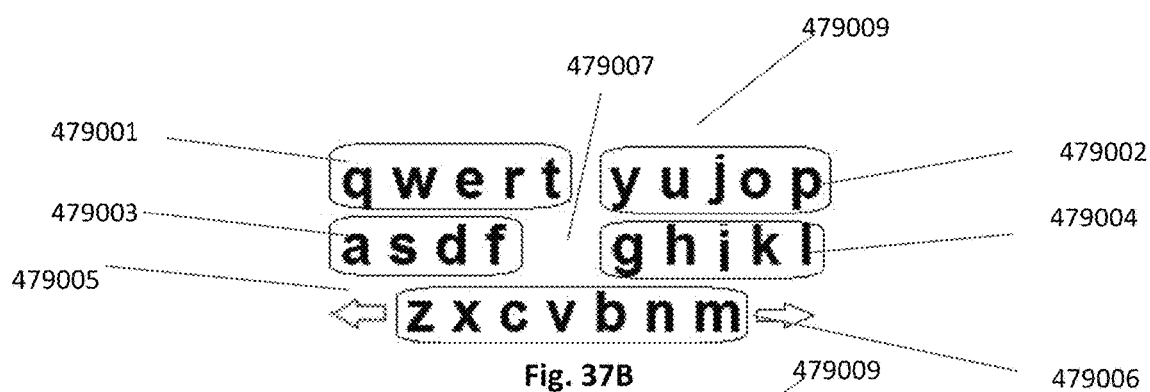

FIG. 37A, shows another example of a keyboard of the invention having a QWERTY letter arrangement. In this example, the first/top line of letters of a QWERTY keyboard are divided into two separate groups wherein each group is assigned to a separate key. In this example, the letters QWERT are assigned to the key 479001 and the letters YUIOP are assigned to the key 479002. Accordingly, the second/middle line of letters of a QWERTY keyboard are divided into two separate groups wherein each group is assigned to a separate key. In this example, the letters ASDF are assigned to the key 479003 and the letters GHJKL are assigned to the key 479004. Finally, the letters, ZXCVBNM are assigned to a/the broadly ambiguous zone/key 479007. Note that, this is an example, and therefore, major or minor modifications may be considered. For example, the letter G may be assigned to the key 479003 rather than being assigned to the key 479004. Also for example, as shown in FIG. 37B, (e.g. for better accuracy) the order of assignment of the letters J and I may be swapped such that to respectively corresponding keys 479002 and 479004. Note that the exemplary keypads of FIGS. 37A and 37B resemble to the keypad of FIG. 35A with a different letter arrangement.

In the current example, any of the keys/zones may also ambiguously (e.g. through a first type of interaction) and/or precisely (e.g. through a second type of interaction) represent a special character assigned to said key. Such special character(s) may be part of the group of letters assigned to said/corresponding key/zone.

According to one method, the special characters assigned to a key in the corresponding special character mode instance, may also ambiguously being assigned to a predefined interaction such as a predefined interaction with the corresponding key. According to one method, said special characters assigned to a key and the letters assigned to a preferably same key may constitute a single group of characters ambiguously assigned to a predefined interaction such as a tapping action on the corresponding key. As a first example, when the user provides a tapping action on the key 479002, said interaction may ambiguously correspond to any of the letters and special characters (e.g. in this example, digits 1-9) assigned to said key. As a second example, a tapping action on the key 479002 may ambiguously correspond to any of the letters assigned to said key, and a long pressing action on said key 479002 may ambiguously correspond to any of the digits 1-9 assigned to said key. It is understood that another type of first and/or second types of interactions may correspond to entering precisely any of the letters and/or special characters assigned to a key. These matters have already been described by this inventor.

Figure 37C:
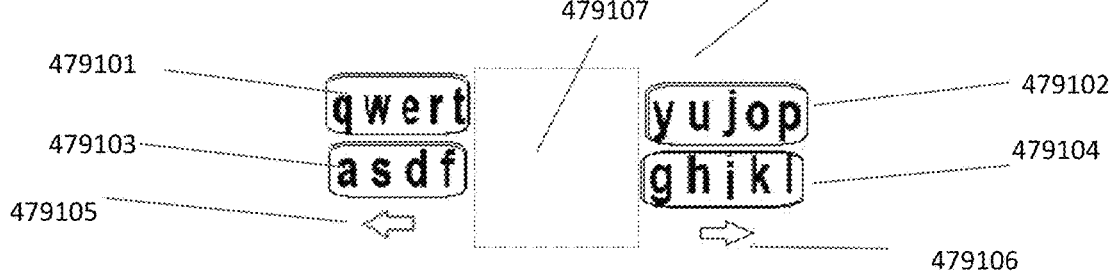

With continuous description of the current embodiment, FIG. 37B shows the keyboard of the FIG. 37C in another (e.g. reduced) mode resembling to the keypad of FIG. 35B.

Figure 37D:
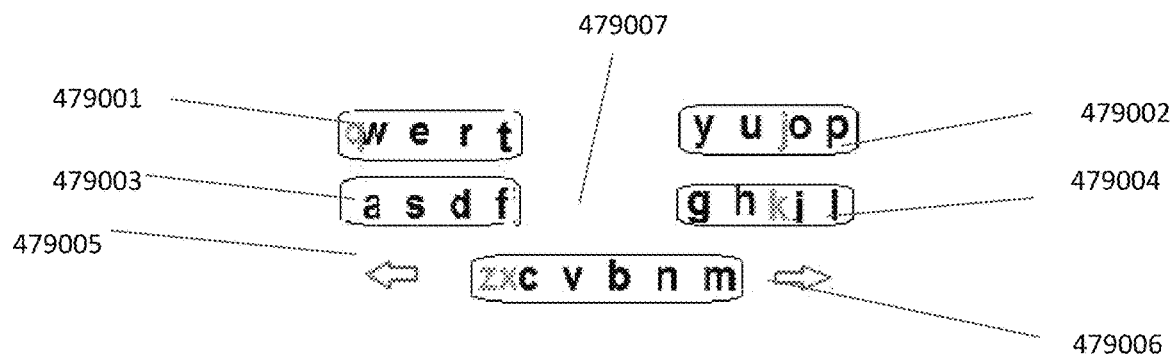

As mentioned, the exemplary keypads of FIGS. 37A to 37B, and the keypad of 37C of the current embodiment respectively resemble to the exemplary keypads of FIGS. 35A and 35B with a different letter arrangement, therefore preferably, the principles of data entry described in the embodiment relating to the exemplary keypads 35A to 35B may apply to the keypads of the current embodiment. As an example, FIG. 37D, shows the keypad of FIGS. 37A and B in a predefined reduced size including main and secondary characters as described before.

In the embodiments above described and shown through the exemplary keypads 35A, interacting with a predefined zone 477007 outside/between the keys may precisely correspond to entering an identified character such as the character T. This character may preferably be used (e.g. considered in the input information provided by a user to enter a word) by the semi-predictive, fully predictive, (e.g. and fully precise) modes of the data entry system of the invention to predict/present corresponding words.

As mentioned before, according to one method, after the user selects a word in the word list presented by the system, the system may propose one or more longer words. If the selected word was not the current predicted word, then said word selected word may preferably become the current predicted word. According to one embodiment, providing a second tapping action on the selected word may enter said word. According to one method, after selecting it, the selected word preferably remains in its location within the word list (i.e. its location does not change) so that to permit a desired word in the wordlist by providing a double-tapping action on it.

According to one embodiment, after the user provides an end-of-the-word signal such as a space character, the system may propose one or more symbols (e.g. commonly used symbols such as !?.,) such as (e.g. special) characters and/or functions (e.g. Enter function, switching to another mode (e.g. special character mode) each preferably being assigned to different zone on a/the touch sensitive surface/screen (e.g. herein may be referred to as preferred symbols zones) such that interaction with one of said zones may preferably selects/enter the corresponding character/function. After such interaction several scenarios may be considered:

According to a first scenario, preferably the presented preferred symbols zones are removed from the touch sensitive surface.

According to a second scenario, the presented preferred symbols zones remain on the touch sensitive surface so that for example the user can enter more of said special characters and or functions. In this case, according to one aspect, providing a predefined interaction such as pressing on the space character, proceeding to entering a next word (e.g. tapping on a letter key), etc., may preferably remove the presented preferred symbols zones from the touch sensitive surface/screen.

According to one method, a predefined interaction such as a press-and-holding action on a such zone may correspond to repeating to enter the corresponding character until the user ends said interaction (e.g. removes his/finger from the touch sensitive surface). As mentioned, one or more of the zones may correspond to function(s). As an example, interacting with one of the preferred symbols zones may correspond to entering the system into the/a (e.g. precise) special character mode (e.g. hereafter may be referred to as symbol mode) of the invention where more zones corresponding to more special characters are preferably presented to the user. In this case, according to one method, at least the presented zone of the preferred symbols zones corresponding to the switching action may remain on the screen so that the user for example the user can switch back to the previous (e.g. letter) mode.

Figure 37E:
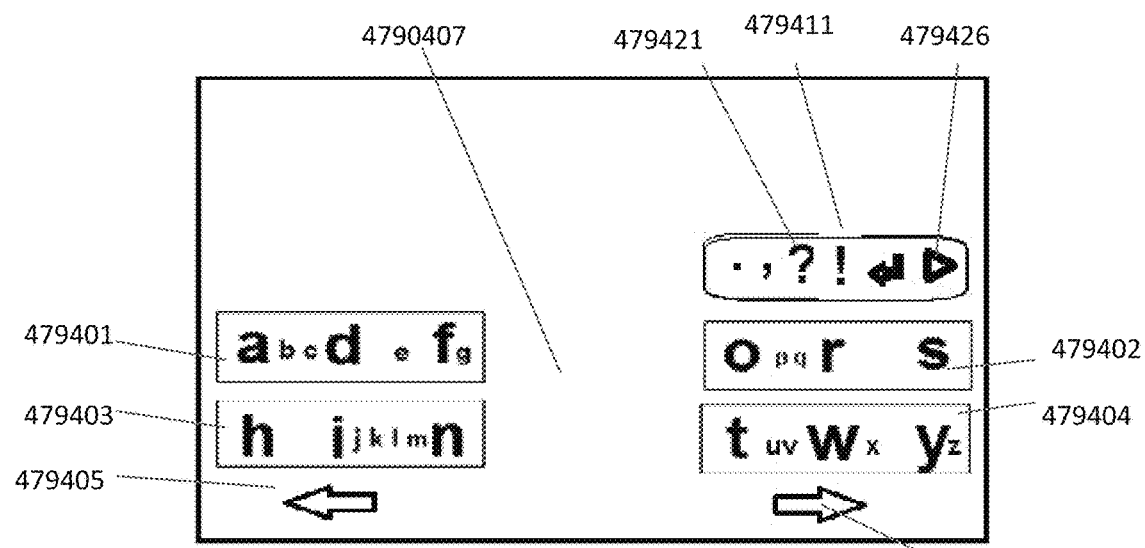
FIG. 37E-37F show examples of a keyboard having a symbol zone/key.

According to one method, after said (e.g. a first) preferred symbols zones are removed from the screen, another group of one or more preferred symbols zones may be presented on the screen. For example, the said another group may include a zone corresponding to activation of the Enter function. Note that said another group may include one or more zones of the previous (e.g. the first) preferred symbols zones. FIG. 37E shows as an example wherein after typing the "How", the user has pressed the space key 479406. In this case, the system preferably shows on a location 479411 (e.g. herein may be referred to as few/preferred symbols button/zone) a number of preferred symbols zones each corresponding to for example a symbol such as special characters or a functions. Providing a predefined interaction such as a tapping action on such a zone may enter/activate said symbol. In this example, the zones 479421 and 479426, respectively correspond to entering the character "?" and to switching the system into the precise symbols mode. Note that the few symbols button may be displayed diagonally or vertically preferably on/close to the/an edge of the screen. According to one method, the few symbols button may include more/other symbols/functions (e.g. Shift, CapsLock, Tab, Settings, Switching language, Remove keyboard from the screen, etc.). According to one aspect, (e.g. when the few symbols button is presented on the screen) all of the symbols assigned to the few symbols button may simultaneously be shown/available to a user, while according to another aspect, the few symbols button may have a means (e.g. a predefined zone to tap on, a sliding function over the few symbols button, etc.) so that the user can scroll between different layers of the few symbols button wherein each layer presents a number of (e.g. different) symbols/functions.

Figure 37F:
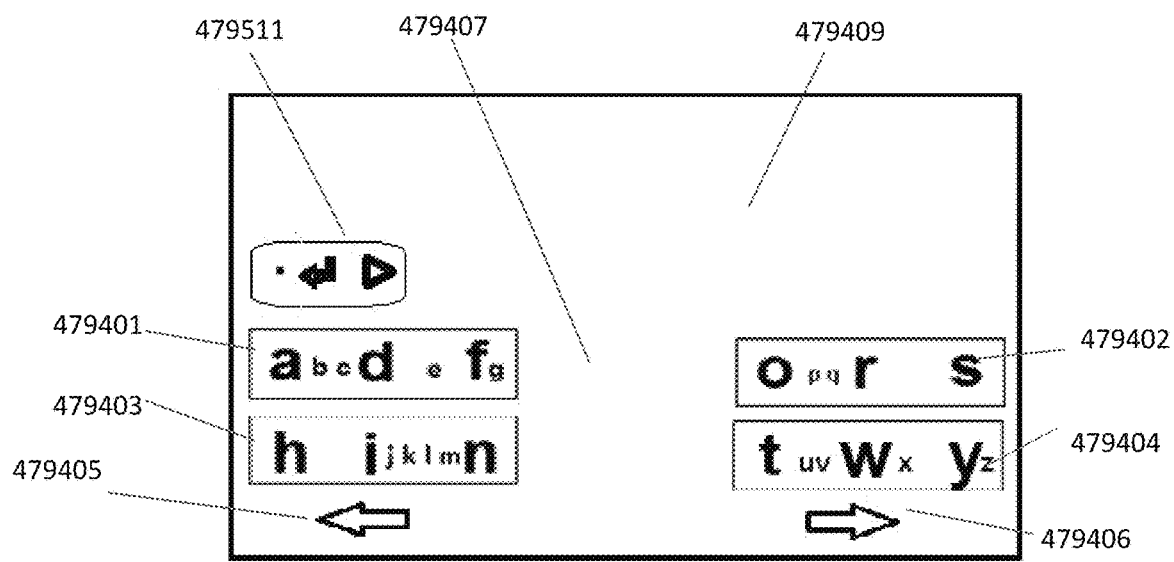

Note that the preferred symbols zones and their corresponding symbols shown in these examples are exemplary and they may vary. Other groups of one or more preferred symbols zones may be considered and their location on the screen may vary. FIG. 37F shows as an example, having three symbol zones 479511 and being located on the left of the screen.

Figure 37G:
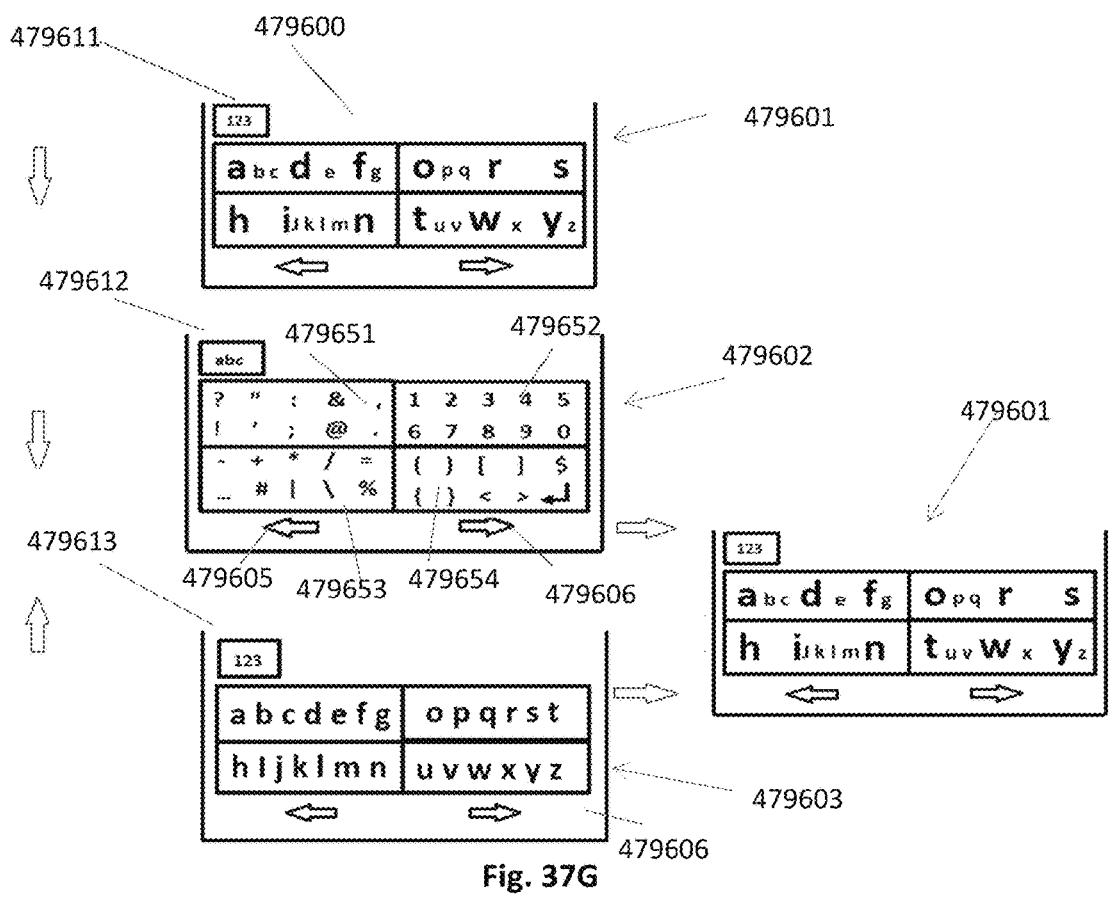
FIG. 37G-37H show an example of a keypad have a zone/key to switch to semi-predictive or fully predictive mode/instance.

According to one method, the at least one (e.g. preferably all of the) preferred symbols zones may preferably at least most of the time remain/displayed on the screen (e.g. herein may be referred to as permanent preferred symbol zone(s)) so that substantially always being available to the user. As an example, FIG. 37G shows the keypad of the invention in for example the semi-predictive or fully predictive mode/instance 479001 (e.g. hereafter may be referred to as the original mode) and wherein a permanent preferred symbol zone/key 479011 relating to switching the system into symbol mode/instance is printed on the screen. According to a preferred method, after the user interacts (e.g. taps) on the zone/key 479011, the system may preferably switch to the symbol instance/mode 479012, wherein the symbols are shown/grouped in four different zones 479651 to 479654 based on their common characteristics as described throughout this and previous patent applications filed by this inventor. Note that in this example, on each zone, the symbols are arranged in two lines.

After the system enters into the symbol mode, preferably, the permanent preferred symbol zone 479011 may change its appearance 479012 and/or function. In this example interacting with the zone/key 479012 may switch the system into the precise letter mode 479003. Now, preferably, the permanent preferred symbol zone/key 479012 may change its appearance and/or function to 479013 (e.g. in this example, similar to 479011) so that interacting with the zone/key 479012 may switch the system into the corresponding mode (e.g. in this example to symbol mode 479003).

According to one method, in any of the modes (e.g. the symbol mode, the precise letter mode) if the user presses the space key 479606, the system preferably switches back to the original mode 479001.

According a one embodiment, the system may include both:

a first type of preferred symbol zone(s) that may not always be shown on the screen (e.g. such as the zone(s) 479411 of FIG. 37E which is preferably shown after typing a character/letter/word (e.g. a text) and pressing the space key, and the disappears upon providing a predefined interaction such as starting to type a next text (e.g. herein may be referred to as temporary preferred symbol zone); and/or a the permanent preferred symbol zones(s)/key(s).

Figure 37H:
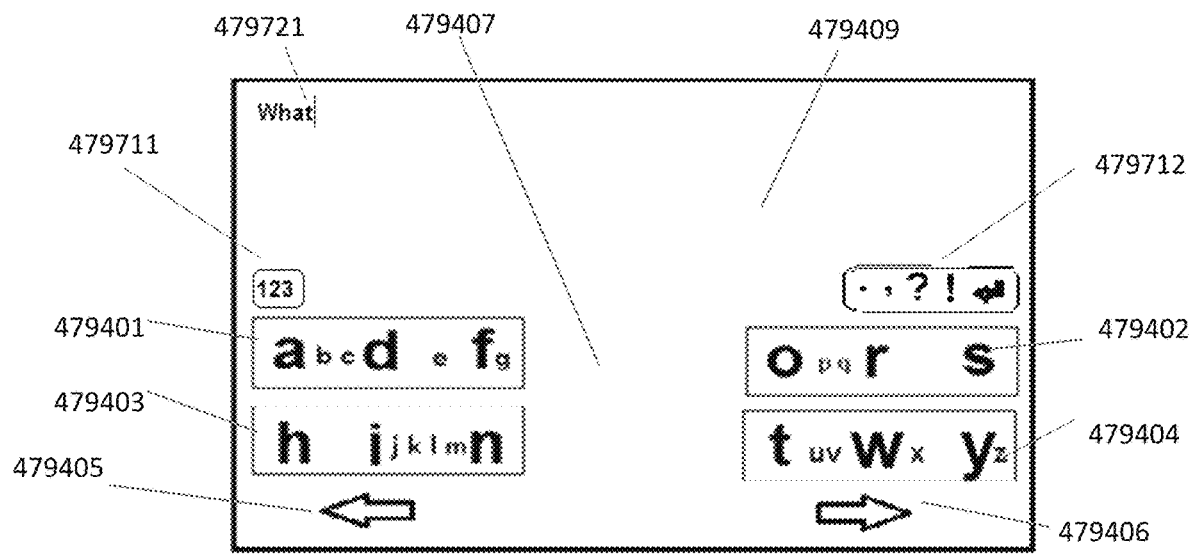

FIG. 37H shows the keypad of the invention of FIG. 37G in an exemplary instance after typing the word "what" 479121 and pressing the space key. In this example, both, the permanent preferred symbol zone/key 479711, and the temporary preferred symbol zone/key 479712 are presented on the screen 479409.

Note that, both, the number of temporary and/or the permanent preferred symbol zone(s) may vary. For example, the two permanent preferred symbol zones/keys may be shown on the screen, wherein a first one corresponds to the symbol mode, and the second one may relate to precise letter mode. According to one method, when the system is in the original mode/instance, interacting with a/the permanent preferred symbol zone/key may correspond to entering the system into the precise letter made. Another interaction with said preferred symbol zone may enter the system into the symbol mode, and vice versa.

Figure 37I:
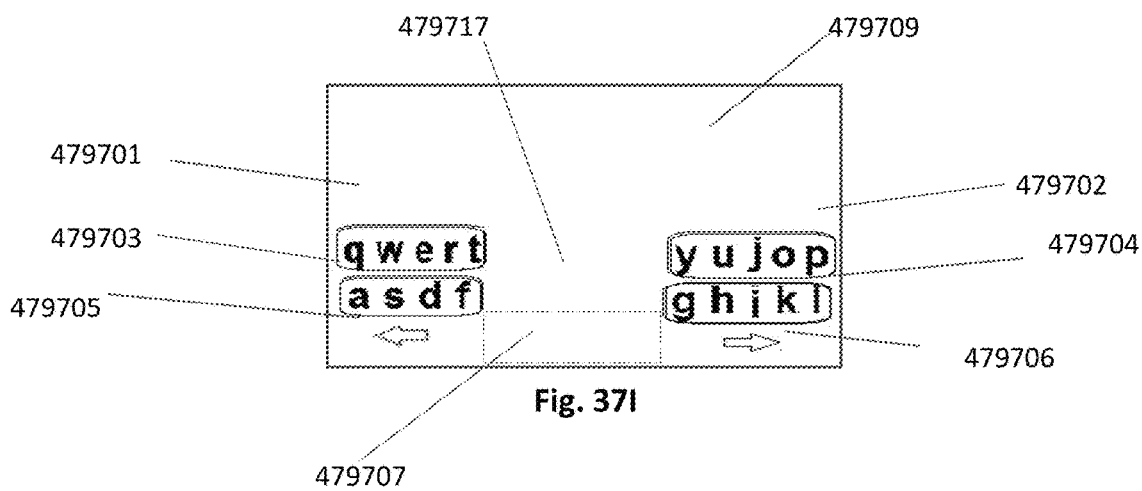
FIG. 37I-37K show examples of a keypad having a broadly ambiguous zone.
Figure 37J:
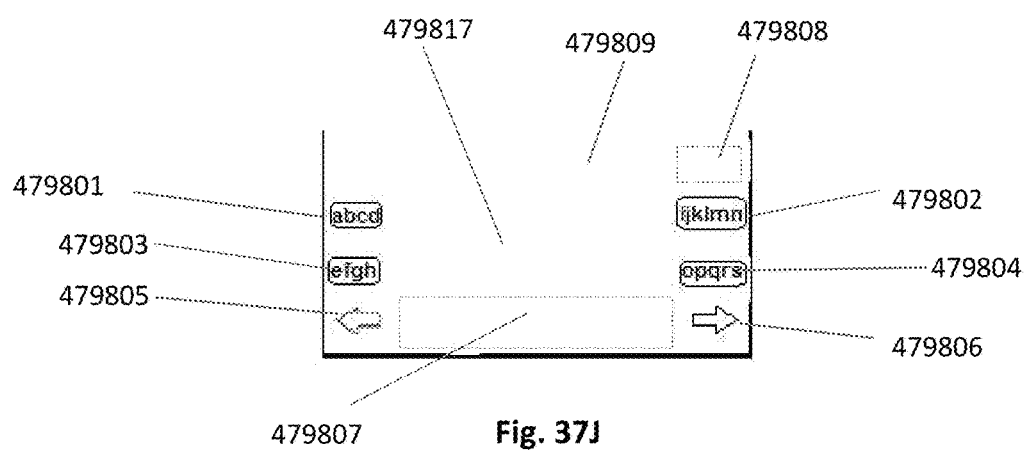
Figure 37K:
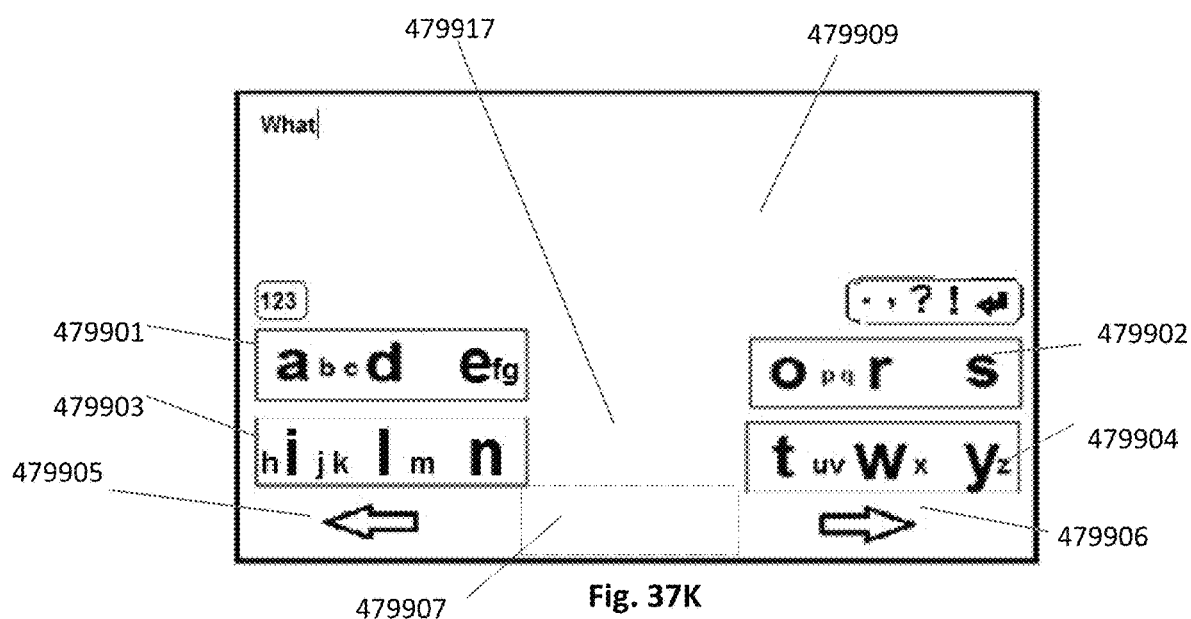

As mentioned before, the/a broadly ambiguous zone of a keypad of the invention may be located anywhere on the screen and preferably is invisible/transparent. FIGS. 37I to 37K, show some examples of the keypad of the invention and the (e.g. their corresponding) broadly ambiguous zones. FIG. 37I shows an exemplary keypad of the invention with QWERTY letter arrangement as described before. Here the broadly ambiguous zone 479707 (e.g. corresponding to the letters ZXCVBNM) is the zone between the space key 579706 and the backspace key 479705. In this example, the zone 479717 between the letter keys is accessible to a user so that for example he/she may be able to (directly) interact with content on the screen in that zone.

FIG. 37J shows another exemplary keypad of the invention with alphabetic letter arrangement as described before. Here the broadly ambiguous zone 479807 (e.g. corresponding to the letters TUVWXYZ) is the zone between the space key 579806 and the backspace key 479805. In this example, the zone 479817 between the letter keys is accessible to a user so that for example he/she may be able to (directly) interact with a content on the screen on that zone. According to another example, the broadly ambiguous zone may be located (e.g. location/zone 478008) next-to/near one of the (e.g. groups of the) keys of the keypad so that the whole middle of the screen being (e.g. directly) accessible. Note that in this example, the letter keys are designed to be very narrow so that to maximize the screen real state for viewing a content on the screen. According to other concepts, the letter keys may be displayed vertically of they may be small squares having alphabetical order (e.g. each key may have two or more lines of alphabetically ordered letters).

Note that in the examples of the keypads of FIGS. 37I and 37J, all of the letters/characters on their respective keys 479701 to 479704, and 478801 to 478804, are preferably considered as preferred letters/characters, and the letters assigned to the respective broadly ambiguous zones may be considered as none-preferred letters/characters.

Figure 37L:
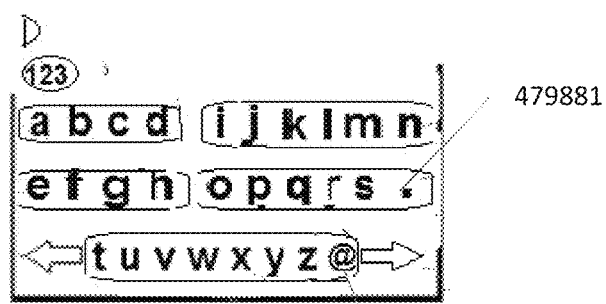
FIG. 37L shows an example of a keypad having the characters "." and "@".

FIG. 37L shows another exemplary keypad of the invention, for example (e.g. in the precise letter mode) resembling to the keypad of FIG. 35A with the difference being that here the keypad also includes the characters "." 479881 and "@" 479882 so that the user can enter an email address without switching to another mode such as, for example, a symbol mode.

Figure 37M:
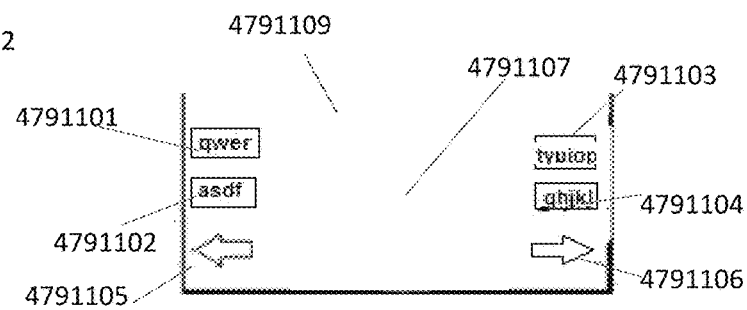
FIG. 37M-37O show examples of a keypad substantially with a QWERTY letter arrangement.

FIG. 37M shows another exemplary keypad of the invention with a QWERTY letter arrangement. Here the broadly ambiguous zone 4791107 (e.g. corresponding to the letters "Z", "X", "C", "V", "B", "N", "M") is the zone between the space key 4791106 and the backspace key 4791105. In this example, the letters are dispatched on four keys and the broadly ambiguous zone such that to provide high accuracy prediction.

Figure 37N:
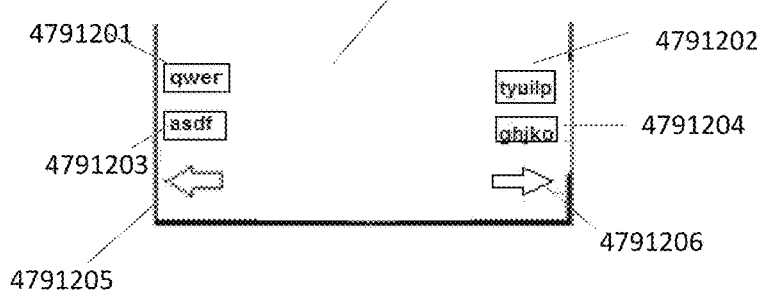

FIG. 37N shows another exemplary keypad of the invention with a substantially similar QWERTY letter arrangement. Here the broadly ambiguous zone 4791207 (e.g. corresponding to the letters "Z", "X", "C", "V", "B", "N", "M") is the zone between the space key 4791206 and the backspace key 4791205.

In this example, the letters "O" and "L" that are in the QWERTY order have been swapped to provide very high accuracy of prediction.

Figure 37O:
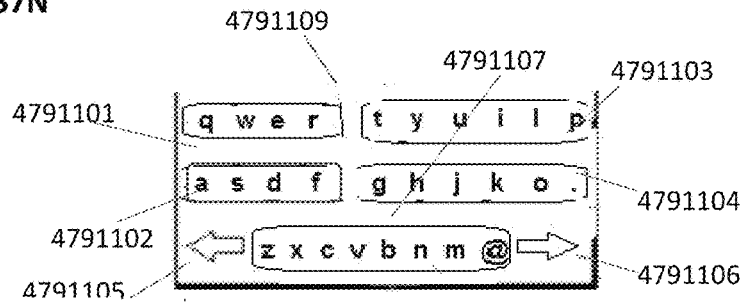

FIG. 37O shows an enlarged exemplary keypad of the invention having a QWERTY-like arrangement preferably having five keys/zones (e.g. herein may be referred to as a 'multi-mode key/zone') each corresponding to a plurality of characters. In this example, letters QWER are assigned to the key/zone 4791101, letters TYUILP are assigned to the key/zone 4791103, letters ASDF are assigned to the key/zone 4791102, letters GHJKO are assigned to the key/zone 4791104, and letters ZXCVBNM are assigned to the key/zone 4791107. In this example, the keypad is preferably in precise/enlarged mode. Note that as described throughout this application, an interaction with such precise/enlarged keyboard may preferably be simultaneously considered as relating to entering a precise character and/or an ambiguous character relating to said interaction. Note that, as shown in this example, additional characters (e.g. in this example the '@' and '.' symbols) may also be assigned to said zones/keys. Such additional characters may also be entered precisely and/or ambiguously as described. In a preferred embodiment, any of several groups of characters preferably having a common characteristic may be assigned to a corresponding zone/key of such keypad and be entered ambiguously and/or precisely. As such, words including alphabetical and/or special characters may be entered by using this embodiment. Note that for better prediction accuracy, modifications to a QWERTY layout may be applied. In this example of this embodiment, the letters L and O are swapped.

According to one embodiment, when the/a keypad/keyboard is in ambiguous mode (e.g. FIG. 37M) at some point during enlarging at least some of the keys of said keypad/keyboard, said keypad/keyboard may switch to the/a corresponding keypad/keyboard (e.g. 37O) of the precise mode. According to one embodiment, when the/a keypad/keyboard is in precise mode (e.g. FIG. 37O) at some point during shrinking at least some of the keys of said keypad/keyboard, said keypad/keyboard may switch to the/a corresponding keypad/keyboard (e.g. 37M) of the ambiguous mode.

Figure 37T:
FIG. 37T shows an example of a keypad with a substantially similar QWERTY letter order.

Note that any means such as a slider, pinching action, etc. may be used to enlarge/shrink the/a keypad/keyboard. Note that, when the system (e.g. and the corresponding keypad) is in the ambiguous mode, the characters (e.g. letters) assigned to the/a broadly ambiguous zone of the ambiguous keypad may be shown/printed in said zone. Note that such a keypad may be of any kind such as those shown in FIG. 37A and FIG. 37M, or a keypad having any number of keys. For example, said keypad may have six letter keys, preferably arranged in two rows (e.g. columns) wherein the letters are arranged in a predefined order such as an alphabetic order, a qwerty type order (e.g. FIG. 37T. The letters L and O are swapped, but according to one aspect, they are not be swapped), etc.

Figure 37P:
FIG. 37P shows an example of a keypad (e.g. in its precise mode) for German language with a substantially similar QWERTZ letter arrangement.
Figure 37Q:
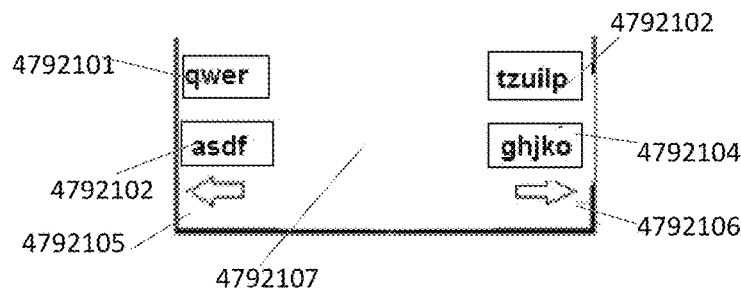
FIG. 37Q shows an example of a keypad with a substantially similar QWERTZ letter order in ambiguous mode.

FIG. 37P shows an exemplary keypad of the invention (e.g. in its precise mode) for German language with a substantially similar QWERTZ letter arrangement with (minor) modification (e.g. letters L and O are swapped). FIG. 37Q shows the keypad of FIG. 37P in its ambiguous mode. Here the broadly ambiguous zone 4792107 ambiguously corresponds to the letters include "Y", "X", "C", "V", "B", "N", and "M".

Figure 37R:
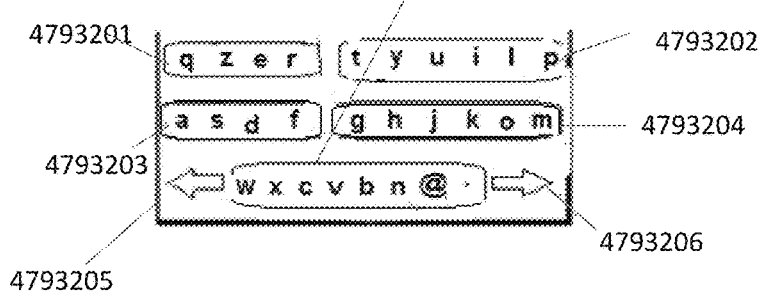
FIG. 37R-37S show examples of a keypad for French language with a substantially similar AZERTY letter arrangement.
Figure 37S:
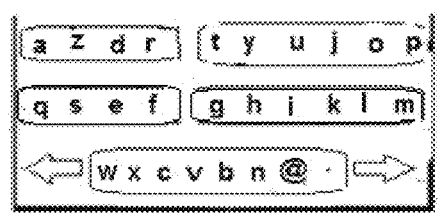

FIG. 37R shows an exemplary keypad of the invention (e.g. in its precise mode) for French language with a substantially similar AZERTY letter arrangement with (minor) modification (e.g. letters L and O are swapped, and the letters Q and A are swapped). FIG. 37S shows another exemplary keypad of the invention (e.g. in its precise mode) for French language with a substantially similar AZERTY letter arrangement with (minor) modification (e.g. letters D and E are swapped, and the letters I and J are swapped). In these examples the corresponding ambiguous keypads are not shown but they resemble to that of FIG. 37Q with these letter arrangements including modifications of swapped letters.

In the examples above modifications may be considered by people skilled in the art.

Methods of the entry of phonetic-based words/chains of characters (e.g. and thereafter the Hieroglyphic characters/words) using the data entry system of the invention has been described in different patent applications filed by this inventor. The data entry system of the invention having a keyboard having few (e.g. four) keys and one or more (e.g. preferably one) broadly ambiguous zone as described herein or in the previous patent applications may be used for such purpose. For example an alphabetical keyboard of the invention or a (e.g. slightly modified) qwerty-based keypad of the invention may be used for entering Pinyins and/or (thereafter) Chinese characters/words as described in detail before.

FIG. 37K shows another exemplary keypad of the invention with alphabetic letter arrangement as described before. Here the broadly ambiguous zone 479807 (e.g. corresponding to the letters (e.g. bcfghjkmpquvxz) printed in small) is the zone between the space key 579906 and the backspace key 479905. In this example, the zone 479917 between the letter keys is accessible to a user so that for example he/she may be able to (directly) interact with a content on the screen in that zone.

Note that in this example, the letters/characters printed in large font on the keys 479801 to 479804 are preferably considered as preferred letters/characters, and the letters printed in small font on said keys are preferably assigned-to and/or represented-by the broadly ambiguous zone 479907 and are preferably considered as none-preferred letters/characters (e.g. the small letters are printed on the keys 479901 to 479904 so that to remind at least the alphabetical order of the large letters and/or to provide a method of entering (e.g. any of) the letters precisely.

Note that as mentioned and shown before, the mouse functions may preferably be provided from a predefined zone such as for example a broadly ambiguous zone.

Forming and saving chain of words (e.g. phrases, sentences, etc.) in a database used by the system has been described before in previous patent applications filed by this inventor. According to one embodiment, after typing/providing the input information corresponding to a word, a predefined interaction (e.g. such as a gliding action preferably in a predefined direction) for entering a proposed/predicted word (e.g. in a word first) may preferably enter said word and/or attach said word to a previous word (e.g. which is already entered) and/or to a next word (e.g. to be entered). Preferably the attached words may include (e.g. by the system or manually) a delimiter such as a space character and/or another predefined character. The attached words as such may be added to a dictionary. By entering the input information corresponding to at least the portion such as the beginning portion of a chain of words formed and/or saved as such, the system may predict and/or propose a portion or the whole of said chain of characters. Preferably, when providing the input information corresponding to a word of such chain of words, the user may also enter the corresponding delimiter. In this case, according to one method, the system assumes that the information provided by the user is preferably corresponding to a word of a chain of words in the database, wherein said word may preferably be any of the words of the words of said chain of words. Accordingly, the system may propose one or more chain of words that include said word. Note that the user may provide more than one word as such corresponding to a chain of words. Note that, according to one method, words entered as such may preferably correspond to the beginning words of the corresponding chain of words.

As mentioned and shown before, the words in the/a word list of the invention may be arranged in different manner such as vertically (e.g. herein may be referred to as vertical word list), and/or horizontally (e.g. herein may be referred to as horizontal word list), and/or in another manner. According to one embodiment of the invention, a switching method may be used to (e.g. dynamically) switch the word list from a first manner to a second manner. For example a predefined interaction such as a gesture provided on/from a vertical word list in preferably a predefined direction may switch said word list to horizontal (e.g. and/or vice versa).

It must be noted that a broadly ambiguous zone of a keypad as described throughout this and previous patent applications filed by this inventor, is preferably referred to an invisible zone displayed on the screen to which a number of one or more characters such as at least one letter is assigned. Said zone may be located anywhere on the screen preferably outside the visible zones/keys of the keypad. Preferably, the said broadly ambiguous zone (e.g. herein may also be referred to as invisible zone) may be/is located between the two groups of keys of the invention as described and shown before throughout different patent applications filed by this inventor. According to another method, the invisible zone may be located next to (e.g. above, below, on the right/left side) a key of one of the groups of keys of the keypad. Note that as mentioned before, more than one invisible zone may be considered in a keypad of the invention. Not that according to one method, the borders and/or the characters of an invisible zone (e.g. a broadly ambiguous zone) may be shown on the screen.

According to one embodiment of the invention, the data entry system of the invention may be implemented in an external means/hardware and be (e.g. wirelessly and/or by wire) connected to the corresponding device such as a handset, tablet, TV, etc. As an example, the data entry system of the invention may be implemented in a wristwatch, a bracelet (e.g. of a wrist watch), an external device attached to the/said corresponding device, etc.

Figure 40A:
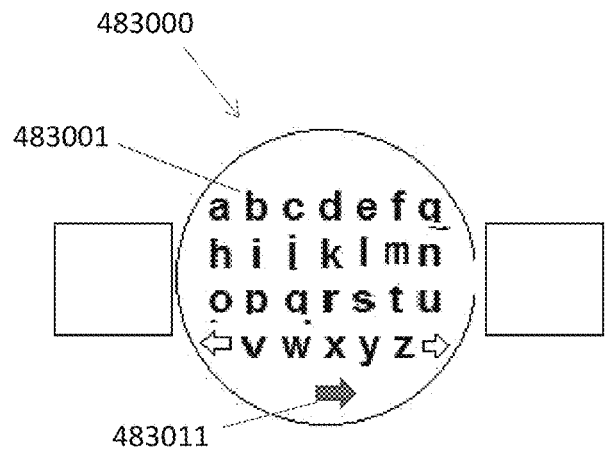
FIG. 40A shows an example of a keypad in precise mode printed a on the screen of a watch.
Figure 40B:
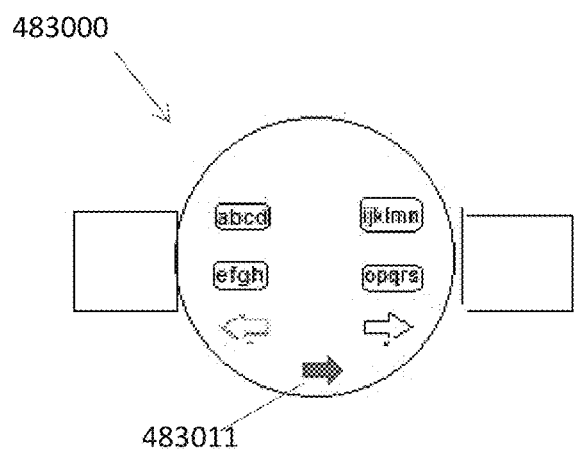
FIG. 40B shows an example of a keypad in ambiguous mode printed on a screen of a watch.

As an example, the keypad of the invention may be implemented within/on a touchscreen of a (e.g. an electronic) wristwatch. The wristwatch may include the data entry system of the invention, and transmitting and receiving means so that to transmit information such as text provided through data entry system of the invention to a remote destination. FIG. 40A shows an exemplary illustration of the keypad of the invention in precise mode printed on the (touch) screen of the watch. FIG. 40B shows the keypad of the invention in ambiguous mode. In these examples, the button/zone 483011 is for example used to switch the system into different modes (e.g. precise mode, ambiguous mode, symbol mode, etc.

According to one embodiment, the input provided by the system within the wristwatch and/or the corresponding output may be transmitted to another device such as mobile phone, tablet, TV, etc. In this case, the screen of the corresponding device may print said output.

By using the approach of using an external input units/ device, the screen of the devices such as mobile phones may be freed from displaying input interfaces and preferably be used for the output at least most of the time.

According to one embodiment of the invention, a predefined interaction such as a gliding action (e.g. including or excluding a long pressing action) in a predefined direction on/from a zone such as for example, the backspace zone/key, between the keys, etc., may relocate at least one of the portions (e.g. preferably, all) of the keypad in a direction such as the corresponding direction. After the user removes the finger from the screen the keypad may preferably stay at the last location. As an example, providing a gliding action upward or downward on/from the backspace key may relocated the keypad of the invention respectively upward or downward.

It must be noted that in different paragraphs in the description of the application the word device using the data entry system of the invention may have been used. Said device may be any type of device such as a handset, (mobile) phone, TV, PC, tablet, etc.

According to one embodiment of the invention, the keys of the keypad used by the system may be designed to be narrow or their visible portion being narrow. For example the three letter rows of a qwerty keyboard may form three narrow lines of keys. According to one method said keys are disposed symmetrically diagonally (e.g. two opposite pairs of keys).

A button for switching the system from a mode to another mode have been described an shown before. According to one embodiment, in addition to the tapping actions as described before, gliding actions provided from/on said button in different directions may be assigned to different functions. Preferably at least a majority of said functions may be related to keyboard modes functions such a Shift, CapsLock, removing the keyboard from the screen, etc. FIG. 41 shows a such button 487008 preferably always available on the screen. As shown in the enlarged portion 487011, a gliding action upward, towards upper-right, rightward, towards lower-right, and downward may respectively correspond to the functions, Shift, CapsLock, switching to ambiguous mode, changing languages, and removing the keyboard from the screen.

According to one embodiment of the invention, preferably in the fully ambiguous mode, when the user taps on a letter key and or the/a broadly ambiguous zone, in addition to relating said tapping action to an ambiguous character, the system may relate said tapping action to a predefined identified character (e.g. a vowel/consonant, a blank character, a visible character representing a blank character, etc.). According to one method, each key may have a different default character, while according to another method, all of the keys/zone may have a same default character. As such, when a user provides a sequence of one or more tapping action on the keys and/or the broadly ambiguous zone, one of the proposed words may preferably be constituted from the corresponding default characters (e.g. said word may herein be referred to as the default word). According to one method, if the user interacts with said/the default word, the system may preferably switch into the precise letter mode, wherein for each interaction with a key of the keyboard, the system may preferably replace the corresponding default character in the default word by the precise letter corresponding to the key of the precise keypad being interacted. By using this method, uncommon words and/or the words that are not included in the database of words used by the system may be entered character by character precisely.

According to a preferred method, when the user interacts with a default word, the system may also propose more words (e.g. if any) corresponding to the input information provided by the user until then. Each additional interaction with the default word may result in proposing more corresponding words. Preferably, at least at first, the system proposes the corresponding words with the length of the default word, and preferably then, the system proposes the words that a (e.g. the beginning) portion of them corresponds to the input information provided by the user.

According to one embodiment of the invention, providing gesture(s) from anywhere on a key in at least one direction of a plurality of predefined directions may provide corresponding at least on character of a plurality of identified characters (e.g. letters) ambiguously assigned to said key. Preferably the order of the gestures directions may correspond to alphabetical order of the corresponding identified characters/letters. As an example, FIGS. 35E to 35G show a first exemplary method of entering precise characters/letters. In this example, the default character of each key/zone may preferably be the first character of the corresponding ambiguous characters in alphabetical order (e.g. respectively, A, E, I, O, and T). The other characters of each key/zone may preferably be entered precisely according to their alphabetical order on the corresponding key, preferably according to gestures in corresponding predefined directions (e.g. clockwise order or opposite clockwise order).

For example, as shown in FIG. 35E, providing gliding actions on/from the key 477701 towards up, upper-right, and right, may respectively correspond to entering precisely the letters, B, C, and D, and providing gliding actions on/from the key 477702 towards up, upper-left, left, lower-left, and down, may respectively correspond to entering precisely the letters, J, K, L, M, and N.

Also, for example, as shown in FIG. 35F, providing gliding actions on/from the key 477703 towards up, upper-right, and right, may respectively correspond to entering precisely the letters, F, G, and H, and providing gliding actions on/from the key 477704 towards up, upper-left, left, and lower-left, may respectively correspond to entering precisely the letters, P, Q, R, and S.

Also, for example, as shown in FIG. 35G, providing gliding actions on/from the broadly ambiguous zone/key 477707 towards up, upper-right, right, lower-right, down, and lower-left, may respectively correspond to entering precisely the letters, U, V, W, X, Y, and Z.

Note that in this example, providing a tapping action on the keys/zones 477701, 477703, 477702, 477704, and 477707, preferably correspond to respectively, the default letters A, E, I, O, and T.

Note that this is only as example to demonstrate the principles of entering intuitively/blindly precise character. Other methods may be considered. For example, interacting such as a tapping action on a key may not correspond/ provide a letter, but (e.g. a symbol representing) a blank character. In this case, according to one method, any (e.g. of all) of the characters (e.g. ambiguously) assigned to a key may be precisely entered by providing a gliding action towards a predefined direction. As an example, providing gliding actions on/from the key 479901 towards up, upper-right, right, and lower-right, may respectively correspond to entering precisely the letters, A, B, C, and D. Same rule may be applied to other keys/zones.

Note that in the embodiment above, the order (e.g. of gestures in different direction (e.g. such as up to eight different directions from a key) described for entering precise character is alphabetic. Other orders such as for example Qwerty order may be used. Note that according to principles described above, a user may enter text blindly, both, in precise mode and in ambiguous mode.

According to one embodiment of the invention, as described throughout different patent applications filed by this inventor, gliding actions including a press-and-holding-action in different directions such as in up to eight directions as described above may be used for entering special characters assigned to a key. As described before in detail, each key may represent a group of characters having a common characteristic. For example, press-and-holding- and gliding actions in different predefined directions such as eight different directions on a key, may provide up to eight different special characters assigned to a key. A long pressing action on a key and removing the finger (e.g. without providing a gesture) may be related to entering another special character assigned to said key.

FIG. 35H shows the keypad of FIG. 35E wherein the letters represented by a key are shown in a simplified reduced manner to permit having extremely small ambiguous keys. for example, the letter IJKLMN assigned to the key 477802 are shown as I-N. in this example, the letters assigned to the broadly ambiguous zone are displayed as T-Z in a (e.g. small) location 477817 on said (e.g. large) 477707 zone.

According to one embodiment of the invention, after the system provides a number of one or more words (e.g. in an initial word list) based on the user's input information corresponding to a word (herein may be referred to as initial input information), providing a predefined interaction such as tapping on a zone such as on the uncompleted word may cause the system to enter into a/the precise letter mode and (e.g. preferably simultaneously) propose more words/stems (e.g. different from those proposed in the word list) (e.g. if any) (herein, a stem may also be referred to as a word) corresponding to the input information provided by the user. Preferably, the stems are the beginning portions of corresponding longer words. According to one method, the system may preferably propose a large number of such words/stems in a large location (e.g. in an enlarged word list). (According to one method, the proposed words/stems have preferably the/a same length (e.g. the same number of characters) as the current predicted word and preferably include substantially all of the corresponding words/stems.) At this time several scenarios may be considered:

Scenario 1: The user may select a proposed word/stem. In this case, according to one method said word/stem may preferably be entered, while according to a second method, the system may propose another word list of one or more words (e.g. preferably including the selected word and) beginning with the selected word (e.g. if any). Preferably after selecting one of the words the enlarged word list is disappeared and a smaller word list (e.g. similar to the initial word list) may be proposed.

Scenario 2: The user does not select any of the proposed words (e.g. none-of the proposed words is her/his desired word) and begins (e.g. a correction procedure by) using the keyboard in precise letter mode to enter her/his desired word character by character precisely. In this case, preferably upon using said keyboard, the system removes the enlarged word list. Preferably, when the user begins to enter precise characters, the system may propose longer words based on the initial input information that was already provided by the user before entering into the correction procedure. The correction procedures of the invention have already been described in detail in different patent applications filed by this inventor.

According to one method, the words/stems in the enlarged word list may be displayed/proposed in alphabetic order, while according to another method they may be displayed/proposed based on said and/or other characteristics such as their priority, etc.

Note that the space and backspace keys of the keypad of the invention may preferably always be invisible and preferably their location on a surface may be presented by small icons (e.g. right and left arrows).

The arrangement of letters on the (e.g. four letter) keys of the keypad of the invention may be in alphabetical order to permit a novice user to type fast from the beginning. According to a first method, as shown in the example of FIG. 32, at least most of the letters may be arranged such that to form two linear lines of letters in alphabetical order (e.g. the letters A to H, and the letters I to S), while according to a preferred method, as shown in the example of FIG. 35B, a first and second portions of said letters (e.g. A to H, and I to S) are preferably arranged on two pairs of keys (e.g. 477001, 477003, and 477002, 477004) located in opposite relationship (e.g. on the/a touch screen) 477009. This way, (e.g. specially on tablets) the user can more easily the keys to find a letter (e.g. for the letters A to H the user looks at the left side, and for the letters I to S the user looks at the right side. In the above mentioned examples, the remaining letters are assigned to the/a broadly ambiguous zone (e.g. respectively, 474007, and 477107).

As described before in this application and previous applications as filed by this inventor, groups of words such as predicted word (for example, candidate words) and the current word, may be display/presented to the user in various formats, styles, methods, etc. For example, predicted words may be presented as wordlists, as described before herein. Such a word list may contain candidate words and also include the current predicted word, preferably displayed the current predicted word in a different color to the candidate words. Alternatively, the current predicted word may (e.g. also) be displayed through/by any other means, for example, at a position in the text (e.g. as if the word is entered directly into the text at the current cursor position) of, for example, a text box. According to one embodiment of this invention, a wordlist may contain candidate words predicted/proposed by a predictive system combined with data entry system of the invention, including the current predicted/proposed word.

According to one method, the current word may be presented to the user according to several (e.g. one or more) criteria, preferably, relating to N-gram entries in a word database where, preferably, N>1 (e.g. bi-grams and/or tri-grams). Preferably, the system may present the current word when the following criteria are satisfied, for (e.g. any) input information provided to the system:

If the last word in a candidate (e.g. one or more) N-gram is equal in length to the length of the current word being entered (e.g. same number of entered characters for the current word), then the last word of the N-gram with the highest priority is preferably presented to the user as the current word.

If the last word of a candidate (e.g. one or more) N-gram is not equal in length to the length of the current word being entered (e.g. same number of entered characters for the current word), then the last word of the N-gram with the highest priority is preferably presented to the user as the current word.

If there is no N-gram in the word database that corresponds to the current input information for the current word being entered, then a 1-gram with the highest priority may be presented as the current predicted/proposed word, preferably with any length. Alternatively, the unigram presented as the current word may be restricted to the length of the current word being entered (e.g. the same number of entered characters for the current word).

If no word (e.g. from unigrams, or from N-grams where N>1) are found that correspond to the input information for the current word being entered by the user, then system may propose a word with highest priority corresponding to any of the input information available to the system. Preferably, if such a proposed word is greater in length than the length of the current word being entered (e.g. same number of entered characters for the current word), then the presented word may be presented such that, preferably, the first characters of the proposed word are presented/display as the currently predicted word.

According to one embodiment of the invention, various modes of the keypad/keyboard may be navigated (e.g. presented and/or accessible) by the user at various (e.g. any stage) during the entry of input information to the system. Said modes may be presented and/or accessible to the user programmatically, for example, when the user is entering information into a field that only accepts numbers/digits. According to one method, the user may navigate (e.g. some of) the various modes of the keypad/keyboard, as shown in the example of FIGS. 42A, 42B, and 42C. FIG. 42A shows an example of a keypad 488000 that includes a function key/button 488001; here the keypad is in the fully predictive mode. Upon the user activating the function key 488001, the keypad moves/switches/activates to another mode, preferably, as shown in FIG. 42B, the precise letter mode and the system presents the precise letter keypad 488100. In this mode, the function key 488101 presents numbers/digits and an additional function key 488102 is shown. Upon the user activating the additional function key 488102, the system returns to the fully predictive mode, for example, as shown in FIG. 42A. If the user does not activate the additional function key, but instead activates function key 488101, then the keypad moves/switches/activates to the special character mode, for example as shown in FIG. 42C. In this mode the function key 488201 presents characters on an alphabet, and an additional function 488202 is shown. Upon the user activating the additional function key 488202, the system returns to the fully predictive mode, for example, as shown in FIG. 42A. If the user does not activate the additional function key, but instead activates function key 488201, then the keypad moves/switches/activates (e.g. back) to the precise letter mode, for example as shown in FIG. 42B.

Note that the symbols for FIG. 42B and FIG. 42C are descriptive examples, and not all of the symbols are necessarily shown, for example on the keys 488211 and 488212.

According to another embodiment, the access to the precise letter mode and to the precise symbol mode may be through two different types of interactions/means/buttons/zones so that the user can access any of said modes directly. FIG. 42D shows as an example, the screen 488009 of a device having two different buttons/zones 488111 and 488112 so that interacting with them permits a direct access respectively to the precise letter mode and to the precise symbol mode. Preferably the buttons are narrow and located close/adjacent to the edge of the device. This has several advantages such as: a) the button(s) does not cover a significant portion of the screen, b) the access to (e.g. a tapping action on) the button(s) is accurate. In the example of FIG. 42E, the system is switched to the precise letter mode, and the buttons 488113 and 488114 respectively correspond to switching the system to the precise symbol mode and to the ambiguous mode. In the example of FIG. 42F, the system is switched to the precise symbol mode, and the buttons 488115 and 488116 respectively correspond to switching the system to the precise letter mode and to the ambiguous mode. Note that such a button (e.g. 488115) may have an additional invisible portion so that as to make (e.g. detectable) zone larger without covering the content on the screen.

Note that the buttons corresponding to switching between modes, the word list, etc., may be located/displayed in any (e.g. predefined) location on the screen. As an example, in FIG. 42H, the mode buttons 488117 and the wordlist 488118 are located close to each other on the right side of the screen 488109.

According to one embodiment, different types of interactions with a type of button as just described in the embodiment above, may be used by any application (e.g. an application other than the application using the screen) to provide different input signals to the system for any purpose (e.g. without interfering with the functions of the user interface on the screen corresponding to an application which is currently running). As an example, different (e.g. straight) gliding actions towards different directions provided from the corresponding edge of the device towards the inside of the screen may be related to functions that are related or are not related to the current running application. This is because, the gliding action provided from the edge of the device or touch sensitive surface (e.g. touch screen) towards the inside of the device at first interacts with such button/bar. This permits/enables an application/a system to perceive a screen event before any other application that uses another portion of the screen. Such type of button/bar and preferably the corresponding gliding actions as described may be used for entering different corresponding input information. Said input information may be used by the system to provide/process different functions. Note that one or more of such buttons/bars may be located on a same edge of a device. According to one embodiment such button may have the form of a (e.g. an invisible) line (e.g. 488331 of FIG. 42G). According to one method, a single such button may substantially cover an edge of the screen. One or more of such buttons may be place on one or more edges of a screen. As an example, as shown in FIG. 42G, three gliding actions 488301, 488302, and 488303 which are provided from the edge of the device/screen towards the inside of the screen preferably provide three different input signals that may be used for any purpose (e.g. to input key interactions, to input data/text, to activate functions, etc.).

As an example, by providing one or more such bars (e.g. 488331, 488332, 488333) on one or more edges of the screen of a device such gliding actions may simulate (e.g. ambiguous and/or precise) key interactions. As an example, in FIG. 42G, six gliding actions 488301 to 488306 may simulate interactions with six keys of the keypad of the invention (e.g. respectively the keys 488401 to 488406). As an example, a different gliding action such as the gliding action 488307 may simulate interacting with the broadly ambiguous zone 488407 of the/a keypad of the invention. It is understood that a greater or lesser number of different gliding actions may be related to a greater or lesser number of keys simulating interactions with keypads with a greater or lesser number of keys. This type of keypad may be beneficial for many people including visually impaired people. In this case, the keypad may not be printed/shown/presented on the screen. Note that said gliding actions may be related differently (e.g. in another order) to the keys of the/a keypad of the invention. Also other types of gliding actions may be used to emulate interactions with the keys of a keyboard. For example, a plurality of gliding actions wherein each of them is provided from a different portion of one or more edges of a touch sensitive surface (e.g. in any angle) towards the inside of a touch sensitive surface may represent a corresponding plurality of different input signals, and wherein each of the input signals may correspond to one or more characters (e.g. emulating a precise keyboard or an ambiguous keyboard).

Figure 42I:
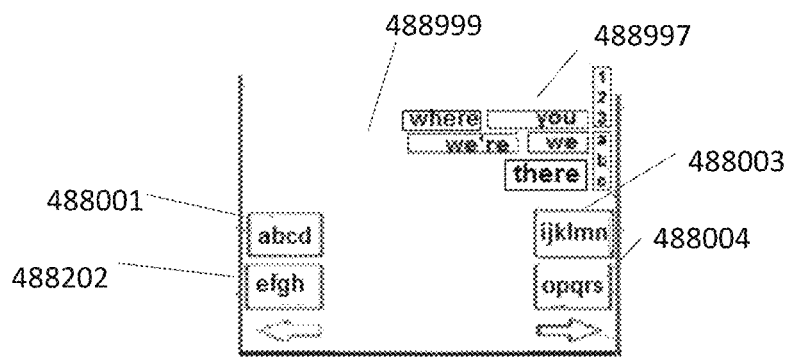
FIG. 42I shows an example of a word list arranged in three lines and two columns of words.

According to one embodiment, the word list may include more than one line of words (e.g. up to three lines) and more than one column of words (e.g. up to two columns). FIG. 42I shows as an example, a word list 488997 showing five words arranged in three lines and two columns of words. In this example, the word having the highest priority is shown in a separate line. Obviously, other number of lines and/or columns may be used to display a number of presented/predicted words. In this example, a gliding action on/from the word list:

a) To the right may provide more corresponding words b) To the left may print the previously predicted/presented words c) Towards up, deletes the word list and/or the word being typed In this example, a gliding action from a word downwards may correspond to fixing said word, and preferably presenting more/other longer words beginning with the fixed word.

Also as an example, a predefined interaction such as a gliding action including a press-and-holding action, provided on/from the word list may enter the system into a/the correction procedure of the invention and may automatically result in switching the keyboard into the precise letter mode.

Note that according to one method, upon providing a predefined interaction, such as a long pressing action, on the keyboard mode button 488001, the keypad of the invention may, preferably, be switched to another mode, for example, the precise letter mode, and stay/remain in that mode until another predefined interaction such as a tapping action on the button 488102 is provided (e.g. in this example, providing space characters, preferably, does not switch back the system to the ambiguous mode). Same may be applied to the symbol mode by, for example, a long pressing on the button 488101 so as to lock the system in, for example, a precise symbol mode of the invention.

According to one embodiment of the invention, the size of a key (e.g. as presented to a user) may be very small. A very small key may, preferably, be defined for the purposes of this and previous patent applications as key that has a size:
[0446] being a minimum size of one display element (e.g. pixel) of a display of an input means, for example, such as a touchscreen; [0447] being a minimum size of an area equal in size to the resolution of a coordinate position of an input means, for example, such as a touch sensitive surface; [0448] being a maximum size of the area, preferably, no larger than a fraction (e.g. half) of the touching (e.g. impact) area of a user's finger with a touch sensitive surface/display; [0449] being a maximum size of a fraction (e.g. 10%) of the length (e.g. width and/or height) of a touch sensitive surface/display; or [0450] a substantially small area of a touchscreen/touch sensitive surface considered by a user not to hinder access to the majority of the information presented on the touchscreen/available information accessible by the touch sensitive surface.

Figures 43A, 43B:
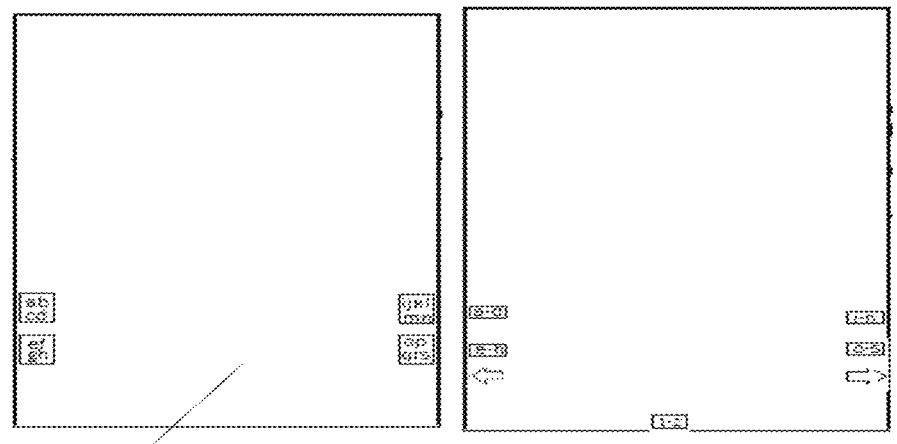
FIG. 43A-43B show examples of very small keys where the majority (e.g. substantially, almost the whole display) of the tough sensitive input means/display is available to the user.

Examples of very small keys are presented in FIG. 43A and FIG. 43B. In these examples, the majority (e.g. substantially, almost the whole display) of the tough sensitive input means/display is available to the user.

According to one method, the keypad of the invention may be (e.g. physically and/or virtually) split in two or more portions each having one or more keys. At least some of said portions of the keypad may be moved towards each other and/or moved away from each other on the/a corresponding input means, for example, a touchscreen/touch sensitive surface. A predefined interaction, with/on at least one portion/key/zone of the keypad, for example, such as a dragging or gliding action, or a pinching action (e.g. such as two fingers gliding towards or away to/from each other) may be used for such a purpose. Preferably, the space/area between keys (e.g. the/a broadly ambiguous zone) may contract/expand accordingly. Preferably, the size of any portion/key/zone may contract/expand accordingly.

According to one embodiment of the invention, the keys of the keypad may be approached (e.g. moved towards each other) and preferably reduce the size of the/a broadly ambiguous zone (e.g. and the keypad).

Figure 44A:
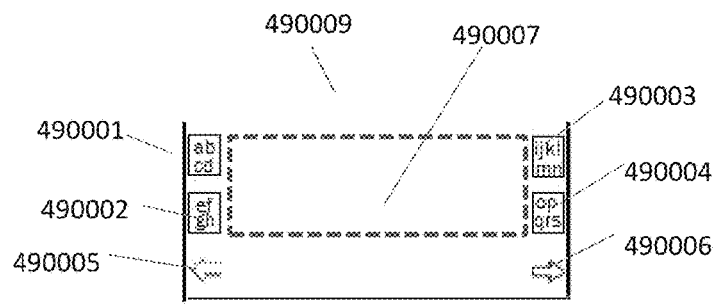
FIGS. 44A-44E show examples of drawings demonstrating the principles of creating and manipulating a reduced dynamic keypad.
Figure 44B:
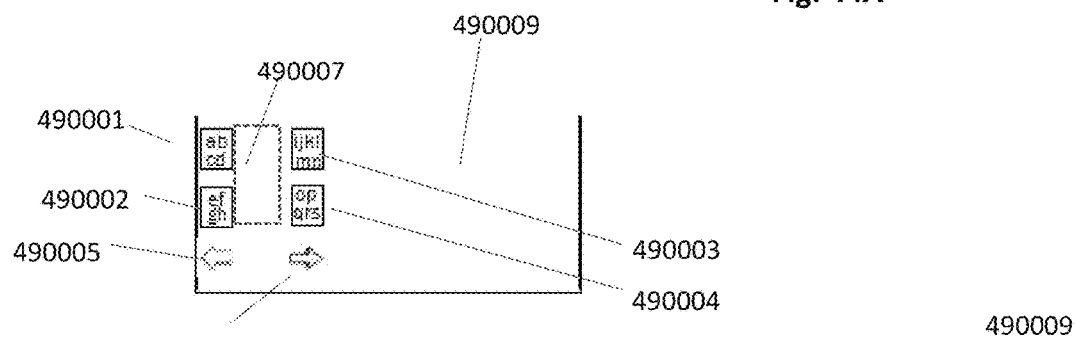
Figure 44C:
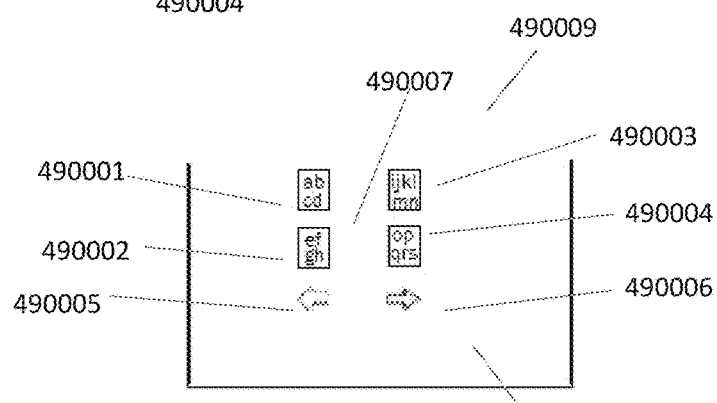

This may permit to have an extremely small input interface (e.g. herein may be referred to as reduced dynamic keypad) for a highly accurate input system. FIGS. 44A to 44E show exemplary drawings demonstrating the principles of creating and manipulating a reduced dynamic keypad. FIG. 44A shows a keypad of the invention having four keys 490001 to 490004, a broadly ambiguous zone 490007, a space key 490006 and a backspace key 490005. In this example, at least the group of keys (e.g. 490001, 490002) of one (e.g. left) side (e.g. herein may be referred to as the first portion of a keypad), and at least the group of keys (e.g. 490003, 490004) of another (e.g. right) side (e.g. herein may be referred to as the second portion of the keypad) are positioned far (e.g. not substantially close and/or not beyond a predefined space between the/said portions) from each other, near opposite edges of the screen (e.g. a portion of the input means) 490009 of a device. According to one method, said first and second portions of keypad may be approached (e.g. moved closer together) by a means such as by dragging (e.g. with a gliding action) one portion towards another portion or by dragging both (e.g. by a pinching action) portions towards each other. Different dragging methods may be considered. According to a preferred method, a portion may be dragged towards another portion by touching one of the keys such as the space key or the backspace key and dragging the respective portion of keys towards the other portion of keys. For example, as shown in FIG. 44B, the portion of keys on the right side may be dragged towards the portion of keys on the left side by touching the space key 490006 and sliding the finger towards the left portion of keys. Preferably, the size of the broadly ambiguous zone (e.g. 490007) is now reduced. According to one method, another predefined interaction such as a dragging action from another key, for example, the backspace key may be used to relocate at least both the portions of the keypad on the screen. As an example, FIG. 44C shows the reduced dynamic keypad of the invention being relocated on the screen by touching the backspace key 490005 and providing a gliding action towards a desired location on the screen 490009 (e.g. by dragging the backspace key 490005 from one location to another location).

Figure 44D:
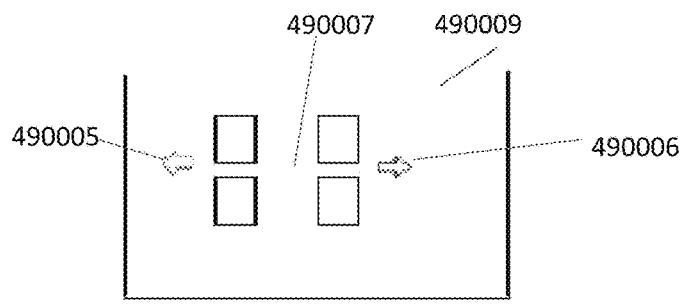
Figure 44E:
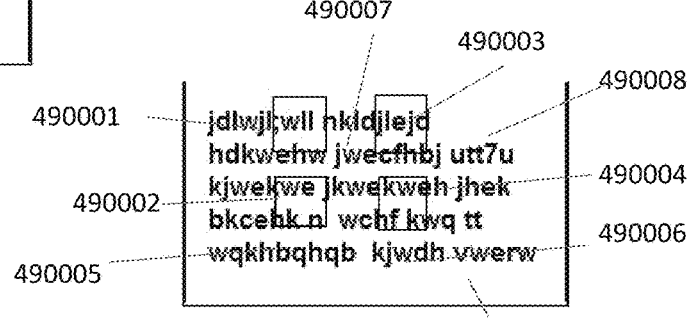

As mentioned before, the keys of the keypad may be invisible/transparent. Preferably, the borders of the invisible keys (e.g. preferably at least the letter keys) are presented on the screen in a predefined manner such as that shown in FIG. 44D. In this example, the borders of the space and the backspace keys are not shown, because the user may easily know where said keys are located relative to the letter keys 49001-490004. Also, preferably, the borders of the (e.g.

invisible) broadly ambiguous zone are generally not shown because the user may easily know its location (e.g. between the split keys) relative to the letter keys. FIG. 44E shows, as an example, the keypad of FIG. 44D superposed on a content (e.g. text) presented on a screen wherein the portion of the content under the keys/zone(s) of the keypad is visible to the user.

Note that the letter keys and the broadly ambiguous zone(s) may herein be referred to as letter keys/zones. Note that as shown in FIG. 44D, the space and backspace keys may be located anywhere (e.g. preferably outside the letter keys/zones) on the screen. Preferably other buttons/zones/keys (e.g. keyboard mode button, few symbols location, etc.) may be located on at least one of the edges of the screen.

According to one embodiment, the system may include a means such as using a predefined user's interaction for positioning the (e.g. portions of the) keypad of the invention in a predefined (e.g. default) location on the screen.

According to another method of dragging, a first portion of the keypad may be dragged towards or away from a second portion of the/a keypad by providing a predefined interaction such as touching a corresponding key (e.g. letter keys, space key, backspace key) and sliding said portion in a desired direction. Preferably, when such dragging action is provided from a first portion towards or away from a second portion, said portions stay on a same (e.g. horizon or vertical) level (e.g. plane/axis) so that the broadly ambiguous zone stays (e.g. preferably, (e.g. proportionately) expands/contracts) in a square, rectangular, or similar/other shape, for example, to it shape before said dragging action.

Note that the first and/or the second portions of the keypad described may include or exclude the space, the backspace keys, and/or, optionally, other keys/buttons/zones (e.g. corresponding to functions, special characters, letters, etc.).

According to one method, at least the whole letter keys/zones may be relocated on the screen by a dragging action from a key wherein said dragging action includes a press and holding action (e.g. at its beginning).

Note that the keypad of the invention may be divided in top and bottom portions instead of left and right portions. The keypad may also be divided into more than two portions.

Said reduced dynamic keypad may provide several valuable features (e.g. in addition to other advantages/features mentioned herein). For example, said reduced dynamic keypad enables a user to easily and/or comfortably enter data with one (e.g. or two) hands. One-handed use is particularly valuable for users of small devices (for example, mobile phones with touch screen input means, tablet computers with larger screen where the/a few keys close to each other can provide fast text entry with one hand), for example, when the have a need to multitask in the (e.g. physical) environment of activity. Another example, since the size and/or location of the reduced dynamic keypad can be reduced and/or changed, the user is now enabled to access any content around (e.g. 490008 of FIG. 44E) the keypad, enabling the user to scroll/move said accessible (e.g. screen) content of a touch screen device in a way that the device or pertinent application allows. The keypad removes a significant limitation of ordinary (e.g. QWERTY, and QWERTY-like) keyboard, namely enabling (e.g. tough simple/convenient interaction with the keypad) the user to access any of said content.

It must be noted that said actions for manipulating the size, position, mode, features, etc. of the dynamic reduced keypad may, preferably, also be applied in the case of any keypad such as, preferably, a semi-precise keypad.

According on one embodiment of the invention, the size of the keypad may be reduce/enlarged by using a predefined means such as providing one or more predefined interactions with the keypad. For example, touch a specific point of the keypad and dragging in the horizontal plane, may enlarge/reduce the keypad in the horizontal plane. Similarly, for example, an interaction in the vertical plane, may accordingly enlarge/reduce the keypad in the vertical plane.

Accordingly, a diagonal gesture from a specific point of the keypad, may preferably enlarge/reduce the keypad in both the horizontal and vertical planes, preferably simultaneously.

As mentioned before, the/a keyboard used by the system may include a broadly ambiguous zone that can be located anywhere on the screen (e.g. preferably between the split keys of a keyboard such as the/a keyboard of the invention (e.g. zone 490007 of FIG. 44F). According to one embodiment of the invention, (e.g. preferably, when the split keys are very closed to each other, the broadly ambiguous zone may be located outside the other letter keys of the keypad. As an example, FIGS. 44F to 44H show exemplary keypads/keyboards of the invention wherein the exemplary broadly ambiguous zones 490007, 490107, and 490207 are respectively located on different locations relating to the other letter keys 490001-490004 of a keypad/keyboard of the invention. Note that in FIG. 44H, the space and backspace keys are also relocated. In FIG. 44H, the exemplary gesture 490011 preferably correspond to interacting with the keys/zones 490002, 490207 and 490004.

According to one embodiment, when the keyboard is relocated/moved on the screen, the wordlist is located in a location on/near an edge on the screen. Said location may preferably be a location on that edge with a predefined relationship relative to the keyboard (e.g. word list moves up or down on an edge if the keyboard is moved up or down anywhere on the screen). FIG. 44K shows a keyboard of the invention relocated on the screen and the word list 490008 is-shown/remains on a predefined location relative to the keyboard on the right side.

According to a preferred embodiment, when the keyboard is relocated/moved on the screen, the wordlist is also relocated on the screen such that the words being shown near the keys so that the user can see them without (e.g. visual) effort. FIG. 44L shows a keyboard of the invention relocated on the screen and the word list 490018 is show/relocated next/near the keyboard (e.g. far from an edge).

According to one embodiment, when the keyboard is relocated/moved on the screen, at least some of buttons/keys/zones other than the main keys/zones of the keyboard (e.g. symbol switching icons, the few symbols button, etc.) may also be relocated accordingly on the screen. On the other hand, according to a preferred embodiment, when the keyboard is relocated/moved on the screen, at least some of buttons/keys/zones other than the main keys/zones of the keyboard (e.g. symbol switching icons, the few symbols button, etc.) is/remains located in a location on/near an edge on the screen. Said location may preferably be a location on that edge with a predefined relationship relative to the keyboard (e.g. said at least some of buttons/keys/zones other than the main keys/zones of the keyboard are moved up or down on an edge if the keyboard is moved up or down anywhere on the screen).

FIG. 44M shows a keyboard of the invention being relocated on the left side of the screen of a device and/while the symbol switching icons 490031 and the few symbols button/bar 490028 (e.g. which here is in vertical position) are shown/remained on a predefined location relative to the keyboard on their corresponding sides near the edges on/of the screen. As mentioned before a/the few symbols button 490028 may include a switching means so that to present more options/functions. In FIG. 44N the few symbols button of FIG. 44M (e.g. after tapping on the +sign) is displayed in a switched instance 490038 to present other/more functions.

It must be noted that other methods of relocation of a/the split keyboard may be considered. For example, the user may use two fingers e.g. by touching (e.g. simultaneously) a key of the first portion and a key of the second portion of the split keyboard and drag (e.g. simultaneously) (e.g. each of) said two portions of the split keyboard to a desired location/s on the screen. Note that during the entry of a word the few symbols button/bar (e.g. 490028) may change its appearance by for example being reduced in size and/or functions. After the user provides an end-of-the-word signal such as pressing the space key, said bar may be enlarged (e.g. to its enlarged size and function/s).

According to one embodiment, any of the/a keyboard in precise mode and the/a keyboard in ambiguous mode used by the/a system may be relocated on the screen. According to one method, each of said keyboards may be relocated in a different location on the screen regardless of the location of the other keyboard.

According to a preferred method, when a first of said keyboards is relocated on the (e.g. touch) screen, the height of the second keyboard on the screen may be adjusted to the height of the first keyboard on the screen so that when the system is switched to the second keyboard said second keyboard is shown at the same height as the first keyboard.

Figure 44Q:
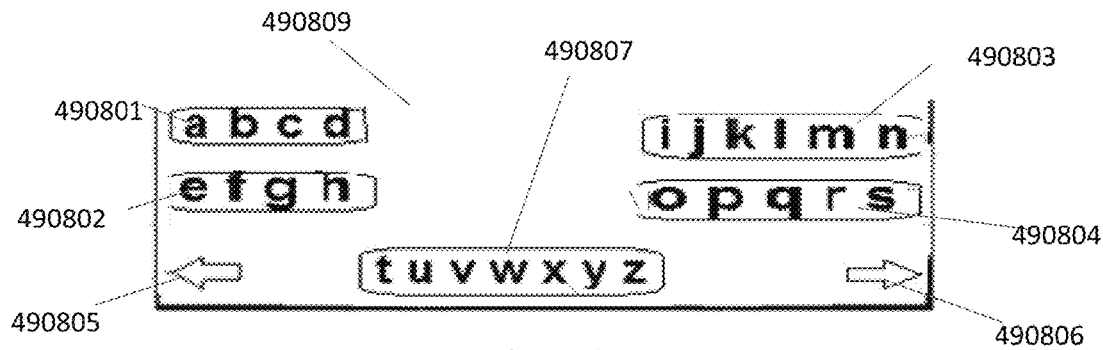
Figure 44R:
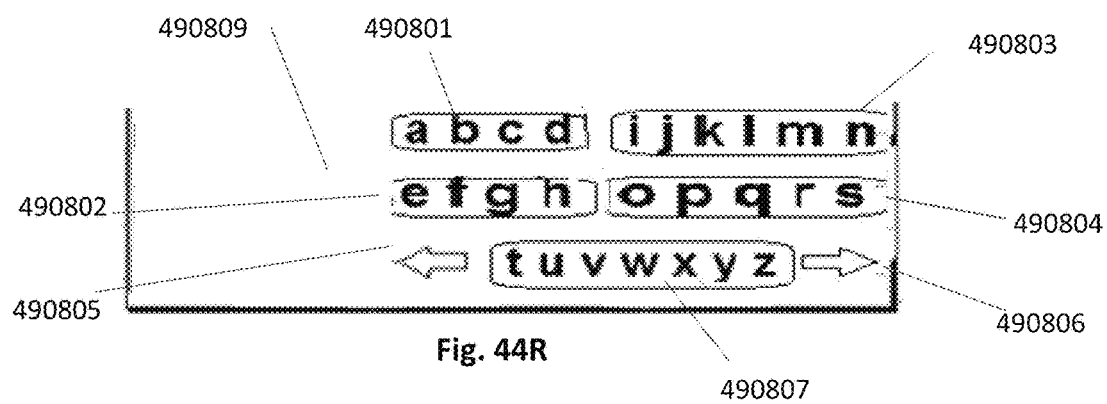
Figure 44S:
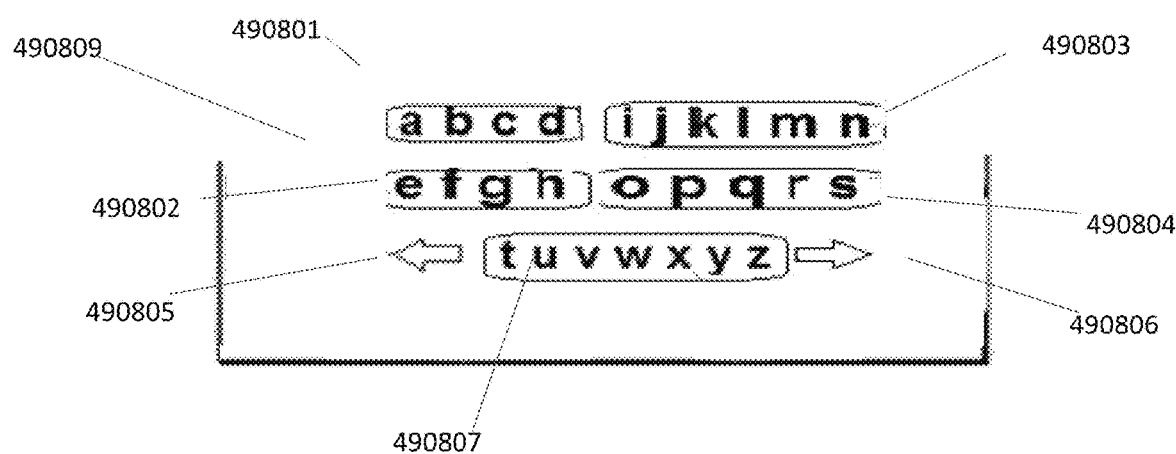

Note that the/a keyboard in the precise mode may also be reduced or extended in size. As an example, FIG. 44Q shows a keyboard of the invention is precise mode located on the screen 490809 of a device in landscape mode. As an example, in order to move the keys of the left side towards the keys of the right side or in order to reduce the width of the keyboard, the user may slide from the a key such the backspace key 490805 towards right. FIG. 44R shows said keyboard after being reduced in size. Note that the key/zone 490807 is also relocated. (Now) the user may relocate the reduced keyboard on the screen 490809 by sliding from a key such as the space key 490806 towards any desired direction on the screen. FIG. 44S shows said keyboard after being relocated on the screen 490809.

In FIG. 44P, the split letter keys are moved towards each other such that to be substantially adjacent to each other and form a 2.times.2 array of letter keys 490001 to 490004. In this example, the broadly ambiguous zone 490017 is dynamically defined to be a zone in the center of said array of keys. An exemplary alphabetical letter arrangement 490091 of the keyboard in this position is also shown for better explanation.

It must be noted that other methods for approaching, distancing, or relocating at least a portion of a keyboard such as the/a keypad/keyboard of the system may be considered. For example, according to one method, the user may provide a predefined interaction such as a predefined pressing action a desired location on the screen, and wherein said at least one portion of the keypad/keyboard may be relocated in a predefined position relative to the pressing action on the screen.

Note that at least the letter keys of the keypad may be split in other manners such as vertically as for example shown in FIGS. 44I and 44J.

It must be noted that in the embodiments above, the relocation (of e.g. any portion) of a split keypad in any direction (e.g. upward, downward, leftward, rightward, diagonally) on the screen has been described such that to permit the relocation of the keypad with one finger. This is very beneficial in mobile environments wherein in many situations one of the hands of a user may provide other tasks. The data entry system of the invention where the keyboard can become very small and complete manipulation of it including fast and accurate text input can be provided by a single finger (e.g. thumb) (e.g. while holding a device is with the same hand) is a unique input technology. It must be noted that other methods of relocation of keys may be considered with one or two hands. As an example, moving a first portion of the keypad towards a second portion for a (e.g. predefined) distance may also cause the second portion to move towards the first portion for the same distance.

According to one embodiment, upon relocation of the keyboard, at least some of the function icons may preferably be relocated accordingly and positioned near the keypad. For example, when the right portion of the keypad is moved inside the screen (e.g. distanced from the right edge), the few symbols button may be located at the right side of (e.g. adjacent to) said portion.

A method of (e.g. simple) sliding/gliding action(s) to emulate tapping/pressing actions on the keys and/or zones (e.g. of a keypad) on a touch sensitive surface may be considered. According to one embodiment, providing a gesture (e.g. sliding/gliding action) from/on a first key/zone towards/onto/traversing (e.g. partially or completely) one or more keys/zones may preferably represent/duplicate (a number of) corresponding interactions (e.g. tapping actions) with at least some of said zone/keys preferably depending on parameters such as a gesture's shape, trajectory, speed, etc. For example, providing a single gliding action traversing three zones/keys of a keypad may emulate/correspond-to pressing/tapping on said keys.

According to a preferred method, a straight gliding action beginning from a zone/key of a keypad and ending on another zone/key or traversed a last key during the gliding action, may preferably correspond to interacting with said two zones/keys of the keypad even if the gliding action traversed other zones/keys. Accordingly, if said gliding action is a complex (e.g. not straight/curved one or more times) gliding action, it may preferably also correspond to interacting with at least some of the other zones/keys on which said gliding action traversed/interacted. Preferably, said other zone/s are the zone/s on which the trajectory is angled/curved. Note that according to one method, beginning of a gliding action is where a user touches a (e.g. touch sensitive) surface and begins to provide a gliding action. Accordingly, a gliding action preferably ends upon removing the finger from the surface.

The above method may be used with a keypad/keyboard of the invention. As an example, such keyboard may have a few keys (e.g. four keys) and preferably one broadly ambiguous zone as shown in FIG. 45A. According to a preferred method, a straight gliding action departing from/on a first key and ending on or traversing a last key of the interaction with the keypad, may preferably correspond to interacting with said two keys. As an example, in FIG. 45A, the straight gliding actions 491011, 491012, 491013 respectively correspond to interacting with the keys 491001 and 491003, 491001 and 491004, and 491001 and 491002. Note that in this example, all of the gliding actions have traversed the broadly ambiguous zone 491007, but because they are straight gliding actions, they are not considered as interacting with the broadly ambiguous zone 491007. Also, as an example, the complex gliding actions 491014 and 491015 both correspond to interacting with the keys/zones 491002, 491007, and 491003. Note that in this example, the complex gliding actions have several line segments that are either angled or curved in the broadly ambiguous zone 491007.

According to one embodiment of the invention, if a gliding action provided over the keys/zones of the keypad ends on a location outside said keys/zones of the keypad, a corresponding word of a database used by the system may be entered and a space character may be added after said word by the system. As an example, as shown in FIG. 45C, the gliding action 491016 corresponds to interacting with the keys 491002 and 491001 and wherein because said gliding action has ended on a location outside, preferably, the letter keys and the broadly ambiguous zone 491007 of the keypad (e.g. herein may be referred to as the main keys/zones of the keyboard), a corresponding word (e.g. "ha") may be entered and a space key may preferably be added after said word. Similarly, the gliding actions 491017, 491018, and 491019 ended outside the main keys/zones of the keyboard may respectively correspond to the words relating to interacting with the keys/zones 491002 and 491007, 491002 and 491003, and 491002, wherein, preferably, a space character may automatically be entered/inserted/added after the corresponding words. Accordingly, as shown in the example of FIG. 45E, the gliding action 491021 corresponds to a word relating to interacting with the keys 491002, 491003, and the broadly ambiguous zone 491007 wherein a space character may automatically be entered/inserted/added after said word.

According to one embodiment of the invention, a complex gliding action provided over two keys, and traversing outside the main keys/zones of the keyboard may correspond to interacting with said two keys. As an example, in FIG. 45D the gliding action 491023, wherein a portion of it traverses outside the main keys/zones of the keyboard, corresponds to interacting with the keys 491003 and 491004, and a similar type of gliding action 491022 provided on said two keys, but traversing the broadly ambiguous zone 491007, preferably corresponds to interacting with the keys/zones 491003, 491007, and 491002. Similarly, the complex gliding action 491025 departing from the key 49001 and ending on the same key 491001, and traversing outside the main keys/zones of the keyboard may preferably correspond to two consecutive interactions with a corresponding single key 491001. Accordingly, a similar type of gliding action 491024 departing from and ending on a same key 491002, but traversing the broadly ambiguous zone 491007 preferably corresponds to interacting with the zones/keys 491002, 491007, and 491002.

According to one embodiment of the invention, a gliding action that ends within main keys/zones of the keyboard may correspond to a one or more words of the database used by the system, where a number of said words are preferably presented to the user. FIG. 46A shows a complex gliding action 491026 corresponding to interacting with the zones/keys 492007, 492002, 492001, and 492007. A word list 492008 is presented to the user. According to one embodiment of the invention, if a gliding ends outside the main keys/zones of the keyboard one of the words presented to the user may be entered automatically by the system and a space character may be entered/inserted/added after said one of the words. FIG. 46B a gliding action 492027 similar to the gliding action 492026 but ending outside the main keys/zones of the keyboard. In this example, the word "that" (e.g. preferably having the highest priority among the corresponding presented words) may be entered by the system and a space character is preferably inserted/added/entered after said word.

According to one embodiment of the invention, if a gliding action ends within a corresponding word list another word of the word list may be entered and a space characters is preferably added/inserted/entered after said word. In FIG. 46C, a gliding action 492028 is similar to the gliding action 492026 and similar to gliding action 492027, but ending in the word list 492008. In this example, the word "what" (e.g. having the second highest priority among the presented words) is entered, and preferably a space character is entered/added/inserted after said word.

According to another embodiment, after a gliding action exits the main keys/zones of the keyboard, the wordlist becomes available under the user's finger so that the user can select one of them (e.g. by continuing the gesture until the desired word in the list.

According to one embodiment of the invention, the input information corresponding to a word provided by a user may include a variety of interactions such as one or more gliding actions (e.g. one or more separate gliding actions, each corresponding to a different portion of a desired word) and/or one or more tapping actions on the keys of the keypad. This permits to a user to enter a word by lifting his/her finger from the corresponding touch sensitive surface between each interaction. According to one embodiment, an signal such as providing a space character, providing a special character such as "?", selecting a word (e.g. of a list of words) presented to the user, etc., may (e.g. gliding and/or tapping actions) signify the end of the entry of the input information corresponding to a desired word. As an example, FIGS. 47A and 47B show exemplary steps of the entry of the word "pull". In the step of FIG. 47A, the user provides a gliding action 493029 corresponding to three beginning characters of the word "pull". The system may propose a number of words corresponding to the input information provided until then. In the step of FIG. 47B, the user provides a gliding action 493030 corresponding to the last character of the desired word. Note that, the gliding action 493030 is ended outside the main keys/zones of the keyboard, therefore preferably, the system enters/selects the word "pull" (e.g. the most probable word of the word list) and preferably inserts a space character at the end of the entered/selected word "pull".

FIGS. 47C and 47D show another example of the steps of the entry of the word "pull". The step of FIG. 47C, is similar to the step of FIG. 47A. In the step of FIG. 47D, the user provides a tapping action 493032 corresponding to the last character of the desired word. The system proposes a number of corresponding words including the word "pull" (e.g. the most probable word of the word list-of-the-word signal The user may now select a desired word (e.g. the word "pull"), and preferably provides an end-of-the-word signal such as a space character by interacting with (e.g. tapping on) the space key 493006. Note that in order to provide more accuracy, the space key 493006 of the system occupies a large portion of the keypad.

FIG. 47E show another exemplary steps of the entry of the word "pull". In this example, the user may first provide the input information corresponding to the first three letters of the desired word "pull" by three tapping actions 493033, 493034, 493035 on respectively the key/zone 493004, the zone 493007, and the key/zone 493003. He then may provide a gliding action 493036 corresponding to the last character of the desired word, wherein preferably said gliding action ends outside the main keys/zones of the keyboard so that the system enters the word "pull" and adds a space character to its end.

Note that a single compound gesture resembling to combination of two single gestures may correspond to two different input information. As an example, the compound gesture 494013 of FIG. 48A corresponds to interacting with the keys 494004, 494002, and 494003. On the other hand, the two gliding actions 494014 and 494015 of FIG. 48B correspond to interacting with the keys 494004, 494002, 494002, and 494003.

According to one method, a gesture provided over a number of keys/zones may correspond to interacting with at least some of said keys/zones. As an example, providing a gliding action over a number of keys/zones may be considered as interacting with said keys and/zones if a corresponding word exists in the database of words used by the system. On the other hand, as an example, providing a gliding action over a number of keys/zones may be considered as interacting with some of said keys and/zones if a corresponding word does not exist in the database of words for interacting with all of the keys/zones being interacted. Accordingly, as an example, even if a corresponding word exists for the keys/zones being interacted, in addition to proposing said word/s, the system may also consider some of the zones being interacted and may propose additional corresponding word/s.

According to one example, when a user provides a straight gliding action over the keys/zones 494001, 494007, and 494003, may be considered by the system to two sequences of interactions respectively: the sequence of key/zone interactions 494001, 494007, 494003, and/or the sequence of key/zone interactions 494001, 494003.

Note that the predicted words may preferably be presented to a user each time the system/processor receives a new input information during the entry of a word (e.g. when the gliding action traverses a new/additional zone/key, a new tapping actions is provided, etc.).

Note that a gesture ended outside the main keys/zones of the keyboard may correspond to a full word or it may be related to the beginning portion of a longer word which both may be presented in the corresponding word list to a user. Accordingly, a word entered/selected as such may be one of said words based on the different methods of presentation/selecting a word such as those as described in this application.

According to one embodiment, after a gliding action enters to a location outside the main keys/zones of the keyboard, the system may present the word list under the user's finger so that the user can quickly select a word in the wordlist.

According to one embodiment of the invention, after the user provides a gliding action corresponding to selecting/entering a word (e.g. the gesture ends outside the main keys/zones of the keyboard), the wordlist remains on the screen. At this time several scenarios may be considered such as:

Scenario 1: The user interacts with the word list for example for selecting another word, scrolling within more words, etc. In this case the word list remains on the screen. In the user selects one of the words (e.g. other than the already entered word), the newly selected word preferably replaces the previously entered word. According to one method, the wordlist still remains on the screen for example for more selection, while according to another method the wordlist disappears. Note that after selecting a word, depending on the design of the system, a space character may be entered or not entered at the end of the selected word.

Scenario 2: The user proceeds to a task other than interacting with the word list, such as for example proceeding to entering the input information corresponding to a next word, entering/activating a function, etc. In this case the word list preferably disappears.

Note that at least some of the words (e.g. presented in the word list) corresponding to the input information (e.g. gliding and/or tapping actions provided by the user) may be longer words (e.g. the input information corresponds to the beginning characters of said words).

Note that as shown in the above-mentioned figures (e.g. 45A), at least the space key (e.g. 491006) may preferably be a large key so that to avoid mistyping and accelerate the speed of the data entry.

As mentioned before, providing a gesture that ends outside the main keys/zones may correspond to preferably selecting a word and preferably entering a space character. According to one embodiment of the invention the keyboard of the invention may not include a space key.

According to one embodiment of the invention, when a user provides a gesture on the keypad and wherein the end of the gesture is provided outside the main keys/zones of the keypad, at this time, several scenarios may be considered such as:

Scenario 1: if the user removes the finger from the surface on which the gesture is provided, the system preferably considers that providing the input information corresponding to a word is ended.

Scenario 2: if the user does not remove the finger from the surface on which the gesture is provided, and glides back onto the keypad (e.g. without removing the finger from said surface), the system preferably considers that providing the input information corresponding to a word is not ended and adds the input information corresponding to at last gliding action to the previous input information corresponding to the desired word.

According to one embodiment of the invention, when a user provides a gesture on the keypad and wherein the end of the gesture is provided (e.g. outside the main keys/zones of the keypad) on a zone corresponding to entering a space character, at this time, several scenarios may be considered such as:

Scenario 1: if the user removes the finger from the surface on which the gesture is provided, the system preferably considers that providing the input information corresponding to a word is ended.

Scenario 2: if the user does not remove the finger from the surface on which the gesture is provided, and glides back onto the keypad (e.g. without removing the finger from said surface), the system preferably considers that providing the input information corresponding to a word is ended, and providing the input information corresponding to a new word is started.

According to a preferred method, each of plurality of gliding actions corresponding to a same input information (e.g. a same key interactions) and each ending in a different predefined location preferably outside the main keys/zones may correspond to a different predicted word (e.g. of a proposed word list). For example, each of two such gliding actions wherein one ends on the upper side of the keypad outside the main keys/zones, and the other ends on the right side of the keypad outside the main keys/zones, may correspond to a different corresponding word. Preferably, a such gliding action that ends on the space key/zone may preferably correspond to a corresponding word that matches a predefined condition such as the word having the highest priority among the corresponding words.

According to a preferred method, during the entry of a word, the user may provide at least one gliding action and/or at least one tapping/pressing action on the keypad. Providing each of such interactions generally requires touching the keypad and removing the finger from the keypad. According to this method, the system combines all of said interactions and (e.g. ambiguously) relates them to one or more single words. Providing a predefined signal such as tapping/gliding on a space key may end the procedure of providing such (e.g. combined) input information corresponding to a word.

According to one embodiment of the invention, upon providing an input information by providing a first type of interaction with (e.g. tapping actions on) the keys of the/a keyboard (e.g. of the invention or any other keyboard (e.g. a full keyboard such as a QWERTY keyboard)) the system may present the corresponding words in a first manner/order, and upon providing the same input information by providing a second type of interaction with (e.g. said interactions include at least one gliding action on) the keys of the/a keyboard (e.g. of the invention or any other keyboard (e.g. a full keyboard such as a QWERTY keyboard)) the system may present the corresponding words in a second manner/order.

According to one embodiment of the invention, upon providing an input information by providing a first type of interaction with (e.g. tapping actions on) the keys of the/a keyboard (e.g. of the invention or any other keyboard (e.g. a full keyboard such as a QWERTY keyboard)) the system may present a first group of corresponding words (e.g. from a general database of words), and upon providing the same input information by providing a second type of interaction with (e.g. said interactions include at least one gliding action on) the keys of the/a keyboard (e.g. of the invention or any other keyboard (e.g. a full keyboard such as a QWERTY keyboard)) the system may present a second group of corresponding words (e.g. from another database of words such as a sms database, personal database, professional database, etc.).

Figure 49A:
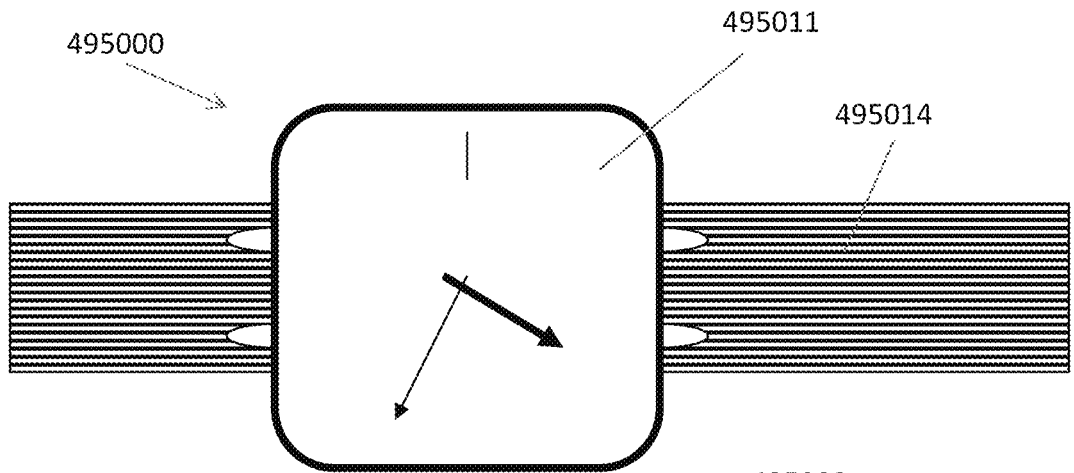
FIG. 49A shows an example of a wrist device having a wrist watch and its band.
Figure 49B:
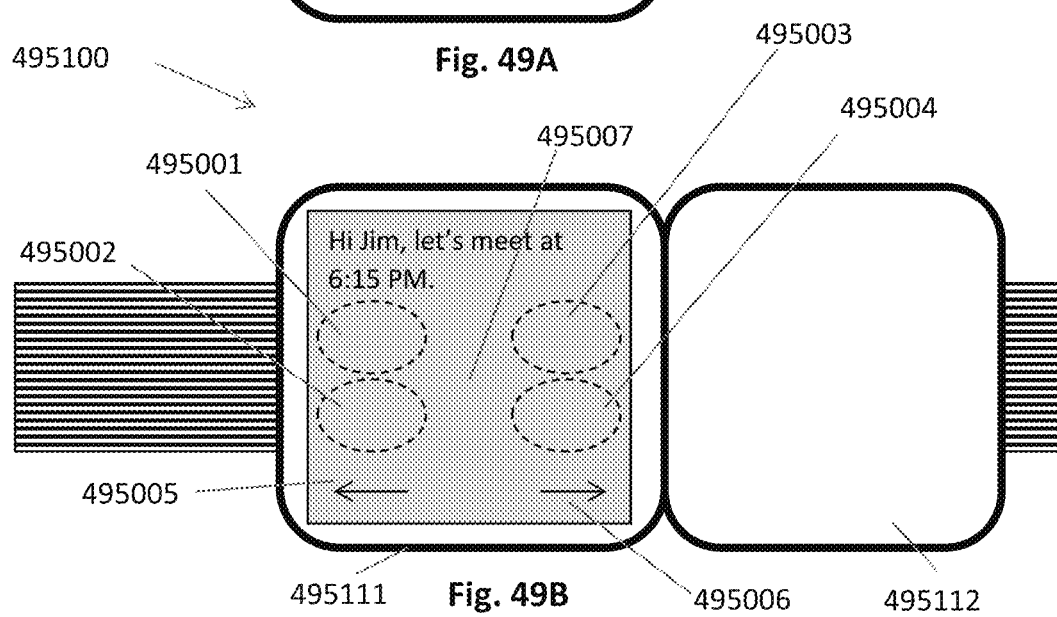
FIG. 49B shows an example of a wrist device with a bracelet including an electronic device.

The data entry system of the invention may be implemented into and/or attached to a wrist apparatus and/or a wristband. FIG. 49A shows a wrist device 495000 having a wrist watch 495011, its band 495014. The watch may be a traditional watch manufactured by a watch manufacturer. As an example, as shown as in FIG. 49B, the bracelet of said watch may include an electronic device such as a wrist communication device 495100. According to one aspect, said electronic device may have a first portion 495111 that preferably includes a display unit 495009, and a second portion 495112 to cover said display for example when the display is not in use. The data entry system of the invention may be implemented within or used by the device. In this example, the data entry system uses an on-screen keyboard having the letter keys 495001 to 495004, the broadly ambiguous zone 495007, the space key 495005, and the backspace key 495006, which are all implemented in the display of the device which uses a touch screen. A user may use said keyboard to enter text.

Figure 49C:
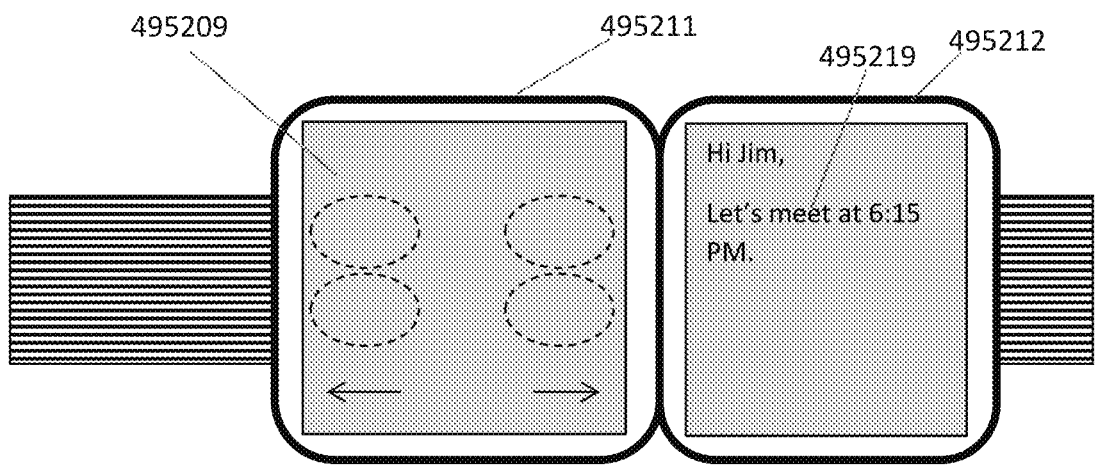
FIG. 49C shows an example of a wrist device where the body and the cover of the electronic device both include a display unit.

In the example of FIG. 49C, a substantially similar device is shown, wherein here the body 495111 of the device and the cover 495212 of the electronic device both includes a display unit, respectively 495209 and 495219. In this example, a first display 495109 is used for input and a second display 495119 is used for output.

Figure 49D:
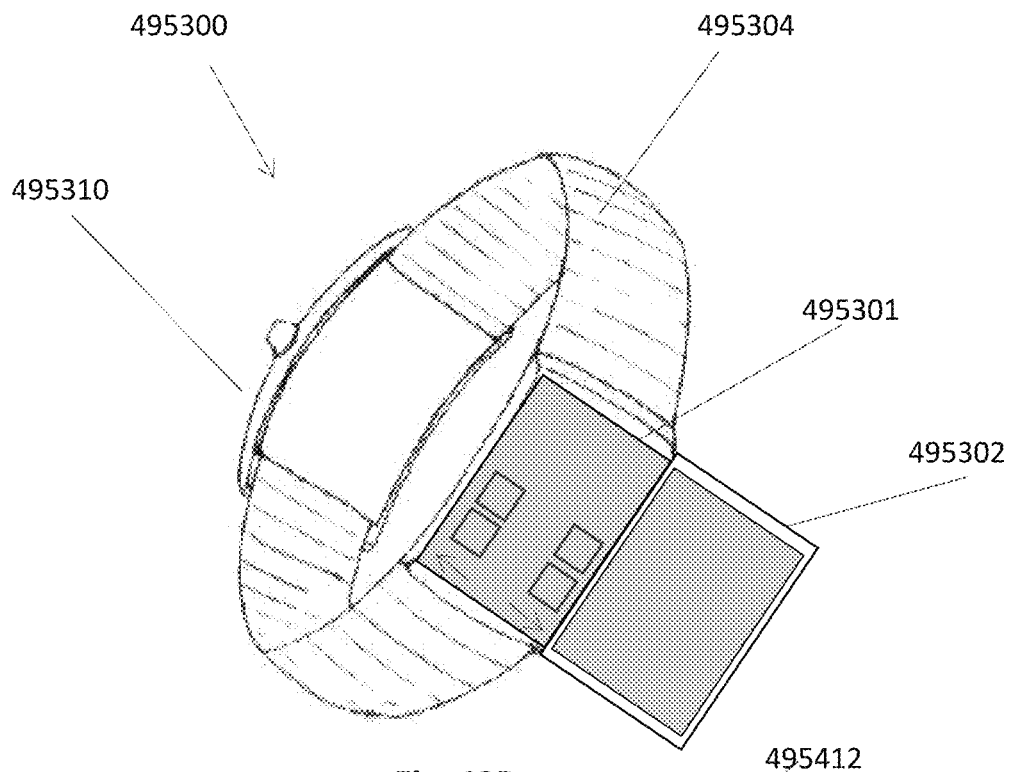
FIG. 49D shows an example of a bracelet.

The advantage of having two devices using a single wristband is in that a watch manufacturer can manufacture a wristwatch regardless of a device (e.g. smartphone) manufacturer may manufacturing a wrist device and wherein a single strap may be used to form a single bracelet. Said watch and electronic device may preferably be located on opposite sides of a user's wrist. FIG. 49D shows an example 495300 of such bracelet. In this example, the wristwatch 495310 is attached to an electronic device, having a body 495301 and a cover 495302, by means of a strap 495304. In this example, the inside of the cover 495302 includes a display unit. Preferably, an input interface is integrated within a touch sensitive surface (e.g. touch screen) in the body of the device 495301. Preferably both display units are used to display contents. According to one method, the input interface may be integrated within the display of the cover. According to one method, the attachments of said strap and the at least the wristwatch may preferably be used those (e.g. commonly) used in the watch industry. According to one method, the cover preferably does not include a display but preferably has a transparent/empty portion so that the user can see at least a portion of the display unit located on the body of the electronic device.

Figure 49E:
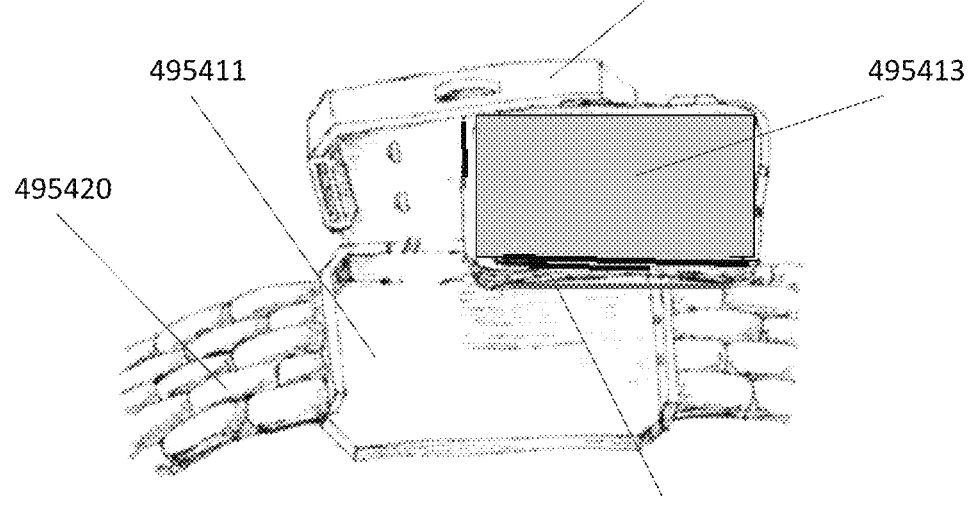
FIG. 49E shows an example of a strap having a housing to removably house an electronic device.

According to one aspect the strap may include a (e.g. at least one) housing so that to (e.g. preferably, removable) house the electronic device and/or the watch. FIG. 49E shows a strap 495420 having a housing 495411 to removably house an electronic device such as mobile computing/phone 495410. Said bracelet may preferably be manufactured by a watch manufacturer according to the style of a corresponding watch to which said bracelet is suitably attached. Preferably the housing may be manufactured such that to cover substantially all of the surfaces of the electronic device. According to one aspect, only the display side of the electronic device may not be covers by the housing. According to another method, the housing may also cover the display of the corresponding device preferably when the display is not in use. For example, the housing 495411 may have a cover 495412 covering the display 495413 of the device 495410 when needed and to recover the display 495413 when needed as shown in FIG. 49E. Note that the housing may have any shape such as square, rectangular, oval, etc. according to a preferred method, the housing may have an easy housing/unhousing system such as a clipping feature, so that to easily permit to house or to remove the device from the housing. Preferably, the housing may include a empty/hollow base permitting to reduce the height of the housing (e.g. when it the device is inserted inside said housing).

Such (bracelet) approach may creating an enormous market for both watch and mobile device manufacturers.

The data entry system of the invention preferably having few letter keys such as four keys permits an easy and quick method of input for devices with any size of screen including devices with tiny screens. One of such devices may be a wrist mounted electronic device.

FIG. 50A shows as an example, a small electronic device 496000 (e.g. in this example being implemented/attached to a wristband 496017) having a touch sensitive surface (e.g. a touch screen) 496009. A data entry system of the invention having a keypad of the invention having few keys such as four letter keys 496001 to 496004, a broadly ambiguous zone 496007, and two more keys/zones 496005 and 496006 preferably respectively representing at least a backspace key and a space key. The keypad of the invention is used to enter some words that are displayed on the screen. FIG. 50B shows as an example said device with a data entry system of the invention having a keypad of the invention having few keys such as four letter keys 496001 to 496004 and a broadly ambiguous zone 496007. In this example, the space and backspace functions are assigned to gestures provided on the keypad (e.g. broadly ambiguous zone 496007)/screen respectively towards right 496106 and towards left 496105.

According to one method, preferably, a few/preferred symbols button/zone and the corresponding features and interactions as described earlier may be implemented with the system. In FIG. 50B, an exemplary few/preferred symbols button/zone 496101 is displayed for example after the entry of a word. methods of interaction and methods of presenting and/or hiding a few/preferred symbols button/zone has been described before.

To enhance some of the functionalities of the data entry system (e.g. interacting with a word list, activating functions, etc.) on preferably small devices different methods of interaction may be considered. As an example, providing a predefined interaction such as a gesture from each of a number of different edges of a device/screen towards inside a/the screen of the device may correspond to the entry or output of a different type of data.

According to one embodiment of the invention, during the entry of a word, providing a predefined interaction such as a gesture departing from a predefined location such as an (e.g. a predefined) edge of a device/screen towards inside the screen may result in presenting a word list having one or more words corresponding to the input information relating to a word being entered by the user. Preferably, one or more words may be shown to the user before/without-requiring providing such gesture. Preferably, the word list is shown on a new window (e.g. hereafter may be referred to a secondary window) at least substantially overlapping or replacing the window wherein a text box and/or the keypad of the invention are located (e.g. hereafter may be referred to a primary window). FIG. 50C shows as an example, the screen of the device of FIG. 50A after the user provides a gesture 496108 from the edge of the device/screen towards inside the screen during the entry of the input information corresponding to a desired word. In this example, the input information being provided by the user corresponds to several words including the word "that" which had been shown before as shown in FIG. 50A as the best match to the user. By providing such gesture, the system may preferably show also said word in the wordlist so that the user may select it to get longer word beginning with said word. Methods of interaction with a word list have been described before in detail. They may be applied to any wordlist such as the one of being described here. For example, providing a gesture downward 496117 or upward 496118 on the word list may result in proposing respectively a next group of corresponding words or a group of (e.g. corresponding words previously being proposed).

Depending on the design of the system, according to one method, after providing a predefined interaction such as selecting/entering a word or providing a same type of gesture from the edge of the divide/screen, the system may switch back to the main window.

Preferably, if a word is not being entered, providing a same type of predefined interaction (e.g. such as a gesture from an edge of a device/screen towards inside the screen) may be related to another functionality such as showing another type of content on the screen.

According to one embodiment of the invention, providing a predefined interaction such as a gesture departing from a predefined location such as an (e.g. a predefined) edge of a device/screen towards inside the screen may result in switching the keyboard into the precise symbol mode wherein at least a large number of special characters are presented to the user for being selected. Preferably, the symbols are shown on a secondary window that at least substantially overlaps or replaces the primary window. As an example, FIG. 50D shows the screen of the device 496000 after the user provides a gliding action 496208 from the left edge of the screen/device towards inside the screen. In this example, two groups of symbols corresponding to the keys 496001 and 496002 are presented to the user. By providing a predefined interaction such as a gliding action 496218 rightward on the screen the system may propose more symbols as shown in FIG. 50E. Providing a gliding action leftward 496228 may result in presenting the previous screen status.

Figure 50F:
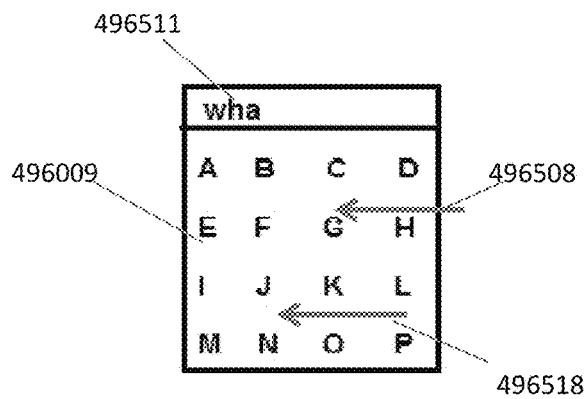
FIG. 50F shows an example of the screen of a small electronic device after a user provides a gesture from the right edge of the device/screen towards inside of the screen.
Figure 50G:
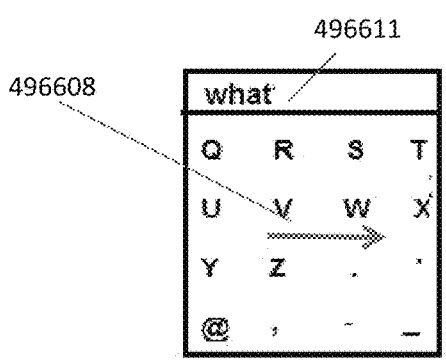
FIG. 50G shows an example of the screen of a small electronic device showing more precise letters.

According to one embodiment of the invention, providing a predefined interaction such as a gesture departing from a predefined location such as an (e.g. a predefined) edge of a device/screen towards inside the screen may result in switching the keyboard into the precise letter mode wherein at least a large number of characters mainly letters are presented to the user for being selected. Preferably, the letters are shown on a secondary window that at least substantially overlaps or replaces the primary window. As an example, FIG. 50F shows the screen of the device 496000 after the user provides a gliding action 496508 from the right edge of the screen/device towards inside the screen. In this example a groups of precise letters are presented to the user. By providing a predefined interaction such as a gliding action 496518 leftward on the screen the system may propose more precise letters as shown in FIG. 50G. Providing a gliding action rightward 496608 may result in presenting the previous screen status. Note that in the examples of FIGS. 50F and 50G, the (e.g. secondary) window corresponding to the precise letters partially covers the screen. The other remaining portion (e.g. respectively, 496511, 496611) of the screen is used to show (e.g. a portion of) the text box so that the user being able to see what he/she types.

Figure 50H:
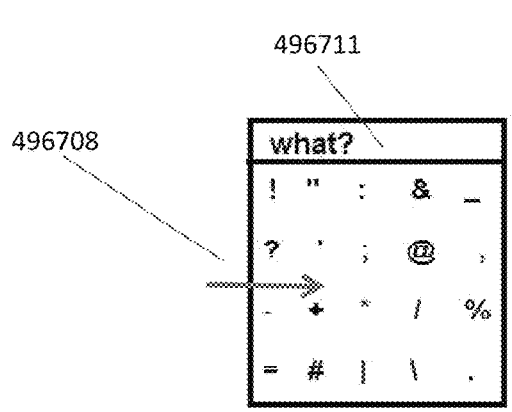
FIG. 50H shows an example of a window corresponding to the precise symbol mode shown to the user after providing the gliding action.

FIG. 50H shows a window corresponding to the precise symbol mode shown to the user after providing the gliding action 496708. In this example, the secondary window covers a portion of the screen and the user can see the special character (e.g. "?") after the word "what", which is entered by interacting with this window.

Figure 50I:
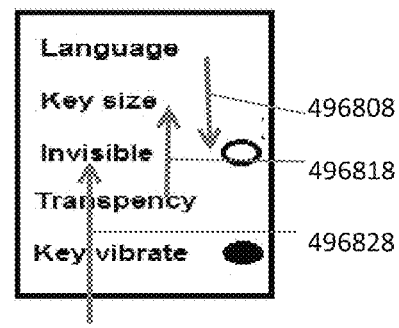

According to one embodiment of the invention, providing a predefined interaction such as a gesture departing from a predefined location such as an (e.g. a predefined) edge of a device/screen towards inside the screen may result in switching the system into the function/setting mode wherein at least a number of functions are presented to the user for being selected. Preferably, the functions are shown on a secondary window that at least substantially overlaps or replaces the primary window. As an example, FIG. 50I shows the screen of the device 496000 after the user provides a gliding action 496808 from the bottom edge of the screen/device towards inside the screen. In this example, a number of functions are presented to the user. By providing a predefined interaction such as a gliding action 496818 upwards on the screen the system may propose more functions. Providing a gliding action downwards 496828 may result in presenting the previous screen status (e.g. previous functions or the primary window).

Figure 50J:
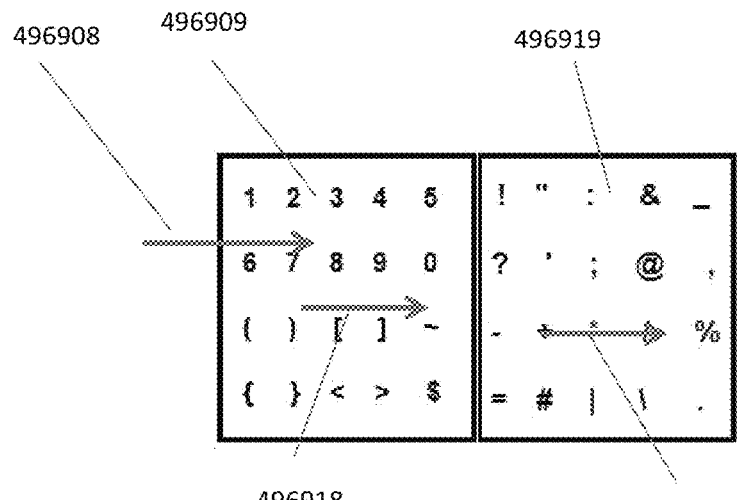
Figure 59Q:
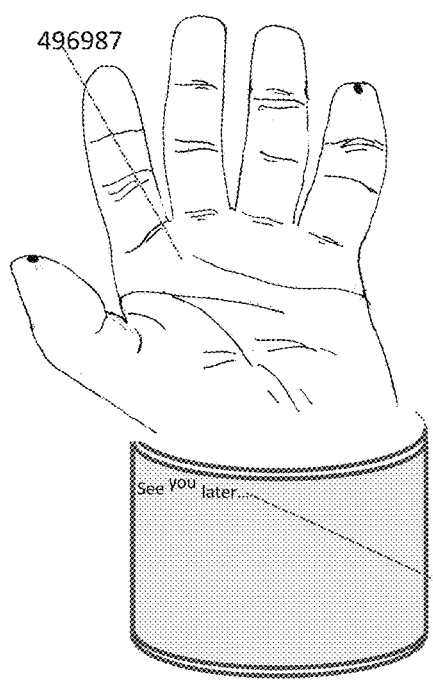

Note that a device may have an extending display. As an example, FIG. 50J shows a device having a main display 496909. Said device has an extending portion with an integrated display 496919. As an example, providing a gliding action 496908 corresponding to switching the system to the precise symbol mode may result in presenting a number of symbols on at least one of the display (e.g. in this example on both displays). A predefined gliding action 496918 may provide more symbols on the screen/s. Providing another predefined interaction 496928 may result in presenting the previous screen/s status.

As mentioned gliding actions from (e.g. a predefined portion of) an edge of a device/screen/touch surface, etc., towards the inside of a touch sensitive surface may be related to interacting with a key of a keyboard model. According to one embodiment, a gliding action traversing one or more times with one or more predefined edges of a device may correspond to interacting one or more times with the key/s of a keypad model.

As an example, FIG. 50K shows touch sensitive surface of a device wherein (e.g. invisible) portions 496731 to 496734 and 496737 of bars/zones/lines located on the edges of the device correspond to the keys/zones (e.g. 496001 to 496004 and 496007) of a keypad model such as the keypad of FIG. 50A. As an example, a substantially horizontal gliding action (e.g. 496721) provided from the upper left side of the edge of the screen towards the inside and ending inside the screen may be related to interacting with the key/zone 496001. As an example, a substantially horizontal gliding action (not shown) from the upper right side of the edge of the screen towards inside and ending inside the screen may be related to interacting with the 496003. As an example, a substantially horizontal gliding action (not shown) from the lower left side of the edge of the screen towards inside and ending inside the screen may be related to interacting with the 496002. As an example, a substantially horizontal gliding action (e.g. 496724) from the lower right side of the edge of the screen towards inside and ending inside the screen may be related to interacting with the 496004. A diagonal gliding action 496723 provided from lower left edge towards the center of the keypad/touch surface may be related to interacting with both the key 496002 and with the broadly ambiguous zone 496007. A gliding action 496725 traversing zone/line 496737 preferably corresponds to interacting with the broadly ambiguous zone 496007. As an example, a substantially horizontal gliding action (e.g. 496722) provided from the upper right side of the edge of the screen traversing the upper-left side of the screen may be related to interacting with the keys 496003 and 496001. And so on.

Note that instead of having the keys in form of lines on the edges of the/a device, narrow keys in form of bars may be used on the corresponding locations (e.g. alongside the edges) so the user may provide either gliding actions as just described or provide tapping actions on said keys.

With continuous description of the current embodiment, according to one method, a gliding action provided from a zone/key, preferably of the keypad, in a first direction (e.g. to the right 496727) may correspond to entering a space character, and a gliding action provided from a zone/key, preferably of the keypad, in a second direction (e.g. to the left 496726) may correspond to providing a backspace function. Preferably, said gliding actions may be required to continue until the corresponding edge of the screen (e.g. exiting from the screen). By using this method, the space key and the backspace key may be eliminated from a/the corresponding keyboard.

According to one embodiment, a curved (e.g. curved upward) gliding action, provided from any predefined edge, and traversing the opposite predefined edge may correspond to interacting with the keys 496001 and 496003. A similar gliding action curved in the opposite direction (e.g. curved downward), but gliding in the same direction (e.g. from start to finish), provided from any predefined edge, and traversing the opposite predefined edge may correspond to interacting with the keys 496004 and 496002. This matter has been described in detail in previous patent applications filed by this inventor. Said details of said interactions may be applied to edge/bar type buttons and/or interactions as described herein.

According to another principle, instead of gliding actions, tapping actions on the zones/bars 496731, 496732, 496733, 496734 and 496737 may correspond to interacting with said zones/bars. Note that principles describes herein may apply to any type of device such as smartphone, tablet, smart watch, etc. As an example, preferably in devices with larger screen the bars may be longer such that interacting with a different portion of a bar/zone (e.g. 496731) correspond to an identified character assigned to said portion and preferably also ambiguously correspond to any of the several characters (e.g. including said identified character) assigned to said zone/bar. Preferably, a space bar and/or a backspace bar may also be located on the edges of the screen.

Methods of dynamically defining an ambiguous zone relating to interacting with a location on a touch sensitive surface and relating said interaction to the characters surrounding/neighboring the interaction position on the screen have been described before in patents applications filed by this inventor. According to one embodiment, the letters (e.g. and one or more special characters) of a language may be arranged on a (e.g. small) zone/surface and by considering this method and using a word prediction system using a database of words, words/text can be entered relatively quickly. FIGS. 50L to 50O show as examples different types of such character arrangements on a touch sensitive surface. As an example, each of the tapping actions 496811 to 496815 provided on the keypad of FIG. 50L may correspond to several characters surrounding the touching impacts on the keypad. As an example, based on a sequence of such tapping actions a word predictive system of the invention may predict one or more words, for example one or more words including the word "input". The arrangement of letters on in FIG. 50O is such that the vowel characters are positioned far from each other (e.g. to augment the accuracy of the word prediction).

It must be noted that according to one method, at any moment during presentation of a secondary window, providing a gesture from one/another edge of the device/screen towards inside the screen may provide a corresponding secondary window. According to one method, two different secondary windows may be shown simultaneously on the screen.

According to one method, in the embodiments above, after providing an interaction (e.g. gesture) to so that the system to present additional secondary window/content, if there is no additional secondary window or additional content to be shown, the system may present the corresponding first secondary window (e.g. looping presentation).

It must be noted, that the principles of principles/embodiments described may be applied to devices with any size of the screen.

It must be noted, that the principles of principles/embodiments described above regarding the presentation of a secondary window may use any type of predefined interaction to switch the system to said secondary window. For example, said gestures may be provided from a zone on the screen such as preferably from the broadly ambiguous zone. As an example, instead of and/or in addition to providing gestured from four different edges of a device/screen towards inside of the screen, four gestures from a broadly ambiguous zone wherein each gesture in provided in a different direction (e.g. up, right, down, left) may provide a different corresponding window as described.

Note that, in the embodiments above regarding the sliding method from different edges of a device/screen towards inside of the screen have been described to correspond to a data entry system, it is understood that said interactions may be related to any other type of functionality/content.

Note that, in the embodiments above regarding the sliding method from different edges of a device/screen towards inside of the screen have been described to correspond different types of functionalities, according to one embodiment, said type of gliding actions may be provided from outside of a predefined-portion/content on the screen towards inside said portion/content to provide different types of functionalities preferably related to said portion/content.

According to one embodiment, two gliding actions provided from different predefined portions of an edge of a device/screen/zone towards inside of the device/screen/zone may correspond to two different windows/functions.

The/a method of capturing a gesture interaction provides from/the the edge of a screen/device towards inside the screen has been described in different patent applications filed by this inventor.

According to one embodiment of the invention, a predefined interaction, such as a double tapping action on the broadly ambiguous zone, may preferably remove the keyboard from the screen According to one embodiment, the ambiguous characters assigned to a key/zone may include one or more special characters. The word predictive system of the invention may consider said characters (e.g. too) when it predicts word/s. According to one embodiment, the group of special characters ambiguously assigned to a key/zone may mainly be constituted of one or more special characters of the group of special characters that, in the precise symbol mode of the system, are represented/located/correspond to the location of the ambiguous key in the ambiguous mode. This matter has already been described in detail in different patent applications filed by this inventor.

Figure 50P:
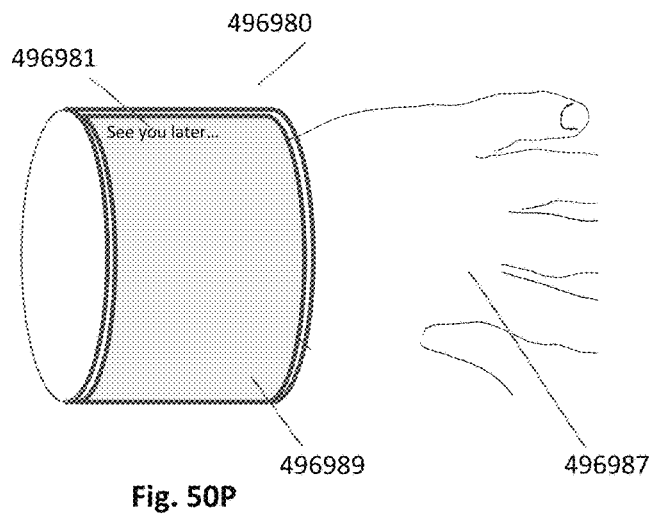
FIGS. 50P shows a type of wrist mounted (e.g. communication) device(s).
Figure 50R:
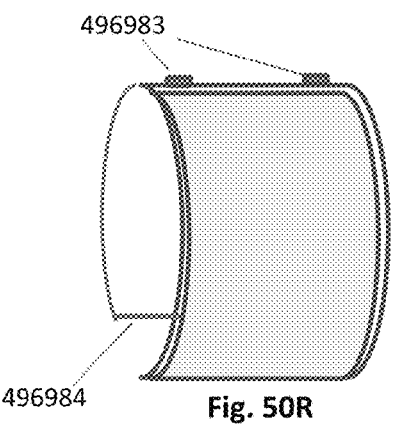
FIG. 50R shows an example of a wrist mounted device having attaching/detaching means.
Figure 50S:
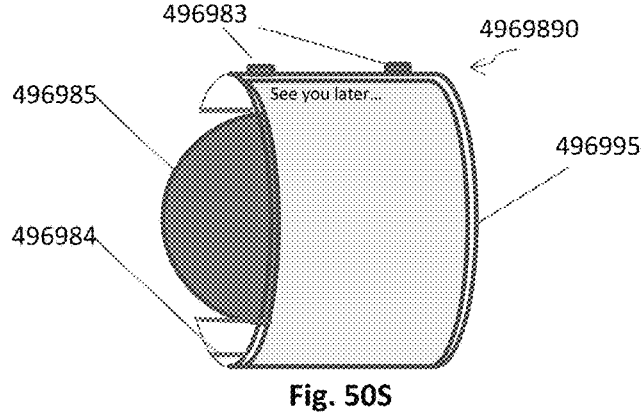
FIG. 50S shows an example of a wrist device having a strap including a communication device.
Figure 50T:
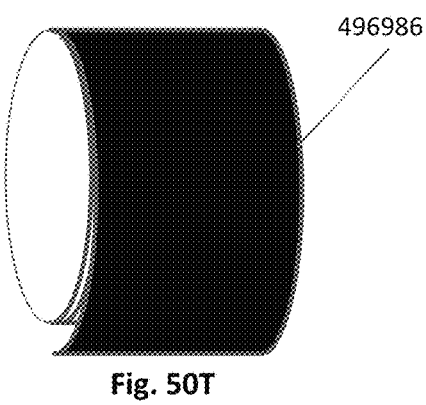
FIG. 50T shows an example of a screen of a device having a cover.

FIGS. 50P to 50S, show another type of wrist mounted (e.g. communication) devices. FIG. 50P shows a wrist-mounted device 496980 in form of a bracelet having a curved/flexible touch sensitive display unit 496989 wherein on which a text 496981 is presented. Preferably, the screen is large enough to circumferentially cover at least a large portion of the user's wrist. The data entry system of the invention may be used/implemented in said device. In this example, the user's arm/hand and the corresponding text 496981 are in horizontal position. FIG. 50Q shows as an example, the user's hand in vertical position. In this case, according to one method, the screen of the device may preferably automatically change the orientation of the contents printed on it. In this example, the text 496981 is shown in landscape mode. Note that, as shown in FIG. 50R, said wrist-mounted device may include attaching/detaching means (e.g. including, Velcro, hinges 496983, clasp 496984, etc.) so as to be attached/detached from the user's hand/arm. The screen of the device may include a cover 496986 (e.g. rigid, flexible) as shown in FIG. 50T.

According to one embodiment, the wrist-mounted device may be in form of a strap having a communication/computing device. Said strap may be attached to a (e.g. conventional) watch. FIG. 50S, shows as an example, a wrist-mounted device 496890 having a strap 496995 including a communication device. Said strap may be (e.g. detachably or fixedly) attached to a (e.g. conventional) watch unit 496985.

According to one embodiment, providing a first type of gliding actions (e.g. gliding actions not including a press and holding action) in different predefined directions on/from a key may correspond to a first type of different corresponding symbols (e.g. mainly letters), and providing a second type of gliding actions (e.g. gliding actions including a press and holding action) in different predefined directions on/from a key may correspond to a second type of different corresponding symbols (e.g. mainly special characters). Preferably, when a key is touched, the touching point may be considered as the center of a virtual copy of the key which may or may not be shown under the user's finger.

In this example, a gliding action provided from the center of a such virtual key towards or traversing a letter/character located on said key may correspond to entering said letter/character. Accordingly, a gliding action including a press-and-holding action provided from the center of a such virtual key towards or traversing a special character located on said key may correspond to entering said special character.

Figures 51A, 51B, 51C:
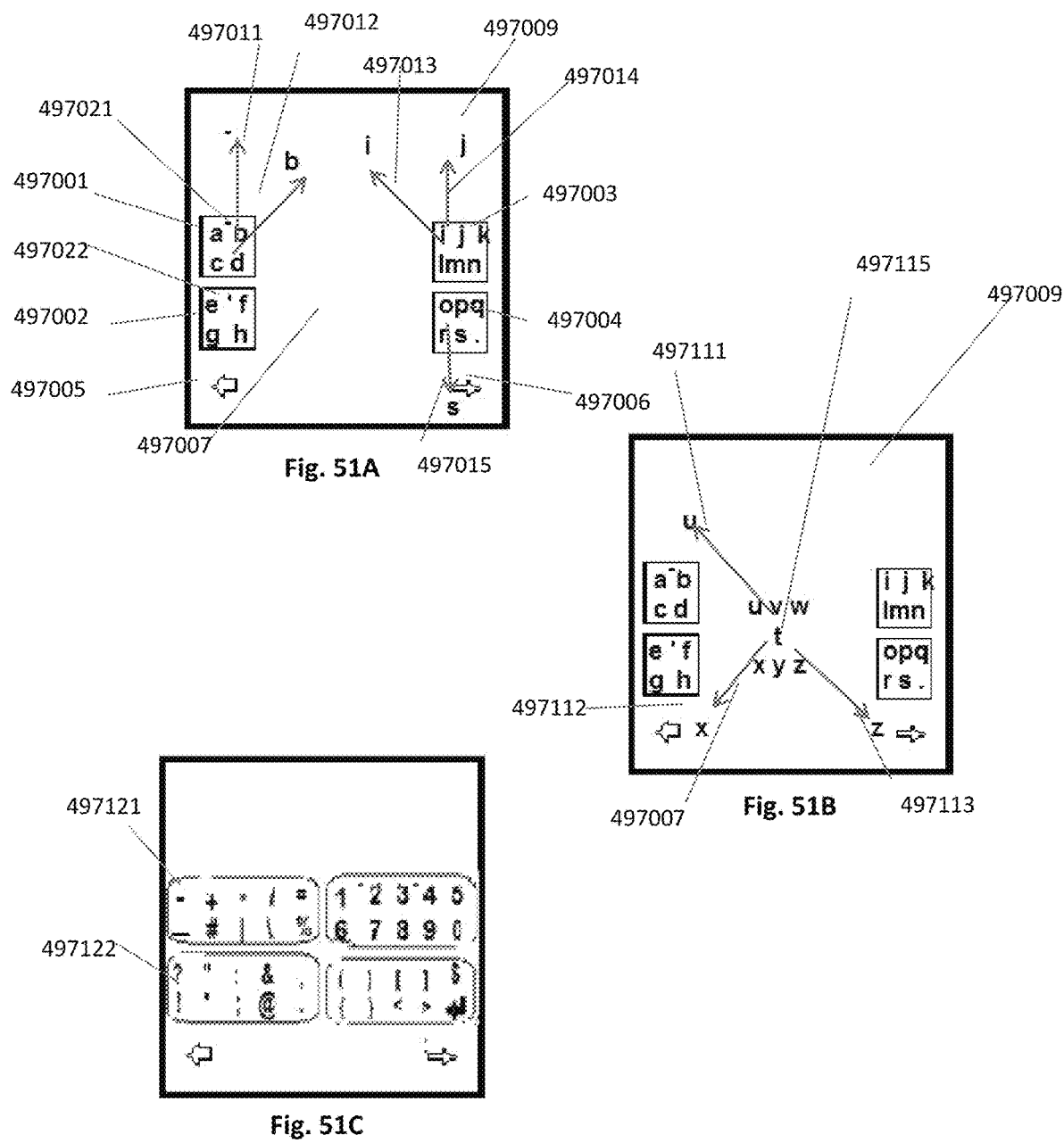
FIG. 51A shows an example of a virtual keypad located on a touch screen.
FIG. 51B shows an example of letters assigned to a broadly ambiguous zone.
FIG. 51C shows an example of a keypad in the precise symbol mode.

FIG. 51A shows as an example, a virtual keypad of the invention located on a touch screen. Said keypad has four letter keys 497001 to 497004, the broadly ambiguous zone 497007, a space key 497006, and the backspace key 497005. Note that in this example, the character "-" 497021 along with several letters A, B, C, D, and the character "_" 497022 along with several letters E, F, G, H are respectively ambiguously assigned to the key 497001 and 497002. The arrangement of letters on the keys of the keypad (e.g. clearly/easily) permits a user to enter a desired precise/identified letter by providing a gliding action on/from a key based on principles just described. For example, the provided gliding actions 497011, 497012, 497013, 497014, and 497015, respectively correspond to the letters-, b, i, j, and s. According to one embodiment, the letter assigned to the broadly ambiguous zone may or may not be shown on the screen but may follow the same principles for entering them precisely. Preferably, one of the characters (e.g. "t") assigned to said zone may precisely be entered by providing a press and holding action on said zone. The rest of the characters may be entered according to the principles just described. As an example, as shown in FIG. 51B the letters assigned to the broadly ambiguous shown are shown and arranged such that to guide the user about the direction of gliding action to provide regarding a specific letter. As an example, the gliding actions 497111, 497112, and 497113 may respectively correspond to the letters u, x, and z. As mentioned, in this example, entering the letter 't' is assigned to providing a press and holding action anywhere in the broadly ambiguous zone 497007, therefore said letter is printed in the center of the other letters. It is understood that entering the letter "t" may be assigned to a gliding action in a specific direction such as to the rightward on/from said zone. Other methods for entering specific characters such as other types of gliding actions, and/or other (e.g. types of) different directions assigned to different specific characters may be considered by people skilled in the art.

Preferably, the special characters ambiguously assigned to the keys of the keypad in ambiguous mode are mainly from the corresponding group of special characters printed/presented on the screen when the system is in the precise symbols mode. As an example, as shown in FIG. 51C, in the precise symbol mode, preferably, the arithmetic characters (e.g. 497121) and punctuation marks (e.g. 497122) are printed/located on the screen such that their locations on the screen respectively correspond to the location of the keys 497001 and 497002 of the keypad of FIG. 51A in the ambiguous mode.

According to one embodiment during the entry of a word, the size of the keys/zone(s) of the keyboard and/or the invisible zone around the keypad may be enlarged so as to reduce or eliminate mistyping. Preferably, the enlarged portions may be invisible so as not to obscure the visibility of the content printed/presented on the screen. Preferably this option may be activated or deactivated from a menu such as a/the settings of the input method.

According to one embodiment of the invention, a word list may include up to a predefined number of words, for example up to five words, wherein each of said words in presented or related to a different color corresponding to the colors of the keys/zones of the keypad. As such, providing an interaction (e.g. such as a gliding action) with a key/zone with a predefined color may correspond to entering or selecting the word in the word list with the corresponding color. Preferably, the gestures may be provided from the edge of the screen (e.g. corresponding to a corresponding key) towards inside the screen. According to one method, the edges of the screen may include different bars in different colors each corresponding to the color related to one of the words of the wordlist so that the sliding action being provided from a corresponding bar. Note, that different characteristics of a bar other than color may be considered.

According to one embodiment of the invention, a number of words may be entered and/or selected to constitute a phrase and be saved for example in a database and preferably later be used by a data entry system such as the data entry system of the invention. As an example, at any moment during the entry of a text a user by means (e.g. a gliding action, downwards on the right side of a keyboard) of a predefined interaction, may inform the system to record a text (e.g. one or more (e.g. preferably consecutive) words) preferably provided after (e.g. or before) said interaction (e.g. the recorded phrase may include a word being entered if said interaction is provided in the middle of the entry of a word). Said phrase may be ended by providing the same or another predefined interaction. Said phrase may preferably be recorded or saved as a 1-gram entry of a database. For example, first and last name of a person may be entered or recorded as such.

Note that during recording a text such as a word or a phrase or etc., in addition to the text input information (e.g. characters) corresponding to said text, other input information corresponding to said text (e.g. herein may be referred to as text characteristics) such as one or more functions such as at least one editing function (e.g. Enter (e.g. Next Line (e.g. \n)) Function, color, font, etc.) or other functions corresponding to said phrase provided during the entry of said phrase may be recorded too. As an example, the input information corresponding to a phrase such as "best regards, John" to be printed in two lines "Best regards," and "John" may be entered by:

a) providing a gliding action informing the beginning of the entry of a phrase to be recorded/stored.
   b) Typing the words "best regards,"
   c) Pressing the Enter/NextLine key
   d) Typing the word 'John'
   e) Providing a gliding action corresponding to the ending of input information and/or recording of said phrase.

The/a corresponding entry of a database, may include all of the input information provided for a corresponding recorded phrase.

According to another embodiment, for the purpose of recording a phrase, for each word of the phrase, the user may provide a predefined interaction such as a gliding action as described.

Note that as an example, during an entry of a text, a gliding action (e.g. 488223 of FIG. 42D, or 488224 of FIG. 42E) provided downwards from right keys/zones/side of any keyboard such as the split keypad of the invention and/or a precise keyboard such as a QWERTY keyboard, may correspond to informing the system that the words (e.g. preferably including a word being entered) provided from that moment may be recorded and saved as a phrase as just described, According to one embodiment, the words of a database of words used by the system may include text characteristics (e.g. font, color, size, etc.). In this case, as an example, two similar words each having a different text characteristic may be considered as being two different words by the system. As such, the input information provided by a user for creating and/or searching a text (e.g. word, phrase) may include one or more of said characteristics. As such, during the entry of a text by a user, in addition to the text input information provided by the user, the system also considers the corresponding text characteristics (e.g. the user provides the input information corresponding to a word/phrase after selecting an italic font) and responds accordingly. For example, after receiving the input information (e.g. including text input information and text characteristic information) corresponding to a word, according to a first method, the corresponding words (e.g. "this") of the database having the provided text characteristics may be considered by the system with higher priority over the corresponding words (e.g. "this") without having said text characteristics. As an example, in this case, the system may preferably give priority of presentation/proposing to the corresponding text including said characteristic. According to a second method, the corresponding words without having said text characteristics may not be considered by the system.

According to one embodiment, in the word list, tapping on a word/stem may enter said word/stem and preferably may result in adding a space character at the end of the entered word. Accordingly, providing a gliding action (e.g. rightwards) on/from a word of the word list may select said word, and the system may propose more longer word(s)/stem(s) beginning by the selected word/stem.

It must be noted that the term 'word' used through this application may be considered as a word, a gram of an entry of a database of words, an entire entry of a database of words, compound word, composite word, phrase, a character, etc., creating and/or entering such a word may be herein referred to as creating and/or entering a text portion.

As mentioned before, when a keyboard is in its precise/enlarged mode, the left and right keys can be distanced from each other, while the bottom key(s) may or may not (be) moved, as shown in FIG. 53 wherein the multi-mode keys/zones 499001 and 499003 are distance from the multi-mode keys/zones 499002 and 499004, and the multi-zone key/zone 499007 is preferably situated under the distanced keys and preferably close to the center of the keyboard. In this example, the zone 4990071 (e.g. herein may be referred to as a/the 'neutral zone') between the distanced left and right keys may be used as a function zone/key, such as, for example, a space key. This is beneficial because as mentioned earlier, in a precise/enlarged mode, a user may tap anywhere on a multi-mode key/zone. Preferably, for one hand (one thumb) use of a keyboard, in order to not excessively move his/her finger, the user may preferably tap on each of the multi-mode keys close to the center of the corresponding keyboard, and in this case, having the space zone 4990071 in the center of said keyboard may be beneficial for comfortable and/or fast typing. Note that more than one neutral zone may be included/used with a keypad. For example, as shown in FIG. 53A, two neutral zones 4990071 and 4990072 may be used to provide any of the functionality of the space and backspace keys/zones of the invention, respectively. Note, any combination whether including or excluding any number of keys (e.g. space or/and backspace keys) may be used by people skilled in the art. For example, in FIG. 53A space key/zone 499006 and backspace zone/key 499005 may be excluded from the keypad.

According to one embodiment, providing a predefined interaction such as a gesture towards the left on the zone 4990071 may correspond to changing the functionality of said zone to the backspace function. After such interaction, tapping actions on said zone correspond to backspacing. Accordingly, providing another predefined interaction such as a gesture towards the right on zone 4990071 may correspond to changing the functionality of said zone back to the space function. Note that, preferably, any of such gestures may also provide respectively, a backspace function and a space function.

FIG. 53B, shows another example/arrangement of the multi-mode keys/zones of an enlarged keyboard of the invention. In this example, multi-mode key/zone 499007 is positioned on the right side of the keyboard while the space key 4991071 is positioned in the center of the keyboard, and the backspace key 499005 is position on the left side of the keyboard.

FIG. 53C shows another example/arrangement of the multi-mode keys/zones, space key, and backspace key of an (e.g. enlarged/precise) keyboard.

The zone 4990071 may also correspond to mouse (e.g. navigation) functions as described throughout this and previous patent applications filed by this inventor (e.g. by providing gestures in predefined directions, wherein said gestures preferably include a long-pressing action).

Note that, preferably, upon interaction with multi-mode key/zone, said key/zone may be highlighted.

According to one embodiment, a keyboard (e.g. of the invention) in any of its modes and/or orientation (e.g. relating to a device) may be resizable. Any means for such purpose may be used. Said means, herein referred as 'resizing means', for example, may be a slider, a interaction such as a pinch (e.g. on a touch screen), etc. Said resizing may be stored/memorized for any state of said keyboard. A stored state may be recalled when the system is in a corresponding mode and/or orientation. A keyboard may be displayed according to its state and/or orientation. The resize function may be limited to a predefined number of states or sizes, or it may be unlimited to any size as may be controlled by a user. Preferably, at least the space and backspace keys may be limited to a minimum size so as to be useable.

According to one embodiment, a resizing means may be a predefined gliding action provided on a bar such as the 'few symbols button/bar'. As an example, a gliding action upwards on said bar enlarges the keyboard in its corresponding mode, while a gliding action downwards on said bar reduces the size of the keyboard in its corresponding mode.

In the example of FIG. 53, providing an predefined interaction such as a gesture upwards or downwards from the zone 4990071, may respectively correspond to increasing/decreasing the height of the corresponding keyboard, preferably according to the (e.g. length of the) gesture.

Accordingly, providing a predefined interaction such as a gesture in a diagonal direction upwards or downwards, may respectively correspond to increasing or decreasing both the height and width of the corresponding keyboard, simultaneously and proportionally to the angle and length of said gesture.

Accordingly, providing a predefined interaction such as a gesture leftward and rightward may set the keyboard to a corresponding first and second size.

FIG. 53D shows an exemplary keypad of the invention having four (e.g. ambiguous) keys/zones 499001-499004 and a broadly ambiguous zone 499007. In this example, the broadly ambiguous zone 499007 partially occupies the area between the first group of keys/zones 499001, 499003, and the group keys/zones 499002, 499004. The rest of the area 499008 is assigned to (e.g. other) functions/symbols such as space and backspace functions. Preferably, the area 499008 is primarily used as a space key/zone 499006. Preferably, a predefined interaction such as a gliding action (e.g. 499018) provided from said zone 499008 towards for example the left may correspond to a backspace function. Preferably, after providing such predefined interaction, (e.g. in addition to a backspace) the functionality of said area is changed to backspacing function (e.g. 499005 of FIG. 53E) such that, for example, a tapping action on said area may preferably correspond to a backspace function. Said functionality may be switched to a space function by providing a predefined interaction such as a for example a gliding action towards right from said zone, or (e.g. automatically) upon said user's interaction with any other keys/zones, for example, for typing a character. Note that all/some of the functionalities assigned to the space and/or backspace keys/zones as described in this and previous patent applications may be assigned to said area 499008 in a corresponding mode. For example, when said zone 499008 has space functionality, an interaction such as a gliding action including a press and holding action provided from said zone in any direction may move the keypad on the screen in said direction. For example, when said zone 499008 has backspace functionality, an interaction such as a gliding action including a press and holding action provided from said zone in any direction may change (e.g. increase or decrease) the distance between the keys/zone 499001, 499003 and the keys/zones 499002, 499004. Note that the corresponding key/zone may present to the user an icon representing the current mode of said zone/key. For changing the size of the keys, a means such as predefined interaction (e.g. pinching with two fingers) may be provided on the keypad.

The keypad just described above, can be extremely minimal in size while being comfortably for typing, for example, even for people who have large fingers. As an example, as shown in FIG. 53F, such keypad may be integrated in a small device such as for example, a smart watch 499111, smartphone, a pendant-type device, etc. In FIG. 53G, said keypad is shown in its invisible mode.

Different methods of using sweeping/swiping actions (e.g. gestures) corresponding to interacting with more than one key and/or more than one time with a key (e.g. combined with/without tapping actions on the keyboard) have been described before by this inventor. According to one method of the invention, the enlarged/precise keyboard preferably having a neutral zone may be used with such gestures so as to provide an easy, quick, and accurate text entry method. Having a neutral zone with a keyboard may permit consecutive interactions with one or more keys/zones (e.g. multi-mode keys/zones) without the need for the user to traverse an undesired key/zone since the user's gesture may traverse from any key to any key (including the same key), through a/the neutral zone if needed (e.g. because by traversing a/the neutral zone may preferably not be considered as interacting with a key/zone relating to character(s)).

Figure 54A:
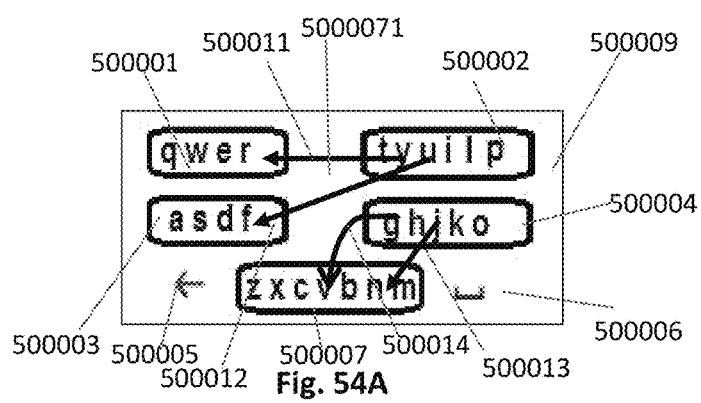

FIGS. 54A to 54H demonstrate an exemplary embodiment of such method which preferably includes multi-mode keys/zones, preferably a touch sensitive surface 500009, for example, a touchscreen. Note that the number designations for key/zone and for the neutral of FIG. 54A also applies to keys/zones and neutral zone of FIGS. 54B to 54H. As shown in FIG. 54A the gesture 500011 corresponds to interacting with the keys 500002, 500001. The gesture 500012 corresponds to interacting with the keys 500002, 500003. The gesture 5000013 corresponds to interacting with the keys 500004, 500007. The gesture 500014, traversing the neutral zone 500071, also corresponds to interacting with keys 500004 and 500007.

Figure 54B:
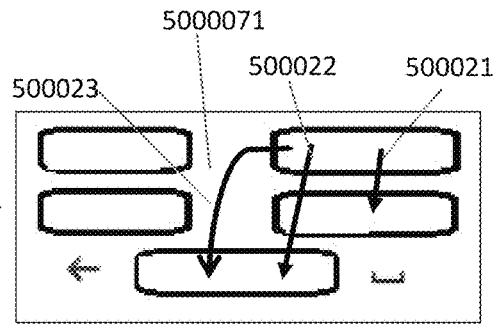

In FIG. 54B the gesture 500021 corresponds to interacting with the keys 500002 and 500004. The gesture 500022 corresponds to interacting with the keys 500002, 500004, and 500007, while the gesture 500023 corresponds to interacting with keys 500002 and 500007 because traverses the neutral zone 500071. Although the departure and destination keys/zones of the gestures 500022 and 500023 are identical, the corresponding input information are not identical because the gesture 500022 also traverses the key 500004 while the gesture 500023 traverses the neutral zone 500071.

Figure 54D:
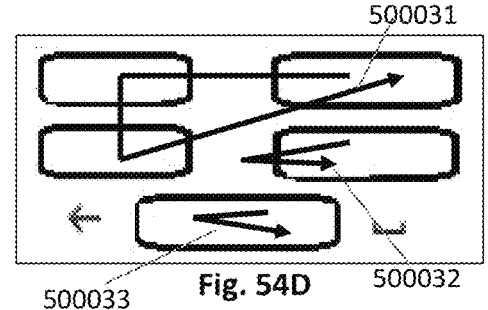
Figure 54C:
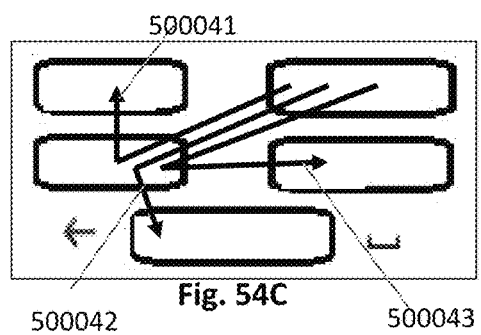
Figure 54E:
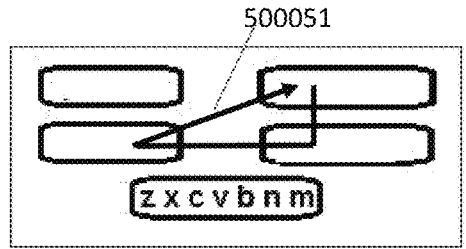
Figure 54F:
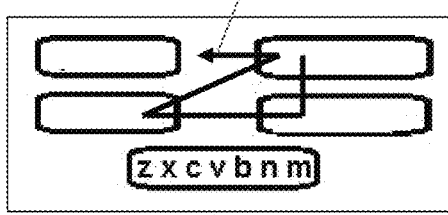

In FIG. 54C, the gestures 500041, 500042, and 500043 begin on key 500002, traverse the neutral zone 500071, traverse the key 50003 and respectively end on the keys 500001, 500007, and 500004 to respectively correspond, for example, to the words 'use', 'tax', and 'tag'.

In FIG. 54D, the complex gesture 500031 corresponds to interacting with the keys 500002, 500001, 500003, and 500002, corresponding to a number of words such as the words 'left', 'text', for example. Note that a back and forth gesture provided on a key/zone or from a key/zone towards a neutral zone and back to the same key may preferably correspond to consecutive interactions with a/the same key. As a first example, the gesture 500032 corresponds to interacting with key 500004, the neutral zone 500071, and the key 500004 corresponds to two consecutive interactions with the key 500004, corresponding to the words, for example, 'go' and 'ok'. As a second example, the gesture 500033 corresponds to interaction twice with the key/zone 500007.

As mentioned earlier in this application and previous applications, the gestures may be combined with tapping actions for entering a word. Also, multiple separate gestures, each corresponding to a different portion of a word may be used to enter a word. Also, an auto-spacing system or a manual spacing may be used at the end of the input information (e.g. gestures and/or tapping actions) provided by the user for the entry of a word.

With continuous description of the current methods and embodiments, if a gesture is ended in a neutral zone, the system may enter a word and the system may preferably append a space character to the end of said word. The complex gesture 500051 of FIG. 54E corresponds, for example, to input information corresponding to the word 'that'. According to one method, the system may not automatically provide an end-of-word signal such as an auto-space, because, for example, the system may expect further key interactions. The complex gesture 500052 of FIG. 54F also corresponds to the word 'that', for example, but in this case the gesture is ended in the neutral zone 500071 which preferably corresponds to an end-of-word signal such as a space character. In this case, preferably the word 'that' is entered and a space character is appended to the end of the word. In the case that the system enters a word (e.g. into a text field), with or without a space character, the system may also propose other corresponding words so that in case the user selects one of said proposed words, the system replaces the entered word by the selected proposed word. However, if the user does not select any of the other proposed words, and for example, proceeds to entering further input information, the system cancels said proposed words (e.g. removes proposed words from the screen of a touchscreen).

Figure 54G:
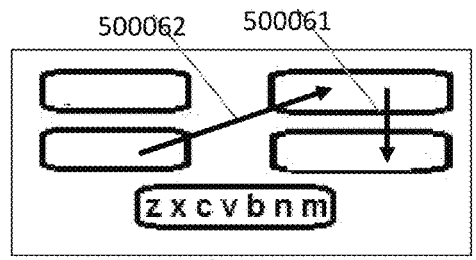
Figure 54H:
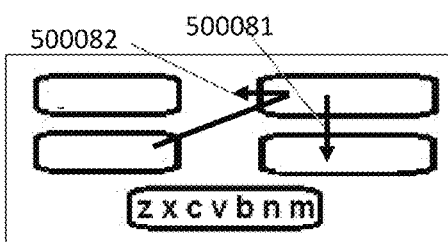

In the example FIG. 54G, the input information corresponding to the word 'that' is provided by two consecutive gestures 500061 (corresponding to interacting with the keys 500002 and 500004) and 500062 (corresponding to the keys 500003 and 500002). In FIG. 54H, for example, the gestures 500081 and 500082 correspond to entering the word 'that' but in this case the gesture 500082 is ended in the neutral zone 500071.

According to a preferred method, a complex gesture can be provided anywhere on the keyboard (e.g. of the invention, preferably having a neutral zone as described herein), regardless of interacting with the corresponding keys/zones. As an example, according to this method, the system may easily relate the complex gesture 500051 of FIG. 54E to, for example, the word 'that', even if it is not provided on the corresponding keys/zones. The shape of such complex gesture is considered as input information, and such input information may recognized by the system as interacting with the correspond keys/zones (e.g. and neutral zone) of the keyboard. According to a preferred method, the system dynamically analyzes the shape of the gesture to related it to the corresponding key interactions. According to another method, the system search for a resembling pattern in a database of gestures.

According to one embodiment of the invention, if a gesture is a straight gesture beginning from a first key and ending and a last keys, and traversing one of more middle keys, the system may or may not consider said middle keys. Preferably, if said gesture is a non-straight gesture such that it changes direction on each of the middle keys, then preferably said middle keys may also be considered by the system.

Note that some or all of the methods/features/aspects/principles/embodiments of interaction with more than one key and/or more than one time with a key (e.g. combined with/without tapping actions on the keyboard) as described through this application and previous application filed by this inventor, may be combined.

According to one method, the size of the keys and the displayed characters on said keys may be such that to enable the user to view the characters while providing a gesture on the keys/zones.

According to one method, upon providing a gesture over one or more keys, the system may relate said gesture to interacting with one or more multi-mode keys/zones, the system may also relate said gesture to a number of precise characters (e.g. including its neighboring characters) on or near where (e.g. the path of) a gesture was provided, or near where the acceleration and/or direction of said gesture changes, etc.

Preferably, a substantially straight gliding action (e.g. 500011 of FIG. 50I) traversing at least 2 keys may correspond to interacting with source and destination keys/zones (e.g. keys/zone 500002 and 500007, e.g. of a keypad of the invention in split mode). If a user desires to also interact with any of the others keys in addition to source and destination keys/zones (e.g. said other keys/zones may herein be referred to as middle keys/zones), the user may change a feature of a gliding action for each of said middle keys/zones, for example, change of speed, direction, pressures, etc. For example, the gliding action 500012 of FIG. 54I may correspond to interacting with the keys/zones 500002, 500004, and 500007. FIG. 54I shows the same interactions on a keypad of the invention in a non-split mode. Accordingly, the gliding actions 500051 and 500052 respectively correspond to interacting with the keys/zones 500003, 500004, and the keys/zones 500003, 500007, 500004 of the minimal keypad of FIG. 54M.

Providing a gliding action on a single key/zone may preferably correspond to two interactions (e.g. two tapping actions) on with said key/zone. Preferably, the order of presentation of the corresponding letters on the key/zone corresponds to the direction of the gliding action. For example, as shown in FIG. 54K, the gliding 500031 provided on the key 500002 may preferably correspond to the word "up" and the gliding action 500032, provided on the same key, may correspond to the word "it". Note that, such a gliding action may correspond to a portion of a word. In this case, in addition to considering to ambiguous interactions with the corresponding key, the direction of such gliding action preferably restricts the number of choices. For example, a tapping action on the key/zone 500003 and providing the gliding action 500031, may preferably correspond to the word "ail", while the tapping 500003 and the gliding action 500032 may preferably correspond to the word "fit". Note that the direction defined by two or more predefined actions (e.g. tapping actions) on an identical key/zone may correspond to a gliding action (e.g. simple or complex) on said key in the corresponding direction.

A gliding action ending outside the letters keys/zones of a keypad may correspond to entering a precise character and/or a function. For example, the gliding action 500041 starting and ending on two letter keys/zones 500001, 500003 may correspond to interacting with said two keys, and a gliding action 500042 provided from the key 500001 traversing the key 500003 and ending outside the keypad of the invention, may correspond to the Spelling Help feature/function of the invention.

According to one embodiment of the invention, during the typing of a word, if a character being typed is a (e.g. precise) special character and no corresponding word(s) are found in the database of word used by the system, a word corresponding to the input information excluding said special character may be entered. Preferably, said special character is also added to the end of the entered word.

Note that (e.g. in addition to letters) the special characters entered ambiguously and/or precisely by in interacting with a key/zone during the entry of the input information corresponding to a word, may be considered by the system to predict a word. Note that one of the zone/keys of a keypad may be assigned to mouse functions as described before.

Note that the input means of the keypad of the invention may be implemented in various technologies, by those skilled in the art. For example, the keypad of the invention may be implemented on a touch sensitive surface such as a touchscreen or touchpad, in the air detected by a motion sensor(s), on physical keys of a physical keyboard, etc.

The prediction of the words using the data entry system may dynamically vary based on some parameters. According to one embodiment of the invention, based on users' interaction with the keyboard during the entry of a chain of characters such as a word, the system may automatically use various methods of prediction.

According to a first procedure, during the entry of a word if two impact point(s) on a predefined area (e.g. the right side or the left side of the keyboard, preferably defined by a line that separates the right and left keys/zone) of a keyboard are located within the same (e.g. preferably vertical) axis, where said axis has a predefined width, may preferably inform the system that each of the input signals, of a corresponding impact, ambiguously corresponds to any of the characters assigned to the corresponding key/zone (e.g. herein may be referred to an ambiguous input signal). As an example, in FIG. 55A, tapping on twice on the letter 't' 501011 may ambiguously correspond to several words, such as, 'it' and 'up'. As another example, tapping on the letter 't' 501001, 'g' 501012, 'g' 501012, may ambiguously correspond to several words, such as 'too' and log.

According to a second procedure, during the entry of a word if two impact point(s) on a predefined area of a keyboard are not located within the same (e.g. preferably vertical) axis, may preferably inform the system that each of the input signals, of a corresponding impact, precisely corresponds to an identified character on and/or near which the impact was provided (e.g. herein may be referred to an unambiguous input signal). As an example, in FIG. 55A, tapping on the letter 'u' 501021 and the letter 'p' 501022 may precisely correspond to the word 'up'. According to another example, tapping the letter 'h' 501031 and the letter 'i' 501032 may precisely correspond to the word 'hi'. Note that the system may use a word completion software to (e.g. also) predict longer words including one or more identified characters. Note that, preferably, one of the words predicted as such, may be entered by providing a preferred interaction, such as pressing the space key.

Note that in the first procedure, preferably, in addition to relating the impacts to ambiguous input signals, the system may also relate said interactions to unambiguous input signals and propose a corresponding chain of unambiguous characters. Note that in the second procedure, preferably, in addition to relating the impacts to unambiguous input signals, the system may also relate said interactions to ambiguous input signals and propose one or more corresponding words.

According to one method, upon determining a procedure, the system may preferably first propose one or more words based on said procedure. If needed, the system may (e.g. further) propose one or more words based on another procedure (e.g. the other procedure).

Note that the first and second procedures may be combined to predict one or more words. As an example, during the entry of a word, one or more impacts may be related by the system to ambiguous input signal(s) and one or more impacts may be related to unambiguous input signal(s). As an example, during the entry of a word, if the majority of impacts are provided within the same (e.g. vertical) axis, and one or more other impacts are provided outside said axis, the system may preferably relate the impacts inside said axis to ambiguous input signals and may preferably relate those impacts outside said axis to unambiguous input signals. The system may propose one or more words accordingly.

The procedures described above/herein, may be used with any of the other methods of the word/text prediction systems. As an example, said procedures may be used/combined with the Spell Help methods of the invention.

Note that the procedures described above, are exemplary procedures. More procedures based on user interaction/behavior may be considered by those skilled in the art. As an example, during the entry of a word, (e.g. preferably, if one or more of the impacts is provided outside an axis in which a number of impacts are provided), the system may propose one or more words based on the following considerations: (1) the system considers all of said impacts (e.g. N impacts) as unambiguous input signals, (2) the system considers at least one of the impacts as being an ambiguous input signal (e.g. from 1 to N impacts). A such ambiguous input signal may preferably be related either to the key/zone on which the impact is provided or it may be preferably related to one or more character(s) on or located nearby said corresponding impact. Optionally, said ambiguous input signal may be related by the system to any character.

Note that based on user behavior such as typing with one or two hands the system may or may not relate the impacts to corresponding to ambiguous and/or unambiguous input signals. As an example, in FIG. 55B, the impacts 501111, 501112, and 501113 the system may not be able to relate said impacts to a first or a second procedure because if said impacts are provided by one finger they preferably should be related precise characters (e.g. only to the word 'can'), while if the impacts are provided by two hands then the user may have been related to ambiguous input signals. In this case, preferably, the system may consider each of the corresponding procedures to predict one or more words. In FIG. 55C, in addition to the impacts 501111, 501112, and 501113, the user has provided two more impacts 501114 and 501115. In this case, the system may preferably, at first, relate said impacts to unambiguous input signals because the left impacts 501112 and 501114 are provided on different vertical axis.

Note that, according to one method the system may use various means of recognition to recognize the intention of the user regarding typing precisely or ambiguously. Such means of recognition may be defined regardless of the consideration for the axis of typing as described above.

As mentioned before, during an instance of the data entry corresponding to a word, the system may relate/correspond the interactions such as tapping actions on a zone/key to both precise and/or to ambiguous input signal(s) (e.g. precise/identified and/or ambiguous characters). According to one embodiment, if a sequence of such input signals related by the system to precise characters correspond to a word and/or a stem (e.g. preferably corresponding to the beginning characters of a (e.g. one or more) word/s of a database of words used by the system), then said identified chain of characters may be considered as having the highest priority for that instance and may be considered as the current word being entered. Accordingly, preferably, said word may be entered and/or presented as the first choice. According to one method, more words (e.g. word candidates) beginning with said chain of characters may be presented to the user. Optionally, (e.g. preferably, if none of the proposed words is the desired word), the system may also propose words relating/corresponding to (e.g. considered) ambiguous input signals. If such input signals are not related to a word and/or a stem of the dictionary, the system may propose words based on ambiguous input signals.

Figure 55A:
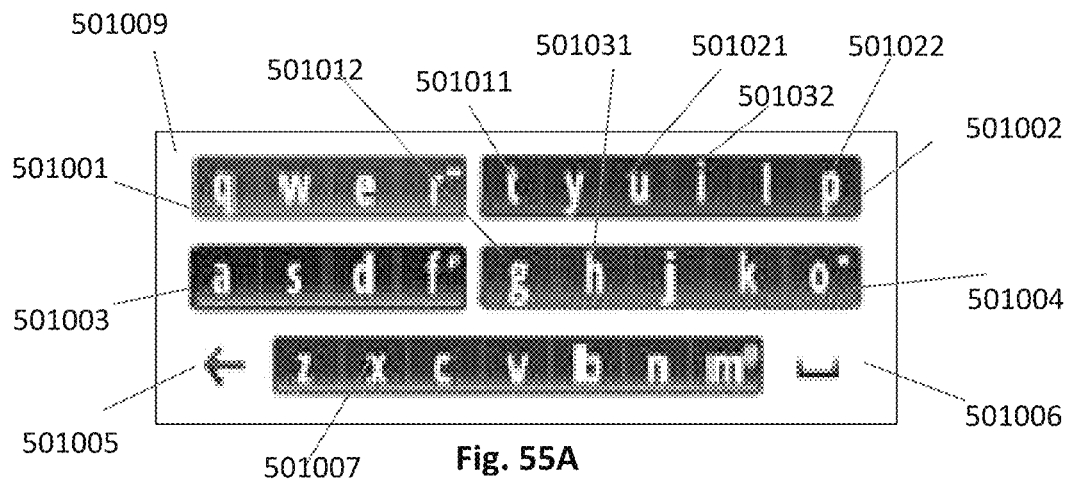
Figure 55B:
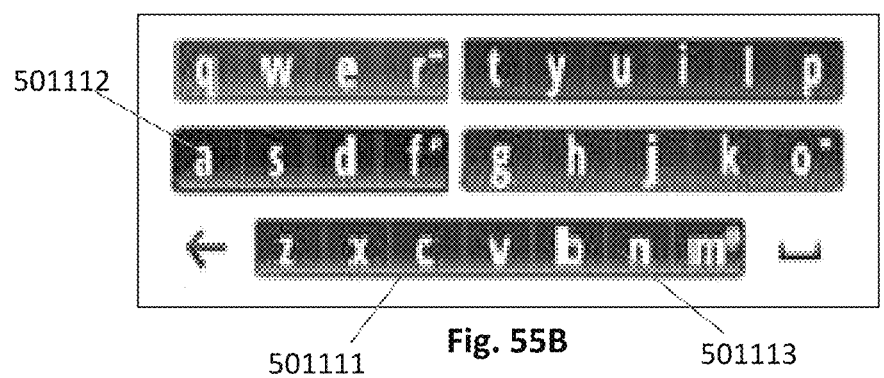
Figure 55C:
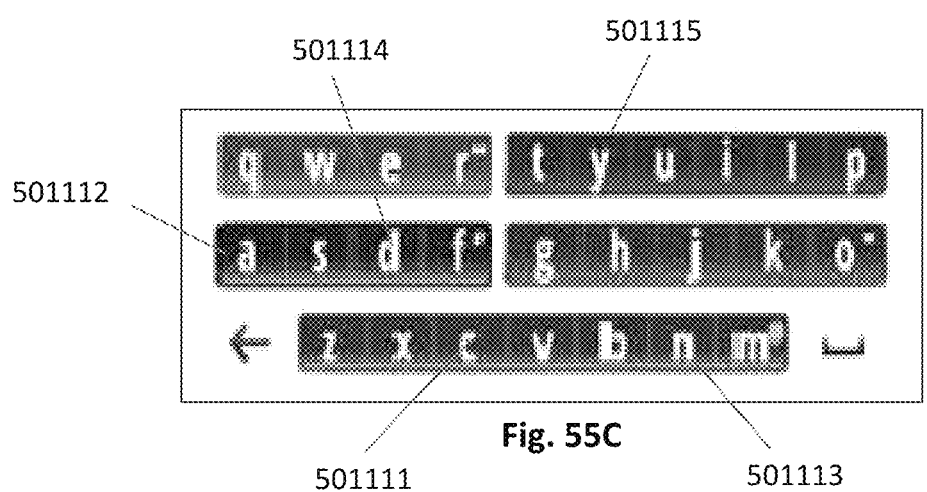

As an example, by considering the keyboard of FIG. 55A, if the user taps anywhere on the keys 501001, 501004, 501003, and 501002, and the corresponding precise chain of characters (e.g. EHDY) the system may propose ambiguous words 'what', 'whale', 'rofl' and 'whatsoever'. On the other hand, if said pressing actions correspond to tapping precisely on the letters W, H, A, T the system may relate said chain of characters WHAT which is a worked of the database and also corresponds longer words that begin with said chain of characters. As an example, in this case, the system may relate said interaction to the words WHAT, WHAT'S, WHATSOVEVER, WHATEVER, WHAT'D, etc.

Note that, according to one method, the user interactions corresponding to entry of information corresponding to a word may be considered by the system to include ambiguous and/or precise input signals. As an example, an auto-correction system such as the ones described herein may be used with the system to propose a word(s) that may be considered by the system to include some (e.g. one or more) of the input signals as precise characters and one of more of the input signals as ambiguous (e.g. in case the system does not find a word in the word database if the system relates all the input signals to precise characters). The system may propose one or more words (e.g. short and/or long words) accordingly.

Preferably, the principles just described may be applied to the words having at least a predefined number of characters (e.g. preferably at least 3 or at least 4 characters).

The principles described above may be used with any technology such as those described in this and related applications. As an example, these principles may be used with the Spelling Help system (e.g. relating the precise and ambiguous interactions to the beginning and ending characters of a word) of the invention.

Note that, for the word list of the invention has been described in detailed before, preferably upon display of said word list, a group of one or more keys/zones (e.g. herein referred to as word list keys/zones) may be displayed (e.g. next to and/or immediately underneath the word list). Upon actuating (e.g. tapping, gliding, etc.) a key/zone of said group of keys/zones, word(s) in said word list may be modified, preferably adding an additional character corresponding to a key/zone of said group of keys/zones to the end of at least one word in said word list. Preferably, when the word list is not displayed, the word list keys/zones are not displayed.

Figure 44T:
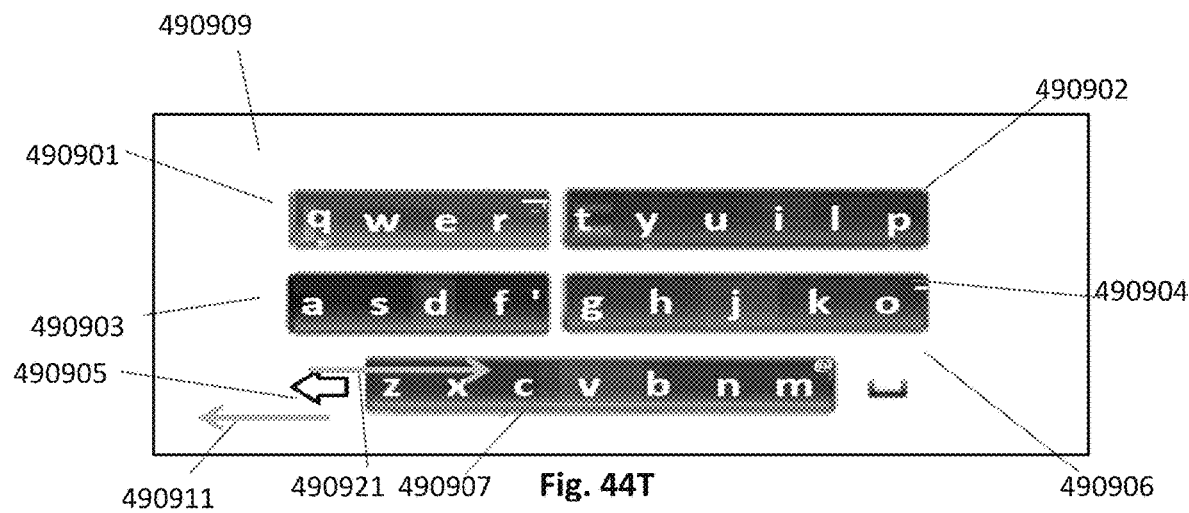
FIG. 44T shows an example of a gliding action for increasing the width of the keys of a keyboard.
Figure 44U:
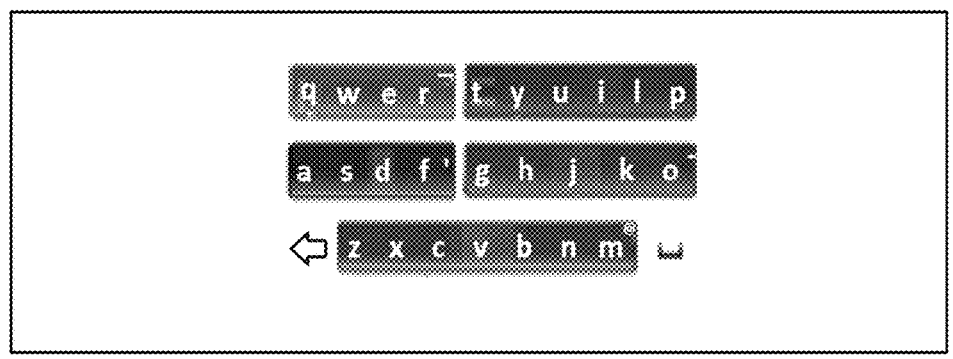
FIG. 44U shows an example of an enlarged/increased keyboard.
Figure 44V:
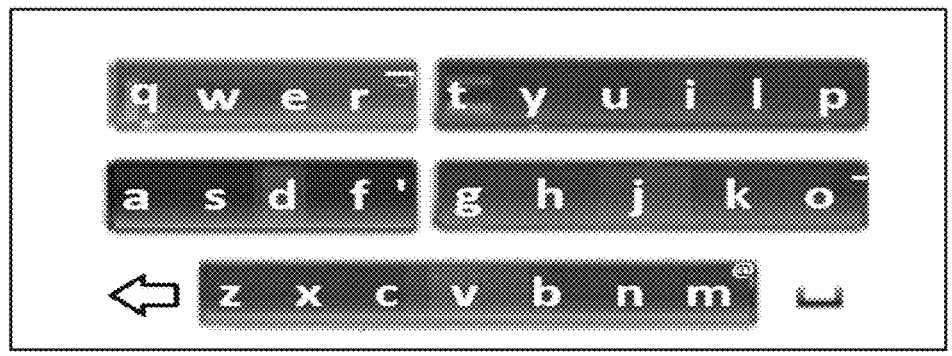
FIG. 44V shows an example of a reduced/decreased keyboard.

The description regarding positioning and resizing (e.g. splitting, changing the size of the keys, moving the keys) of a keyboard have been described herein. As described, according to one embodiment, providing a predefined interaction such as a gliding action provided in a predefined direction from a key such as a backspace key may correspond to a function such as splitting or unsplitting the keyboard of the invention such as those splitting functions described throughout FIGS. 44K to 44S. According to a preferred method, a gliding action corresponding to a splitting/unsplitting action may include a press-and-holding action. Preferably, such gliding actions not including a press-and-hold action may correspond to changing the size of the keys of the keyboard (e.g. increasing and decreasing the size of the keyboard). As an example, as shown in FIG. 44T, providing a gliding action 490911 without including a press-and-hold action from the backspace key 490905 leftwards may correspond to increasing the width of the keys of the keyboard (e.g. see enlarged/increased keyboard of FIG. 44U), providing a gliding action 490921 without including a press-and-hold action from the backspace key 490905 rightwards may correspond to decreasing the width of the keys of the keyboard (e.g. see reduced/decreased keyboard of FIG. 44V), providing a gliding action without including a press-and-hold action from the backspace upwards may correspond to increasing (e.g. or decreasing) the height of the keys of the keyboard (e.g. preferably, upwards). Providing, for example, a gliding action without including a press-and-hold action from the backspace key diagonally towards the upper-left may increase/decrease the one or both of the width and the height of the keys of the keyboard (e.g. preferably, towards upper-left direction increases both height and width of the keyboard, and towards lower-right direction decreases both height and width of the keyboard. Also as an example, towards the upper-right increase the height and decreases the width of the keyboard. Other combinations of changing the height and/or width of the keyboard according to a corresponding predefined action may be considered by those skilled in the art).

Preferably, providing a gliding action without including a press-and-hold action from the backspace downwards may correspond to decreasing (e.g. or increasing) the height of the keys of the keyboard (e.g. preferably, downwards), and providing a gliding action without including a press-and-hold action from the backspace key diagonally towards the lower-left may increase the both the width and height of the keys of the keyboard (e.g. preferably, towards lower-left).

Preferably, a predefined action such as a press-and-hold action (e.g. and removing the finger) without providing a gliding action on a predefined zone such as the space key and/or the backspace key may correspond to resizing and/or repositioning the keyboard in a predefined/default instance. According to one method, said predefined/default zone may be a predefined instance of the keyboard (e.g. position and/or size, etc.) or another instance such as an instance defined by a user (e.g. the/a previous instance of the keyboard).

Preferably, if a first gliding action provided in a predefined direction is assigned to a first function (e.g. increasing the size of the keys/keyboard), a second gliding action provided in another (e.g. substantially opposite) direction may be assigned to another function such as preferably opposite/complementary function (e.g. decreasing the size of the keys/keyboard).

Note that, the interaction corresponding to splitting and/or resizing the keys of the keyboard may be interchanged.

According to one aspect of the invention, preferably, resizing of the keyboard resizes some of the (e.g. ambiguous letter/character) key(s)/zone(s) of the keyboard (e.g. preferably the keys/zones that are (e.g. preferably ambiguously) associated with a group of characters (e.g. letters)).

According to one aspect of the invention, preferably, some of the button(s)/key(s)/zone(s) (e.g. preferably button(s)/zone(s)/key(s)) of the keyboard are not resized and maintain a predefined size, when the keyboard is resized. As an example, the keys/zones that contain punctuation characters (e.g. period, comma) may have a fixed size while other (e.g. ambiguous letter) keys/zones may be of any size corresponding to the size of the keyboard.

According to one aspect of the invention, some key(s)/zone(s)/button(s) of the keyboard may be resized such that their size is bound by a predefined limited (e.g. key(s)/zone(s)/button(s) are not a size that is unusable (e.g. too small to use reliably, comfortably, confidently)).

According to one embodiment of the invention, key(s)/zone(s)/button(s) that are not (e.g. automatically) resized or resized to predefined limit (e.g. as just described) (e.g. according to the size of the keyboard) may contain characters (e.g. special characters) and/or, preferably, functions (e.g. mode keys, shift function, enter function), herein referred to as function buttons.

According to one embodiment of the invention, a portion of a function button may be visible while another portion of said function button may not be visible (e.g. displayed). According to one method, the portion not displayed may be delimited/indicated/highlight by one or more outline(s), preferably on at least one boundary/border of said function button or of said not display portion of said function button (e.g. 490971 to 490974 in FIG. 44Z1).

According to one preferred method, for a function button that may have a portion that is or is not displayed, said function button may be displayed as a bar (e.g. 490971 to 490974 in FIG. 44Z2), herein referred to as a bar function button. Preferably, said function button displayed as a bar may be activated/actuated (e.g. provide the system with an activation signal) by a predefined interaction such as a tapping action or a gesture interaction (e.g. sliding or gliding from the edge of the device/input means as already described). Displaying a function button as a bar the size of the input method may be reduced (e.g. the space occupied by the function button of the input method is reduced).

According to another preferred method, for a function button that may have a portion that is or is not displayed (e.g. said portion may be invisible), said function button may be a line (e.g. 490971 to 490974 in FIG. 44Z3), preferably displayed as a line (e.g. optionally not displayed), herein referred to as a line function button. Preferably, said line function button may be activated/actuated (e.g. provide the system with an activation signal) by a predefined interaction such as a gesture interaction (e.g. sliding or gliding from the edge of the device/input means as already described). Displaying a function button as a line function button the size of the input method may be reduced (e.g. the space occupied by the function button of the input method is reduced).

Figure 44W:
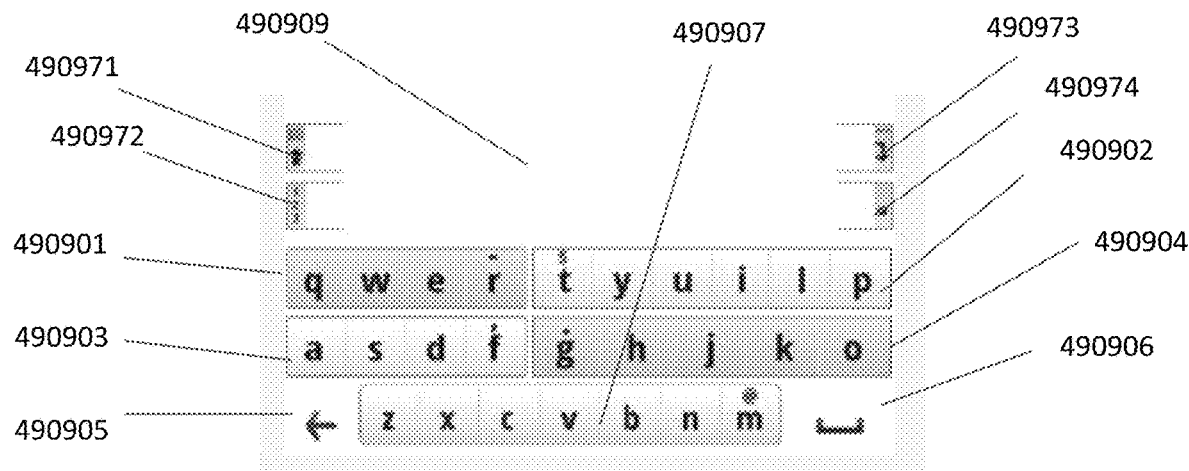
FIG. 44W-44Y show examples of keys/zones that are associated with special characters and/or functions that are displayed on the sides of the screen.

According to one method, the function button(s) may be located on the sides of the input means, such as a touch sensitive surface (e.g. a touchscreen), and preferably said function buttons may be located above the (e.g. ambiguous letter keys/zones 490901 to 490904) key(s)/zone(s) of a keyboard. In the example of FIG. 44W, keys/zones 490971, 490972 and 490973, 490974 associated with special characters and/or functions, are displayed on the sides of the screen 490909. Keys/zones 490971 and 490972 are displayed on the left side of screen 490909, and keys/zones 490973 and 490974 are displayed on the right side of the screen 490909.

Figure 44X:
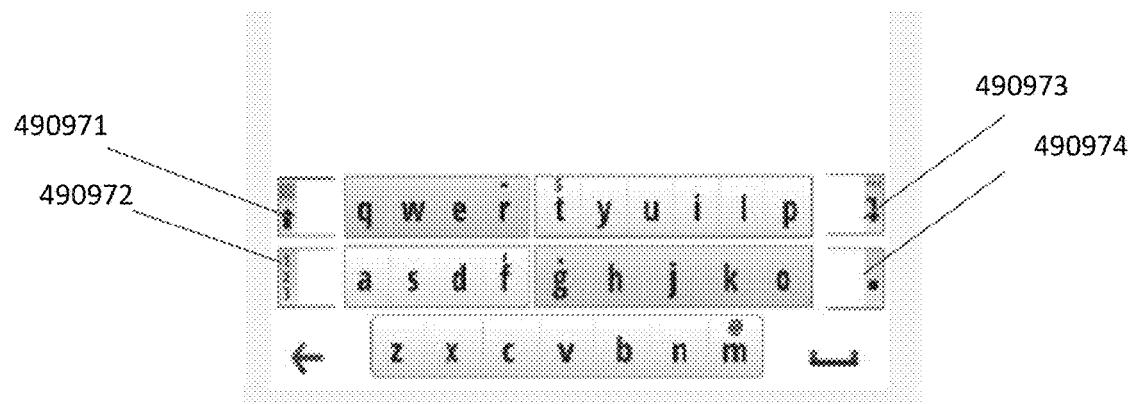
Figure 44Y:
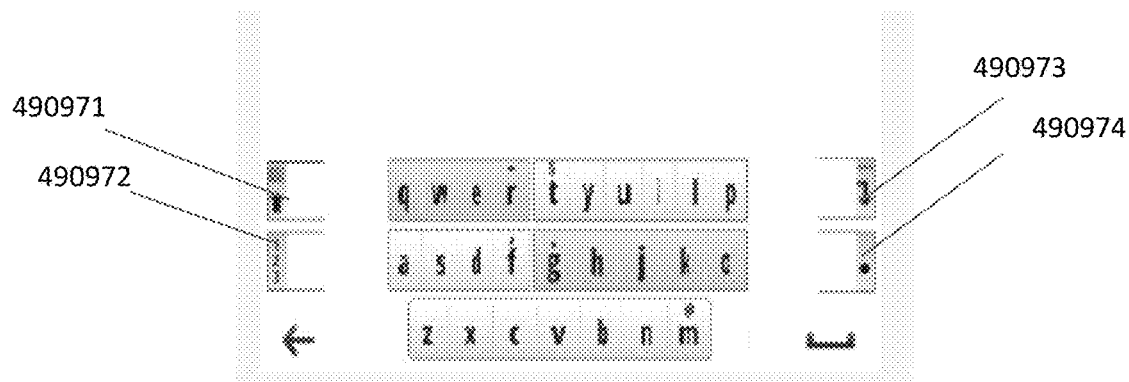

Furthermore, according to another method, upon resizing (e.g. reducing the width of) a keyboard, function button(s) may (e.g. automatically) be positioned at a location of substantially the same height of at least some of the (e.g. ambiguous letter) (e.g. ambiguous letter keys/zones 490901 to 490904) key(s)/zone(s) of the keyboard, while being located on the side(s) of the input means, such as a touch sensitive surface (e.g. a touch screen). In the example of FIG. 44Y, keys/zones 490971, 490972, and 490973, 490974 associated with special characters and/or functions, are displayed on the sides of the screen 490909. Keys/zones 490971 and 490972 are displayed on the left side of screen 490909 at the same height of the keys of the keyboard, and keys/zones 490973 and 490974 are displayed on the right side of the screen 490909 at the same height of the keys of the keyboard.

According to one method, function button(s) may be located on (e.g. attached to) the (e.g. outer (such as the left most side and right most side) side(s) of key(s) of a keyboard. Preferably, upon resizing (e.g. reducing the width of) a keyboard, function button(s) may (e.g. automatically) be positioned/attached at the side(s) of the (e.g. ambiguous) keys of the keyboard. In the example of FIG. 44X, keys/zones 490971, 490972, 490973 and 490974 associated with special characters and/or functions, are displayed on the sides the keyboard. Keys/zones 490971 and 490972 are displayed on the left side of the keyboard, and keys/zones 490973 and 490974 are displayed on the right side of the keyboard.

According to one embodiment, substantially all of the side bars may be located on one edge of the screen.

According to one embodiment, a predefined interaction with a key such as a gliding action in a predefined direction such as upward from a key (e.g. of an ambiguous or precise keyboard) may be related to a Shift function. Preferably such interaction may also be related to typing/entering a corresponding character in the corresponding Shifted Mode. Preferably, if said gliding action includes a press-and-holding action it may activate the capslock function.

According to one embodiment of the invention, the (e.g. system) resources (e.g. input means and/or screen areas of an input interface such as a touchscreen) allocated/assigned to an input method (e.g. a native keyboard of an operating system/device) such as an input method of invention may be utilized by and/or made available to an executable object/component (e.g. such as a computer software/application), preferably in addition to the input method (e.g. alone), herein referred to as extra input method resource(s). Since the input method of the invention may be reduced in size and/or, for example, made invisible, the screen area(s) usually allocated to a full-sized input method/keyboard (e.g. that occupies a predefined area of the screen allocated by a (e.g. operating) system/device to an input means such as a keyboard) (e.g. considered larger than a input method with reduced size) and under control of the input method may be made available to another application. As another example, the extra input method resources such as a screen area may contain a chat application, such as, for example Skype, image editing method/application of the invention (described herein), video chat application, while a regular application area (e.g. all related operating system and device resource e.g. such as a touchscreen device/resource) of an operating system may be occupied by other application(s), such as, for example WhatsApp. According to the current embodiment, an input method such as the input method of the invention may (e.g. simultaneously) interact with applications in the extra input method resource or in the regular application area of an operating system.

Several advantages of such principles relating to current embodiment follow, as an example: (1) the user can chat on an instant messaging application(s) with other users, for example, on WhatsApp, Skype, Facebook, and at the same time the user can for example, send pictures, edit pictures (e.g. using the image editing method/application of the invention) from the application(s) operating in the extra input method resources (e.g. under control of the input method). Optionally, the user may share pictures with other users through any application(s). For example, an picture edited as such may be share through a chat application such as WhatsApp preferably operating in the regular application area of an operating system. (2) a user can chat with a first group of users by using an instant message application as described, and in the extra input method resource area a user may video chat with a second group of users.

Note that, in the current embodiment, according to a preferred method, upon an interaction with an area corresponding to an application running in the regular application space of an operating system (e.g. touching the screen in the area assigned to said application), that application gains focus of the input method. Similarly, upon an interaction with an area corresponding to an application running in the extra input method resource (e.g. touching the screen in the area assigned to said application), that application gains focus of the input method. Alternatively, the input information provided by the input method is provided to both applications.

According to one embodiments of the invention, On the word list:

Sliding in a predefined direction such as upwards may cause the system to propose more words corresponding to the input information provided by the user.

Sliding downwards removes the word list and preferably deletes the word being entered.

A gliding action including a long-press preferably corresponds to moving the wordlist (e.g. on the screen)

A long pressing action on a word/stem may preferably cuses to provide/present by the system more words/stems beginning with that word/stem.

As mentioned before, the input information provided by a user may be provided through any input means. As an example, interacting with the (e.g. 5 letter) keys/zones of the/a keypad (e.g. model) of invention may be imitated by interaction (e.g. tapping/gliding) of (e.g. 5) fingers of a user on a touch sensitive surface such as a touchscreen. As an example, a user may lay at least one (e.g. preferably all five) fingers (e.g. of one hand) on the surface so that to permit to the system to approximately localize the locations of the corresponding fingers to hit the screen during a text entry session. Each of said fingers tapping on the corresponding localized location may imitate the input signal provided by interacting with the corresponding key of the (e.g. imaginary) keypad (model) of the invention. As such the user may enter text preferably anywhere on the screen without preferably having a user input interface on the screen. For some symbols/functions (e.g. such as spacing, backspacing, functions, special characters, etc.) input other means (e.g. side bars/buttons, gliding actions, etc.) may be used.

Figure 56A:
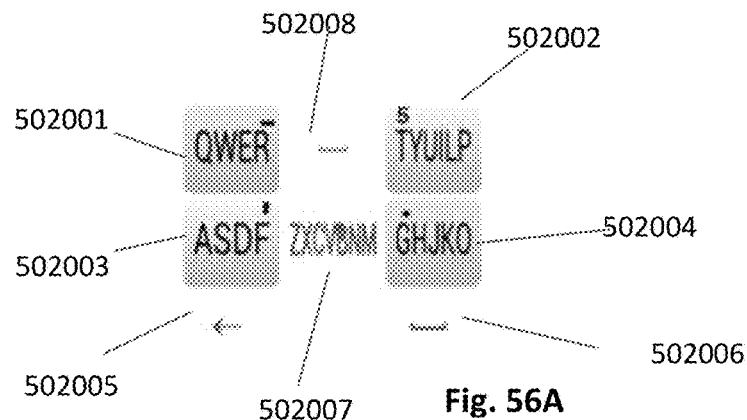

According to one embodiment, the broadly ambiguous zones (e.g. the zone between the 4 letter keys of the invention) may be divided in at least two subzone, one subzone corresponding to the letters/characters assigned to said broadly ambiguous zone, and the other subzone corresponding to the space and/or back space functions as described previously in this application. Such a keypad may herein be referred to as "mini keypad). FIG. 56A shows as an example, an exemplary 4-key mini keypad, wherein the subzone 502007 is used for a group of (e.g. ambiguous (e.g. may also type identified letters by typing precisely on the letters)) letters, and the subzone 502008 is used by space and/or backspace as described before in this application (e.g. see descriptions related to FIGS. 53A to 53E).

Figure 56B:
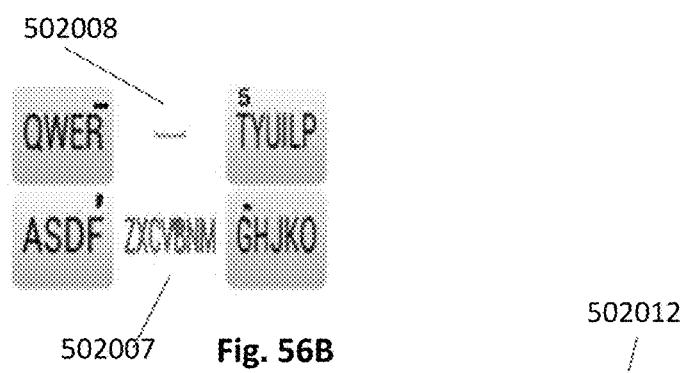

With continuous description of the current embodiment, according to one method such the space and backspace keys (e.g. 502006 and 502005) of the keypad may be removed/excluded to provide an extremely small input interface. Such a keypad may herein be referred to as "super mini keypad). FIG. 56B shows as an example, an exemplary 4-key super mini keypad of the invention based on the mini keypad 56A with the difference that here the space key 502006 and the backspace 502005 key are removed/hidden.

Figure 56C:
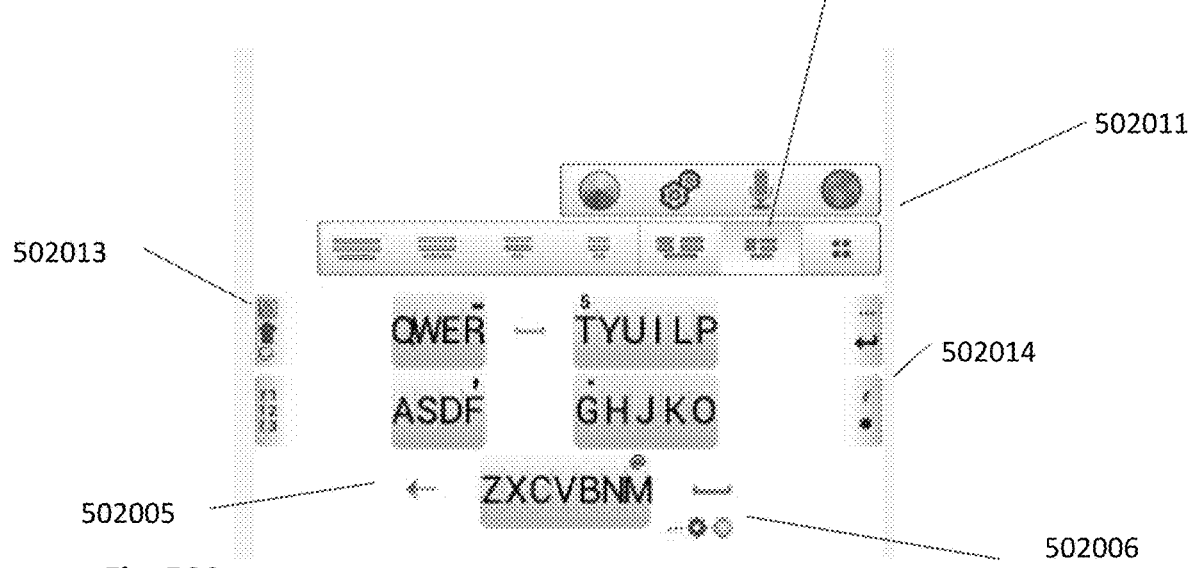

Preferably, a switching method/means may be used to switch between the mini and super mini keypads. As an example, a predefined interaction such as a gliding action (e.g. upwards or downwards, or etc.) provided from/on the sub-zone 502008 corresponding to the space/backspace may be used to switch back and forth between said mini and super mini keypads. FIG. 56C shows as an example, an exemplary small and split 5-zone keypad of the invention selected 502012 among others from a menu bar 502011 which was displayed (e.g. on the screen) by providing a predefined interaction on the space key 502006. As mentioned, a predefined interaction such a gliding action provided on a key (e.g. upwards on/from the key 502005) may switch the keyboard to a/the full-size keyboard of the invention.

According to one embodiment, the system may include a next word prediction method based on at least one predefined/target word (e.g. at least one of the last words being entered, a selected word, etc.). The next word(s) predicted as such may be presented to the user preferably in a word list. According to one method, the predicted words may be used in an auto-correction feature such that if a word is being typed by the user (e.g. if a user begins to type a word), one or more of said predicted next words corresponds to the input information provided by the user with (e.g. preferably minor (e.g. one, two, etc.) mistyping the system also proposes said one or more predicted next words.

According to one embodiment, a correction means may be available to the user during the entry of a word, so that the user can ask the system to correct (e.g. propose words by considering/assuming that the user has mistyped on at least one key/zone). For a better prediction, according to one method, the user may be authorized to make less/few mistypes (e.g. 1 to 2) for short words and more mistypes (e.g. 1 to 4) for longer words.

According to one embodiment, if the keypad (e.g. herein may also be referred to as "keyboard") of the invention is located in a predefined location on the screen such as adjacent to an edge of the screen, the (e.g. a portion of) content displayed on the screen may preferably be located/relocated at a location on the screen (e.g. and/or in an area or portion of the screen) such that the keyboard does not cover (e.g. a portion of) the content. For example, if the keyboard is located adjacent (e.g. no distance between said edge and the keyboard) to at least on one of the (e.g. predefined) edges (e.g. top, bottom, left, right, a corner, etc.) of the screen, a/the content may be located/relocated as explained. Preferably, when/if the keypad and an (e.g. a predefined) edge of the screen are spaced by at least a predefined (e.g. size of) distance (e.g. 1 screen pixel), then the keyboard may cover at least a portion of the content of the screen. According to one embodiment, relocating the keypad on the screen as such may (e.g. automatically) relocate and/or resize the (e.g. or a portion) content on the screen accordingly.

According to one method, a predefined interaction such as a gliding action (e.g. including and/or excluding a long pressing action) from/on a portion of the keyboard such as for example a key of the keyboard (e.g. used for the data entry (e.g. a letter key, the/a space key, etc.)) may be used to relocate the keyboard on the screen. As such, preferably the form factor of the keyboard and/or preferably the size of the keyboard is not changed when such interaction is provided and/or when the keyboard is moved as such). According to one embodiment, (e.g. when a/the content on the screen and the keyboard are located on separate (e.g. distinctly different) portions of the screen) relocating/separating the keyboard from an edge of the screen (e.g. detaching/separating the keyboard from said edge by a distance) may automatically cause the system to enlarge the size of the content on the screen such that to occupy a larger portion (e.g. preferably all) of the screen such that at least a portion of the keyboard occupies/overlaps at least a portion of the content. As an example, if the keyboard is adjacent to a predefined edge of the screen such as the bottom edge or the top edge of the screen, moving it on the screen such that to detach it from said edge (e.g. such as to relocate the keyboard some predefined distance from said edge) may cause the system to automatically allocate a larger portion (e.g. by preferably including a portion of the screen previously occupied by the keyboard) of the screen (e.g. the whole screen) to the content such that the keyboard overlaps/covers a portion of the content.

With continuous description of the current embodiment, moving the keyboard (e.g. by a means such as the gliding action as described) on the screen such that to become adjacent to a predefined edge of the screen may automatically cause the system to reduce the size of the content on the screen such that preferably the keyboard does not cover the content (e.g. the portion of the screen used by the keyboard and the portion of the screen used by the content are/become separated from each other).

According to one embodiment, if the size of the keyboard is less than a predefined size (e.g. its width and its height are respectively less than the width and the height of the screen) moving the keyboard (e.g. anywhere on the screen including positioning the keyboard on/near an edge) on the screen preferably does not (e.g. automatically) affect the size and/or the location of the content on the screen.

With continuous description of the current embodiments, as an example, if the keyboard is adjacent to the bottom of the screen and the content is located above it, providing a gliding action from a key (e.g. the space key) of the keyboard in an upwards direction, for example, may move the keyboard upwards such that to get separated from the bottom edge of the screen. At this time, preferably, the size of the space assigned to the content (e.g. herein may be referred to as the size of the content) enlarges to preferably include more information on the screen. As an example the size of the content may be enlarged to also occupy (e.g. at least a portion of) the space that was allocated to the keyboard when it was adjacent to said edge. In this case, preferably, the keyboard overlaps the content. Accordingly, moving the keyboard as explained, towards the bottom of the screen such that to become adjacent to the bottom edge of the screen may preferably cause the content to be resized and/or relocated in its original/previous (e.g. previous location before attaching the keyboard to bottom edge in this example) location (e.g. above the keyboard). Note that the bottom edge of the keyboard is used to describe this example. The example described may be applied to any other edge of the screen such as the top, left or the right edge of the screen.

Note that, (e.g. when the keyboard is overlapping the content on the screen) by moving the keyboard on the screen by interacting with a portion (as described) of the keyboard enables a user to position the keyboard very close (e.g. to even 1 screen pixel) to an edge of the screen, without resizing/moving the content on the screen.

According to one method, a predefined interaction such as a quick gesture (e.g. from a key such as the space key) may preferably relocate/move the keyboard on/to an edge of the screen preferably the edge of the device towards which the gesture is provided. In this case, according to one method, the content on the screen may (automatically) be relocated and/or resized accordingly.

Preferably, the automatic relocation and or/resizing of the content relative to relocation of the keyboard as explained may become effective or non-effective by using a switching means for example a button of the settings of the system.

Note that in the description herein the "content" generally refers to as the information displayed or to be displayed on the screen regardless/excluding (e.g. if the keyboard was not displayed) of the keyboard. Also note that, "enlarging" or "reducing" the size of the content is preferably referred to resizing the content (e.g. of the screen) and/or adding more information to the content or removing a portion of the information of the content (e.g. of the screen).

According to one embodiment, a predefined interaction (e.g. a gliding action (e.g. upwards) on/from a key such as the backspace key (e.g. 502005)) may switch between at least two types/sizes of the keyboard of the invention (e.g. from the full-sized keyboard to the split/4-key keyboard, etc.)

Relating a Swiping/gliding actions provided on/over one or more zones/keys to interacting (e.g. tapping) on said keys have been described before. According to one embodiment, a short gliding action provided from/on a first key/zone towards another (e.g. an adjacent) key/zone may correspond to interacting with said first key/zone and an adjacent key/zone located in the direction of the gliding action. Preferably, a long gliding action provided from/on a first key/zone towards another key/zone may correspond to interacting with said first key/zone and another key/zone (e.g. located in the direction of the gliding) preferably the key/zone located after a key/zone adjacent to said first key/zone. In both cases, the gliding action may end at any location (e.g. on or outside) said another key/zone.

According to a preferred method, any of said short and/or long gestures are preferably ended on the keyboard. Accordingly, any gesture from the keyboard upwards and ending outside the keyboard may be related to a shift function. Note that, during the entry of the input information corresponding to a word, preferably if a gesture ends on a space key, the system may enter a space character after said word.

Note that according to a preferred method, a tapping action on a key may correspond to one interaction with said key, a gliding action beginning and ending on a key may preferably correspond to two interactions with said key, and a complex gliding action (e.g. a back-and-forth gliding action) having a N number of gliding actions separated by a characteristics such as the change of direction/angle, pause, etc., between the simple (e.g. substantially straight) gliding actions (e.g. constituting a/the complex gliding action) wherein said complex gliding action begins and ends on a key may preferably correspond to N+1 (e.g. in this example, three) interactions with said key, and so on.

According to one method, in addition to relating a gliding action to an ambiguous zone, the system may also relate the gliding action to the letters on/near which the gliding action begins, ends, and/or changes its characteristics such as the change of direction/angle, pause, etc.

According to one embodiment, providing if the trajectory of a swiping action provided from a first zone to a second zone travels extensively over any of said zones, said swiping action may be related to interacting at least two times with the zone on which the swiping action has travelled extensively, and accordingly at least one time with the other zone key/zone (e.g. also depending on the length of the of the trajectory of the swiping action on said key.)

According to one embodiment of the invention, the word list of the proposed word list may include one or more advertisement (e.g. ads) banners/icons. Said ads may be presented to the user based on a context such as, for example, the geographical location of the device of the user, the text that the user is entering, the text that is printed/displayed on the screen of the user's device, the information (e.g. birthday) of the an entity such as a person (e.g. the user, his/her friends), etc.). Preferably said ads are small in size, and upon interaction with an ad the ad may be enlarged.

According to one method, the one or more advertisements are preferably displayed when there are not enough predicted word choices in the word list.

According to one embodiment, a first (e.g. type of) interaction such as a first tapping action on (e.g. any location) a word (e.g. in a textbox) may be related (e.g. by the system) to selecting said word for any purpose such as editing/correcting said word. A second (e.g. type of) interaction such as an another/additional tapping action on (e.g. any location/position) of said word may preferably correspond to positioning a cursor in a location/position of said word, for example, for insertion (e.g. or a letter) or vice versa. Note that the first and second interactions may be other types of interactions, for example the first interaction may be a tapping interaction and the second interaction may be touching said word at a first location and then gliding to a second location in said word.

According to one embodiment, the system may include at least two types of corrections of words: An auto-correction system, and a correction-on-demand system as described before.

Preferably, during the entry of a word, both systems may be available. Preferably, the auto-corrected words related to the auto-correction system may be automatically proposed if the system does not have enough words relating to the (e.g. exact) input information provided by the user relating to a desired word.

Figure 57A:
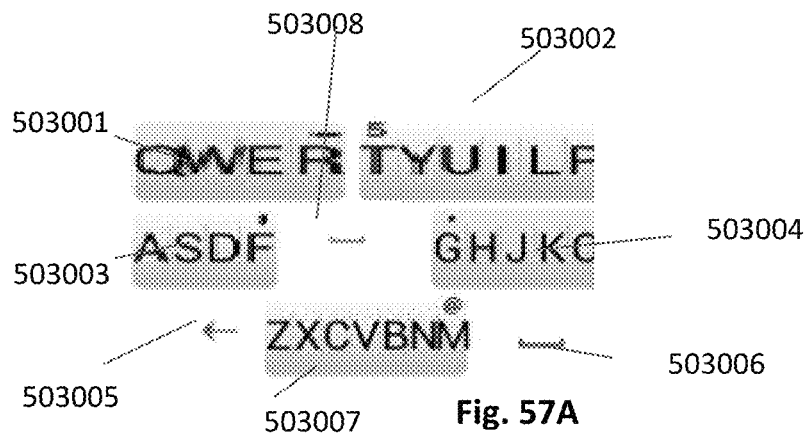
Figure 57B:
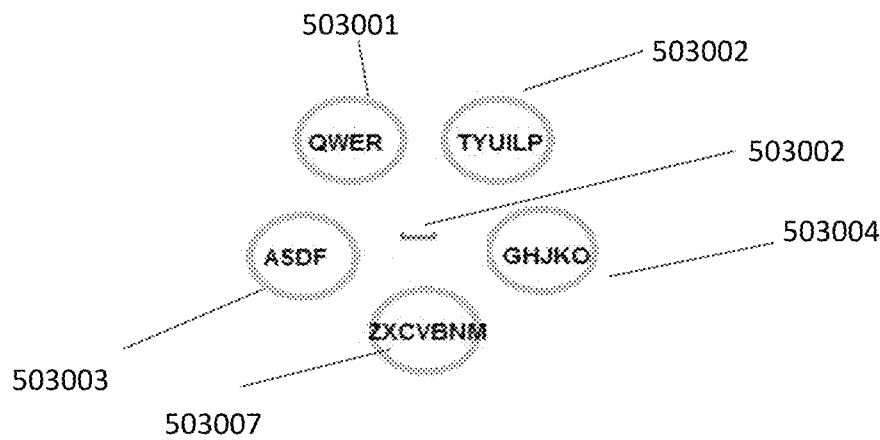
Figure 57C:
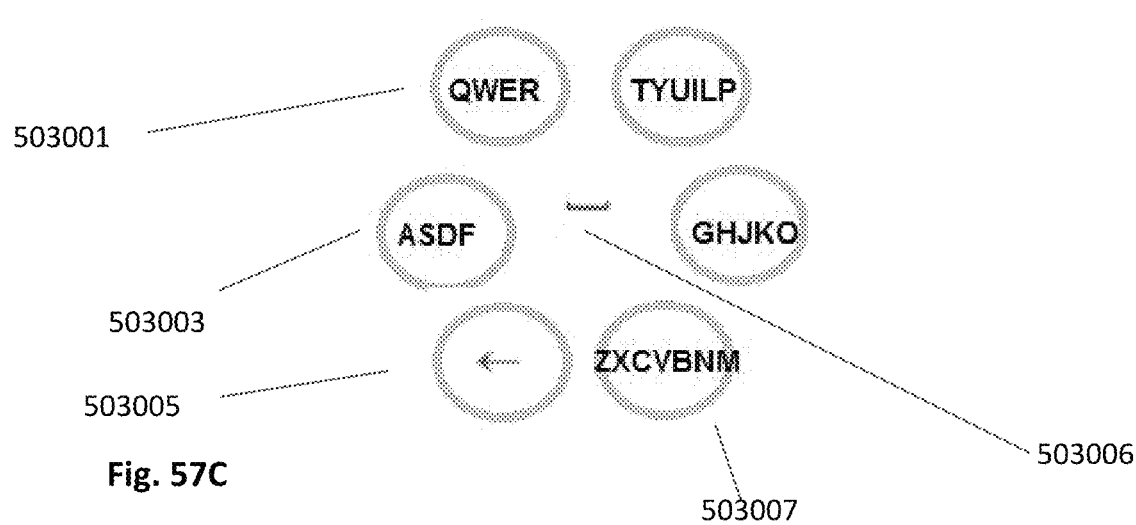

In FIGS. 57A-57C, three types of keyboards of the invention are proposed (e.g. to prevent or reduce mistyping) without affection performance of the system and/or user. As an example, if the user types with one finger, in FIG. 57A, the letter keys are arranged such the letter keys (e.g. any letter key) may be accessed without the need for the user to traverse a finger over another (e.g. letter) key. Preferably, the zone corresponding to the space and backspace key, as described before, is located between (e.g. in the middle of) the letter keys. In FIG. 57B, the keyboard is a separate keyboard resembling the keyboard of 57A, but the keys are represented by circles shapes, forming a circle of keys (e.g. a center zone with keys/zones located around said center zone). The keyboard of FIG. 57C, resembles that of 57B, with the difference that the a separate zone is provided to the backspace function, and the center zone is allocated to the Space key. Note that these are only examples, and other modification and other allocations of keys/zones may be considered by those skilled in the art. Note that in the examples above, a qwerty arrangement is used, and other letter arrangements may be considered by those skilled in the art.

Figure 58A:
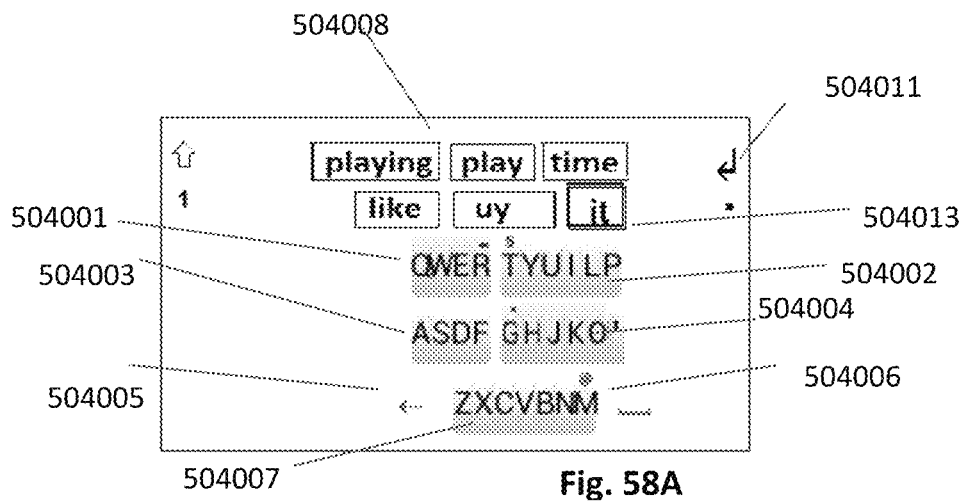

According to one embodiment, at least one of the keys may include at least one special character. As an example as shown in FIG. 58A, the key 404004 includes the apostrophe in the first layer (e.g. in order to enter the word "it's", the user may tap on the keys 404002, 404002, 404004, 404003.)

According to one embodiment, the side icons/icons (e.g. 405011) may exclude background so that to improve the visibility of the content on the screen.

The system may include one or more space and/or backspace keys. According to a preferred embodiment, the at least one of the space and the backspace key may be implemented such that to by easily reachable by the user (e.g. herein may be referred to as additional space and/or backspace). Preferably said key(s) are presented to the user when necessary. As an example, after a user selects a proposed word, said space and/or backspace key may be presented to the user (e.g. preferably together with the special bar character but preferably being independent from said bar (e.g. scrolling the special characters bar may preferably not scroll the space and/or backspace key. Preferably, at least the space key is presented in a large form factor to be easily reachable. Also preferably, the space key may be located on/in approximately the same location as the location of the first choice word (e.g. the word having the highest priority) in the word list so that when the user selects said word the space word can be reachable without relocating the finger on another location on the screen to reach the space key. Preferably the first choice word is also printed/presented in a large form factor/background so that to be reachable easily. Preferably, said space and/or the backspace remain on the screen after interacting with them. Preferably, the special character bar and said space and/or backspace keys are removed from the screen upon a predefined interaction such as interacting with a/the main space bar 504006.

Figure 58B:
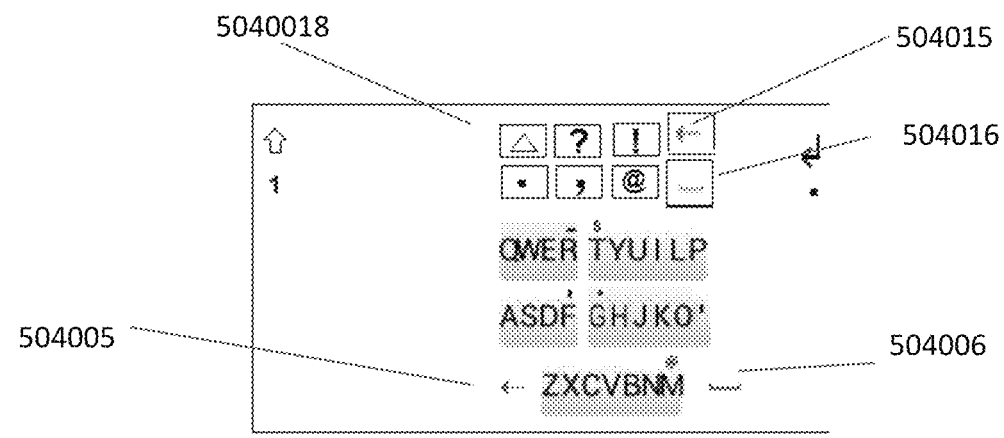

FIG. 58B shows as an example, a keypad of the invention having a space key 504006 and a backspace key 504005. In this example, in addition the system also includes an additional space key 504016 and an additional backspace key 504015, in this example, as described. When a user types a text (e.g. with one hand), he can select a word (e.g. most of the time the first choice word 405013) from the word list 504008 and then if necessary he can provide space(s) 504016 or backspace(s) 504015 easily.

Figure 59A:
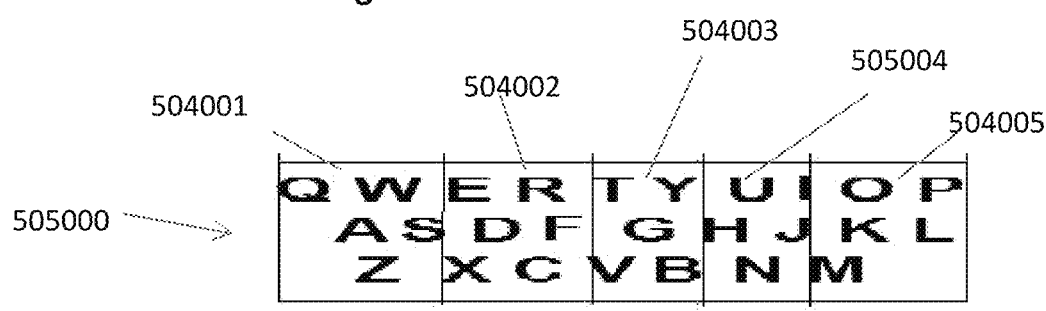
Figures 59B, 59C, 59D, 59E, 60A:
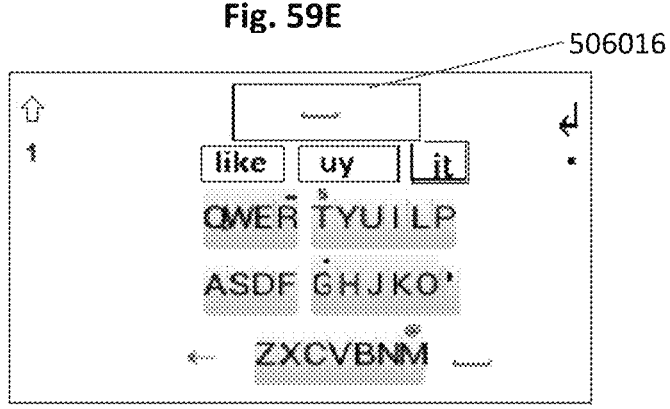
Figure 60B:
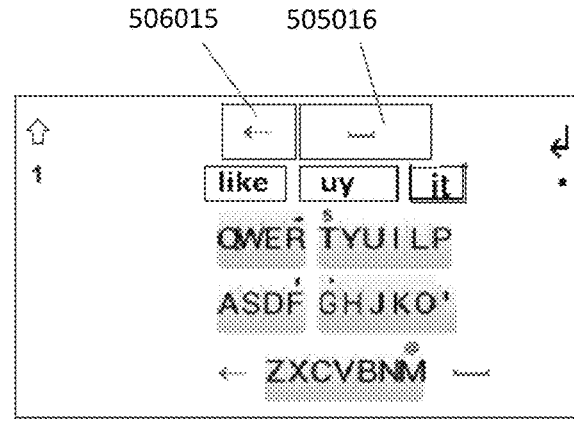

According to a preferred embodiment, the additional space and/or the backspace key/zone may be available on the screen when a text (e.g. a word) is being typed. Said space and/backspace key/zone may be removed from (e.g. not available) the screen when no text is being typed. According to one method, said space and/or backspace key may be visible or invisible to the user. If any of said keys is invisible, preferably an icon may be shown on the screen at the location of any of said keys. Preferably, said space and/or the backspace keys are presented above the keyboard (e.g. preferably above the word list) closed to the keyboard so that permit an easy access. As an example, FIG. 60A shows a keyboard of the invention having an additional space key/zone 506016 as described located above the keyboard. In the exemplary FIG. 60B, a such additional space key 506016 and an additional backspace keys 506015 are shown above the keyboard.

As mentioned before, the keyboard of the invention having few (e.g. 5 keys/zones) may have any kind of letter/character assignment to the keys. As an example, FIGS. 405A-405D show the keys of the keyboard to form a single (e.g. horizontal) zones of keys, and accordingly, the letters are QWERTY arrangement being divided vertically into said 5 zones. As an example, in FIG. 59A, the qwerty keyboard 505000 is divided into 5 zones 505001-505005. Said line of zones may have any height. As an example, keyboard of FIG. 59A has a reduced height to form a narrow keyboard. FIGS. 59B-59E show different layouts of keyboards based on the principles described, as an example.

According to one embodiment, the keys of the keyboard may be designed such that to permit reducing mistyping while interacting with them. FIG. 61A shows an exemplary keyboard of the invention preferably when user uses one hand/finger to type. FIG. 61B shows an exemplary keyboard of the invention preferably when user uses two hands/fingers to type.

According to one embodiment, the keys/zones of the keypad may be invisible so that to permit to view the content on the screen under the said key/zones. Preferably, at least a portion of the borders of the keys/zones may be shown on the screen. According to one embodiment a switching method such as preferably an interaction (e.g. a gliding action) from a key/zone (e.g. from the backspace key/zone) may be used to switch the keyboard back and forth between visible and invisible modes (or vice versa). FIG. 62A shows an exemplary invisible keyboard of the invention.

According to one method, the letters of the keys may preferably be printed in small font in a location/portion of a/each key/zone such that to significantly occupy a small portion of a/each key. The rest of the keys may preferably be invisible/transparent as described. The letters may be printed at any preferred location on the keys. for example, they may be printed as shown as an example in FIG. 62B (e.g. reminding the QWERTY arrangement) or they may be printed on the sides of keys near the edges of the screen, etc. According to one embodiment, the space and backspace keys may be located at different preferred locations. As an example, in FIG. 62A, they are respectively (e.g. 508006, 508005) located at the bottom of the keyboard, and in FIG. 62B, they are respectively (e.g. 508106, 508105) located on the sides of the keyboard, Note that the space and/or backspace keys/zones may be marked/presented (e.g. by the corresponding icon(s)). In FIG. 62C, the space key 508206 is located on the right side the keyboard, and the backspace key 508205 is located in the bottom of the keyboard next to (e.g. on the right side of) the letter zone 508007. For left handed people, the space key may be located on the left side of the keyboard, and the backspace key may be located at the left side of the zone 508007, etc.

According to these principles, a keyboard with large keys but visually occupying at most a very small portion of the screen may be provided.

According to one embodiment, each of the zones/keys may be presented with a different background color. Preferably, the keys/zones may be presented in an alternate manner by two different colors. This may permit to provide some degree of transparency to the keyboard and see the content under the keyboard but still being able to visually differentiate the keys/zone from each other. According to one embodiment, the letters/characters of each zone/key may also have some degree of transparency such that enabling the user to enter precise characters when needed.

According to one embodiment, the side bars/icons may be relocated (e.g. preferably upwards or downwards preferably on the edge/s of the screen) on the screen (e.g. preferably, by dragging a predefined or any of the side bars/icons).

According to one embodiment, when the user enters a text, the user generally types on a same zone on the keyboard. According to one method, if the user types one or more times out of said zone, the system may consider that the user intends to type precisely on corresponding letter/s. In this case, the prediction procedure may consider said interactions as an attempt to type one or more precise characters, and may predict words accordingly (e.g. by considering the letter/s on and/or near the impact area.

According to one embodiment, a gliding action provided from an edge (e.g. a first edge) of the screen towards inside the screen may correspond to reducing the size of the keyboard (e.g. on the screen). Accordingly, a gliding action provided from an edge (e.g. a second/opposite edge) of the screen towards inside the screen may correspond to enlarging the size of the keyboard (e.g. on the screen). Alternatively, a gliding action provided from the keyboard towards a predefined direction may (e.g. back and forth) reduce and/or enlarge the size of the keyboard.

According to one embodiment, when a user touches a location on a zone/key of the keyboard, the letter/character corresponding to said location may be highlighted/displayed/shown. Additionally, one or more letters closed to said location on said key may also be highlighted/displayed/shown. The use may slide his/her finger towards a desired character to select it. Note that upon sliding on the zone/key other characters under and/or near the user's finger touching point (e.g. on the zone/key) may be highlighted/displayed/shown accordingly.

According to one embodiment, during the entry of a sequence of key/zone interaction, the system may compare the characters of a group of corresponding words with the identified characters corresponding to the location on the keys on which the user interacts. According to one method, if at least a predefined number of characters of a word in the group is similar to a number of said identified characters (e.g. preferably corresponding to the same character positions) the system may preferably allocate higher priority to said word even if said word has a lower priority (e.g. in a word list) relating to one or more words within said group (e.g. a word with originally higher priority may have lower priority within the word list.)

According to one embodiment, in the spell help procedure of the invention, after a user end the entry of the input information corresponding to the beginning and the end of a word, if any of the words proposed by the user is not the desired word (e.g. the user may inform the system by any means that none of the words is the desired word), the user may provide additional input information corresponding to one or more other characters of said word.

According to a method, the ending character/s of a word is/are preferably entered precisely. As such (e.g. in a word list corresponding to the input information provided by a user) the system may allocate higher priority to the word/s that their ending character/s is/are similar to such precise character/s.

According to one method, not all of the hidden portions of a content can be unhidden by a single receiver.

It must be noted that the exemplary keyboard of the system having five letter zone may have any key configuration. For example, any row of a regular (e.g. QWERTY) keyboard may be represented by a single key/zone.

According to one embodiment, when a user interacts with a zone, the system may consider said interaction as an ambiguously corresponding to any of a group of characters/letters assigned to said zone (e.g. first type of prediction). Upon a accomplishment of a predefined condition (e.g. such as if the user interacts with (e.g. taps on) different locations on a single key/zone or not harmonious interactions once a side of the keyboard (e.g. not typing in a single axe on one side of the keyboard) during the entry of a word), the system also may consider said interaction as precisely corresponding to the identified character assigned the interaction impact and/or ambiguously corresponding to one or more characters near the interaction impact on said zone (e.g. second type of prediction). By providing a sequence of zone/key interactions, based on these principles, the system may propose one or more corresponding words to the user. In this case, the system may first propose a (e.g. one or more) corresponding word even if its frequency is lower than the word corresponding to the input information provided by the user regardless of the impacts locations on the keys. According to one method, instead of accomplishing a condition, the user may be permitted to switch the system from the first type to the second type (e.g. and vice versa) of prediction just described.

Principles of entering text directly onto a (e.g. virtual) content has been described before in detail by this inventor. As an example, a user may take or select a photo, provide a gliding action in a desired direction on a location on said photo and start entering text. The text entered will be located in the direction of the gliding action on the content, preferably, starting from location corresponding to the beginning of the gliding action. A menu may be available to the user to select features such as font, color, size, etc. The entry of text may be through any text entry system such as a keyboard, user's speech using a speech recognition system, handwriting, etc. Preferably, upon providing the gliding action a keyboard pops up on the screen.

According to one embodiment, a word or a chain of word/s may be selected by a predefined type of interaction such as a gliding action including a holding action (e.g. glide and hold, press and hold and glide) on said word (e.g. or chain of words) or preferably near said word (e.g. or chain of words) in the direction/trajectory that said word (e.g. or chain of words) has been entered. In this case, according to one method, a press and holding action on the screen/picture may correspond to another function such as for example a horizontal trajectory for a text to be entered. A selected word may be edited. For example, the user may change the color of the word, the font, the location, etc. According to one method, after selecting a word, other candidates corresponding to the input information corresponding to the selected word may be presented to the user.

The image editing application/functions described herein may permit providing/typing graffiti on a background image/textbox. As such according to one embodiment a social picture sharing application may be created so that user can, edit (e.g. write graffiti preferably simultaneously, an image in a cloud server.

According to one embodiment, the image editing system may be designed such that to not allow (e.g. editing) access in a predefined location on an image, preferably unless a user has an authorization (e.g. through a password). For example, access to the bottom right of an image may be reserved to an editor's signature or an advertisement, etc.

According to a preferred embodiment of the invention, a method of applying functions to a word being entered (e.g. the current (e.g. predicted) word) or to a selected word which has been previously entered (e.g. an already previously entered word may be selected by providing a predefined interaction such as a long-pressing action on said word) (e.g. herein the current word and/or selected word may be referred to as target words) may be considered, such as:

In the case that a word being entered, a predefined action such as a tapping action (e.g. anywhere outside the keypad and/or corresponding broadly ambiguous zone) on the screen, may display a menu.

In the case that a previous word is selected, a predefined action, such as a tapping action, may be preferably provided not on the selected word.

In the case of a targeted word (e.g. a word being entered and/or a previous word being selected herein may be referred to as targeted word), a predefined action such as a tapping action (e.g. anywhere outside the keypad and/or corresponding broadly ambiguous zone) on the screen, may display a menu. Said predefined action may preferably not be provided on the selected word or on a zone assigned to the selected word.

After the menu is displayed, an interaction with a function of the menu may apply to the targeted word. Preferably, said application of the function may be executed in real time so that the use can see effect of the function on the targeted word. As an example, said function may be change of the color, font, size, font, shadow, style, etc. of the targeted word.

According to one method, functions other functions (e.g. such as those other than the functions relating to a menu)

may be applied to a targeted word. For example, in the case of a targeted word on a touchscreen, providing a gesture in a direction may cause the system locate (e.g. relocate) the targeted word under the user's fingers in the direction of the gesture. Preferably, during providing such gesture, the system may show (e.g. on the fly/in real time) the corresponding word in the corresponding gesture trajectory so that the user can modify the trajectory if necessary.

Preferably, a press-and-holding action anywhere on the screen and a slide of a finger in a direction may cause to move the targeted word in said direction (e.g. preferably from the targeted words original location, or optionally under the user's finger) without changing the trajectory of the targeted word itself. Note that said press-and-holding action with gesture may also be provided on the targeted word itself.

With continuous description of the current embodiment, according to one method, a tapping action on a selected word unselects said selected word. Additionally, in case of a targeted word and during the display of a menu on the screen, according to one method, a predefined action (e.g. such as a tapping action anywhere on the screen (e.g. preferably not on the targeted word)) may hide the menu.

According to one method of the invention, a gliding action on the screen may cause the system to display the keyboard on the screen without a menu being displayed on the screen.

According to one method of the invention, when a gliding action is provided on the screen, the trajectory is shown to the user preferably in the form of a line. In the case of a targeted word, according to one method, in addition to said trajectory or in replacement of said trajectory, the targeted word is displayed.

According to one embodiment of the invention, a complex gliding action such as a sequence of continuous gliding actions may be provided on the screen before enter several words. After entering said several words, the system may preferably display said several words according to the trajectory of the complex gliding action on the screen. According to one method, the system may assign each of the gliding action trajectories of said complex gliding action to each word of said several words. Optionally, the system may assign trajectories to the whole of said complex gliding action, and adjust the trajectories of each word accordingly.

According to one embodiment of the invention, a long pressing action on a selected text (e.g. one or more words) may preferably release (e.g. unselect) said text. According to this approach preferably a tapping action anywhere on the screen (e.g. preferably outside the broadly ambiguous zone, if a (e.g. corresponding such) keyboard is popped up one the screen) including on a selected text may correspond to displaying the/a menu and/or a/the keyboard. In this embodiment, a tapping action on the/a selected word may preferably not unselect said word.

According to one embodiment of the invention, the system may enable the user to identify/select one or more portion(s) of an image (e.g. whether edited or not) and share it with one or more party/parties. According to one method, the identified/selected portion(s) of the image, may be the only portion(s) enabled for editing (e.g. entering text/graphic elements, etc.). According to a second method, the identified/selected portion(s) may be the only portions of the image that are not enabled for editing. According to one embodiment, the principles just described may be used in an application (e.g. having the data entry system of the invention and) using a server that may be employed to control the said enablement/disablement of editing an image. According to another method, some portion(s) may be enabled for editing, and some (e.g. one or more) portions (e.g. of the same image) may be disabled for editing. According another method, any of enablement and/or disablement may be alternated/switched. According another method, more portion(s) may be added at any time, and any of exiting portion(s) may be removed.

As an example, FIG. 3A shows an image 44100 wherein the portions 441001-441005 are selected by the user for editing purposes. The rest of the image are disable from an editing action. For selection/identification purposes, a means, preferably in a menu, may be available to the user so that by using said means the user may select said one or more portion(s) of the image. As an example, the user may draw may a shape/form (e.g. a square or other shape) as shown in FIG. 3A to identify/select said portions. According to one method, said selection procedure may be provided without interacting with a means in a menu, while according to another method the user may interact with a means in a menu before providing shape/form. Said means in a menu may define enabling/disabling purpose of the selected portions. Preferably, for each of enabling and disabling purposes, a different means in a menu is designated. In the example of FIG. 3A, the selected portion(s) are designated to be enabled for editing, and the rest of the image is disabled for editing. In FIG. 3B, the portions 441103, 441104, and 441105, which are edited, correspond to the selected portions 441003, 441004, and 441005 of FIG. 3A, respectively. Other portions are not yet edited.

FIG. 4A shows a selected portion 442001 of an image 442000 wherein said portion is disabled for editing. The rest of the image is enabled for editing. In this example, several comments/texts are edited into the image by one or more users. In the example of FIG. 4B, a split comment, having two portions 4421011 and 4421012, is a single comment that was typed on the image but was (e.g. manually or automatically) split because the portion 442001 prevented it from being printed in a continuous area where portion 442001 was located.

With continuous description of the current embodiment, note that in a preferred method, when a user shares an image having selected portions, said portions are marked by some means, for example, by a line/contour. After editing content in said portion(s), said marking means may disappear. According to a method, in order to have access to a selected portion (e.g. or the rest of the image if the selected portion is disabled for editing) for editing, the editing party (e.g. someone who receives said image) may require an access control means such as a login (e.g. username and/or password) to edit said portion(s)/image. For monetizing purposes, in some cases, the provision of said access control may require payment.

With continuous description of the current embodiment, any portion of an image may be shared separately from the rest of the image with a designated user, and access control, defined herein, may be applied to that portion. Such portion (s), after being edited by the designated user, may be transmitted to a (e.g. remote) server which may assemble the received portions into a (e.g. single) image(s). According to one method, the assembled image may not include the portions that may not yet be edited. While, according to another method, the assembled may also include the non-edited portion. Any of said assemble images, may at any moment be accessed by any user. According to one method, a user may identify themselves as the editor of any portion of an assembled image. Note that, one or more portion(s) of said image may be edited by the user who shares said image.

Figure 5A:
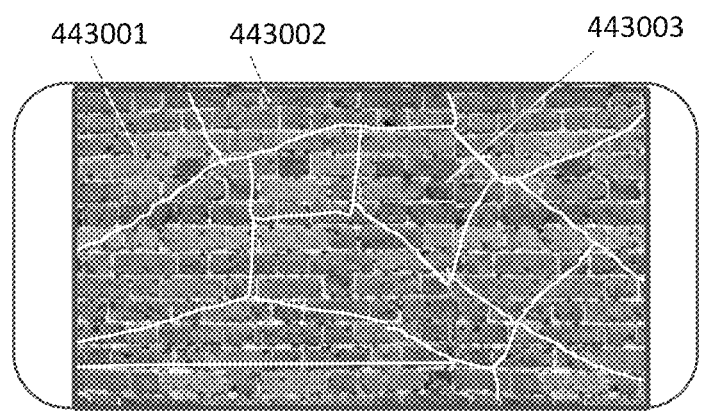
FIG. 5A shows an image that is partitioned into several portions.
Figure 5B:
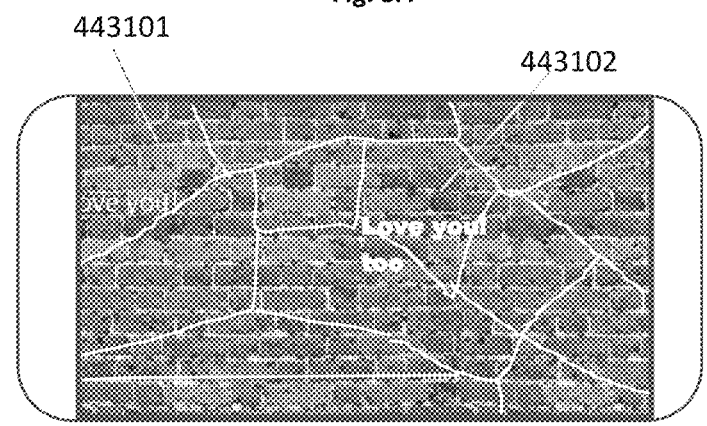
FIG. 5B shows portions of an image that are edited, while the remaining portions are not edited.

According to one method, each of said portions may be auctioned (e.g. online) and preferably control by some access means. FIG. 5A shows an image 443000 that is partitioned (e.g. manually by a user or automatically) into several portions (e.g. 443001, 443002, 443003, and others not numbered in the FIGURE). In FIG. 5B, the portions 443001 and 443003 are edited, while the remaining portions are not edited, but users can see the entire image at any moment. In FIG. 5C, only edited portions are shown to a user(s).

Note that, according to one embodiment, all the principles just described above concerning the selection and/or definition a/any portion of a content, such as an image, for example, for editing purposes, may be applied in such a way the user receiving said content. For example, a user that receives an image from another user (e.g. a sender that controls access), may define and/or request from the sender of the image to define a portion of the image to be edited by him. As mentioned before, for monetizing purposes, in some cases, the provision of said access control to a portion defined by a receiver of content may require payment.

Note that a selected portion of an image may include a part of the image, parts of an image, or the entire image.

Virtual walls such as a facebook walls and/or feeds, are very popular today. In such so-called "walls" the content such as text and user identification pictures are provided on different text fields or other corresponding image backgrounds that have no relation with a wall that we are used to image. The image editing principles described in this application may allow typing on images in form of a wall and/or forming a wall. As an example, a user may post a subject (e.g. including text) on an image and said image may be shared (e.g. provided/sent to) with other/s on a page such as a web-page. Other users may comment/respond to the posted subject on preferably similar image. The similar image may be provided by the user posting the subject by a third party such as a server sharing/providing images such as the server controlling the page. The image of the posted subject and/or the images including comments to the posted subject may be positioned next to each other on the shared page. Preferably, the posted subject and/comments may be positioned in a linear manner, preferably, vertically. In this case, as an example, they may form/construct at least a substantially single image. If each of said images is the image of a wall (e.g. China's, Berlin, or a building wall), the combination of said images on the shared page may form a single wall with many comments making it a pleasant and fun. It also may permit better visualization of the comments. According the one embodiment, any location on the constructed image (e.g. wall) may be accessed freely or by means of permission (e.g. as described before) for posting a comment.

Figure 6:
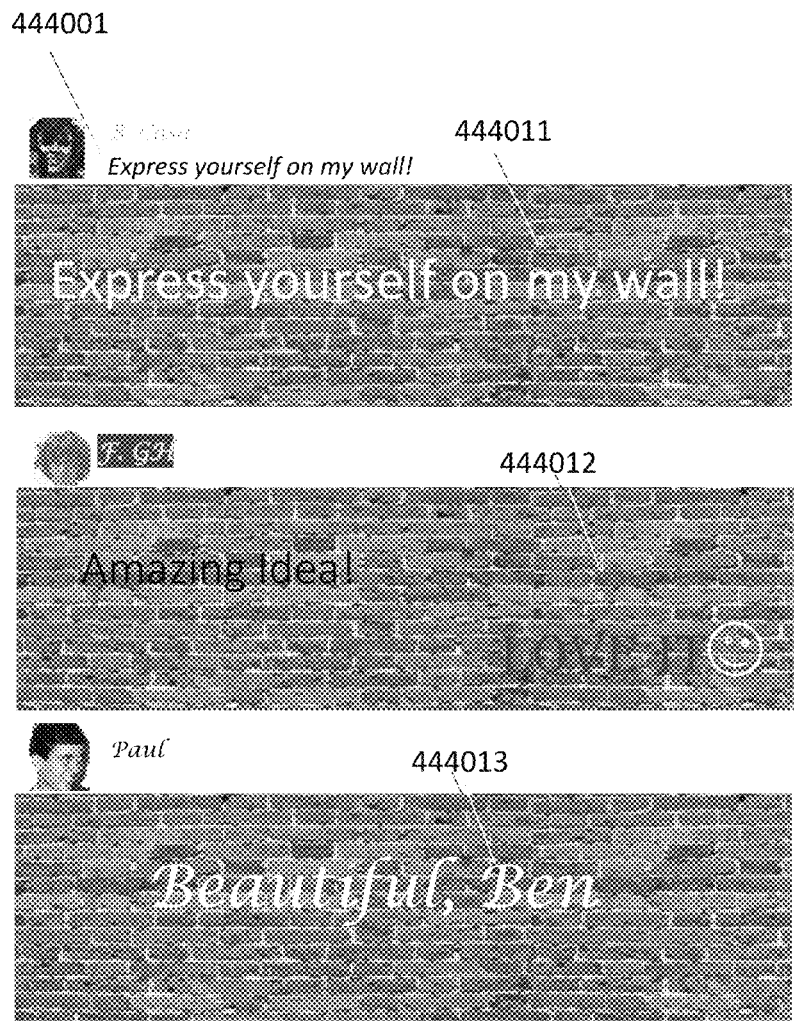
FIG. 6 shows an example of a "wall" in a social application using image editing principles.

FIG. 6 shows as an example, a "wall" in a current social application such as Facebook using the image editing principles/application as described. In this example, a user 444011 has typed a subject 444007 on an image 444001 such as the image of a wall and shared in his facebook page. In this example, the image of the user himself and/or his corresponding personal information are located outside the image (e.g. because Facebook application requires it). In this example, under said image, posts 444002, 444003, from other user 444012, 444013, responding to the posted subject image 444001, are positioned in a vertical manner. The overall page/wall substantially forms a single image/wall with a single debated subject with a small gap between each image.

Figure 6A:
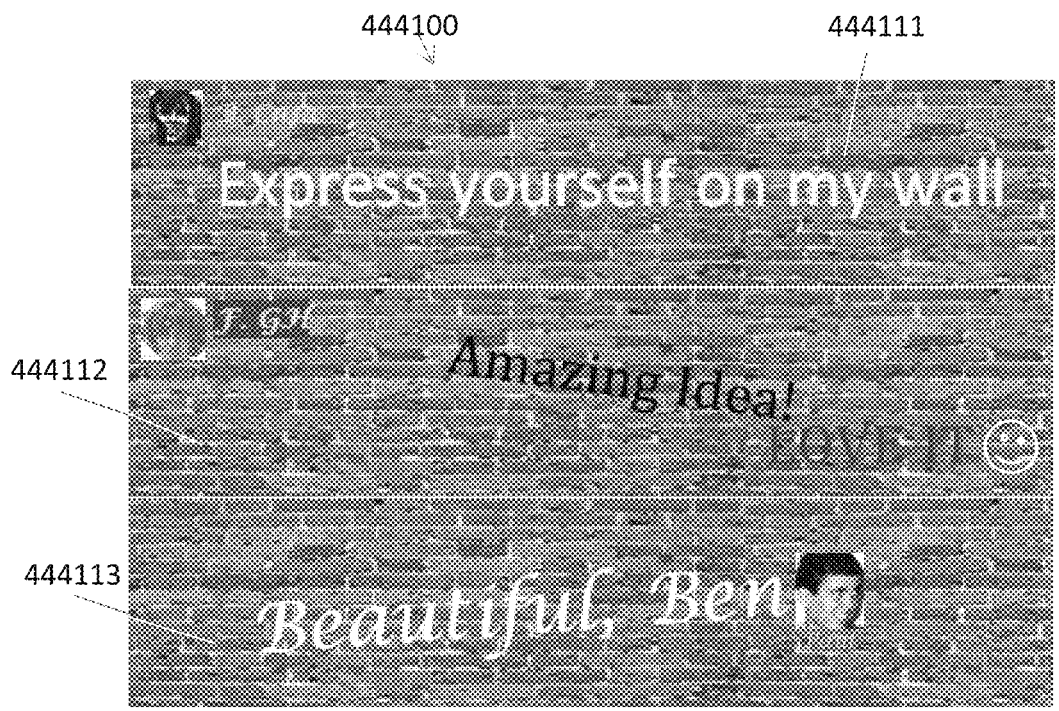
FIG. 6A shows several images that include information from the images' respective poster, having a small gap separating between the images.
Figure 6B:
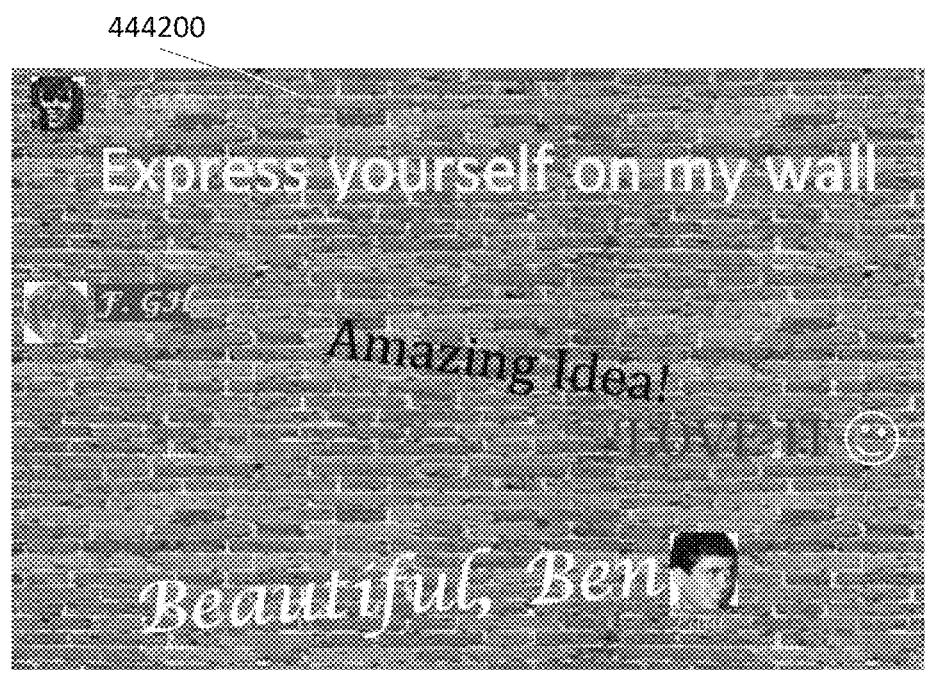
FIG. 6B shows several images that include information from the images' respective poster, having no gap separating between the images to produce a single image.

In a preferred embodiment, the information corresponding to the poster (e.g. user who provides) of the subject and the responding users may be positioned/printed on their corresponding images so that to at least minimize the gap between images. In the example of FIG. 6A, each of the images 444101, 444102, and 444103, include information from its respective poster, 444111, 444112, or 444113. In this example, a very reduced gap separates the images, while in FIG. 6B, no gap is provided between image and they form a single image 444200.

Figure 7:
FIG. 7 shows a portion of the wall that has the image of a wall which may be different from other portions of the wall.

According to one embodiment, the images posted by users may not resemble each other, but preferably may have common characteristic(s). In FIG. 7, a portion 445002 of the wall 445000 has the image of a wall which may be different from other portions (445001 and 445003) of the wall 445000.

The principles of commenting on a subject while constructing an image such as a wall may be used with/in any type of (e.g. social) application and/or platform/service such as Facebook, YouTube, etc.

According to one method, a single image may be divided into pieces, preferably linear (e.g. vertical or horizontal) pieces and the pieces may be shared with a number of users. Note that, preferably, each of said pieces may have a different portion of the image which may not necessarily resemble another portion of the image. Because a single image is divided into several portions, the number of portions is generally limited to fixed predefined number. In order to divide an image into several portions, a means such as those described before or some (e.g. automatic) means may be used. As an example, the user may divide the image by drawing lines on the image or the user may instruct the system to automatically divide in to a random number or desired number of portions.

According to one method, an admin, defined herein, user may share any of the portion(s) with other users by the admin user's control of the image, or the admin user may allow other users to select a portion available (e.g. from an entire image and the corresponding portions that may be shown to a user, for example, on a web page) to edit, by preferably sharing the entire image.

According to one method, the portions of a divided image may be available in a linear sequential manner. Preferably, the first portion may be edit by the admin user or another user and the next (e.g. second) available portion is preferably the portion adjacent to the first portion, and the third available portion is preferably the portion adjacent to the second portion, and so on. As mentioned before, according to a preferred method, at least one of said portions may be available to a user by means of access control (e.g. that may be defined and/or granted based on monetary system such as a credit/point/reward system, or payment system). As such, advertisers, celebrities, corporations, consumers may use these principles to monetize and/or market and/or advertise their brands, products, services, etc. through images.

Figure 8:
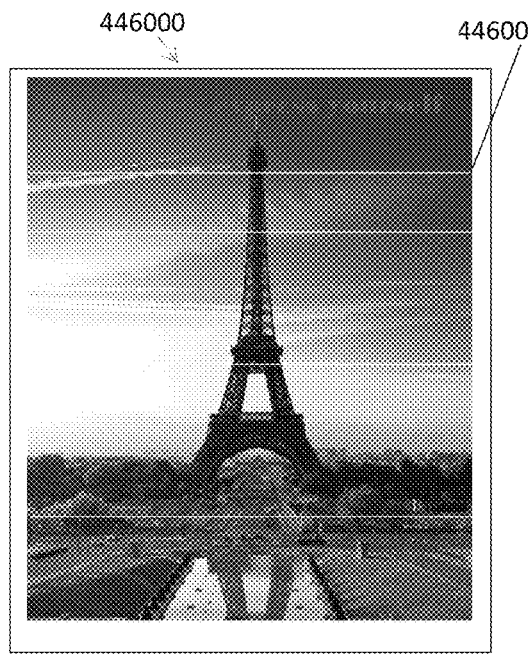
FIG. 8 shows an image divided into five portions by means of drawing lines.
Figure 8A:
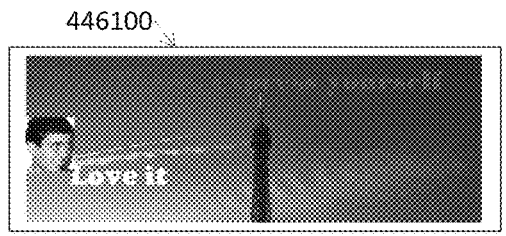
FIG. 8A-8C show a comment/post on various portions of image that is provided by a user.
Figure 8B:
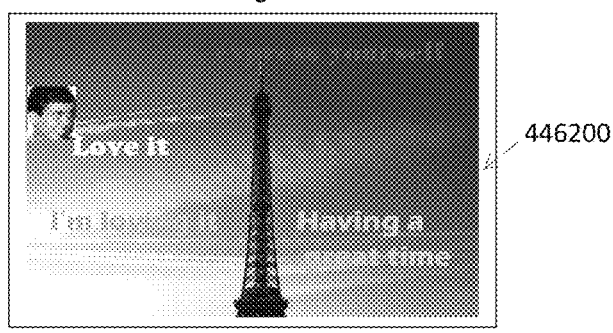
Figure 8C:
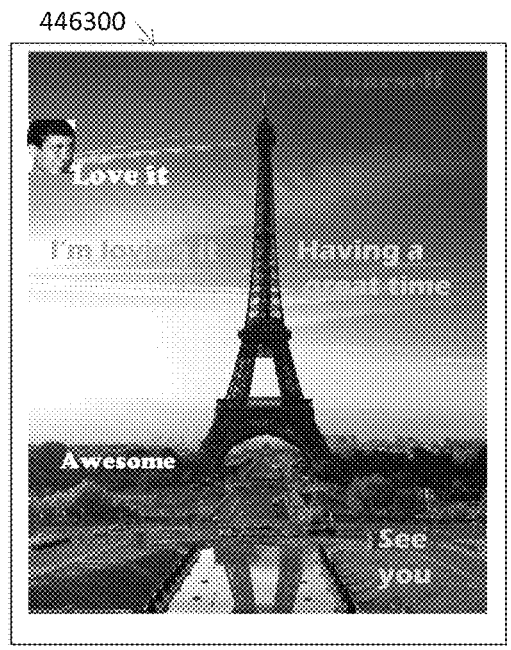

As an example, FIG. 8 shows an image 446000 divided into five portions by means of drawing lines such as the line 446001. The portion(s) of the image may be available to some users as described before. In this example, the first portion of the image is edited by the admin user. FIG. 8A shows a comment/post on the second portion of image provided by a user acquiring control of the second portion. According to one method, the combined edited portions 446100 may be provided on a page, such as a web page, so as to be seen by others, as shown in FIG. 8A. In FIG. 8B, a third comment/post provide by another user and the combined three portions 446200 are shown. In FIG. 8C, the whole edited image 446300 including all of the portions including all the comments/posts provided by several users is shown.

Note that, as shown, the divided portions may have different size.

By using the methods/principles of providing information corresponding to the (e.g. related layered) graphical presentation of text (e.g. herein referred to as graphical text) and/or related content and meta data (e.g. such input information may herein be referred to as scene information) to provide text on a content (e.g. a picture/image, video, blank picture/form) described throughout this application, a new protocol/system/method of messaging/communicating (e.g. email, IM, SMS, etc.) may be developed. The advantage of such system is in that the user can express himself/herself (e.g. instantly) through a colorful text, various fonts, text in various directions, corresponding image(s) (e.g. if any) on which the text is to be presented/shown (e.g. anywhere on an image), etc. This preferably eliminates or at least may reduce the need of using text input controls which are mostly related to a restricted text manipulation/processing functionality. According to one method, a (e.g. remote) server may organize/manage/process the scene information relating to a user's activity received from a user (e.g. and other sources related to the user's activity). The server may also transmit/receive such information to/from a destination/source. According to one method, all information (e.g. scene information) such as the history of the messages (e.g. and/or user's activities related to said scene information) may be saved/recorded/stored in a (e.g. remote) server. Said information may be accessible by one or more user(s) upon predefined user interactions and/or (e.g. system) conditions.

According to one embodiment, such information may be transmitted from a user (e.g. fixed/mobile device) to another user (e.g. fixed/mobile device) without the use of a server (e.g. peer to peer).

Note that reference to server herein may refer to a network cluster of servers, whether centralized, distributed or otherwise configured.

The scene information, such as history of messages of a user, may be stored and/or accessed as text and processed (e.g. sorted) accordingly. The procedure of processing may be executed on a server and/or in a user's device.

Figure 9:
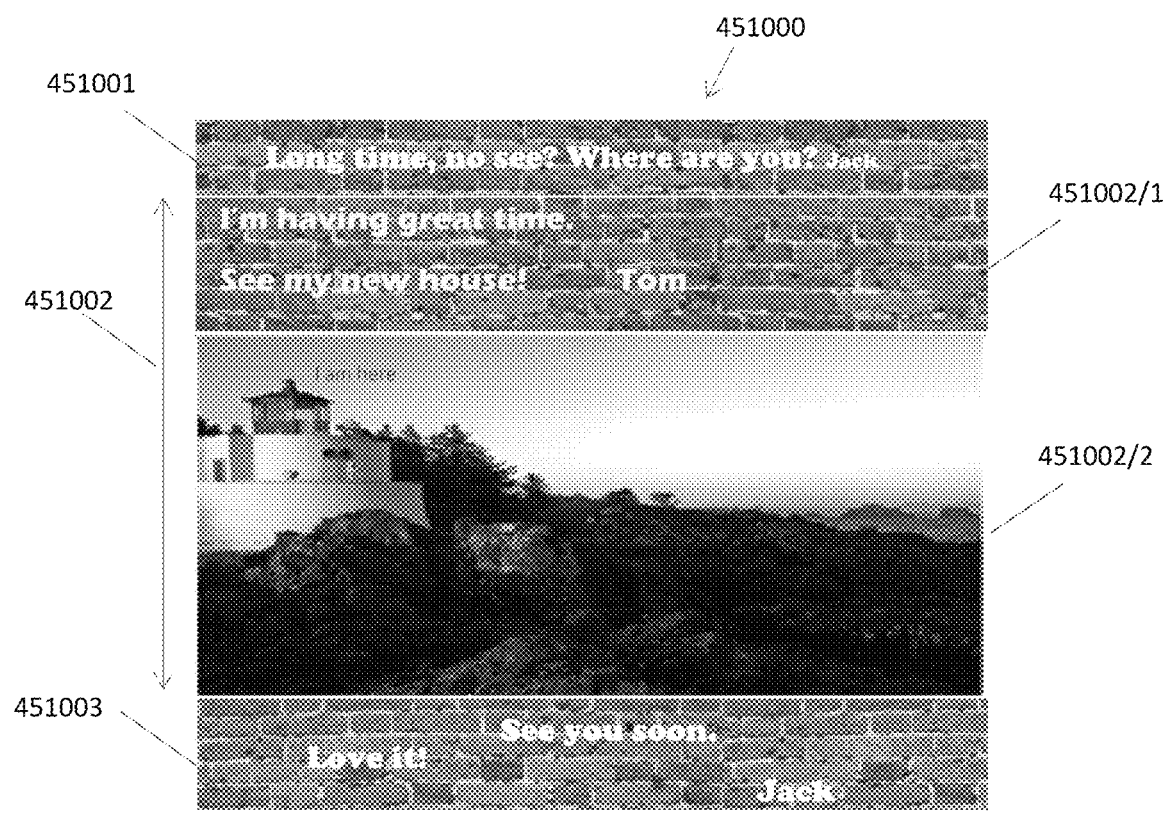
FIG. 9 shows as an example of text/graphic messaging.

In the current embodiment, according to one method, the graphical presentation of the scene information may include an attachment such as a picture, a textual document, other types of information, etc. According to a preferred method, the scene information may be printed/presented to a user in the form of a single document/presentation element (e.g. audio and/visual output). Note that the scene information may include one or more image(s). Any portion of a text (e.g. provided as such by a user) may be displayed on one or more of said image(s). FIG. 9 shows as an example of text/graphic messaging as just described above. In this example, on the screen 451000 of a (e.g. mobile) device text is present on/over an image (e.g. several texts are presented on/over several images may also be considered as forming a single image). In this example, the first message "Long time, no see? Where are you? Jack" is presented over an image 451001 that resembles a wall (e.g. note that the image is only an example, and any image may be used, whether from the sender, receiver or another source). The reply to this message is the second message 451002, which contains two sections (451002/1 and 451002/2). The section 451002/1 on which the message is "I'm having great time. See my new house! Tom" is presented on/over an image and attached image 451002/2 is presented, with text written over it, namely "I am here". The reply to this second message 451002 is "Love it! See you soon. Jack" where each part of this third message 451003 is presented at various positions and angles on/over the image of a wall (e.g. this is a exemplary image but it could be any other image as already described). Note that, in this example, all the messages together may be considered as a history of messages (e.g. a conversation). Also, note that, in this example, the wall/background image of Tom's message is the same as the image of Jack's messages, however, this is only optional, as a user (e.g. Tom, and or Jack) could select any image as a wall/background image for messages at any time.

According to another method, the attachment may be presented on/in a separate document.

The principles of providing scene information by a first party and/or presenting said scene information to a second party, as described throughout this application, may transform network, social, telecommunication protocols and systems such as email, instant messaging (e.g. Whatsapp, ICQ, MSN, AOL Messenger, Instagram, etc.), short message service (SMS), social networks (e.g. such as Facebook, Twitter, LinkedIn, Pinterest, etc.), etc. where a user can express themselves by eliminating/reducing text boxes and using graphical text and/or content, preferably provided on images.

Preferably, at least a portion of text included in scene information may be treated as text (e.g. not graphical information). As such, functions such as text searching, text sorting, copy, paste, cut, select, etc. may be applied to such text.

According to one embodiment, a scene information (e.g. may exclude an image) and the presentation of at least a portion (e.g. at least a portion of a graphical text) of said scene information on a (e.g. remote) receiving device may be presented on/with a content (e.g. such as an image) on a (e.g. remote) receiving device (e.g. a mobile device, server, desktop, etc.).

According to one embodiment, preferably, the scene information may be contained/found on a (e.g. remote) server wherein at least some of said scene information may be processed (e.g. associated with other information, incorporated into a collage of other scene information, classified according to predefined and/or dynamic parameters and/or classification systems). According to one method, the server may provide at least a portion, preferable at least the last message sent by a user, to a destination. In such case, if the receiving destination/party desires to have more scene information, more information may be sent to the receiving destination on demand. According to one method, the receiving destination may process at least some of scene information.

With continuous description of the current embodiment, (e.g. rendering) information (e.g. transmitted to a destination), may by presented/displayed on and/or over any content such as an image, video, text box, email, etc.

According to one embodiment, in the picture editing application/embodiments, the system may include a means (e.g. from a menu) to define a zone of/on an image on which a text may be wrapped when typing a text. For example, the user may be allowed to define such a zone on the picture by drawing a zone after providing an interacting with a section of an appropriate menu relating to the activation of such function.

According to one embodiment of the invention, a secured method of identification of the signature of a user may be created. When a user signs on a touch sensitive surface such as on a touch screen, his/her graphical signature may be considered/memorized by a system. When user provides a signature, the gliding action corresponding to the signature on said surface also provides a (e.g. complex) sound. Said graphical signature and said sound may be transmitted to a destination (e.g. another user's device, a server, etc.) for authentication. Said destination may already have stored a correct version both the graphical and sound of the user's signature. By comparing said the combined information with the stored information, the user's signature may be authenticated.

Note that, for the entry of text, no text box is used and/or required. The text provided as such may be presented over any content such as an image, a text box, video, etc. without necessarily being integrated with the content.

According to a preferred embodiment of the invention, the presentation of text on a (e.g. receiving) device may stop after a predefined lapse of time, or by instruction of the a user, or (in the case of a video) after a fixed number of frames. Optionally, said text may be saved (e.g. for several purposes such as reviewing content, for example, related to and/or including said text at a later time) on a remote/local server and/or on a receiving device.

According to one embodiment, a photo sharing/editing application such as the photo editing application of the invention may include a store (e.g. online store such as an Internet based store), where goods/contents such as fonts, photos, smileys, etc. may be presented for sale/rent to users. According to one embodiment, photos owned by a party may be proposed in the store to the users in a manner not be used more than a predefined number of times such as, preferably, one time. For such purpose, after a user selects/purchases a content such a photo, the photo may be presented with and/or amended by a security element such as a watermark (e.g. text and/or signature of some kind, preferably substantially visible). After a user edits a photo (e.g. types/writes at least a predefined number of characters on the photo, preferably at least a predefined number characters being entered in a location far from an edge of the photo, such that the photo may not be duplicated as an original), providing a predefined interaction such as for example saving or sharing the photo, may preferably result in removing said security element by the system and/or by a third party such as the provider/owner of the photo from the edited and shared/saved photo. According to another method, upon a predefined condition such as at after a user edits a photo (e.g. types/writes at least a predefined number of characters on the photo, preferably at least a predefined number characters being entered in a location far from an edge of the photo, such that the photo may not be duplicated as an original), the security element may be removed (e.g. by the system and/or by a third party such as the provider/owner of the image/photo) from the edited and shared/saved photo. Said security element may preferably be inserted/added/put on/appended by the system on the presented and/or purchased photo. Note that in the example above, a content such as a photo was used in the example, it is understood that any other content such a video, music, etc. can be used through the principles described. In the embodiment/principles as being described, the user preferably does not purchase a photo rather than a copy of it for use (e.g. editing such as texting on it) (e.g. herein may be referred to as the right of use).

According to one method, the/a user may purchase the right of use (e.g. editing) of a (e.g. an original) picture for a predefined number of copies/times (e.g. 1, 2, 5, 10, etc.) against payment. In this case, preferably, for each case/session/download of use, the user may preferably download a single copy of the picture/photo.

This manner of selling content allows the owner of the content to keep the original version of the content while monetizing said content through the store. In this case the photo is preferably presented/proposed at an inexpensive price.

The revenues of the store may be shared with the suppliers of content and the owner of the photo editing application.

Note that, the principles of editing (such as typing text/comments) and sharing pictures/images as described throughout this application may use any type of keyboard such as the keyboard of the invention having few keys such as four keys (e.g. and zone outside of said keys) or a QWERTY-like keyboard.

According to one embodiment of the invention, providing (e.g. first predefined) gesture(s) to the system, in a (e.g. horizontal) plane may preferably control the display and/or access to information of the history relating to the content (e.g. message/image which is one content in a discussion/channel/topic/thread) on which the user provides said gestures. Such gestures can, for example, be leftwards and rightwards gliding gestures. For example, if the user glides to the left on an image, the system may display a previous/initial/earlier content relating to said image given the present content displayed at that time. If the user glides to the right on an image, the system may display a next/last/later content relating to said image given the present content display at that time.

Preferably, providing (e.g. second predefined) gesture(s) to the system, in a (e.g. vertical) plane may preferably control the display and/or access to information of the history relating to the sequence of content (e.g. message(s)/image(s)) in a discussion/channel/topic/thread on which the user provides said gestures. Such gestures can, for example, be upwards and downwards gliding gestures. For example, if the user glides upwards on a discussion/channel, the system may display a previous/initial/earlier message content (e.g. in some predefined rendering state) relating to said discussion/channel given the present message content displayed at that time. If the user glides downwards on a discussion/channel, the system may display a next/last/later message content (e.g. in some predefined rendering state) relating to said discussion/channel given the present message content displayed at that time.

According to one embodiment of the invention, the public sequence of content (e.g. message(s)/image(s)) in a discussion/channel/topic/thread may be controlled by access control mechanisms (e.g. such as allowing unauthenticated users) to view and manipulate (e.g. add, modify, etc.) new and/or existing content(s) in a sequence of content. Such access controls may, preferably, be setup/controlled/manipulated by one or more authenticated users, and at least, initially, by the initial user or group of users who established (e.g. setup and enabled access to) the said sequence of content.

According to one embodiment of the invention, the private sequence of content (e.g. message(s)/image(s)) in a discussion/channel/topic/thread may be controlled by access control mechanisms (e.g. such as allowing to only identified and authenticated users or groups of user) to view and manipulate (e.g. add, modify, etc.) new and/or existing content(s) in a sequence of content. Such access controls may, preferably, be setup/controlled/manipulated by one or more authenticated users, and at least, initially, by the initial user or group of users who established (e.g. setup and enabled access to) the said sequence of content.

According to one embodiment of the invention, the person-to-person sequence of content (e.g. message(s)/image(s)) in a discussion/channel/topic/thread may be controlled by access control mechanisms (e.g. such as allowing only two identified and authenticated users) to view and manipulate (e.g. add, modify, etc.) new and/or existing content(s) in a sequence of content. Such access controls may, preferably, be setup/controlled/manipulated by the (e.g. two) authenticated users who established (e.g. setup and enabled access to) the said sequence of content.

According to one embodiment of the invention, providing an interaction, preferably a pressing-and-holding action on a content, such as an image, may preferably display said content without any additional content such as said text (e.g. on it).

According to one embodiment of the invention, providing an interaction, preferably such as a gliding action on a content (e.g. such as an image), may preferably display additional content relating to said content (e.g. image). Said additional content may be one and/or a combination of other contents such as: images, text, hypertext links, audio, link(s) to other content(s), or a link(s) to another sequence of content.

Entering text with many different characteristics such as different colors, fonts, sizes, text location (e.g. on/in a document such as on an image), directions, text orientation, and/or in/on different context (e.g. backgrounds such as an image, background color of the image, etc.), audio, video, application, communication channel, etc. may be used in an application/function such as a search application/function to provide additional information to said application/function for faster and more accurate/relevant search results (e.g. such a type of searching method may herein be referred to as complex search). As such, databases used by such a search application/function, may preferably include text and at least some of such different characteristics. As an example, if desired information such as a document (e.g. picture that includes a color text with words displayed in different directions, Internet web page, Internet website, an x-ray scan including text), it may be searched by providing a keyword(s) that may include one or more words of the text printed in the relevant, one or more colors, one or more directions, one or more fonts, one or more sizes, etc. According to one method, said search may also include an image (e.g. used as a background image to the keyword). Note that the relationship between the location and/or characteristics the word(s) in the keyword may define the search criterion (a). According to one method, the relationship (e.g. coefficient, etc.) of the characteristics of a (e.g. text) keyword(s) between each other, and the relationship of the (e.g. text) characteristics between each other of the corresponding result may preferably define the result.

Note that in a search, one or more of the characteristics as described above may provide sufficient information for a desired result. Also, note that, the characteristics provided for a search may be approximate (e.g. near) to the exact characteristics. For example, typing a word included in a keyword may result in searching any corresponding data/document that includes any corresponding word that is written in any kind of yellow color. Accordingly, as an example, if the keyword includes as word written at an angle (e.g. on a slope, such as 60 degrees) the system may search the corresponding words written in a predefined slope close to said angle (e.g. 50 degrees to 70 degrees).

Figure 31:
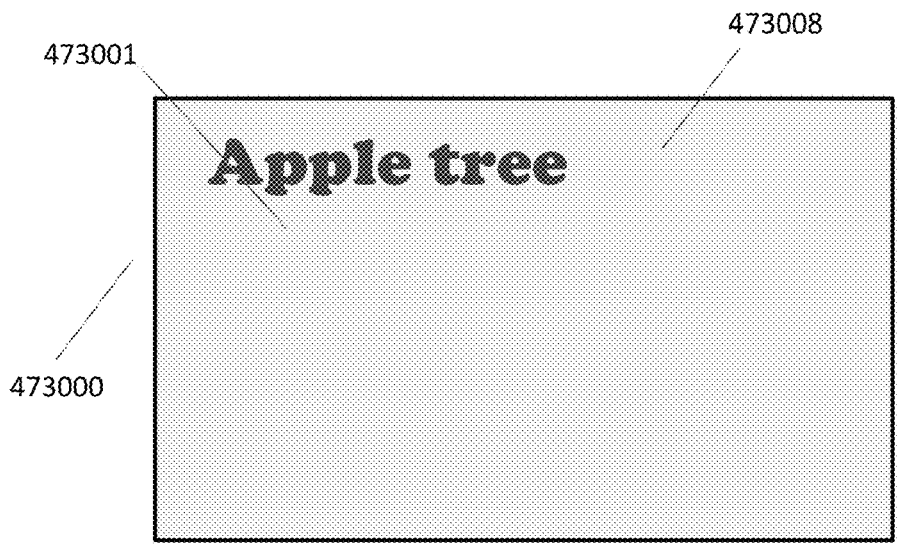
FIG. 31 shows an example of a search input.

As an example, FIG. 31 shows a search input (e.g. keyword) as described above. In this example, preferably the keyword 473000 provided relates to searching for a corresponding image. The keyword is preferably in the form of an image having a Yellow background color 473008 that indicates the approximate background color characteristic (e.g. color, average color, most of the image having said color, indicating the general color, etc.) of the corresponding image to be searched. The image to be search also preferably includes:

the text 473001;

said text is preferably written in the color Red;

said text is preferably located in the (e.g. approximate) location in the image as indicated in the keyword 473000;

said text is preferably written at the (e.g. approximate) angle in the keyword 473000; and the relative size of said text in the image to be searched is preferably similar to the relation of the size of the text 473001 to the size of the keyword 473000, etc.

Note that, preferably, the results of the search may include from all to at least one of the characteristics described/shown in the keyword.

According to one embodiment of the invention, the search box (e.g. field) may have the form (e.g. square, round, rectangular, oval, etc.) of the frame and/or the main object (e.g. person, hand, a type of animal, a tree, etc.) of the content (e.g. the photo) to be searched. Said search box may be drawn by a user and/or it may be provided by the searching system/application/engine. For example, a search application may present to the user different templates as the/a search box.

(e.g. Contrary to the traditional messaging systems) the image editing system of the invention permits to type a message, post comments, include contents such as tags, user's identification (e.g. name, small icon/picture), etc. at any location within a messaging history regardless of some constraints (e.g. the date of a previous posted message). This is possible the background of the history of the messaging between one or more people may be graphical visible surface (e.g. an image) or an invisible/transparent window/surface (e.g. such background/window may herein be referred to as graphical surface). As described and shown before, a new message/text typed on an image may be written on the top of a graphical surface such that a user viewing said graphical surface may first see said message before seeing the other message(s) written below the new message on said graphical surface but being written prior to said new message.

According to one method, the system may permit a user (e.g. to type a new message on a new graphical surface/image and) to insert a (e.g. the edited) new graphical surface within an already existed graphical surface/image. According to one method, said inserted graphical surface/image may split or not split the original graphical surface/image Different methods of interaction in the image/photo/video/etc. editing (e.g. texting on an image) application/system (e.g. herein may be referred to as image editing system/application) have been described before. According to a preferred embodiment, an/the image editing system may preferably use at least one (e.g. preferably all) of the following principles (e.g. when an image is being edited, on for example a touch screen): [0762] Upon providing a predefined interaction such as a tapping action on an image (e.g. on a touch screen), different scenarios may be considered such as:

Scenario 1: if the menu is displayed (e.g. shown) on the screen, preferably after providing said tapping action the menu will/may be removed (e.g. or hidden) (e.g. by the system) from the screen. Also preferably, if the keyboard is NOT displayed on the screen, after providing said tapping action the keyboard will/may preferably be displayed on the screen (e.g. upon said tapping action, if the keyboard is displayed on the screen it will remain on the screen).

Scenario 2: if the menu is NOT displayed on the screen, after providing said tapping action the menu will/may preferably be displayed on the screen. Also preferably, if the keyboard is displayed on the screen, after providing said tapping action the keyboard will/may preferably be removed (e.g. or hidden) from the screen.

Upon providing a predefined interaction such as a gliding/ gesture action (e.g. corresponding to a word to be entered, or to a word which is being entered, or to a selected word (e.g. for relocating said selected word (e.g. on the/a touch screen), etc.) on the (e.g. touch) screen, different scenarios may be considered such as: [0766] If the/a keyboard is not displayed on the screen, the keyboard will/may preferably be displayed on the screen. And/or [0767] If the/a menu is not displayed on the screen:

According to a first method, the menu will/may preferably be displayed on the screen. (e.g. upon said tapping action, if the keyboard is not displayed on the screen, it will remains not displayed). [0769] According to a second method, the menu will/may preferably be displayed on the screen unless if the menu will/may cover at least a (e.g. predefined) portion (e.g. a/the beginning portion) of the gliding/gesture action. [0770] Preferably in all cases, if the/a menu is displayed on the screen and the user start to type a text (e.g. a character, a word), the menu will/may preferably be disappeared/removed/hidden from the screen.

Note that a predefined interaction such as a tapping action (e.g. relating to displaying the menu on or removing the menu from the screen) may not affect the location and/or direction of the current (e.g. last) gliding action (e.g. and the corresponding word/text) provided/shown on the screen.

If an interaction such as a tapping action regarding displaying or removing the/a menu from the screen is provided when a current word is being typed/entered or when a (e.g. previous) word is selected, preferably, said word may remain on the screen and may preferably keep at least some, preferably all, of its characteristics (direction, color, etc.).

Note that principles of functions and/or interactions in an image editing system such as the principles described herein may be used with any keyboard such as a keyboard of the invention, a QWERTY keyboard, etc. As an example, the keys/zones of a keyboard used by the system may (e.g. mainly) from one, two, three, or four rows of keys/zones respectively located next/closed to one, two, three, or four edge(s) of the surface of the/a corresponding touch sensitive/ screen used by the system. The keys/zones of such rows may be of any kind. For example, a zone may correspond to one identified character or it may ambiguously correspond to any of a plurality of characters. A zone may be a fixed zone, or it may be a dynamic zone as described in detail before. As an example, the system may have two rows of zones, each representing several characters and wherein being located on opposite sides on the corresponding screen. according to another example, the keyboard may form only one line of zone (e.g. including or excluding the space and/or the backspace keys) and being located on one edge of the screen for example on the edge opposite to menu bar. Different methods of arrangements of letters on keys/zone and/or different may of arrangements of said keys/zone have been described throughout this application. Many others may be considered by people skilled in the art. Said keyboards may be used by the image editing system of the invention and be located on the screen according to principles described or according to appropriate manners preferably in a manner to minimize the interference with the image to be edited and/or with the menu, etc.

Figure 38A:
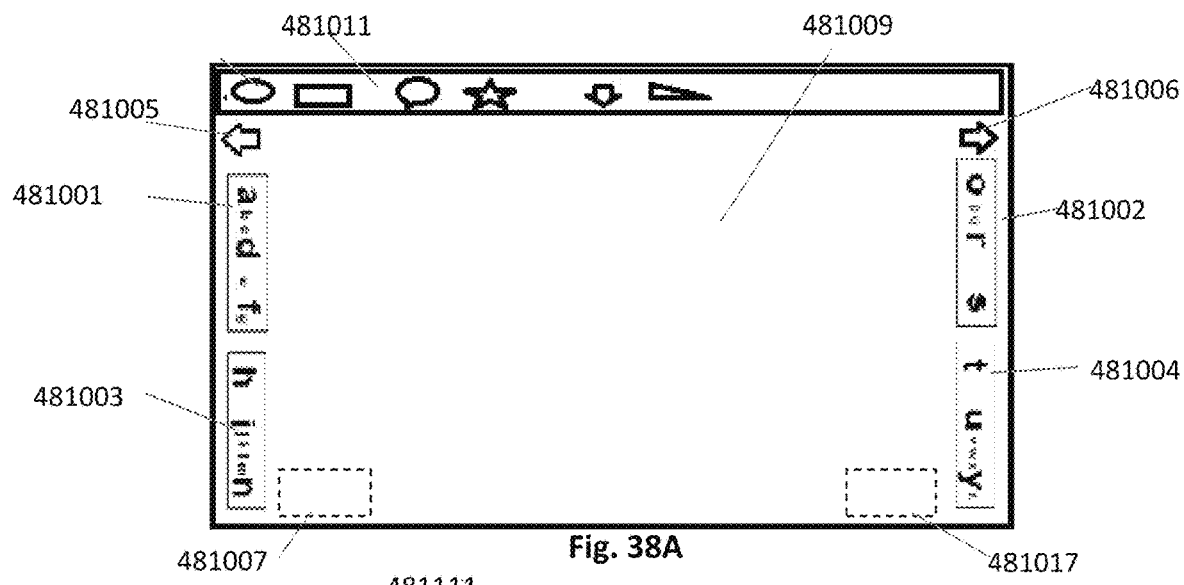
FIG. 38A-38C show three examples of keyboards located at the edge of an input interface.
Figure 38B:
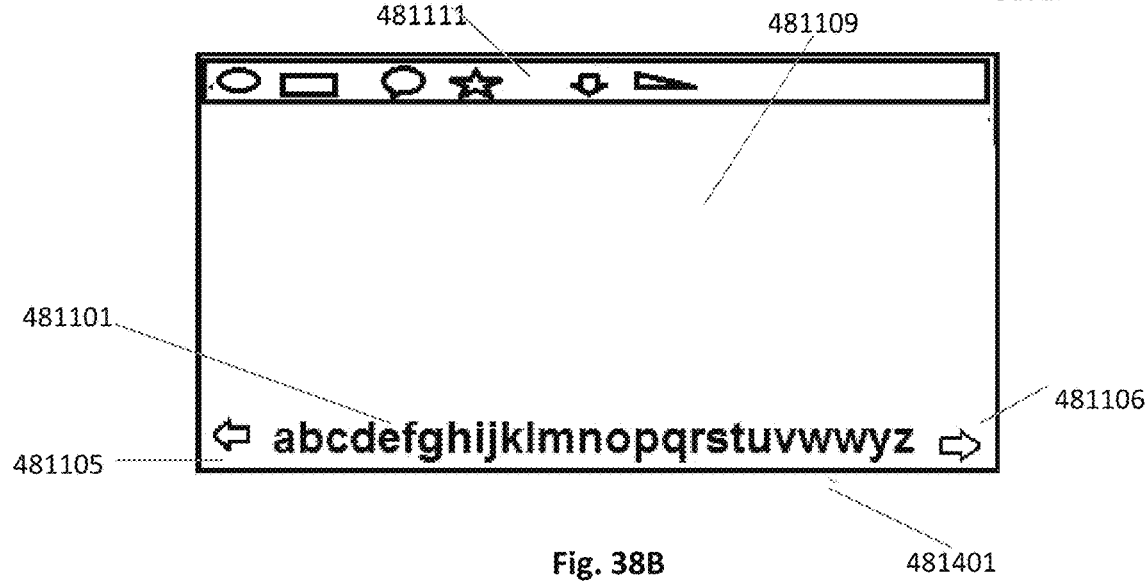
Figure 38C:
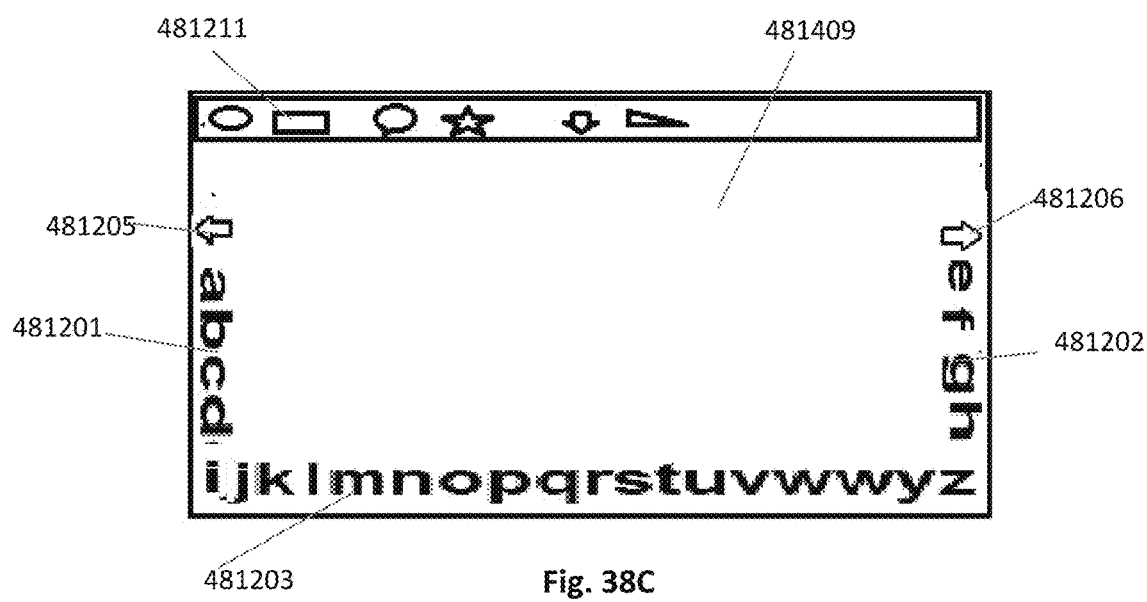

As an example, FIGS. 38A to 38C show three exemplary such keyboards. In FIG. 38A, shows a keypad of the invention in alphabetic order as was shown before, but wherein here the letter keys 481001 to 481004 are split in two groups and displayed on opposite sides closed to/adjacent to the edges of the touch screen 481009. In this example, the space key 481006 and the backspace key 481005 are also on opposite sides of the screen. The keys are arranged such that when the menu 481011 is displayed on the screen, the keypad and the menu preferably do not cover each other. In this example, the broadly ambiguous zone include is shown in two locations 481007 and 481017 (e.g. although it may be made of a single (e.g. continuous) zone, or three or more zones). In the example of FIG. 38B, the keyboard is made of a single line/zone 481101. This keyboard may be a precise keyboard wherein an interaction on a (zone corresponding to a) letter/character may enter it precisely and/or it may be a dynamic keyboard as described before (e.g. an interaction with a zone of the keypad may ambiguously correspond to several (e.g. neighboring) characters/letters.

In the example of FIG. 38C, a keyboard having three portions 481201 to 481203. The interaction with the keyboard may be based on the principles described regarding to the keyboard of FIG. 38B.

As mentioned before, these keyboard when used with the image editing (e.g. texting) systems may give them a lot of advantages by minimizing the interference with the image, menu, etc.

It must be noted that these are only exemplary keyboards and methods of interaction and/behavior of the system relating to such interaction. (e.g. based on the principles described) Other types of keyboard, other types of arrangement of characters (e.g. QWERTY), other types of the behavior of the system regarding the interaction may be considered.

Figure 39:
FIG. 39 shows an example of a keypad where its keys are arranged around the edge of an input interface.

Note that according to one embodiment, when the user desires to enter identified characters, the system may show the character/letters around the screen (e.g. near the edge of the screen). According to one aspect, when the system is in ambiguous mode, the keypad may be a keypad having four ambiguous letter keys/zone, and when the system is in precise mode, the keypad may be a keypad wherein at least each of its letter keys represent a single character and the keys are arranged around the screen (e.g. the keypad of FIG. 39).

Note that although in many embodiments interactions (e.g. tapping, gliding) with a (e.g. touch sensitive/screen) surface are being used to describe the principles of data entry of the invention, it is understood that said interactions and said surface may be of any kind. For example, said interactions may be provided in the air/space and said surface may be a remote surface of any kind. According to one method a remote detecting means such as a camera, sensor, etc., may be used to detect the user's interactions (e.g. tapping, gliding, etc.). In this case, according to one method, a surface may not be needed.

The principles described may provide an extremely user-friendly method of interaction for editing (e.g. typing on) a picture. As an example, while a keyboard is covering at least a portion of an image, if a user desires to type a text under the keyboard, or if he desired to relocate a text being typed/selected under the keyboard, when/if the menu is not displayed on the screen (e.g. if the menu is displayed on the screen, the user may remove it by providing a tapping action on a predefined location such as outside the keyboard (e.g. on the screen)) the user may provide a tapping action on a predefined location such as outside the keyboard (on the screen). In this case, the system may preferably remove the keyboard from the screen (e.g. and preferably the menu pops up). Now, the user may provide a gliding action from a desired location (e.g. in s desired direction) on the portion of the screen that the removed keyboard was covering. Upon providing such a gliding action (other) different scenarios may be considered such as:

1st scenario: if a word/text is being typed/selected, upon providing a gliding action (e.g. anywhere on the screen), said word/text may preferably be relocated on the screen according to said provided gliding action (e.g. location, direction).

2nd scenario: if a word/text is NOT being typed/selected, upon providing a gliding action (e.g. anywhere on the screen), said gliding action may preferably define the location and direction of the/a next/new word/text to be entered.

Note that, after providing the/said gliding action the keyboard may be re-displayed on the screen and the user can/may be able to, respectively, start modifying (e.g. appending characters, deleting characters, changing the color, etc.) of the word being entered/selected and/or he may type a new word/text, under the displayed keyboard according to the provided gesture.

Note that in at least some (e.g. preferably, all) of the embodiments/descriptions of the invention regarding an image editing application/system, the principles corresponding to a word being entered may preferably also be applied to a word being selected, and/or vise versa.

It must be noted that principles described above (e.g. regarding displaying/removing a menu and/or a keyboard, typing, keyboard usages, menu usage, etc.), may be applied to and/or used with any content printed on a screen (e.g. and not only to an image). For example, said content may be a text box, a video being played on a screen, an invisible content displayed on the screen, etc. according to one method, the screen on which the image editing system is used may have no content (e.g. except a keyboard and/or menu that may be displayed or removed). In this case, for example, a text being typed/created as such may (e.g. be saved and) be printed on any content, such as for example, on a remote content or on a content that may be displayed later on a/the screen.

It must be noted that the descriptions and drawings provided throughout this application are brought up to describe and/or demonstrate the principles of the data entry system and/or the image editing application of the invention. Other descriptions, examples, modifications, etc., may be provided by people skilled in the art based on the principles of the data entry of the invention. For example, instead of or in addition to a keyboard, any other input systems (e.g. voice recognition, lip reading recognition, handwriting, handwriting recognition, (e.g. gesture) interactions in the air, etc.) may be used/combined with the picture editing system and/or its principles (e.g. a user may provide a gliding action in a direction on a photo (e.g. printed on a touch screen) and (e.g. then) speak a text. In this case, the spoken text may preferably printed on the photo according to said gliding (e.g. preferably starting at the beginning of the gliding action and/or according to the direction of the gliding action)), and the data entry systems of the invention, as described throughout this and previous patent applications.

According to one embodiment, some predefined texts (e.g. word(s), phrases, sentences, paragraphs, etc.) may be pre-stored in the database used by the system. They may be entered by using the data entry system of the invention by using any of the input means used by the system. For example, they may be entered by using the word/sentence predictive system of the invention or by using a speech (e.g. voice) recognition (e.g. command-and-control) system. According to one method, the user may be enabled to add her/his own such text(s) to the database used by the system.

According to one embodiment, at least in the image editing system, a user may be enabled to relate-to and/or include a content such as an edited image (e.g. that includes a text (e.g. preferably entered by a user)). Said content may be of any kind such as a audio (e.g. music), a video, a text, a list of information, etc. By providing a predefined interaction such as for example a tapping action on a location on said image, said content may be activated and/or become available. As an example, when a user edits a picture by typing a text on it, he may speak (e.g. what he types) and/or he may add a music. Said speech and/or music may be played by an interaction with the image locally or remotely. As an example, after an editor of an image (e.g. hereafter may be referred to as editor) shares the image with a friend or others, the receiving party may provide a predefined interaction such as for example, touching a/the (e.g. portion of the) text written on the edited picture to listen to the speech and/or music and/or video that the editor of the image has been included or related to. Different other methods may be considered. According to one method, a predefined interaction such as a sliding action over at least a portion of a text (e.g. one or more words) may result in playing the audio corresponding to said portion or to all of the related text. The speed of the audio may be related to the speed of the sliding action. Note that the content combined and/related to an edited image may be or may not be related to, a text typed/included/corresponding to an edited image.

According to one embodiment of the invention, users can share a content/background such as an (e.g. remote) image (e.g. including relating contents such as audio, speech, video, etc.), a video (e.g. streaming/being played, etc.), a textbox, an invisible/virtual background/surface (e.g. on a screen) etc., and edit it (e.g. type text (e.g. in deferent location(s) and/or direction(s) on it) preferably, at least substantially, simultaneously, preferably, by using the principles of the data entry system of the invention and/or the principles of the image editing application of the invention.

According to one embodiment of the invention, each interaction (e.g. taping action) with a location on a zone having a number of characters such as letters (e.g. a zone may include all of the letters of a language (e.g. zone 478101 of the keypad of FIG. 36D) or it may have some of the letters of a language (e.g. zone/key 479001 of the keypad of FIG. 37A having five/keys zones) a/the word predictive data entry system of the invention may dynamically relate some (e.g. one or more) of the characters/letters related to (e.g. an example of related characters is described in this application) and/or closed to the interaction location (e.g. tapping impact on the zone) and upon receiving one or more of such interactions the system may preferably predict one or more words from a database used by the system. This method of word predictive system may be used by any keyboard/keypad such as those described and shown in this and previous patent applications filed by this inventor.

According to one embodiment of the invention, a first predefined interaction such as short gliding action may preferably select a predefined portion of an already entered text such as a word (e.g. a consecutive number of characters), and a second predefined interaction such as a longer gliding action may select another predefined portion of a text (e.g. a character, a line of text (e.g. corresponding to a/the corresponding gliding action, a paragraph, the whole already entered text, etc.)

According to one embodiment of the invention, at any moment during the entry or editing of a text providing a predefined interaction such as activating the Enter/Return key (e.g. by providing a predefined interaction) results in locating at least the next line of the corresponding text (e.g. already typed and/or being typed and/or to be typed) in a direction parallel to the direction of the gesture (e.g. that was) provided on the screen/image corresponding/relating to a predefined line of the corresponding text (e.g. the next line of text will be show/displayed parallel to the gesture corresponding to the first line of the corresponding text). Note that the/said corresponding text may be a block of text such as a phrase, paragraph, whole text of a text field, etc.

According to one embodiment of the invention, the system may include a means such providing a predefined interaction, wherein after providing a gliding action corresponding to the direction of a text, providing said means, the system preferably adjusts the direction of said gliding action to a predefined degree on the screen (e.g. the closest 45 degree).

According to one embodiment, the photo/image editing application may include a means such as a button such that to enable the user to share said photo with/in another social application.

Figure 52A:
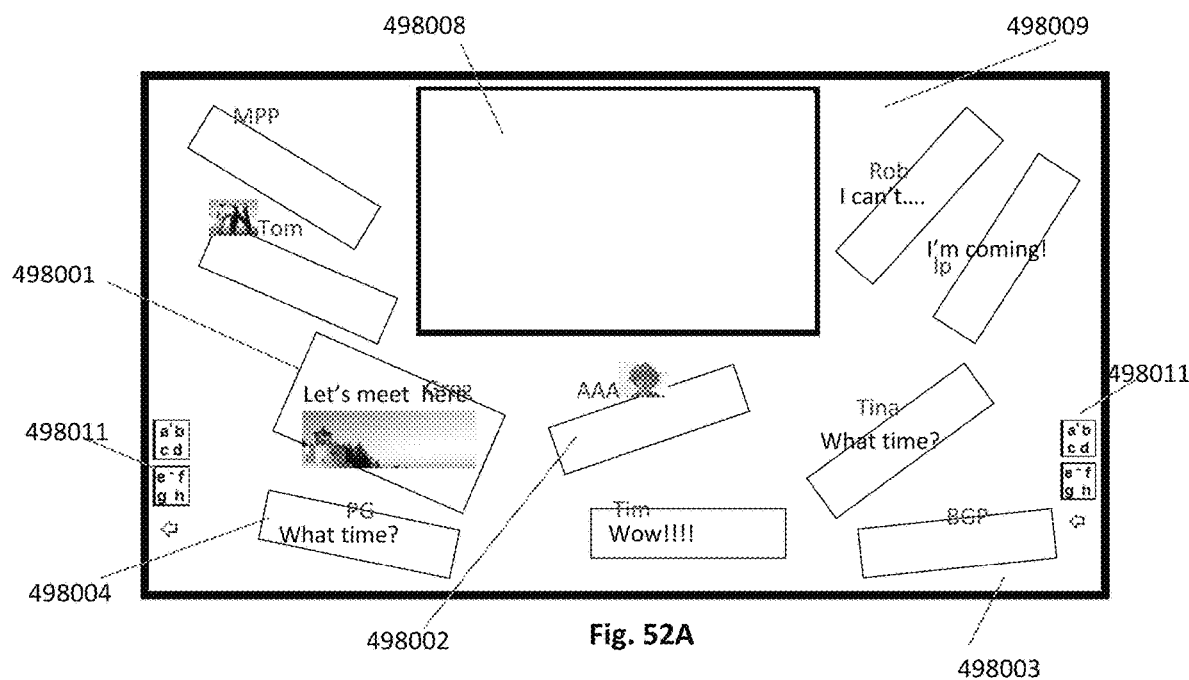
FIG. 52A shows an example of a box on which an image frame is defined.
Figure 52B:
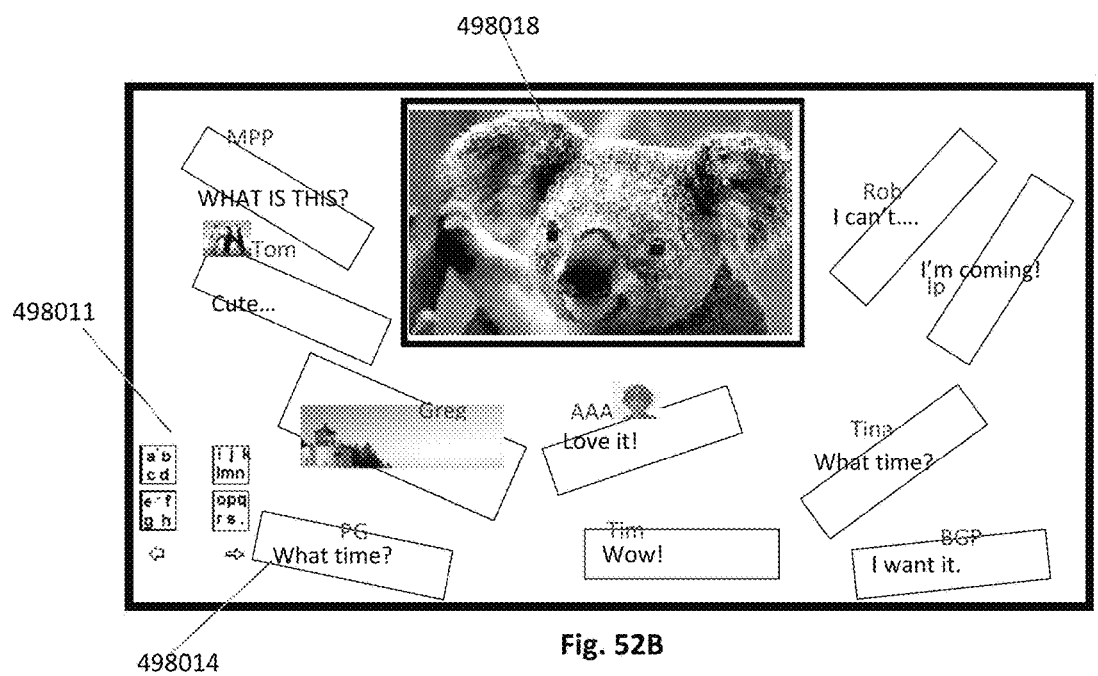
FIG. 52B shows an example of a box with an image frame that contains a photo/image.

A method of editing an image is described. According to one embodiment of the invention, a portion (e.g. herein may be referred to as image/subject frame) of box (e.g. a background image, application, etc.) (e.g. on a display or touchscreen surface, etc.) may be defined by a user or by a system to display/present/store a content such as an image (e.g. one or more images (e.g. photo, video, text, etc.), a (e.g. online) game, audio content, etc. (e.g. herein may be referred to as discussion subject) on the fly (e.g. dynamically). Said content (e.g. image) may be an image sourced from a gallery of images (e.g. on a device), from a camera (e g immediately after taking a photo) (e.g. automatically and/or directly), or other communication or storage device/system. Said image frame may be a predefined zone on said box or it may be dynamically defined by a user or by the system depending on some (e.g. one or more) (e.g. dynamic) parameters. FIG. 52A shows an example of a box 498009 on which an image frame 498008 is defined (e.g. size, location, and orientation in the box). As an example, if a user takes a photo using a camera (e.g. a camera of the corresponding device) said photo may be directly (e.g. without user's intervention) placed into said image frame 498018 as shown in FIG. 52B. A user may provide/type text anywhere on the box and save or share said box (e.g. as an image like a postcard).

The current principles may be used in many circumstances. For example, this technology may be used to create a social interaction/discussion (e.g. texting, audio, visual, etc.), preferably including a texting application that herein may be referred to as a (e.g. virtual) forum. As an example, said box may display (e.g. contain) a group of users interacting (e.g. a (e.g. virtual) message board/forum), and said image frame 498018 may be considered as a/the subject of interaction/discussion. Preferably, the display of a device of each of the participants may display the box (e.g. preferably in a similar manner/fashion/rendering). Preferably, a server (e.g. remote computer/platform) may be used to handle the streaming/interactions of the discussion between the participants.

Note that said/the content/subject/image may be changed at any moment by any of the users or another user which may not currently be part of the said interaction/discussion so that a new discussion will be initiated (e.g. in the/a (e.g. different) box).

According to one embodiment, the history of the interaction/discussion may be stored or it may not be stored so that it may not be accessible after the interaction/discussion. As an example, the history of a chat may be stored or it may be deleted when a subject of corresponding to an image frame is changed, or on a predefined (e.g. automatic system) events, for example, such as a period of time after a change to an image frame.

Note that the content (e.g. image) in the image frame may be the subject of discussion or it may contain a text or other information for the purposes of discussion.

According to one method, a different zone (e.g. herein may be referred to as a desk(s)) on the box may be assigned to the comments/discussion of one (e.g. each different) user. As an example, as shown in FIG. 52A, four different zones 498001-498004 are assigned to users (e.g. one or more different users), for example as shown in FIG. 52B each of the users (e.g. 498014, 498011) have commented in a zone allocated to each of said users.

Note that the box may be of any shape.

Note that user interactions may by information of any form including, for example, text, images, audio, etc. As an example the image editing system of the invention for entering text as described in detail throughout this application may be used for such purpose. In this case, the background of the box or the background of a zone corresponding to a user, may, by itself be an image.

Note that history of an image frame and/or a corresponding user may be browsed or scrolled while interacting with the image frame, such as for example providing gestures (e.g. back and forth). In this case the corresponding discussion/interaction may appear on the box/zones in the corresponding locations.

Note that the history of discussion of each user may also be browsed, for example, by scrolling on the corresponding zone (e.g. or other zone) of a user.

Note, a zone corresponding to a user may be considered as an image frame of another interaction/discussion.

It must be noted that other types of presentations and methods of discussion may be considered; for example, a (e.g. single) zone may include all of the discussions relating to said image in said frame.

Note that the frame and/or zones may have any shape, location, orientation, size, and other (e.g. graphical) attributes. For example, the size of the frame may be controlled (e.g. before, during, or after any discussion/interaction).

Note that the frame and the desks may be shown on the devices of each of the participants. Preferably, a participant may select the desk of a number of participants (e.g. to be displayed on the screen of his/her device) among all of the participants.

As mentioned, a virtual discussion may, preferably, be opened by providing a content in the frame. A group of one or more participants may participate in discussion. Different methods of creation of a such group may be considered: such as:

The initiator of the discussion (e.g. the provider of content in the frame) may invite a predefined group of people/friends.

The initiator of the discussion (e.g. the provider of content in the frame) may provide a public invitation for any random participant.

The initiator of the discussion (e.g. the provider of content in the frame) an invitation to a number of people to participate.

A/the (e.g. remote) server (e.g. used by the forum application) may be used to send notifications to the appropriate participants or to the general public.

Note that a remote server or online platform may be used in transmitting information related to any activity/functionality of/during the forum (e.g. among the participants). For example, a remote server communicates information from a first user/participant (e.g. user's desk) to at least a second user/participant). As another example, the server may be used by the forum administrator for activities such as sending invitations to users.

Each user may interact with a forum through one or more devices, that preferably includes a box (e.g. with which a user may interact).

A subject may have sub-subjects. For example, the subject may be a football game and a sub-subject may be a replay of a portion of a game. Note that a sub-subject of a subject may or may not be related to the main subject.

According to one method, the participants of the forum may be a group of one or more people/entities, each being represented by one or more desks (e.g. one or more (e.g. text) box/s). The participants may be invited to the forum (e.g. they may get a password for participation) or the forum may be open to any (e.g. random) participant. According to one embodiment, a participant may enter a content (e.g. text, picture, video, game, etc.) in his corresponding desk to be accessed (e.g. viewed) by one, more than one, or all participants (e.g. according to the users preference settings). According to one method said content may be available for viewing by all of the participants. According to another method, said content may be available for being viewed by a number of one or more selected participant/s. For example, a participant entering a content (e.g. in his desk) may select one or more other participants by for example, providing an interaction (e.g. such as single-tapping) on/in their corresponding desks, enabling them to view his/her content entered/being entered/to be entered. Said selection may be a predefined selection or it may be a selection dynamically provided during a forum (e.g. for a period of time/text entry during the forum).

Different types of participants may be considered. For example, a first type of participant may have the right to watch/view the forum but not have a desk to participate in discussion/chatting (e.g. type/write), while a second type of participant may have a desk for discussion/chatting. According to one method, having a desk may require a satisfaction of some criteria (herein may be referred to as a fee), for example, such the payment of a fee. Preferred locations regarding the desk may also require a (e.g. higher) fee. Because the screen of a mobile device has a limited size, more than one layer of boxes may be considered for more desk assignments. For example, a first layer may include a first plurality of desks and a second layer may include a second plurality of desks. A second box layer may preferably include the subject frame although according to one method, it may exclude the subject frame. The size of desks may vary, for example, based on a fee. The number of desks may vary, for example, based on a fee.

A desk may include the name or a username or some other identifying information for identification of the corresponding participant.

The content (e.g. text) inputted or outputted in desks/image frame(s) may disappear after a predefined of time given some predefined event. The history of a forum may be stored or it may not be stored.

According to one embodiment, the desk locations (e.g. in a box) may be defined by a user (e.g. such as any entity, for example an administrator or participant in a discussion) in the box (e.g. depending on the features and configuration of a forum).

Optionally, the assignment of a desk to a participant may be defined by himself/herself or by another entity such as a computer, administrator of the forum or the forum host.

According to one method, one or more of the desks may be relocated in a box. According to one embodiment, one or more desks may not be permitted to be relocated.

A participant (assigned to a desk) may be a person and/or a group of persons. (e.g. A participant may be assigned to more than on desk.)

As mentioned, a desk is preferably a content such as a text box, but may also be used to display or play other type of content such as an image, a video, audio, game, document, etc.

According to one method, the location and/or assignment of one or more desks on the/a box of different devices may not be identical. A user may be permitted to relocate a desk or change the assignment of it to a (e.g. another) participant. According to one method, a user may use a list of entities/information such as a list of contacts (e.g. email address, facebook identifier, twitter identifier, name, telephone number, etc.) in a device and may assign a desk(s) to a user/participant (e.g. by dragging a corresponding entry of the list to a desired desk). A user may also relocate a desk in the box by for example dragging it to a desired location. For example, a contact information (e.g. displayed on a screen of a device) may be dragged in order to assign a desk to a user or to relocate a desk in a box.

Preferably, a desk may be designed to have a predefined specification (e.g. including settings, features, format). Preferably, the specification of a desk may dynamically change for example by a person or automatically by a computer/system.

If all of the desks of a forum are occupied/assigned, a/the system may create a waiting list for additional users desiring to participate in a/the forum (e.g. in case of cancellation or creations of additional desks, or in case a participant leaves the forum, etc.)

During a forum, one or more subjects (e.g. of the image/subject frame) may be discussed. A new subject may be provided by a participant dynamically during a forum. Preferably, for such action, an authorization may be required provided by an entity such as the administrator/admin of the forum (e.g. administrator (e.g. administrator in this application refers to an owner, creator, beneficiary, initiator, etc., of a forum).

According to one method, preferably, upon authorization, a user may use a predefined location in the box, such as one near the subject frame, to display a (e.g. their) desired content (e.g. such as to ask a question, display an image, video, etc.) so that other (e.g. all, some, a, etc.) participants can view desired content.

It must be noted that any type of keyboard such as for example preferably the keyboard of the invention permitting to view at least a significant portion of the screen may be used for discussion/texting during the/a forum.

Note that the displayed content in the frame subject may be modified during a forum.

Any type of forum may be considered to be used by the system/app. For example, the subject of a forum may be a scientific matter (e.g. medical), a game, a video/movie (e.g. live chat, see a video/subject then chat), a photo, a text, shopping, auction, etc. As mentioned a user may relocate the desk of the/his preferred participants to a location that he desires. For example, during a medical forum wherein participants are doctors, a user may relocate the desks of the doctors he wants to see their interactions (e.g. texting) to the first/main layer or close to the subject frame, or any other preferred location.

As an example, a forum may be created regarding a (e.g. live) football game. The admin may invite some people and the participants may watch the game while having a live chat (e.g. texting). A replay of a portion of the game may be provided (e.g. by the admin, by any of the participants, etc.). Preferably, a participant may have access to the content of the forum to view it at any moment preferably in the subject frame on his/her device, preferably while other participants continue viewing the (e.g. original) content provided by the admin.

A forum may also be used for auctions where participants type their offers for an article, for example, presented in the subject frame, and wherein people can see (e.g. best) offers in the desks of the corresponding participants in real time.

Many methods of monetization may be considered for/through the virtual forum application/system such as:

a forum with up to a predefined number of participants may be free and beyond that number the forum will be permitted upon a fee (e.g. for a new user beyond the predefined number or for all the users).

Attendees/participants of a forum may attend the forum upon a fee (e.g. or authorized membership).

Advertisements during a session/forum may be displayed on the screens (e.g. or box/desk) of the participants, preferably in the image/subject frame. The advertisement may be the same for all participants or they may be different for each participant for example based on their tastes, location, or online behavior, etc.

Preferred desks may be assigned to a participant(s) based on a fee.

A person may purchase a desk of another participant upon a fee and the administrator/owner may take a commission or a fee for that transaction.

A forum administrator/owner may take a commission or a fee for a/any financial transaction/exchange relating/during a forum.

An entire (e.g. and it's history) may be transferred to another owner/administrator for a fee.

A participant may enter a content (e.g. text, video, picture, audio) in the image/subject frame for a fee.

According to one method, a desk, a portion of discussion such as a comment, and/or a participant may be banned (e.g. restricted/excluded in any predefined way) for any reason such as bad behavior, from the box/forum.

Note that a box may include one or more subject frames at any moment.

Note that more than one entity such as an administrator may control or be assigned to manage a forum/box.

Note that a box or a portion of it (e.g. a desk) can be zoomed into or zoomed out of its display. For example, by providing a predefined interaction such as a double tapping action on a desk, the desk may be enlarged (e.g. to full screen) so that its content will be better viewed. Also for example, by providing a predefined interaction such as a double tapping action on a/the subject frame, the said frame and its subject/content (e.g. a video, a photo, a text, etc.) may be enlarged (e.g. to full screen) so that its content will be better viewed.

Note that a box display may be filtered, for example, to highlight areas of the box, or to display portions/layers of the box, etc.

Note that one or more desks may be highlighted, publically (e.g. on all participating boxes/devices) and/or locally (e.g. on a user's device/box). For example, when a participant selects a group of one or more other participants the corresponding desks may be highlighted, for example in a highlighted color.

Note that at least for a lapse of time during a forum an image/subject frame may not be displayed.

Note that text of a desk/box may be limited by being wrapped in a desk or may be limited to one line in a desk, or a predefined number of characters when displayed. Upon authorization, said limitation may be removed. A scrolling method may be used to view the history of the content of the desk (e.g. independently or in synchrony with at least some of the other desks). According to one method, the desk may be (e.g. dynamically) enlarged to view more lines of a desk.

Note that some desks may not be enabled to be relocatable/moveable in a box.

According to one method, any user (e.g. other than participants) may be able to provide/submit a content (e.g. a question) to the forum that may preferably be displayed on a location in a box (e.g. a subject/image frame, a predefined desk, etc.) for example upon authorization (e.g. if required) of for a fee.

According to one method, a forum may not have an admin.

According to one method the forum application/platform may be used for a group chat (e.g. including texting) that may be communicated peer-to-peer and/or amongst peers (e.g. without the involvement of an administrator).

According to one embodiment, an (e.g. relevant) information provided by a (e.g. any) party regarding/during a forum may be transmitted to a server and from there to corresponding/relevant devices/users. According to one embodiment an information may be transmitted to devices/user automatically by a/the server or upon a user's request.

According to one embodiment, at least one of the desks of a forum is mandatory. This means that all of the boxes used by participants of a forum preferably include said at least one desk. According to one method, a user can add one or more desks of participants of his choice into the box. The list of said participants may be provided from different sources such as by the admin of the forum, contacts list of the user's phone device, facebook friends, etc.

Note that accordingly, two users participating in a forum may have different participants' desks in their box/es.

A gaming application for providing the longest word by participants, for example, using the forum applications/platform is described hereafter. As an example, a group of participants may use a keyboard (e.g. of the invention) wherein at least one of the keys ambiguously corresponds to a plurality of characters. Said application may use a word predictive system based on receiving ambiguous input signals provided by interacting with ambiguous keys. As an example, a user may press a desired ambiguous key for a desired word/stem. (e.g. said information may correspond to the length of the desired word, or the length of the corresponding beginning portion of a longer word that other participants may not be aware of). The content (e.g. the single word wherein its length corresponds to the input information provided until then) is presented on an image/ subject frame or some other location on the participant's devices/screens. The length of the presented word (e.g. must) correspond to the input information (e.g. key interactions) provided until then. After viewing the output and by considering the output, the next participant (e.g. preferably in a predefined row of participants) may attempt to enter a next letter for a word/stem (e.g. as just described above) corresponding to input information provided until then (e.g. including the participant's current attempted input), and so on by the next participants (e.g. preferably in the row). Note that a word may be a stem of a longer word.

According to one aspect of the invention, after interacting with a key/zone of the keyboard, if there is no corresponding word in the database of words used by the system/application, the participant is eliminated. (e.g. by eliminating participants as such) the last participant providing the last word is the winner of the game (e.g. or that session of the game).

According to one method, the history the words proposed in the game by be reviewed (preferably at any moment) during/after the game. Note that preferably, a predefined lapse of time is assigned to a participant for enter the input information (e.g. corresponding to a next character) wherein upon expiration of said time lapse, when not receiving said input information, the participant may be penalized (e.g. eliminate from the game) in some manner.

As mentioned before, the history of a box/forum/frame/desk may be accessible. According to one embodiment of the invention, the history can be replayed (e.g. played back). For such purpose, according to one method, a play mechanism (e.g. a software application) may be used. Said play mechanism may include features such as play forward, play backward, stop, start, repeat, etc. A user my view an instant of a history synchronized between at least some, preferably all, of the objects (e.g. desk, image/content/subject frame, etc.) in a box. At least some of said objects may be interactable.

According to a preferred method, an instance such as a portion of the forum/box may be synchronously viewed (e.g. replayed) upon selection of a content such as a desk, portion of the content of a desk, or an image/subject/content frame, etc. Preferably, selection a content may result in playing at least a portion of the history of the forum/box/object that may include a time period before and/or a time period after the corresponding instance related to the selected content.

Note that, any portion of a forum/box may be searched according some search parameters, such as a keyword, a scrolling means, playing means, color, time/date, user, subject, etc. If the results correspond to an identified content, then the system may (e.g. automatically) view the corresponding instance as described. If there is more than one results, then the user may select (e.g. identify) one of the results and view the corresponding instance as described.

A method of simplified private and/or public communication/message is described. Said method may preferably be used by the forum application described herein. According to one embodiment, upon providing and/or selecting a content, such as recording/selecting a video, taking a photo, recording audio, generating a text, etc., said content may automatically be shared with a forum (e.g. presented/located in the frame image or a box of a (e.g. corresponding) forum).

According to one method, said selected content may be considered (e.g. by a user/provider) as public content which means that preferably said content may be automatically/manually located in the provider's desk and or image/subject/content frame (e.g. if user is so authorized), and may (e.g. preferably automatically) be viewed, respectively, in a desk corresponding to the provider in other user/s' box(es) or an image/subject/content frame. Preferably, upon such procedure, other users/participants may be informed (e.g. alerted) of the selected content so as to access said content.

According to one method, said selected content may be considered (e.g. by a user/provider) as private content which means that preferably said content may not be located in the provider's desk and or image/subject/content frame, and may (e.g. preferably automatically/manually) be transmitted to a selected number of participant's but may only be visible and/or accessible by the said selected number of participants with in their corresponding desks. Note that according to this method, the public content of a desk is the information provided by the owner of a desk, and preferably does not include the information/content received from others (e.g. transmitted/send to said (e.g. selected participant's) desk). Preferably, upon such procedure, said selected number of users/participants may be informed (e.g. alerted) of the selected content so as to access said content.

Note that the/a public method (e.g. as described in this embodiment), a user may exclude another user from viewing content in the user's desk. Such exclusion may be applied to a number of particular contents in the desk or it may be applied to all content in the desk (e.g. at any time).

According to one embodiment, upon providing and/or selecting a content, such as recording/selecting a video, taking a photo, recording audio, generating a text, etc. said content may automatically be located in a desk or an image/subject/content frame (e.g. if user is so authorized) of a user's box. Upon such procedure, other users/participants may be informed (e.g. alerted) of the selected content so as to access said content. Note that, a server may be used to provide automatically or upon a participant's request (e.g. according to a participant's settings), the content to the participants device(s), so that it may be viewed in the corresponding forum/box. According one method, said content may be automatically transmitted to a selected number of participants as a private content, in such a way that it may not be viewed in the providers box.

According to one embodiment, if a participant provides a new content/message, the corresponding desk/message may be highlighted. Optionally, the corresponding desk/message may be shown in the first/main layer of the forum/box.

According to a first method, a content provided by a participant may be transmitted to other participants' desks. According to a second method, said content may be transferred to the desk of the provider of the content and be accessed/seen by other uses. An alert may be send to the other users to access the content.

The subject of a forum may be a game (e.g. blackjack) where participants can play against the admin or against each other.

Note that according to one embodiment, a group of participants may be dynamically defined by a user (e.g. forum provider/admin) for example based on the subject of the forum.

According to one embodiment of the invention, in the photo editing application, typing a word/text on a picture may be related to activating a function. For example, the text entered may be related to a keyword for a search function or to a url address for browsing.

Note that the methods and principles described for moving the keypad on the screen as described in this applications may be applied to any type of keyboard such as an ambiguous keypad/keyboard and/or a precise keypad/keyboard.

The picture/image editing application/method of the invention may be used for (quick) taking notes. As an example, an image/a view (e.g. in form of a plain in any color) may be used as a background of the note being taken. By using this application a user can start taping immediately in any direction on the image and save or share it. the text entered as such may be searched, sorted, grouped, pulled, etc. The application may include a means such as a zone in a menu assigned to a searching function. After interacting with said means the user may provide an input (e.g. a keyword in form of a text or in form of a complex search as described earlier (e.g. color, direction of text, etc.) to a/the corresponding searching engine. The results of the search may be considered to be presented to the user in different ways such as in text only or in form of the original images as they were entered (e.g. the same background, font, direction of text, color, etc.). In case of images, the results may be shown as a list/series of images that preferably can be scrolled, sorted (e.g. relocated in the list), etc. by the user or by the system.

According to one method, creation and search of a text (e.g. a word, phrase, etc.) systems as described may be provided through the picture/image editing application/system of the invention.

In an image editing application of the invention, typing and drawing/handwriting may be combined in order to edit an image. According to one embodiment, after providing a gesture, if a user begins to type on the keyboard, said gesture may be related to the direction of the entry of text through the keyboard. If not, said gesture may be considered by the system as a drawing action.

The image editing application of the invention may be used for taking/sharing/interacting with notes/text. As such several backgrounds may be available to the user (e.g. during note taking). Preferably, the welcome/start/home page of the image editing application may include one or more zones to display a (automatically or manually) selected (e.g. edited) image.

Note that in image editing application/system described throughout this/previous patent applications filed by this inventor, the word 'image' may be considered as a view of the content edited by said application/system.

In the image/content editing application/system/software (e.g. of the invention), according to one embodiment at least a portion of a content (e.g. text, image, drawing, video, etc.) created, received, edited or being edited may be controlled such that it is hidden (e.g. blurred, erased, covered by another content, etc.). Preferably said at least one portion of a content may be controlled by an (e.g. predefined) event/condition or a user (e.g. preferably a content creator, a receiver, or an editor), such that said hidden portion of a content is hidden from (e.g. other/identified) a (e.g. one or more) user(s) (e.g. receiving said content). Said content may be shared with others. According to one method, a (e.g. selected, predefined, etc.) receiving/consuming party/user(s) may be enabled to unhide/reveal/access (e.g. view) a hidden portion. According to another method, a hidden portion may be unhidden by another entity such as a (e.g. another) content creator or (e.g. automatically) upon a predefined satisfying of a predefined condition (e.g. after a laps of time, after a predefined number of users opened the content, upon a court order, etc.).

According to one method, a means (e.g. such as an icon in the menu, a gesture, a password, etc.) may be used to unhide/reveal/access a hidden portion of content or vice versa (e.g. hide a portion of content).

According to one embodiment, an unhidden portion may be hidden (e.g. again) by any (e.g. predefined) event/entity as described.

Note that a content may include one or more hidden portions. A first type of interaction may unhide/reveal/access one hidden portion at a time, and a second type of interaction may unhide/reveal/access all of the hidden portions and vice versa.

Note that according to one method, the whole content may be hidden/unhidden.

According to one method, the hidden portion may be a portion of a predefined content such as a text (e.g. of several lines) typed over an image without including the portion of the image that does not include the text (e.g. the portion of the image between the lines of text) or vice versa (e.g. hiding a portion of an image but excluding the text being/having typed on that portion).

Note that hiding a portion/whole image/content may be applied to any type of image/content, to an image/content accessed in any manner (e.g. a received shared image/content), etc.

According to one embodiment, a portion of the image/content may be defined to be hidden (e.g. and again unhidden) later. Said portion may be hidden upon completion of a (e.g. one or more) predefined condition(s) such as a predefined interaction (e.g. provided by the creator or a receiver, or another party, e.g. separately or together), at a predefined time, etc. As an example, a receiving party may receive an image/a content which is unhidden but a portion of it is predefined by the creator to be hidden at any moment. According to one method, said portion may be hidden (e.g. and later unhidden) by a predefined entity (e.g. a receiver, the creator, a third party such as court, etc.)

According to one embodiment, the means to unhide/reveal/access a hidden portion of content may be in form of a virtual gum/eraser such that each gesture using said gum/eraser may unhide an area of the hidden portion or vice versa (e.g. from unhidden to hidden).

According to one embodiment, the editing of a content may comprise including any type of media within the content. Preferably, a media (e.g. an audio, video, text, etc.) may be included in a content such that interacting with a related portion of the content may activate/unhide/reveal/access said media content/media. As an example, interacting with a location of a (e.g. received) content may be related to interacting with a hyperlink (e.g. a url) such that to activate said link.

Note that the hidden portion of a content may include any media such as an image and/or text and/or video and or/audio, etc.

Common passwords/group passwords (e.g.)/automatically/interaction/identify unhidden by mark/mark visible to a user but not others upon registration/fee According to one embodiment, a user receiving a content having at least one hidden portion (e.g. from a creator) may be provided with a means to either automatically unhide a hidden portion of said content or to manually unhide said content. Said means to unhide said portion(s) of said content may be provide by a creator/editor of said content to one or more receiving parties (e.g. within a group of users exchanging contents). For example, said means may be a password provided to one or more users of a group (e.g. during registration or at a later time, later exchanged between one or more users in a group).

According to another example, said means may be provided upon a fee to one or more users (e.g. within a private group or to anyone in the public, e.g. outside the group).

Note that a receiver of a content may editing a content (e.g. hiding a portion of content, typing text on the content, etc.) and may so be considered as a new creator of a content or editor of the content.

According to one embodiment, a portion of a content may be hidden or unhidden/revealed/accessed upon a predefined condition/interaction by a third party. As an example, a portion of an unhidden content (e.g. content of the invention) may be hidden upon instruction the system by a party (e.g. a creator, third party, a court, etc.) to hide/reveal/access said content or vice versa (e.g. from hidden to unhidden). As an example, at least a portion of a content stored in a server used by a content creator/provider may be hidden or unhidden as described such that said portion(s) of a content may be hidden or unhidden to the users accessing said content.

Note that according to one method, a hidden portion may preferably be marked/highlight by some means (e.g. change in color, spot, outline, frame, etc.). The mark may preferably be visible to the users who have a/said means to unhide a portion of a content. Note that an unhidden portion can be hidden by a user having a hiding/unhiding means. According to one method if a content having a hidden portion is automatically unhidden to a receiver, said mark may preferably be visible to the receiver to help/assist the receiver to hide said portion by interacting with said marked portion.

According to one method, one or more users may be considered as "trusted" relating to each other such that when they hide a portion of a content and share it said trusted user/s receive said content as unhidden or as hidden but they can unhide it easily (e.g. without using a password) while other users receive said content as hidden.

According to one method, the owner of a group may designate one or more members of a group as "trustee".

According to one method, statically/dynamically, a provider of a content may designate one or more receiving parties as trusted.

According to one method, a hidden portion may be unhidden by interacting with means such a button.

The content may be hidden by other content (e.g. 'hiding content', may be a portion of a content), for example, such as emoticons (e.g. smileys), pictures, advertising, drawings, etc. The content may be opened (e.g. accessed, unhidden), preferably, for example, by removing the hiding content. Preferably, after a user opens hidden content, such hidden content is preferably removed (e.g. hidden, destroyed, made inaccessible), or hidden again (e.g. by the same and/or different hiding content) after a predefined period of time. Opening of hidden content may be opened by various methods, for example, voice recognition, speaker recognition, finger print identification, and/or other access methods/means.

According to one method, a content sent to one or more users may include the hiding element. According to another method, a content may be sent without the hiding element but the information corresponding to the hiding element (e.g. type, size, position, etc.) may be sent also. In this case said hiding element may be provided separately from another source (e.g. a server, from the receiver device, etc.)

The covering/hiding content may be composed of more than one (e.g. individual) content. In this case, according to one method, such covering/hiding contents may preferably be removed one by one by the/a user (e.g. or several/all at a time). The covering/hiding content/s (e.g. emoticon) may be resizable (e.g. by pinching).

According to one embodiment, the hiding content may be related to the hidden portion of the other content hidden by said hiding content. For example, an advertiser (e.g. a manufacturer) may provide a cover/hiding content relating to its brand (e.g. its logo) on another content to hide at least a portion of said another content, and wherein the covered/hidden (e.g. portion of said) content may be an advertisement corresponding to said advertiser.

Note that a content partially of completely being hidden may herein be referred to a as a hidden content.

According to one method, when a hidden content is shared with (sent to) trusted and untrusted parties, trusted parties may receive it unhidden while others may receive it hidden.

According to one method, a content may have several hidden portions wherein not all of them is or may be unhidden to/by a single user.

According to one embodiment, the hidden content, such as an image or portion of an image, may preferably be hidden by another content of the same type, such as another image (e.g. blurring or semi-translucent means/content (e.g. similar image), or the image same blurring the hidden content or similar, over the hidden content).

The system described above may be applied to any type of content. For example in a texting application a portion of a text may be hidden and/or unhidden as described.

Note that the/a gesture corresponding to the direction of a text may be provided in the air. The text may be entered by any other means such as through a speech recognition system. The methods/principles of hiding/covering and unhiding/uncovering as described may be used in many application(s). As an example, an electronic lottery application may use such methods/principles. As an example, a lottery organization may provide lottery tickets wherein the prize (e.g. sum of the prize money, gift, points, etc.) of the lottery may be hidden as described. According to a first method, the database of the lottery tickets may be accessed remotely by the users to select/purchase (e.g. by downloading) one or more tickets. According to a second method, one or more lottery tickets may be randomly or predefinely or on demand, etc., be sent to one or more (e.g. a community) of users by the lottery organization.

With continuous description of the current example, a/the user then may unhide the prize portion of a ticket to see his/her winning, if any (e.g. there may or may not be a prize hidden under the cover).

According to one embodiment, a long pressing action on a word that has been entered may select said word (e.g. for re-editing as described before). A tapping action on a selected word may unselect said word. Accordingly, a tapping action outside a selected word may result in popping up a content such as the keyboard and/or a menu, etc.

It must be noted that in different paragraphs in this application, a gliding action has been described to combine a long pressing action. It must be noted that the long pressing action can be provided at any moment such as at the beginning, in the middle, or at the end of during said gliding action.

It must be noted that in some embodiments the term "special characters" may be considered to refer to special characters and/or functions.

Note that in all of the embodiments, the type of interaction described is exemplary and may be replaced by any other type of interaction such as those described known by people skilled in the art. For example, a press-and-holding action on a key for at least a predefined of time to enter said key into a mode instance may be replaced an interaction such as pressing a second key and simultaneously interacting with said first key.

Additionally, many types of interactions with a key (of the first keypad) for assigning a different group of characters to each of them may be considered by people skilled in the art. For example, each of, touching a key and preferably touching another key, touching a key and touching a different predefined location on the screen, touching a key and touching any location on the screen, etc, may be considered as a different type of interaction with said key.

Thus, while there have been shown and described and pointed out fundamental novel features of the invention as applied to alternative embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto. It is to be understood that the drawings are not necessarily drawn to scale, but that they are merely conceptual in nature.

It must be noted, that any of the systems, features, means, methods, etc., described in this patent application may be used separately or being combined with systems, features, means, methods, etc., of other different embodiments of the invention.

It must be noted that the number of keys, configuration of letters on said keys, key arrangements, type of keys, etc., are being described as examples. They can be designed differently by people skilled in the art by considering the principles of the invention. It must also be noted that a touch sensitive surface may be touchpad, a touch screen, etc.

It must be noted that although in some embodiments through this application for describing the principle of the data entry system of the invention, a touch screen has been used as an example, obviously, any type of touch sensitive surface, any other type of surface, any number of said surfaces on which to which at least a portion on the input interface (e.g. the input keys/zones used by the system) may be considered for the same purpose.

Optionally all of the input interactions described throughout this patent application may be provided in the air. To intercept such interactions different types of detecting means such as camera(s), accelerometer(s), etc., may be user.

It is noted that, although according the preferred principle/embodiment of the invention a full set of the letters of a language are distributively assigned to the keys of a keypad, minor modifications/variations may be considered/provided to this principle by people skilled in the art.

The input system of the embodiments of the present invention may be used with substantially any electronic and/or computerized device, such as cellular phones, GPS devices, tablets, remote controls, handheld devices, television settop boxes and music players, cameras, etc.

It must be noted that although in this patent application "key" and "(predefined) type of interaction with key" has been used to demonstrate different embodiments and methods as described, any (predefined) input means (e.g. providing an input signal) and any (predefined) type of interaction provided through said input means to provide a (e.g. a predefined/different) input signal may be used for the same purpose.

It must be noted that the features such as keypads, key arrangements, number of keys, assignment of a set of characters of a language to each of a first and second set of keys (e.g. or to each of a second and a second type of interactions with one set of keys), type of keys, type of interactions, etc., as described and shown in this patent application are shown as examples to describe different embodiments of the invention. Obviously, other type of such features can be considered by people skilled in the art.

The term key is meant to include any device which identifies finger actuations including pressure sensors, thermal sensors, acceleration sensors, optical systems for tracking movements of the finger, finger caps and gloves with sensors.

While the above description relates to the Latin alphabet, the principles of the invention may be implemented on other alphabets such as Arabic, Hebrew, phonetic alphabets.

Note that, the term of "during the entry of a word" used throughout this application may preferably refer to a word (e.g. the current predicted word) being typed before an end-of-the-word signal such as a space character is entered at the end of the word.

It will be appreciated that the above described methods may be varied in many ways, including, changing the specific elements used and their layout. It should also be appreciated that the above described description of methods and apparatus are to be interpreted as including apparatus for carrying out the methods and methods of using the apparatus. The present invention has been described using non-limiting detailed descriptions of embodiments thereof that are provided by way of example and are not intended to limit the scope of the invention. Many specific implementation details may be used. The above embodiments may be implemented in hardware, software, firmware or combinations thereof.

It should be understood that features and/or steps described with respect to one embodiment may be used with other embodiments and that not all embodiments of the invention have all of the features and/or steps shown in a particular FIGURE or described with respect to one of the embodiments. Variations of embodiments described will occur to persons of the art. Furthermore, the terms "comprise," "include," "have" and their conjugates, shall mean, when used in the claims, "including but not necessarily limited to."

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims.

It must be noted that in some embodiments specific types of interactions such as a first and/or second types of the interaction are being used to describe the embodiment.

The invention claimed is:

1. A system for using multiple applications on a screen of a device, comprising:
an electronic device having a touchscreen;
an on-screen keyboard for entering text in a first application running within said device wherein a first zone of said touchscreen is assigned to an interface of said first application and a second zone of said touchscreen is assigned to said keyboard; and
wherein based on accomplishment of a condition under the control of said keyboard, the system activates a second application and displays an interface of the second application and a reduced interface corresponding to said keyboard on at least a portion of said second zone, and wherein said interface of said first application, said interface of said second application, and the reduced interface corresponding to said keyboard are simultaneously displayed on said touchscreen.

2. The system of claim 1, wherein upon interacting with the interface of any of said applications, the focus of the system is given to the interacted application.

3. The system of claim 1, wherein said keyboard is used with both of said applications.

4. The system of claim 1, wherein an information received from one of said applications is shared with at least the other application while said interface of said first application and said interface of said second application are simultaneously displayed on said touchscreen.

5. The system of claim 4, wherein said information includes at least one of, a text, an image, a video, a webpage and a URL.

6. The system of claim 4, wherein said information is copied from one of said applications and pasted in the other application.

7. The system of claim 1, wherein at least one of the applications is a messaging application.

8. The system of claim 1, wherein said second application is a search application activated by interacting with a button of said keyboard assigned to activating said search application.

9. The system of claim 8, wherein said search application use at least one keyword typed through said keyboard.

10. The system of claim 1, wherein at least one of the applications is used for sharing at least one of text, pictures, or videos.

11. The system of claim 1, wherein said device is a mobile phone.

12. A method comprising:
assigning a first zone of a touch screen to an interface of a first application;
assigning a second zone of said touch screen to an on-screen keyboard; and
based on accomplishment of a condition under the control of said keyboard, activating a second application and displaying an interface of the second application and a reduced Interface corresponding to said keyboard on at least a portion of said second zone of said touch screen and wherein said interface of said first application, said interface of said second application, and the reduced Interface corresponding to said keyboard are simultaneously displayed on said touch screen.

13. The method of claim 12, comprising using said keyboard with both of said applications.

14. The method of claim 12, wherein at least one of said applications is one of, a text messaging application and an image sharing application.

15. The method of claim 12, wherein said interface of said second application is displayed on the touch screen by using a search application activated by providing a predefined interaction with a button of said keyboard that is related to activating said search application.

16. The method of claim 15, wherein said search application use at least one keyword typed through said keyboard.

17. The method of claim 15, wherein said search application use at least one keyword typed through said keyboard after said search application is activated.

18. The method of claim 12, wherein an information received from one of said applications is shared with at least the other application while said interface of said first application and said interface of said second application are simultaneously displayed on said touch screen.

19. The method of claim 18, wherein said information includes at least one of a text, an image, a video, a webpage and a URL.

20. The method of claim 12, wherein upon interacting with the interface of any of said applications, the focus of the system is given to the interacted application.

21. The method of claim 12, wherein said touch screen is integrated within a mobile communication device.

* * * * *